US011999763B2

(12) United States Patent
Fan et al.

(10) Patent No.: US 11,999,763 B2
(45) Date of Patent: Jun. 4, 2024

(54) ORGANOMETALLIC COMPLEX, OLEFIN POLYMERIZATION CATALYST SYSTEM AND POLYMERIZATION PROCESS

(71) Applicant: NOVA CHEMICALS (INTERNATIONAL) S.A., Fribourg (CH)

(72) Inventors: Cheng Fan, Calgary (CA); Charles Carter, Calgary (CA); Darryl Morrison, Calgary (CA); Xiaoliang Gao, Calgary (CA); James T. Goettel, Calgary (CA); Daisy Cruz-Milette, Calgary (CA); Frederick Chiu, Calgary (CA)

(73) Assignee: NOVA CHEMICALS (INTERNATIONAL) S.A., Fribourg (CH)

( * ) Notice: Subject to any disclaimer, the term of this patent is extended or adjusted under 35 U.S.C. 154(b) by 0 days.

(21) Appl. No.: 18/379,510

(22) Filed: Oct. 12, 2023

(65) Prior Publication Data

US 2024/0124502 A1 Apr. 18, 2024

Related U.S. Application Data

(63) Continuation of application No. PCT/IB2023/052757, filed on Mar. 21, 2023.

(60) Provisional application No. 63/344,881, filed on May 23, 2022, provisional application No. 63/322,409, filed on Mar. 22, 2022.

(51) Int. Cl.

| | |
|---|---|
| ***C07F 15/00*** | (2006.01) |
| ***C07F 9/535*** | (2006.01) |
| ***C07F 9/572*** | (2006.01) |

(52) U.S. Cl.

CPC .......... *C07F 9/5355* (2013.01); *C07F 9/5728* (2013.01)

(58) Field of Classification Search

None

See application file for complete search history.

(56) References Cited

U.S. PATENT DOCUMENTS

| | | | |
|---|---|---|---|
| 6,861,485 | B2 | 3/2005 | Wang |
| 6,995,216 | B2 | 2/2006 | Winslow et al. |
| 7,276,566 | B2 | 10/2007 | Muruganandam et al. |
| 7,410,926 | B2 | 8/2008 | Kao |
| 7,566,677 | B2 | 7/2009 | Muruganandam et al. |
| 7,897,706 | B2 | 3/2011 | Kao |
| 8,088,704 | B2 | 1/2012 | Kolb et al. |
| 8,586,497 | B2 | 11/2013 | Kolb et al. |

FOREIGN PATENT DOCUMENTS

| | | |
|---|---|---|
| CA | 2553782 | 9/2005 |
| DE | 102007057854 | 6/2009 |

OTHER PUBLICATIONS

Alhomaidan, O. et al., "Use of Olefine Metathesis to Link Phosphinimide-Cyclopentadienyl Ligand Complexes: Synthesis, Structure, and Ethylene Polymerization Activity", *Organometallics*, 27: 6343-6352, 2008.

Ghesner, I. et al., "Di-tert-butylbiphenylphosphinimide Titanium and Zirconium Complexes: Pendant Arene-Metal Interactions", *Organometallics*, 25: 4985-4995, 2006.

International Search Report and Written Opinion issued in corresponding PCT Application No. PCT/IB2023/052757, mailed Jun. 19, 2023.

*Primary Examiner* — Yun Qian

(74) *Attorney, Agent, or Firm* — NORTON ROSE FULBRIGHT US LLP

(57) ABSTRACT

Organometallic complexes are described which are useful as pre-polymerization catalysts which may form part of olefin polymerization catalyst systems. The catalyst systems find use in the polymerization of ethylene, optionally with one or more $C_{3-12}$ alpha-olefin comonomers. The organometallic complexes are broadly represented by formula I:

(I)

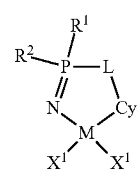

wherein L is a bridging group containing a contiguous chain of atoms connecting P with Cy, wherein the contiguous chain contains 2 or 3 atoms and wherein Cy is a cyclopentadienyl-type ligand. The olefin polymerization catalyst system is effective at polymerizing ethylene with alpha-olefins in a solution phase polymerization process at high temperatures and produces ethylene copolymers with high molecular weight and high degrees of alpha-olefin incorporation. Premetallation compounds, metallation processes and synthetic methods to make the organometallic complexes as well as polymerization processes are also described.

26 Claims, 4 Drawing Sheets

ORGANOMETALLIC COMPLEX, OLEFIN POLYMERIZATION CATALYST SYSTEM AND POLYMERIZATION PROCESS

CROSS REFERENCE TO RELATED APPLICATIONS

The present application is a continuation of International Application PCT/IB2023/052757 filed Mar. 21, 2023, which claims priority to U.S. Provisional Application 63/322,409 filed Mar. 22, 2022, and U.S. Provisional Application 63/344,881 filed May 23, 2022. Each application is incorporated herein by reference in its entirety.

TECHNICAL FIELD

An organometallic complex is provided which finds use within an olefin polymerization catalyst system. Olefin polymerization catalyst systems containing the organometallic complex find use in the polymerization of ethylene, optionally with one or more than one alpha-olefin.

BACKGROUND ART

A wide variety of single site catalysts have been developed to carry out the polymerization of olefins. For example, olefin polymerization catalysts containing phosphinimine ligands are known. Polymerization catalysts having a cyclopentadienyl-type ligand, so called "half sandwich" complexes, are also known.

U.S. Pat. No. 6,063,879 describes Group IV metal complexes containing a monocyclopentadienyl ligand and a phosphinimine ligand. The complexes are described as useful for the polymerization of ethylene and optionally one or more aliphatic or aromatic hydrocarbyl $C_{2-20}$ mono- or di-olefins.

There is a continuing desire to enhance the performance of single site catalysts for use in high temperature olefin polymerization processes, such as solution phase olefin polymerization. Catalysts which operate at higher temperature are desirable because a higher reaction temperature during polymerization reduces energy expenditure.

It would therefore be desirable to provide a single site catalyst with higher thermal stability.

SUMMARY OF INVENTION

We now report on organometallic complexes (also referred to herein as "pre-polymerization catalysts") which can be used in an olefin polymerization catalyst system which has high activity and produces polyethylene of high molecular weight at high conversion efficiency. The olefin polymerization catalyst system is effective at polymerizing ethylene with alpha-olefins in a solution phase polymerization process at high temperatures and produces ethylene copolymers with high molecular weight and high degrees of alpha-olefin incorporation.

An embodiment of the disclosure is an organometallic complex represented by formula I:

(I)

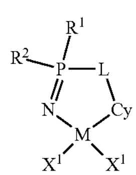

wherein 2

M is Ti, Zr or Hf;

$R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula $—NR'_2$; a silyl group of the formula $—Si(R^a)_3$; a germanyl group of the formula $—Ge(R^a)_3$; and a phosphinimine group of the formula $N{=}P(R^b)(R^c)(R^d)$; wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

each $X^1$ is an activatable ligand;

Cy is a cyclopentadienyl-type ligand covalently bound to L and coordinated to M via η-bonding; and L is a bridging group containing a contiguous chain of atoms connecting P with Cy, wherein the contiguous chain contains 2 or 3 atoms.

An embodiment of the disclosure is an organometallic complex represented by formula II:

(II)

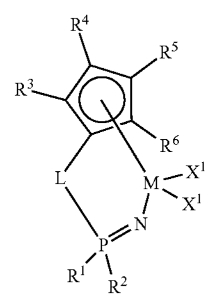

wherein

M is Ti, Zr or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula N═P($R^b$)($R^c$)($R^d$);

wherein $R^3$, $R^4$, $R^5$ and $R^6$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_1$-20 alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^3$, $R^4$, $R^5$ and $R^6$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

each $X^1$ is an activatable ligand; and

L is a bridging group containing a contiguous chain of atoms connecting P with Cy, wherein the contiguous chain contains 2 or 3 atoms.

An embodiment of the disclosure is an organometallic complex which is represented by formula III:

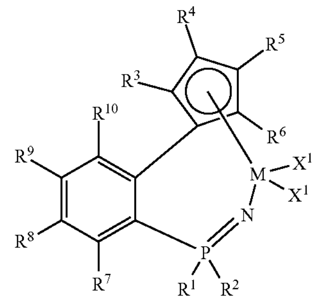

(III)

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula N═P($R^b$)($R^c$)($R^d$);

wherein $R^3$, $R^4$, $R^5$, $R^6$, $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^3$, $R^4$, $R^5$, $R^6$, $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group; and wherein each $X^1$ is an activatable ligand.

An embodiment of the disclosure is an organometallic complex which is represented by formula IV:

(IV)

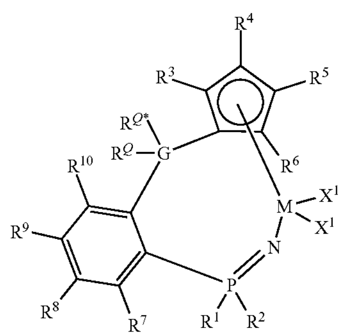

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula N=P($R^b$)($R^c$)($R^d$);

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^3$, $R^4$, $R^5$, $R^6$, $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^3$, $R^4$, $R^5$, $R^6$, $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and wherein each $X^1$ is an activatable ligand.

An embodiment of the disclosure is an organometallic complex which is represented by formula V:

(V)

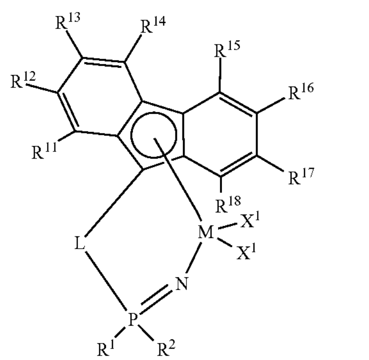

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$);

wherein $R^{11}$, $R^{12}$, $R^{13}$, $R^{14}$, $R^{15}$, $R^{16}$, $R^{17}$, $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^{11}$, $R^{12}$, $R^{13}$, $R^{14}$, $R^{15}$, $R^{16}$, $R^{17}$, $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group;

each $X^1$ is an activatable ligand; and

L is a bridging group containing a contiguous chain of atoms connecting P with Cy, wherein the contiguous chain contains 2 or 3 atoms.

An embodiment of the disclosure is an organometallic complex which is represented by formula VI:

(VI)

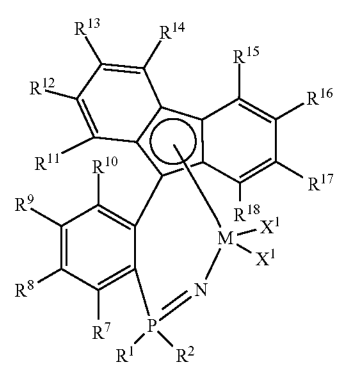

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$);

wherein $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and each $X^1$ is an activatable ligand.

An embodiment of the disclosure is an organometallic complex which is represented by formula VII:

(VII)

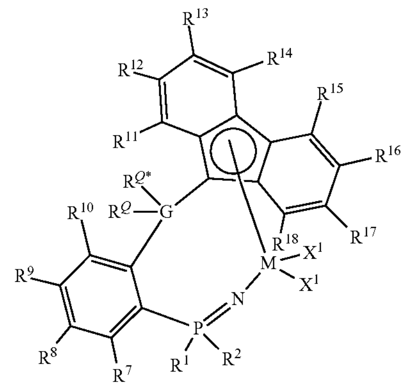

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$);

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_1$-20 alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and each $X^1$ is an activatable ligand.

An embodiment of the disclosure is an organometallic complex which is represented by formula VIII:

(VIII)

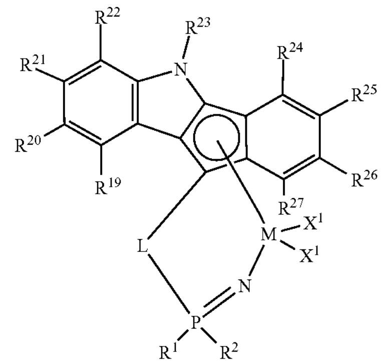

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$;

wherein $R^{23}$ is selected from the group consisting of hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein $R^{19}$, $R^{20}$, $R^{21}$, $R^{22}$, $R^{24}$, $R^{25}$, $R^{26}$, and $R^{27}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^{19}$, $R^{20}$, $R^{21}$, $R^{22}$, $R^{24}$, $R^{25}$, $R^{26}$, and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR, a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group;

each $X^1$ is an activatable ligand; and

L is a bridging group containing a contiguous chain of atoms connecting P with Cy, wherein the contiguous chain contains 2 or 3 atoms.

An embodiment of the disclosure is an organometallic complex which is represented by formula IX:

(IX)

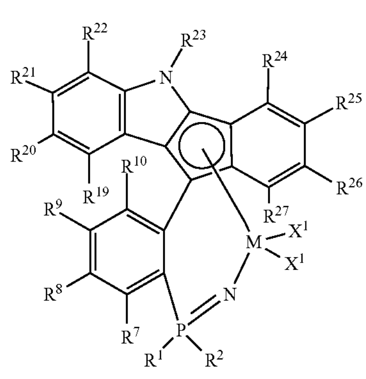

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$);

wherein $R^{23}$ is selected from the group consisting of hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein $R^7$, $R^8$, $R^9$, $R^{10}$, $R^{19}$, $R^{20}$, $R^{21}$, $R^{22}$, $R^{24}$, $R^{25}$, $R^{26}$ and $R^{27}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$, $R^{10}$, $R^{19}$, $R^{20}$, $R^{21}$, $R^{22}$, $R^{24}$, $R^{25}$, $R^{26}$, and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and each $X^1$ is an activatable ligand.

An embodiment is an olefin polymerization catalyst system comprising:

i) an organometallic complex represented by formula I:

(I)

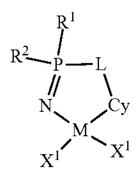

wherein

M is Ti, Zr or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$); wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

each $X^1$ is an activatable ligand;

Cy is a cyclopentadienyl-type ligand covalently bound to L and coordinated to M via η-bonding; and L is a bridging group containing a contiguous chain of atoms connecting P with Cy, wherein the contiguous chain contains 2 or 3 atoms; and ii) a catalyst activator.

An embodiment is an olefin polymerization catalyst system comprising:

i) an organometallic complex represented by formula II:

(II)

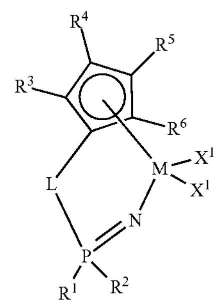

wherein

M is Ti, Zr or Hf;

$R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$);

wherein $R^3$, $R^4$, $R^5$ and $R^6$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR;

a silyl group of the formula —$Si(R^a)_3$; and a germanyl group of the formula —$Ge(R^a)_3$;

wherein two adjacent groups of $R^3$, $R^4$, $R^5$ and $R^6$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

each $X^1$ is an activatable ligand; and

L is a bridging group containing a contiguous chain of atoms connecting P with Cy, wherein the contiguous chain contains 2 or 3 atoms; and ii) a catalyst activator.

An embodiment is an olefin polymerization catalyst system comprising:

i) an organometallic complex represented by formula III:

(III)

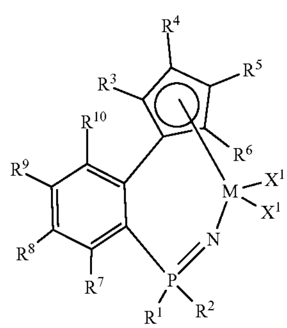

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$;

wherein $R^3$, $R^4$, $R^5$, $R^6$, $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^3$, $R^4$, $R^5$, $R^6$, $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group; and wherein each $X^1$ is an activatable ligand; and ii) a catalyst activator.

An embodiment is an olefin polymerization catalyst system comprising:

i) an organometallic complex represented by formula IV:

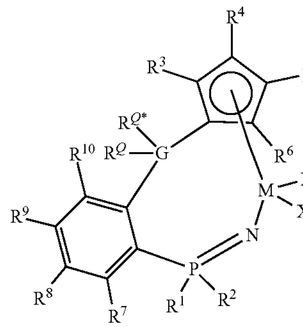

(IV)

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$;

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein $R^3$, $R^4$, $R^5$, $R^6$, $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^3$, $R^4$, $R^5$, $R^6$, $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and wherein each $X^1$ is an activatable ligand; and ii) a catalyst activator.

An embodiment is an olefin polymerization catalyst system comprising:

i) an organometallic complex represented by formula V:

(V)

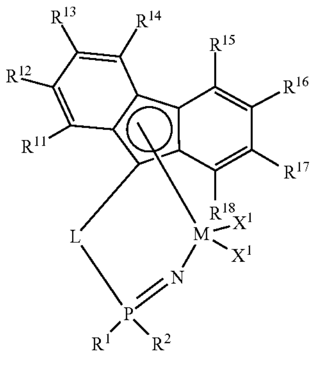

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$;

wherein $R^{11}$, $R^{12}$, $R^{13}$, $R^{14}$, $R^{15}$, $R^{16}$, $R^{17}$, $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^{11}$, $R^{12}$, $R^{13}$, $R^{14}$, $R^{15}$, $R^{16}$, $R^{17}$, $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group;

each $X^1$ is an activatable ligand; and

L is a bridging group containing a contiguous chain of atoms connecting P with Cy, wherein the contiguous chain contains 2 or 3 atoms; and ii) a catalyst activator.

An embodiment is an olefin polymerization catalyst system comprising:

i) an organometallic complex represented by formula VI:

(VI)

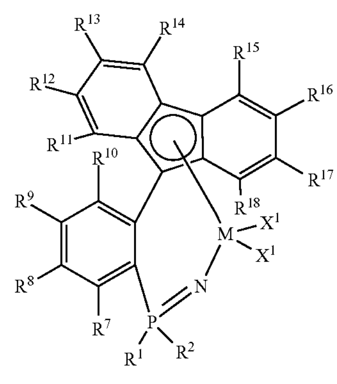

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$;

wherein $R^7$, $R^8$, $R^9$, $R^{10}$, $R^{11}$, $R^{12}$, $R^{13}$, $R^{14}$, $R^{15}$, $R^{16}$, $R^{17}$, and $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^7$, $R^8$, $R^9$, $R^{10}$, $R^{11}$, $R^{12}$, $R^{13}$, $R^{14}$, $R^{15}$, $R^{16}$, $R^{17}$, and $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and each $X^1$ is an activatable ligand; and ii) a catalyst activator.

An embodiment is an olefin polymerization catalyst system comprising:

i) an organometallic complex represented by formula VII:

(VII)

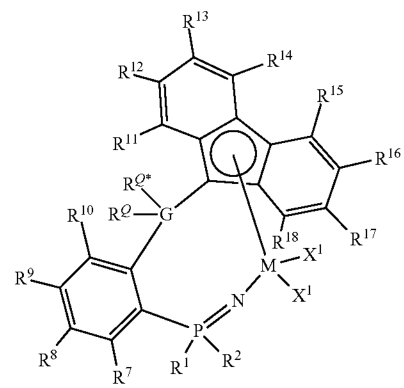

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$;

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and each $X^1$ is an activatable ligand; and ii) a catalyst activator.

An embodiment is an olefin polymerization catalyst system comprising:

i) an organometallic complex represented by formula VIII:

(VIII)

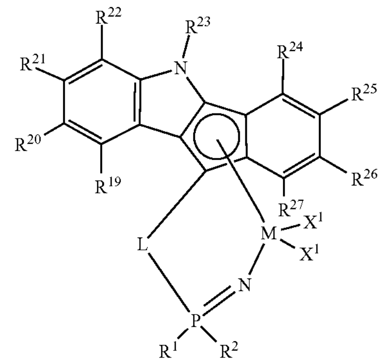

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$;

wherein $R^{23}$ is selected from the group consisting of hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein $R^{19}$, $R^{20}$, $R^{21}$, $R^{22}$, $R^{24}$, $R^{25}$, $R^{26}$ and $R^{27}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^{19}$, $R^{20}$, $R^{21}$, $R^{22}$, $R^{24}$, $R^{25}$, $R^{26}$ and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR, a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group;

each $X^1$ is an activatable ligand; and

L is a bridging group containing a contiguous chain of atoms connecting P with Cy, wherein the contiguous chain contains 2 or 3 atoms; and ii) a catalyst activator.

An embodiment is an olefin polymerization catalyst system comprising:

i) an organometallic complex represented by formula IX:

(IX)

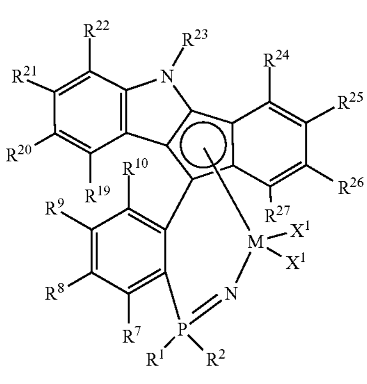

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$);

wherein $R^{23}$ is selected from the group consisting of hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein $R^7$, $R^8$, $R^9$, $R^{10}$, $R^{19}$, $R^{20}$, $R^{21}$, $R^{22}$, $R^{24}$, $R^{25}$, $R^{26}$ and $R^{27}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$, $R^{10}$, $R^{19}$, $R^{20}$, $R^{21}$, $R^{22}$, $R^{24}$, $R^{25}$, $R^{26}$, and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and each $X^1$ is an activatable ligand; and ii) a catalyst activator.

In an embodiment of the disclosure a catalyst activator comprises a catalyst activator selected from the group consisting of an alkylaluminoxane co-catalyst, an organoaluminum compound, a boron-based catalyst activator, and mixtures thereof.

In an embodiment of the disclosure a boron-based catalyst activator is selected from the group consisting of [(hydrogenated tallow alkyl)$_2$(Me)NH][$B(C_6F_5)_4$]; N,N-dimethylanilinium tetrakis(pentafluorophenyl) borate (["$Me_2NHPh$][$B(C_6F_5)_4$]"); and triphenylmethylium tetrakis (pentafluorophenyl) borate (["$Ph_3C$][$B(C_6F_5)_4$]") An embodiment of the disclosure is a polymerization process comprising polymerizing ethylene optionally with one or more than one $C_3$-$C_{12}$ alpha-olefin in the presence of an olefin polymerization catalyst system comprising:

i) an organometallic complex represented by formula I:

(I)

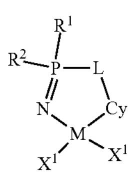

wherein

M is Ti, Zr or Hf;

$R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —N=P($R^b$)($R^c$)($R^d$); wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

each $X^1$ is an activatable ligand;

Cy is a cyclopentadienyl-type ligand covalently bound to L and coordinated to M via η-bonding; and L is a bridging group containing a contiguous chain of atoms connecting P with Cy, wherein the contiguous chain contains 2 or 3 atoms; and ii) a catalyst activator.

An embodiment of the disclosure is a polymerization process comprising polymerizing ethylene optionally with one or more than one $C_3$-$C_{12}$ alpha-olefin in the presence of an olefin polymerization catalyst system comprising:

i) an organometallic complex represented by formula II:

(II)

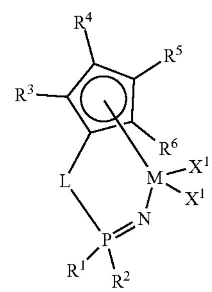

wherein

M is Ti, Zr or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —N=P($R^b$)($R^c$)($R^d$);

wherein $R^3$, $R^4$, $R^5$ and $R^6$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^3$, $R^4$, $R^5$ and $R^6$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

each $X^1$ is an activatable ligand; and

L is a bridging group containing a contiguous chain of atoms connecting P with Cy, wherein the contiguous chain contains 2 or 3 atoms; and ii) a catalyst activator.

An embodiment of the disclosure is a polymerization process comprising polymerizing ethylene optionally with one or more than one $C_3$-$C_{12}$ alpha-olefin in the presence of an olefin polymerization catalyst system comprising:

i) an organometallic complex represented by formula III:

(III)

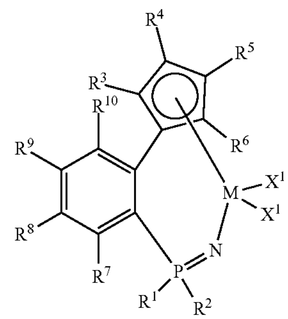

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$);

wherein $R^3$, $R^4$, $R^5$, $R^6$, $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^3$, $R^4$, $R^5$, $R^6$, $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group; and wherein each $X^1$ is an activatable ligand; and ii) a catalyst activator.

An embodiment of the disclosure is a polymerization process comprising polymerizing ethylene optionally with one or more than one $C_3$-$C_{12}$ alpha-olefin in the presence of an olefin polymerization catalyst system comprising:

i) an organometallic complex represented by formula IV:

(IV)

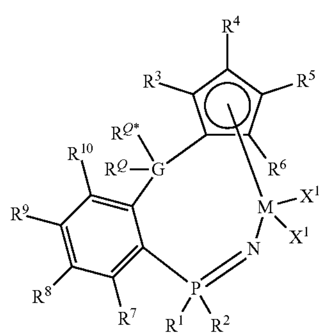

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$);

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^3$, $R^4$, $R^5$, $R^6$, $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^3$, $R^4$, $R^5$, $R^6$, $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and wherein each $X^1$ is an activatable ligand; and ii) a catalyst activator.

An embodiment of the disclosure is a polymerization process comprising polymerizing ethylene optionally with one or more than one $C_3$-$C_{12}$ alpha-olefin in the presence of an olefin polymerization catalyst system comprising:

i) an organometallic complex represented by formula V:

(V)

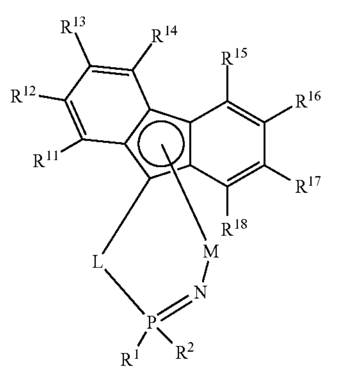

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$);

wherein $R^{11}$, $R^{12}$, $R^{13}$, $R^{14}$, $R^{15}$, $R^{16}$, $R^{17}$, $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^{11}$, $R^{12}$, $R^{13}$, $R^{14}$, $R^{15}$, $R^{16}$, $R^{17}$, $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group;

each $X^1$ is an activatable ligand; and

L is a bridging group containing a contiguous chain of atoms connecting P with Cy, wherein the contiguous chain contains 2 or 3 atoms; and ii) a catalyst activator.

An embodiment of the disclosure is a polymerization process comprising polymerizing ethylene optionally with one or more than one $C_3$-$C_{12}$ alpha-olefin in the presence of an olefin polymerization catalyst system comprising:

i) an organometallic complex represented by formula VI:

(VI)

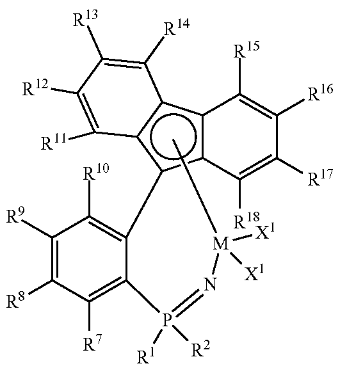

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$;

wherein $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and each $X^1$ is an activatable ligand; and ii) a catalyst activator.

An embodiment of the disclosure is a polymerization process comprising polymerizing ethylene optionally with one or more than one $C_3$-$C_{12}$ alpha-olefin in the presence of an olefin polymerization catalyst system comprising:

i) an organometallic complex represented by formula VII:

(VII)

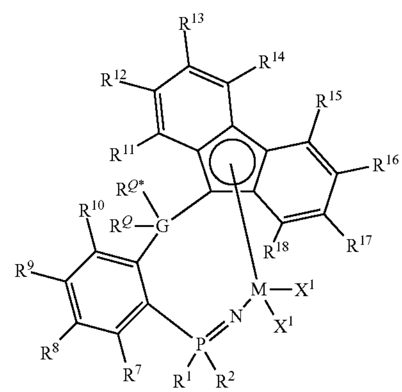

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —N═$P(R^b)(R^c)(R^d)$;

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and each $X^1$ is an activatable ligand; and ii) a catalyst activator.

An embodiment of the disclosure is a polymerization process comprising polymerizing ethylene optionally with one or more than one $C_3$-$C_{12}$ alpha-olefin in the presence of an olefin polymerization catalyst system comprising:

i) an organometallic complex represented by formula VIII:

(VIII)

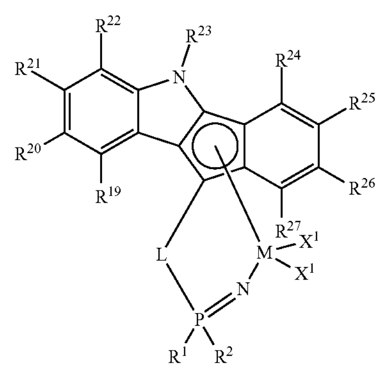

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$);

wherein $R^{23}$ is selected from the group consisting of hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein $R^{19}$, $R^{20}$, $R^{21}$, $R^{22}$, $R^{24}$, $R^{25}$, $R^{26}$ and $R^{27}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^{19}$, $R^{20}$, $R^{21}$, $R^{22}$, $R^{24}$, $R^{25}$, $R^{26}$ and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group;

each $X^1$ is an activatable ligand; and

L is a bridging group containing a contiguous chain of atoms connecting P with Cy, wherein the contiguous chain contains 2 or 3 atoms; and ii) a catalyst activator.

An embodiment of the disclosure is a polymerization process comprising polymerizing ethylene optionally with one or more than one $C_3$-$C_{12}$ alpha-olefin in the presence of an olefin polymerization catalyst system comprising:

i) an organometallic complex represented by formula IX:

(IX)

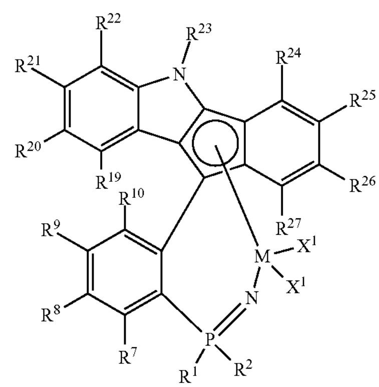

wherein M is Ti, Zr or Hf;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$);

wherein $R^{23}$ is selected from the group consisting of hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein $R^7$, $R^8$, $R^9$, $R^{10}$, $R^{19}$, $R^{20}$, $R^{21}$, $R^{22}$, $R^{24}$, $R^{25}$, $R^{26}$ and $R^{27}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^7$, $R^8$, $R^9$, $R^{10}$, $R^{19}$, $R^{20}$, $R^{21}$, $R^{22}$, $R^{24}$, $R^{25}$, $R^{26}$, and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and each $X^1$ is an activatable ligand; and ii) a catalyst activator.

In an embodiment one or more than one $C_3$-$C_{12}$ alpha-olefin comprise one or more than one alpha-olefin selected from the group consisting of propylene, 1-butene, 1-hexene, and 1-octene.

In an embodiment one or more than one $C_3$-$C_{12}$ alpha-olefin comprise one or more than one alpha-olefin selected from the group consisting of 1-butene, 1-hexene, and 1-octene.

In an embodiment a polymerization process comprises polymerizing ethylene with 1-octene.

In an embodiment a polymerization process is a solution phase polymerization process carried out in a solvent.

In an embodiment a solution phase polymerization process is carried out at a temperature of at least 140° C.

In an embodiment a solution phase polymerization process is carried out at a temperature of at least 160° C.

In an embodiment a polymerization process is a continuous solution phase polymerization process carried out in a solvent.

In an embodiment a continuous solution phase polymerization process is carried out in at least one continuously stirred tank reactor.

In an embodiment a continuous solution phase polymerization process is carried out in at least one continuously stirred tank reactor at a temperature of at least 140° C.

In an embodiment a continuous solution phase polymerization process is carried out in at least one continuously stirred tank reactor at a temperature of at least 160° C.

An embodiment of the disclosure is a compound represented by formula I-L:

(I-L)

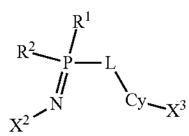

wherein (I-L)

$R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$; wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

Cy is a cyclopentadienyl-type moiety and is covalently bound to L and $X^3$, $X^2$ is hydrogen, or a silyl group of the formula —$Si(R^e)_3$, $X^3$ is hydrogen, or a silyl group of the formula —$Si(R^e)_3$, or a stannyl group of the formula $Sn(R^e)_3$;

wherein each $R^e$ is independently selected from the group consisting of hydrogen, a $C_{1-8}$ alkyl group, $C_{1-8}$ alkoxy group, $C_{6-20}$ aryloxy group, and a $C_{6-20}$ aryl group; and L is a bridging group containing a contiguous chain of atoms connecting P with Cy, wherein the contiguous chain contains 2 or 3 atoms.

An embodiment of the disclosure is a compound represented by formula I-L-H:

(I-L-H)

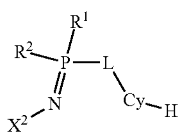

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$; wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

$X^2$ is hydrogen, or a silyl group of the formula —$Si(R^e)_3$, wherein each $R^e$ is independently selected from the group consisting of hydrogen, a $C_{1-8}$ alkyl group, $C_{1-8}$ alkoxy group, $C_{6-20}$ aryloxy group and a $C_{6-20}$ aryl group;

Cy is a cyclopentadienyl-type moiety and is covalently bound to L and H; and

L is a bridging group containing a contiguous chain of atoms connecting P with Cy, wherein the contiguous chain contains 2 or 3 atoms.

An embodiment of the disclosure is a compound represented by formula II-L:

(II-L)

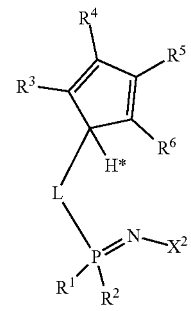

or double bond isomers of formula II-L which are available by migration of the hydrogen, H* within the cyclopentadienyl ring;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$;

wherein $R^3$, $R^4$, $R^5$ and $R^6$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR;

a silyl group of the formula —$Si(R^a)_3$; and a germanyl group of the formula —$Ge(R^a)_3$;

wherein two adjacent groups of $R^3$, $R^4$, $R^5$ and $R^6$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

$X^2$ is hydrogen, or a silyl group of the formula —Si($R^e$)$_3$, wherein each $R^e$ is independently selected from the group consisting of hydrogen, a $C_{1-8}$ alkyl group, $C_{1-8}$ alkoxy group, $C_{6-20}$ aryloxy group and a $C_{6-20}$ aryl group; and L is a bridging group containing a contiguous chain of atoms connecting P with Cy, wherein the contiguous chain contains 2 or 3 atoms.

An embodiment of the disclosure is a compound represented by formula III-L:

(III-L)

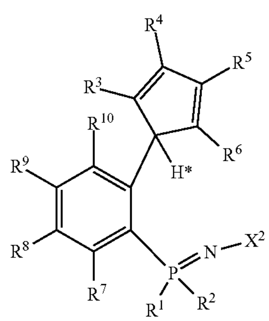

or double bond isomers of formula III-L which are available by migration of the hydrogen, H* within the cyclopentadienyl ring;

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$);

wherein $R^3$, $R^4$, $R^5$, $R^6$, $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^3$, $R^4$, $R^5$, $R^6$, $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group; and $X^2$ is hydrogen, or a silyl group of the formula —Si($R^e$)$_3$, wherein each $R^e$ is independently selected from the group consisting of hydrogen, a $C_{1-8}$ alkyl group, $C_{1-8}$ alkoxy group, $C_{6-20}$ aryloxy group and a $C_{6-20}$ aryl group.

An embodiment of the disclosure is a compound represented by formula IV-L:

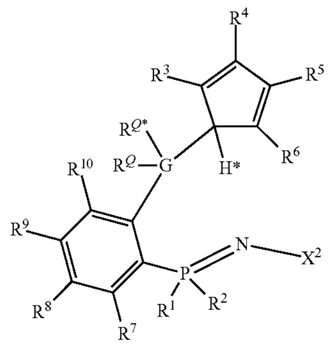

(IV-L)

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$;

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein $R^3$, $R^4$, $R^5$, $R^6$, $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^3$, $R^4$, $R^5$, $R^6$, $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and $X^2$ is hydrogen, or a silyl group of the formula —$Si(R^e)_3$, wherein each $R^e$ is independently selected from the group consisting of hydrogen, a $C_{1-8}$ alkyl group, $C_{1-8}$ alkoxy group, $C_{6-20}$ aryloxy group and a $C_{6-20}$ aryl group.

An embodiment of the disclosure is a compound represented by formula V-L:

(V-L)

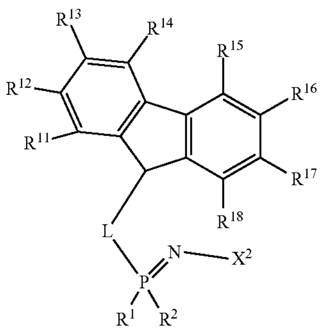

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$;

wherein $R^{11}$, $R^{12}$, $R^{13}$, $R^{14}$, $R^{15}$, $R^{16}$, $R^{17}$, $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^{11}$, $R^{12}$, $R^{13}$, $R^{14}$, $R^{15}$, $R^{16}$, $R^{17}$, $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and $X^2$ is hydrogen, or a silyl group of the formula —$Si(R^e)_3$, wherein each $R^e$ is independently selected from the group consisting of hydrogen, a $C_{1-8}$ alkyl group, $C_{1-8}$ alkoxy group, $C_{6-20}$ aryloxy group and a $C_{6-20}$ aryl group; and L is a bridging group containing a contiguous chain of atoms connecting P with Cy, wherein the contiguous chain contains 2 or 3 atoms.

An embodiment of the disclosure is a compound represented by formula VI-L:

(VI-L)

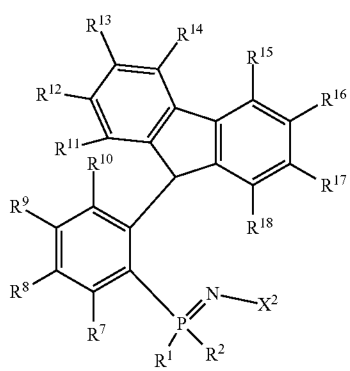

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si(R$^a$)$_3$; a germanyl group of the formula —Ge(R$^a$)$_3$; and a phosphinimine group of the formula —N═P(R$^b$)(R$^c$)(R$^d$);

wherein R$^7$, R$^8$, R$^9$, R$^{10}$, R$^{11}$, R$^{11}$, R$^{12}$, R$^{13}$, R$^{14}$, R$^{15}$, R$^{16}$, R$^{17}$ and R$^{18}$ are each independently selected from the group consisting of halogen;

hydrogen;

a C$_{1-30}$ hydrocarbyl group, which hydrocarbyl group is unsubstituted or further substituted by one or more than one substituent selected from the group consisting of a halogen atom, a C$_{1-20}$ alkyl group, a C$_{1-20}$ alkoxy group, a C$_{7-20}$ alkylaryl group, a C$_{7-20}$ arylalkyl group, a C$_{6-20}$ aryl group, a C$_{6-20}$ aryloxy group, a C$_{7-20}$ alkylaryloxy group, and a C$_{7-20}$ arylalkyloxy group;

a heteroatom containing C$_{1-30}$ hydrocarbyl group, which heteroatom containing hydrocarbyl group is unsubstituted or further substituted by one or more than one substituent selected from the group consisting of a halogen atom, a C$_{1-20}$ alkyl group, a C$_{1-20}$ alkoxy group, a C$_{7-20}$ alkylaryl group, a C$_{7-20}$ arylalkyl group, a C$_{6-20}$ aryl group, a C$_{6-20}$ aryloxy group, a C$_{7-20}$ alkylaryloxy group, and a C$_{7-20}$ arylalkyloxy group;

an oxy group, —OR';

an amido group, —NR'$_2$;

a phosphido group, —PR'$_2$;

a thiolate group, —SR';

a silyl group of the formula —Si(R$^a$)$_3$; and a germanyl group of the formula —Ge(R$^a$)$_3$;

wherein two adjacent groups of R$^7$, R$^8$, R$^9$, R$^{10}$, R$^{11}$, R$^{12}$, R$^{13}$, R$^{14}$, R$^{15}$, R$^{16}$, R$^{17}$ and R$^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a C$_{1-20}$ alkyl group, a C$_{1-20}$ alkoxy group, a C$_{7-20}$ alkylaryl group, a C$_{7-20}$ arylalkyl group, a C$_{6-20}$ aryl group, a C$_{6-20}$ aryloxy group, a C$_{7-20}$ alkylaryloxy group, a C$_{7-20}$ arylalkyloxy group, an amido group of the formula —NR'$_2$, a phosphido group of the formula —PR'$_2$, a thiolate group of the formula —SR', a silyl group of the formula —Si(R$^a$)$_3$, and a germanyl group of the formula —Ge(R$^a$)$_3$;

wherein each R' is independently selected from the group consisting of hydrogen, C$_{1-20}$ alkyl group, and C$_{6-20}$ aryl group;

wherein each R$^a$ is independently selected from the group consisting of hydrogen, C$_{1-8}$ alkyl group, C$_{1-8}$ alkoxy group, C$_{6-20}$ aryloxy group, and C$_{6-20}$ aryl group; and R$^b$, R$^c$, R$^d$, are each independently a C$_{1-20}$ alkyl group; and X$^2$ is hydrogen, or a silyl group of the formula —Si(R$^e$)$_3$, wherein each R$^e$ is independently selected from the group consisting of hydrogen, a C$_{1-8}$ alkyl group, C$_{1-8}$ alkoxy group, C$_{6-20}$ aryloxy group and a C$_{6-20}$ aryl group.

An embodiment of the disclosure is a compound represented by formula VII-L:

(VII-L)

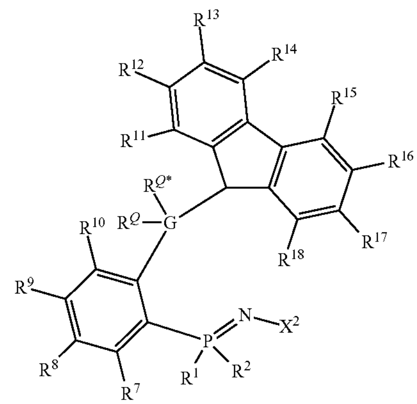

wherein R$^1$ and R$^2$ are each independently selected from the group consisting of hydrogen and R$^X$; or R$^1$ and R$^2$ together with the P atom to which they are attached form a 3-10 membered heterocyclic group which is unsubstituted or further substituted by one or more substituent selected from the group consisting of a halogen atom, a C$_{1-20}$ alkyl group, a C$_{1-20}$ alkoxy group, a C$_{7-20}$ alkylaryl group, a C$_{7-20}$ arylalkyl group, a C$_{6-20}$ aryl group, a C$_{6-20}$ aryloxy group, a C$_{7-20}$ alkylaryloxy group, and a C$_{7-20}$ arylalkyloxy group;

each R$^X$ is independently selected from the group consisting of a halogen atom; a C$_{1-30}$ hydrocarbyl group, which hydrocarbyl group is unsubstituted or further substituted by one or more than one halogen atom, C$_{1-20}$ alkyl group, C$_{1-20}$ alkoxy group, C$_{7-20}$ alkylaryl group, C$_{7-20}$ arylalkyl group, C$_{6-20}$ aryl group, C$_{6-20}$ aryloxy group, C$_{7-20}$ alkylaryloxy group, and/or C$_{7-20}$ arylalkyloxy group; an amido group of the formula —NR'$_2$; a silyl group of the formula —Si(R$^a$)$_3$; a germanyl group of the formula —Ge(R$^a$)$_3$; and a phosphinimine group of the formula —N═P(R$^b$)(R$^c$)(R$^d$);

wherein G is C or Si;

wherein R$^Q$ and R$^{Q*}$ are each independently selected from the group consisting of halogen;

hydrogen;

a C$_{1-30}$ hydrocarbyl group, which hydrocarbyl group is unsubstituted or further substituted by one or more than one substituent selected from the group consisting of a halogen atom, a C$_{1-20}$ alkyl group, a C$_{1-20}$ alkoxy group, a C$_{7-20}$ alkylaryl group, a C$_{7-20}$ arylalkyl group, a C$_{6-20}$ aryl group, a C$_{6-20}$ aryloxy group, a C$_{7-20}$ alkylaryloxy group, and a C$_{7-20}$ arylalkyloxy group;

a heteroatom containing C$_{1-30}$ hydrocarbyl group, which heteroatom containing hydrocarbyl group is unsubstituted or further substituted by one or more than one substituent selected from the group consisting of a halogen atom, a C$_{1-20}$ alkyl group, a C$_{1-20}$ alkoxy group, a C$_{7-20}$ alkylaryl group, a C$_{7-20}$ arylalkyl group, a C$_{6-20}$ aryl group, a C$_{6-20}$ aryloxy group, a C$_{7-20}$ alkylaryloxy group, and a C$_{7-20}$ arylalkyloxy group;

wherein the groups of R$^Q$ and R$^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a C$_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and $X^2$ is hydrogen, or a silyl group of the formula —Si($R^e$)$_3$, wherein each $R^e$ is independently selected from the group consisting of hydrogen, a $C_{1-8}$ alkyl group, $C_{1-8}$ alkoxy group, $C_{6-20}$ aryloxy group and a $C_{6-20}$ aryl group.

An embodiment of the disclosure is a compound represented by formula VIII-L:

(VIII-L)

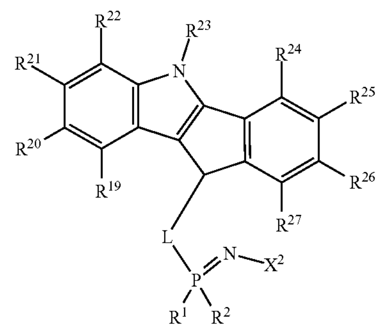

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$);

wherein $R^{23}$ is selected from the group consisting of hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein $R^{19}$, $R^{20}$, $R^{21}$, $R^{22}$, $R^{24}$, $R^{25}$, $R^{26}$, and $R^{27}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^{19}$, $R^{20}$, $R^{21}$, $R^{22}$, $R^{24}$, $R^{25}$, $R^{26}$, and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR, a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group;

$X^2$ is hydrogen, or a silyl group of the formula —Si($R^e$)$_3$, wherein each $R^e$ is independently selected from the group consisting of hydrogen, a $C_{1-8}$ alkyl group, $C_{1-8}$ alkoxy group, $C_{6-20}$ aryloxy group and a $C_{6-20}$ aryl group; and L is a bridging group containing a contiguous chain of atoms connecting P with Cy, wherein the contiguous chain contains 2 or 3 atoms.

An embodiment of the disclosure is a compound represented by formula IX-L:

(IX-L)

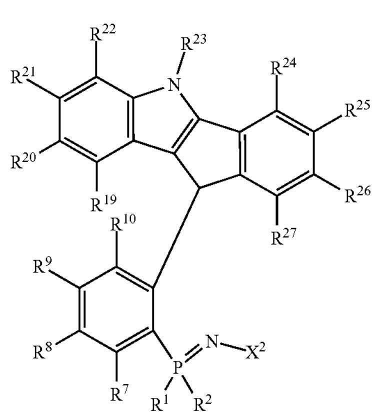

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$);

wherein $R^{23}$ is selected from the group consisting of hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein $R^7$, $R^8$, $R^9$, $R^{10}$, $R^{19}$, $R^{20}$, $R^{21}$, $R^{22}$, $R^{24}$, $R^{25}$, $R^{26}$ and $R^{27}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$, $R^{10}$, $R^{19}$, $R^{20}$, $R^{21}$, $R^{22}$, $R^{24}$, $R^{25}$, $R^{26}$, and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and $R^b$, $R^c$, $R^d$, are each independently a $C_{1-20}$ alkyl group; and $X^2$ is hydrogen, or a silyl group of the formula —Si($R^e$)$_3$, wherein each $R^e$ is independently selected from the group consisting of hydrogen, a $C_{1-8}$ alkyl group, $C_{1-8}$ alkoxy group, $C_{6-20}$ aryloxy group and a $C_{6-20}$ aryl group.

An embodiment is a process to make an organometallic complex, wherein the process comprises reacting a compound represented by formula I-L-H:

(I-L-H)

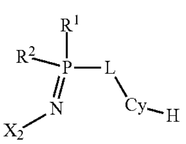

with a group 4 transition metal compound having the formula MX*4, wherein

M is Ti, Zr, or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$); wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

$X^2$ is a silyl group of the formula —Si($R^e$)$_3$, wherein each $R^e$ is independently selected from the group consisting of hydrogen, a $C_{1-8}$ alkyl group, $C_{1-8}$ alkoxy group, $C_{6-20}$ aryloxy group and a $C_{6-20}$ aryl group;

Cy is a cyclopentadienyl-type moiety and is covalently bound to L and H; and

L is a bridging group containing a contiguous chain of atoms connecting P with Cy, wherein the contiguous chain contains 2 or 3 atoms; and each X* is independently selected from the group consisting of halogen, hydrogen, an amido group of the formula —NR$^{\epsilon}_2$, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group; wherein each $R^{\epsilon}$ is independently selected from the group consisting of hydrogen, $C_{1-20}$ alkyl group, and $C_{6-20}$ aryl group.

An embodiment of the disclosure is a process to make an organometallic complex, wherein the process comprises reacting a compound represented by formula I-L-2H:

(I-L-2H)

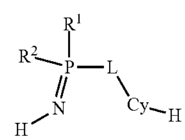

with a base followed by reaction with a group 4 transition metal compound with the formula MX*4, wherein M is Ti, Zr, or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$); wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

Cy is a cyclopentadienyl-type moiety and is covalently bound to L and H; and

L is a bridging group containing a contiguous chain of atoms connecting P with Cy, wherein the contiguous chain contains 2 or 3 atoms; and each X* is independently selected from the group consisting of halogen, hydrogen, an amido group of the formula —$NR^{\epsilon}2$, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group; wherein each $R^{\epsilon}$ is independently selected from the group consisting of hydrogen, $C_{1-20}$ alkyl group, and $C_{6-20}$ aryl group.

An embodiment of the disclosure is a method for making a compound represented by formula I-P-TMS:

(I-P-TMS)

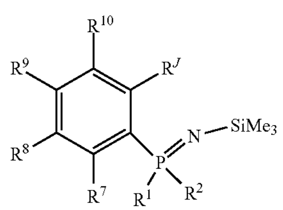

the method comprising combining a phosphine compound represented by formula I-P:

(I-P)

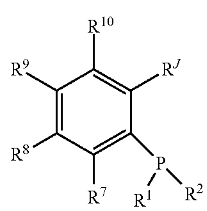

with hexachloroethane, $Cl_3C—CCl_3$; and hexamethyldisilazane, $[(CH_3)_3Si]_2NH$;

wherein $R^J$ is selected from the group consisting of a hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$; and a heteroatom containing hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein $R^1$ and $R^2$ are each independently selected from a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group-$PR'_2$;

a thiolate group SR';

a silyl group of the formula —$Si(R^a)_3$; and a germanyl group of the formula —$Ge(R^a)_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group —$NR'_2$, a phosphido group —$PR'_2$, a thiolate group —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

An embodiment of the disclosure is a method for making a compound represented by formula II-P-TMS:

(II-P-TMS)

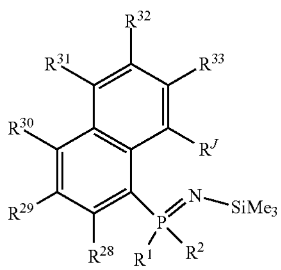

the method comprising combining a phosphine compound represented by formula II-P:

(II-P)

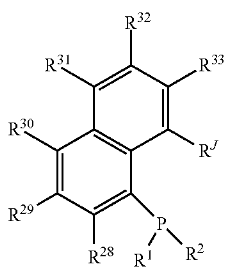

with hexachloroethane, $Cl_3C$—$CCl_3$; and hexamethyldisilazane, $[(CH_3)_3Si]_2NH$;

wherein $R^J$ is selected from the group consisting of a hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$; and a heteroatom containing hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^1$ and $R^2$ are each independently selected from a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group;

wherein $R^{eg}$, $R^{29}$, $R^{30}$, $R^{31}$, $R^{32}$ and $R^{33}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group-PR'$_2$;

a thiolate group SR';

a silyl group of the formula —Si($R^a$)$_3$; and a germanyl group of the formula —Ge($R^a$)$_3$;

wherein two adjacent groups of $R^{eg}$, $R^{29}$, $R^{30}$, $R^{31}$, $R^{32}$ and $R^{33}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group —NR'$_2$, a phosphido group —PR'$_2$, a thiolate group —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

An embodiment of the disclosure is an organometallic complex represented by formula I-M:

(I-M)

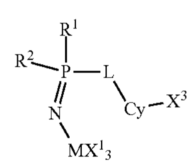

wherein

M is Ti, Zr or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$; wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

Cy is a cyclopentadienyl-type moiety and is covalently bound to L and $X^3$, each $X^1$ is an activatable ligand;

$X^3$ is hydrogen, or a silyl group of the formula —$Si(R^e)_3$, or a stannyl group of the formula $Sn(R^e)_3$;

wherein each $R^e$ is independently selected from the group consisting of hydrogen, a $C_{1-8}$ alkyl group, $C_{1-8}$ alkoxy group, $C_{6-20}$ aryloxy group, and a $C_{6-20}$ aryl group; and L is a bridging group containing a contiguous chain of atoms connecting P with Cy, wherein the contiguous chain contains 2 or 3 atoms.

An embodiment of the disclosure is an olefin polymerization catalyst system comprising:

i) an organometallic complex represented formula I-M:

(I-M)

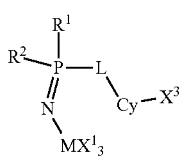

wherein

M is Ti, Zr or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$; wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

Cy is a cyclopentadienyl-type moiety and is covalently bound to L and $X^3$, each $X^1$ is an activatable ligand;

$X^3$ is hydrogen, or a silyl group of the formula —$Si(R^e)_3$, or a stannyl group of the formula $Sn(R^e)_3$;

wherein each $R^e$ is independently selected from the group consisting of hydrogen, a $C_{1-8}$ alkyl group, $C_{1-8}$ alkoxy group, $C_{6-20}$ aryloxy group, and a $C_{6-20}$ aryl group; and L is a bridging group containing a contiguous chain of atoms connecting P with Cy, wherein the contiguous chain contains 2 or 3 atoms; and ii) a catalyst activator.

An embodiment of the disclosure is a polymerization process comprising polymerizing ethylene optionally with one or more than one $C_3$-$C_{12}$ alpha-olefin in the presence of an olefin polymerization catalyst system comprising:

i) an organometallic complex represented formula I-M:

(I-M)

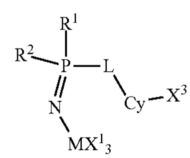

wherein

M is Ti, Zr or Hf, MX 3 (I-M)

$R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$; wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

Cy is a cyclopentadienyl-type moiety and is covalently bound to L and $X^3$, each $X^1$ is an activatable ligand;

$X^3$ is hydrogen, or a silyl group of the formula —$Si(R^e)_3$, or a stannyl group of the formula $Sn(R^e)_3$;

wherein each $R^e$ is independently selected from the group consisting of hydrogen, a $C_{1-8}$ alkyl group, $C_{1-8}$ alkoxy group, $C_{6-20}$ aryloxy group, and a $C_{6-20}$ aryl group; and L is a bridging group containing a contiguous chain of atoms connecting P with Cy, wherein the contiguous chain contains 2 or 3 atoms; and ii) a catalyst activator.

DESCRIPTION OF EMBODIMENTS

Figure 1:
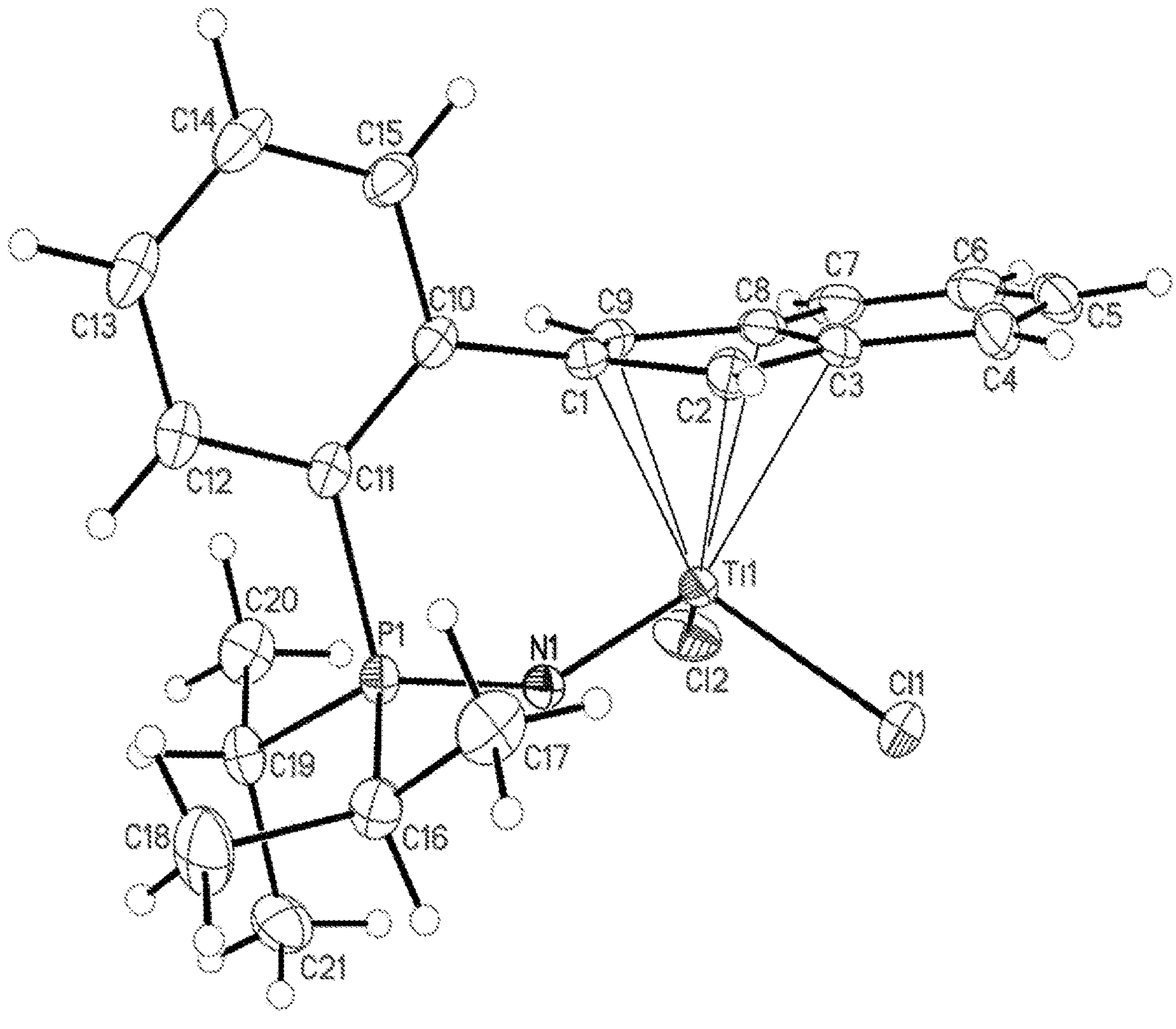
FIG. 1 shows the Oak Ridge Thermal Ellipsoid Plot (ORTEP) of an organometallic complex, Complex 1, of the present disclosure. The ORTEP is a representation of the molecular structure of an organometallic complex of the present disclosure as determined by X-ray diffraction.

As used herein, the term "monomer" refers to a small molecule that may chemically react and become chemically bonded with itself or other monomers to form a polymer.

As used herein, the term "α-olefin" or "alpha-olefin" is used to describe a monomer having a linear hydrocarbon chain containing from 3 to 20 carbon atoms having a double bond at one end of the chain; an equivalent term is "linear α-olefin". As used herein, the term "polyethylene" or "ethylene polymer", refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. An "ethylene homopolymer" is made using only ethylene as a polymerizable monomer. The term "copolymer" refers to a polymer that contains two or more types of monomer. An "ethylene copolymer" is made using ethylene and one or more other types of polymerizable monomer. Common polyethylenes include high density polyethylene (HDPE), medium density polyethylene (MOPE), linear low density polyethylene (LLDPE), very low density polyethylene (VLDPE), ultralow density polyethylene (ULDPE), plastomers and elastomers. The term polyethylene also includes polyethylene terpolymers which may include two or more comonomers in addition to ethylene. The term polyethylene also includes combinations of, or blends of, the polyethylenes described above.

As used herein, the terms "hydrocarbyl", "hydrocarbyl radical" or "hydrocarbyl group" refers to linear, branched, cyclic, acyclic, aliphatic, olefinic (i.e., has double bond unsaturation), acetylenic (i.e., has triple bond unsaturation) and aryl (aromatic) groups comprising hydrogen and carbon that are deficient by at least one hydrogen atom. Hence a person skilled in the art will understand that "hydrocarbyl group" includes by way of providing non-limiting examples, alkyl groups, which may be primary, secondary (such as for example a cycloalkyl group), or tertiary alkyl groups; alkenyl groups; alkynyl groups; and aryl groups. The term "cyclic hydrocarbyl group" is a subset of the term "hydrocarbyl group" and specifically connotes hydrocarbyl groups that comprise at least one cyclic moiety and which may have one or more than one aromatic ring, and/or one or more than one non-aromatic ring present within them. The term "acyclic hydrocarbyl group" is a subset of the term "hydrocarbyl group" and specifically connotes hydrocarbyl groups that do not have cyclic moieties such as aromatic or non-aromatic ring structures present within them.

As used herein, the term "heteroatom" includes any atom other than carbon and hydrogen that can be bound to carbon. The term "heteroatom containing" or "heteroatom containing hydrocarbyl group" means that one or more than one non carbon atom, not including a hydrogen atom, is present in the hydrocarbyl group. Some non-limiting examples of non-carbon atoms (and non-hydrogen atoms) that may be present is a heteroatom containing hydrocarbyl group are N, O, S, P and Si as well as halides such as for example F and/or Br as well as metals such as Sn. Some non-limiting examples of heteroatom containing hydrocarbyl groups include for example aryloxy groups, alkoxy groups, alkylaryloxy groups, arylalkyloxy, silyl groups, and siloxy groups. Further non-limiting examples of heteroatom containing hydrocarbyl groups generally include for example imines, amine moieties, oxide moieties, phosphine moieties, ethers, ketones, heterocyclics, oxazolines, thioethers, and the like. The term "cyclic heteroatom containing hydrocarbyl group" is a subset of the term "heteroatom containing hydrocarbyl group" and specifically connotes heteroatom containing hydrocarbyl groups that comprise at least one cyclic moiety and which may have one or more than one aromatic ring, and/or one or more than one non-aromatic ring present within them. The term "acyclic heteroatom containing hydrocarbyl group" is a subset of the term "heteroatom containing hydrocarbyl group" and specifically connotes heteroatom containing hydrocarbyl groups that do not have cyclic moieties such as aromatic or non-aromatic ring structures present within them.

In an embodiment of the disclosure, a heteroatom containing hydrocarbyl group is a hydrocarbyl group containing from 1 to 3 atoms selected from the group consisting of boron, aluminum, silicon, germanium, nitrogen, phosphorous, oxygen and sulfur.

In an embodiment of the disclosure, a cyclic heteroatom containing hydrocarbyl group is a cyclic hydrocarbyl group containing from 1 to 3 atoms selected from the group consisting of boron, aluminum, silicon, germanium, nitrogen, phosphorous, oxygen and sulfur.

The term "heterocyclic group" is a subset of the term "cyclic heteroatom containing hydrocarbyl group" and specifically refers to ring systems having a carbon backbone that further comprises at least one heteroatom selected from the group consisting of for example boron, aluminum, silicon, germanium, nitrogen, phosphorous, oxygen and sulfur within a ring structure.

As used herein, an "alkyl radical" or "alkyl group" includes linear, branched and cyclic paraffin groups that are deficient by one hydrogen group; non-limiting examples include methyl ($—CH_3$) and ethyl ($—CH_2CH_3$) groups. The term "alkenyl radical" or "alkenyl group" refers to linear, branched and cyclic hydrocarbons containing at least one carbon-carbon double bond that is deficient by one hydrogen group. The term "alkynyl radical" or "alkynyl group" refers to linear, branched and cyclic hydrocarbons containing at least one carbon-carbon triple bond that is deficient by one hydrogen group.

As used herein, the term "aryl radical" or "aryl group" includes phenyl, naphthyl, pyridyl and other groups whose molecules have an aromatic ring structure; non-limiting examples include naphthalene, phenanthrene and anthracene.

An "arylalkyl" is a subset of an "alkyl group" and is an alkyl group having an aryl group pendant there from; non-limiting examples include benzyl, phenethyl and tolylmethyl. An "alkylaryl" group is a subset of an "aryl group" and is an aryl group having one or more alkyl groups pendant there from; non-limiting examples include tolyl, xylyl, mesityl and cumyl.

An "alkoxy group" is an oxy group having an alkyl group pendant there from; and includes for example a methoxy group, an ethoxy group, an iso-propoxy group, and the like. An "arylalkyloxy group" is an oxy group having an arylalkyl group pendent there from (for clarity, the alkyl moiety is bonded to the oxy moiety and the aryl group is bonded to the alkyl moiety).

An "aryloxy" group is an oxy group having an aryl group pendant there from; and includes for example a phenoxy group and the like. An "alkylaryloxy group" is an oxy group having an alkylaryl group pendent there from (for clarity, the aryl moiety is bonded to the oxy moiety and the alkyl group is bonded to the aryl moiety).

In the present disclosure, a hydrocarbyl group or a heteroatom containing hydrocarbyl group (or subsets of these groups, such as alkyl groups, alkoxy groups, aryl groups, aryloxy groups, etc.) may be further specifically defined as being unsubstituted or substituted. As used herein the term "unsubstituted" means that hydrogen groups are bounded to the molecular group that is referred to by the term unsubstituted. The term "substituted" means that the group referred to by this term possesses one or more moieties that have replaced one or more hydrogen groups in any position within the group; non-limiting examples of moieties include halogen groups (F, Cl, Br), an alkyl group, an alkylaryl group, an arylalkyl group, an alkoxy group, an aryl group, an aryloxy group, an amido group, a silyl group or a germanyl group, hydroxyl groups, carbonyl groups, carboxyl groups, amine groups, phosphine groups, phenyl groups, naphthyl groups, $C_1$ to $C_{10}$ alkyl groups, $C_2$ to $C_{10}$ alkenyl groups, and combinations thereof.

An oxy group is well known to persons skilled in the art and may be represented by the formula —OR' where each R' group is hydrogen or a hydrocarbyl group or a heteroatom containing hydrocarbyl group. The R' group in an oxy group may be substituted or unsubstituted (when a hydrocarbyl group or a heteroatom containing hydrocarbyl group).

An amido group is well known to persons skilled in the art and may be represented by the formula $—NR'_2$ where each R' group is hydrogen or a hydrocarbyl group or a heteroatom containing hydrocarbyl group. Each of the R' groups in an amido group may be substituted or unsubstituted (when a hydrocarbyl group or a heteroatom containing hydrocarbyl group).

A phosphido group is well known to persons skilled in the art and may be represented by the formula $—PR'_2$ where each R' group is hydrogen or a hydrocarbyl group or a heteroatom containing hydrocarbyl group. Each of the R' groups in a phosphido group may be substituted or unsubstituted (when a hydrocarbyl group or a heteroatom containing hydrocarbyl group).

A thiolate group is well known to persons skilled in the art and may be represented by the formula —SR' where the R' group is hydrogen or a hydrocarbyl group or a heteroatom containing hydrocarbyl group. An R' group in a thiolate group may be substituted or unsubstituted (when a hydrocarbyl group or a heteroatom containing hydrocarbyl group).

In embodiments of the disclosure, any hydrocarbyl group and/or any heteroatom containing hydrocarbyl group may be unsubstituted or substituted.

The organometallic complex described herein, requires activation by one or more co-catalytic or catalyst activator species in order to provide polymer from olefins. Hence, an un-activated polymerization catalyst or organometallic complex may be described as a "pre-polymerization catalyst".

The Organometallic Complex (The "Pre-polymerization Catalyst")

Although the organometallic complex or pre-polymerization catalysts employed in the present disclosure may generally be considered a so called "single site catalyst", the term "single site catalyst" is used herein to distinguish the polymerization catalysts from polymerization catalysts which are considered traditional multisite polymerization catalysts such as Ziegler-Natta catalysts or chromium-based catalysts. Persons skilled in the art will understand, for example, that metallocene catalysts, constrained geometry catalysts, and phosphinimine catalysts, are all generally considered "single site catalysts", but that each of these "single site catalysts", may also, under certain conditions exhibit what may be considered multisite catalyst behavior. Such is also the case with the pre-polymerization catalysts employed in the present disclosure, and so the term "single site catalyst" is not meant to preclude a pre-polymerization catalyst which may also demonstrate aspects of multi-site behavior.

An embodiment of the disclosure, is an organometallic complex represented by formula I:

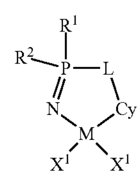

(I)

wherein

M is Ti, Zr or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$); wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

each $X^1$ is an activatable ligand;

Cy is a cyclopentadienyl-type ligand covalently bound to L and coordinated to M via η-bonding; and L is a bridging group containing a contiguous chain of atoms connecting P with Cy, wherein the contiguous chain contains 2 or 3 atoms.

By the phrase "contiguous chain of atoms" it is meant that the atoms being referred to are bonded together in sequence, and to P at one end, and to Cy at the other end.

In some embodiments, $R^1$ and $R^2$ are each independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$); wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group.

In some embodiments, $R^1$ and $R^2$ are each independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group.

In some embodiments, $R^1$ and $R^2$ are each independently a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group.

In some embodiments, $R^1$ and $R^2$ are each independently an unsubstituted $C_{1-30}$ hydrocarbyl group.

In some embodiments, $R^1$ and $R^2$ are each independently an unsubstituted $C_{1-20}$ hydrocarbyl group.

In some embodiments, $R^1$ and $R^2$ are each independently an unsubstituted $C_{1-12}$ hydrocarbyl group.

In some embodiments, $R^1$ and $R^2$ are each independently a $C_{1-20}$ alkyl group.

In some embodiments, $R^1$ and $R^2$ are each independently a $C_{1-12}$ alkyl group.

In some embodiments, $R^1$ and $R^2$ are each independently a $C_{1-9}$ alkyl group.

In some embodiments, $R^1$ and $R^2$ are each independently a branched $C_{3-8}$ alkyl group.

In some embodiments, $R^1$ and $R^2$ are each independently a $C_{6-20}$ aryl group.

In some embodiments, $R^1$ and $R^2$ are the same.

In some embodiments, $R^1$ and $R^2$ are each independently selected from the group consisting of isopropyl, cyclohexyl and tert-butyl.

In some embodiments, $R^1$ and $R^2$ are each an isopropyl group.

In some embodiments, $R^1$ and $R^2$ are each a cyclohexyl group.

In some embodiments, $R^1$ and $R^2$ are each a tert-butyl group.

In some embodiments, each R' is a $C_{1-8}$ alkyl group.

In some embodiments, each R' is a $C_{6-20}$ aryl group.

In some embodiments, each R' is a methyl group.

In some embodiments, each R' is a phenyl group.

In some embodiments, each $R^a$ is a $C_{1-8}$ alkyl group.

In some embodiments, each $R^a$ is a $C_{6-20}$ aryl group.

In some embodiments, each $R^a$ is a methyl group.

In some embodiments, each $R^a$ is an ethyl group.

In some embodiments, each $R^a$ is a phenyl group.

In some embodiments, each of $R^b$, $R^c$, $R^d$ is a $C_{1-12}$ alkyl group.

In some embodiments, each of $R^b$, $R^c$, $R^d$ is a $C_{1-9}$ alkyl group.

In some embodiments, each of $R^b$, $R^c$, $R^d$ is a $C_{1-6}$ alkyl group.

In some embodiments, each of $R^b$, $R^c$, $R^d$ is a branched $C_{3-8}$ alkyl group.

In some embodiments, each of $R^b$, $R^c$, $R^d$ is an isopropyl group.

In some embodiments, each of $R^b$, $R^c$, $R^d$ is a cyclohexyl group.

In some embodiments, each of $R^b$, $R^c$, $R^d$ is a tert-butyl group.

In some embodiments, $R^1$ and $R^2$ together with the P atom to which they are attached together form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group.

In some embodiments, $R^1$ and $R^2$ together with the P atom to which they are attached together form a 4-6 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group.

In some embodiments, $R^1$ and $R^2$ together with the P atom to which they are attached together form a 5-6 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group.

Each $X^1$ is independently an activatable ligand. Each $X^1$ may be the same or different. In some embodiments, each $X^1$ is the same.

The term "activatable ligand" refers to a ligand which may be activated by a catalyst activator and/or a cocatalyst, to facilitate olefin polymerization. An activatable ligand $X^1$ may be cleaved from the metal centre M via a protonolysis reaction or abstracted from the metal centre M by suitable acidic or electrophilic catalyst activator compounds (also known as "co-catalyst" compounds) respectively, examples of which are described below. The activatable ligand $X^1$ may also be transformed into another ligand which is cleaved or abstracted from the metal centre M (e.g., a halide may be converted to an alkyl group). Without wishing to be bound by any single theory, protonolysis or abstraction reactions generate an active "cationic" metal centre which can polymerize olefins.

In some embodiments each $X^1$ is independently selected from the group consisting of a hydrogen atom; a halogen atom; a $C_{1-10}$ hydrocarbyl group; a $C_{1-10}$ alkoxy group; a $C_{6-10}$ aryl oxide group, each of which said hydrocarbyl, alkoxy, and aryl oxide groups may be unsubstituted or further substituted by a halogen atom, a $C_{1-8}$ alkyl group, a $C_{1-8}$ alkoxy group, a $C_{6-10}$ aryl or aryloxy group; an amido group which is unsubstituted (i.e. —$NH_2$) or substituted by up to two $C_{1-8}$ alkyl groups (i.e. —$NR'_2$, where each R'═$C_{1-8}$ alkyl); and a phosphido group which is unsubstituted (i.e. —$PH_2$) or substituted by up to two $C_{1-8}$ alkyl groups (i.e. —$PR'_2$, where each R'═$C_{1-8}$ alkyl).

In some embodiments each $X^1$ is independently selected from the group consisting of halogen, hydrogen, an amido group of the formula —$NR^{\epsilon}_2$, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group; wherein each $R^{\epsilon}$ is independently selected from the group consisting of hydrogen, $C_{1-20}$ alkyl group, and $C_{6-20}$ aryl group.

In some embodiments, two activatable $X^1$ ligands may also be joined to one another and form for example, a substituted or unsubstituted diene ligand (i.e., 1,3-diene); or a delocalized heteroatom-containing group such as an acetate group.

In embodiments of the disclosure, each $X^1$ is independently selected from the group consisting of a halide atom, a $C_{1-4}$ alkyl group and a benzyl group.

In embodiments of the disclosure, each $X^1$ is independently selected from the group consisting of a $C_{1-6}$ alkyl group, a $C_{7-10}$ arylalkyl group, and a halogen.

In some embodiments each $X^1$ is independently selected from unsubstituted $C_{1-6}$ alkyl and a halogen.

In embodiments, each $X^1$ is a halogen atom (e.g., chloride) or a hydrocarbyl group (e.g., methyl group, benzyl group).

In embodiments, each $X^1$ is a benzyl group.

In embodiments, each $X^1$ is a —$CH_2C_6F_5$ group (i.e., a pentafluorobenzyl group).

In embodiments, each $X^1$ is methyl.

In some embodiments, each $X^1$ is independently methyl or Cl.

In some embodiments, each $X^1$ is halogen.

In some embodiments, each $X^1$ is Cl.

In some embodiments, M is Ti.

In some embodiments, M is Hf.

In some embodiments, M is Zr.

As used in the present disclosure, "Cy" represents a "cyclopentadienyl-type ligand" which contains within its structure a cyclopentadienyl moiety, which refers to a 5-member carbon ring and which can coordinate to a metal centre through delocalized π-bonding, or in some cases through σ-bonding.

In some embodiments, "Cy" represents a "cyclopentadienyl-type ligand" which contains within its structure a cyclopentadienyl moiety, which refers to a 5-member carbon ring having delocalized π-bonding within the ring (e.g., aromaticity) and which can coordinate to a metal centre.

In the present disclosure, a cyclopentadienyl-type ligand, Cy, is covalently bound to L and coordinated to M via η- (or eta-) bonding. The skilled person understands that η-bonding denotes hapticity of a ligand and refers to the coordination of the Cy ligand to the metal centre M, typically by $\eta^5$-bonding, but that $\eta^3$-bonding and $\eta^1$-bonding is also possible in some cases and depending on the nature of the cyclopentadienyl-type ligand.

In some embodiments, a cyclopentadienyl-type ligand, Cy, is covalently bound to L and coordinated to M via $\eta^5$-bonding or $\eta^3$-bonding, or $\eta^1$-bonding.

In some embodiments, a cyclopentadienyl-type ligand, Cy, is covalently bound to L and coordinated to M via $\eta^5$-bonding or $\eta^3$-bonding.

In some embodiments, a cyclopentadienyl-type ligand, Cy, is covalently bound to L and coordinated to M via $\eta^5$-bonding or $\eta^1$-bonding.

In some embodiments, a cyclopentadienyl-type ligand, Cy is covalently bound to L and coordinated to M via $\eta^5$-bonding.

In some embodiments, a cyclopentadienyl-type ligand, Cy is covalently bound to L and coordinated to M via $\eta^3$-bonding.

In some embodiments, a cyclopentadienyl-type ligand, Cy is covalently bound to L and coordinated to M via $\eta^1$-bonding.

As used herein, the term "cyclopentadienyl-type ligand" is meant to include ligands which contain at least one five-carbon ring which is bonded to the metal via eta-5 (or in some cases eta-3, or in some cases eta-1) bonding. Thus, the term "cyclopentadienyl-type ligands" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current disclosure, so long as the five-carbon ring which bonds to the metal via eta-5 (or in some cases eta-3, or eta-1) bonding remains intact.

In embodiments of the disclosure, substituents for a cyclopentadienyl ligand, an indenyl ligand (or hydrogenated version thereof) and a fluorenyl ligand (or hydrogenated version thereof) may be selected from the group consisting of a $C_{1-30}$ hydrocarbyl group, which hydrocarbyl group may be unsubstituted or further substituted by for example a halogen (such as would be the case for a pentafluorobenzyl group, —$CH_2C_6F_5$), a $C_{1-20}$ alkoxy group, a $C_{6-20}$ aryl group, a $C_{6-20}$ aryloxy group (each of which may be further substituted by for example a halogen); an amido group which is unsubstituted or substituted by up to two $C_{1-8}$ alkyl groups; a phosphido group which is unsubstituted or substituted by up to two $C_{1-8}$ alkyl groups; a silyl group of the formula —$Si(R^a)_3$ wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and a germanyl group of the formula —$Ge(R^a)_3$ wherein $R^a$ is as defined directly above.

In some embodiments, Cy is selected from the group consisting of heteroatom substituted cyclopentadienyl-type ligands, and heteroatom containing cyclopentadienyl-type ligands.

In some embodiments, Cy is selected from the group consisting of substituted or unsubstituted indeno[1,2-b]indolyl and indeno[2,1-b]indolyl ligands.

In some embodiments, Cy is selected from the group consisting of unsubstituted or substituted cyclopentadienyl ligands; unsubstituted or substituted cyclopentenophenanthryl ligands and hydrogenated versions thereof, unsubstituted or substituted indenyl ligands and hydrogenated versions thereof, unsubstituted or substituted fluorenyl ligands and hydrogenated versions thereof, unsubstituted or substituted octahydrofluorenyl ligands; and unsubstituted or substituted azulenyl ligands.

In some embodiments, Cy is a cyclopentadienyl ligand which is unsubstituted or substituted by up to four substituents independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent substituents on the cyclopentadienyl ligand may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, Cy is an indenyl ligand which is unsubstituted or substituted by up to six substituents independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent substituents on the indenyl ligand may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, Cy is an fluorenyl ligand which is unsubstituted or substituted by up to eight substituents independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent substituents on the fluorenyl ligand may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

A person skilled in the art understands that an indenyl group is a hydrocarbyl group derived from the compound indene:

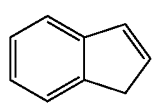

indene

A person skilled in the art understands that a fluorenyl group is a hydrocarbyl group derived from the compound fluorene:

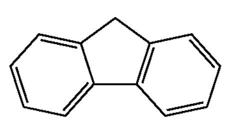

fluorene

Like cyclopentadienyl, an indenyl, or a fluorenyl group is, after deprotonation, able to coordinate to a metal centre by $\eta^5$-bonding (or in some cases, $\eta^3$-bonding, or in some cases, $\eta^1$-bonding).

In some embodiments, Cy is an unsubstituted or substituted indenyl ligand.

In some embodiments, Cy is an unsubstituted indenyl ligand.

In some embodiments, Cy is a substituted indenyl ligand.

In some embodiments, Cy is an unsubstituted or substituted fluorenyl ligand.

In some embodiments, Cy is an unsubstituted fluorenyl ligand.

In some embodiments, Cy is a substituted fluorenyl ligand.

In some embodiments, Cy is an unsubstituted indenyl ligand attached to the L group at the 1-position or the 2-position, wherein the positions on the indenyl rings are numbered as follows:

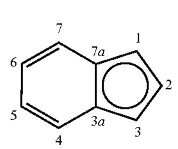

In some embodiments, Cy is unsubstituted indenyl ligand attached to the L group at the 1-position.

In some embodiments, Cy is unsubstituted indenyl ligand attached to the L group at the 2-position.

In some embodiments, Cy is of the formula:

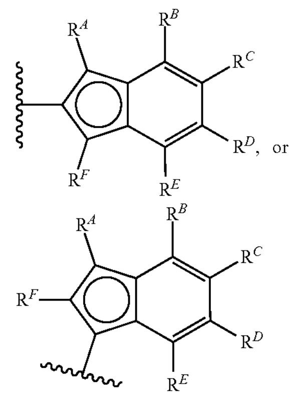

wherein ∿∿∿ indicates the point of attachment to L and each of $R^A$, $R^B$, $R^C$, $R^D$, $R^E$ and $R^F$ are independently selected from H, $C_{1-12}$ hydrocarbyl group and $C_{1-12}$ heteroatom-containing hydrocarbyl group. In some embodiments each of $R^A$, $R^B$, $R^C$, $R^D$, $R^E$ and $R^F$ are independently selected from H and unsubstituted $C_{1-6}$ alkyl group. In some embodiments each of $R^A$, $R^B$, $R^C$, $R^D$, $R^E$ and $R^F$ are H. In some embodiments, two adjacent groups of $R^B$, $R^c$, $R^D$ and $R^E$ are bonded to form a ring.

In some embodiments, Cy is of the formula:

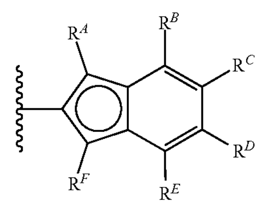

wherein ∿∿∿ indicates the point of attachment to L and each of $R^A$, $R^B$, $R^C$, $R^D$, $R^E$ and $R^F$ are independently selected from H, $C_{1-12}$ hydrocarbyl group and $C_{1-12}$ heteroatom-containing hydrocarbyl group. In some embodiments each of $R^A$, $R^B$, $R^C$, $R^D$, $R^E$ and $R^F$ are independently selected from H and unsubstituted $C_{1-6}$ alkyl group. In some embodiments each of $R^A$, $R^B$, $R^C$, $R^D$, $R^E$ and $R^F$ are H. In some embodiments, two adjacent groups of $R^B$, $R^c$, $R^D$ and $R^E$ are bonded to form a ring.

In some embodiments, L is a bridging group containing a contiguous chain of atoms connecting P with Cy, wherein the contiguous chain contains 3 atoms. In some embodiments, L is a bridging group containing a contiguous chain of atoms connecting P with Cy, wherein the contiguous chain contains 2 atoms. By the phrase "contiguous chain of atoms" it is meant that the atoms being referred to are bonded together in sequence, and to P at one end, and to Cy at the other end.

In some embodiments, L is a bridging group containing at least one cyclic hydrocarbyl group or at least one cyclic heteroatom containing hydrocarbyl group.

In some embodiments, L is a bridging group containing at least one cycloalkylene, heterocycloalkylene, arylene or heteroarylene group. The term "cycloalkylene" refers to a bivalent group containing a cycloaliphatic ring. The term "heterocycloalkylene" refers to a bivalent group containing a heterocycloaliphatic ring. The term "arylene" refers to a bivalent group containing an aromatic ring. The term "heteroarylene" refers to a bivalent group containing a heteroaromatic ring.

In some embodiments, L is a bridging group containing at least one arylene or heteroarylene group.

In some embodiments, L is a bridging group containing at least one cycloalkylene, or heterocycloalkylene group.

In some embodiments, L is a bridging group comprising 1-50 atoms selected from carbon atoms, hydrogen atoms and heteroatoms and containing at least one phenylene group.

In some embodiments L is a bridging group containing at least one arylene group. In some embodiments L is a bridging group containing at least one phenylene group.

In some embodiments L is a bridging group comprising 1-50 atoms selected from carbon atoms, hydrogen atoms and heteroatoms and contains at least one arylene or heteroarylene group. In some embodiments L is a bridging group comprising 1-50 atoms selected from carbon atoms, hydrogen atoms and heteroatoms and contains at least one arylene group. In some embodiments L is a bridging group comprising 1-50 atoms selected from carbon atoms, hydrogen atoms and heteroatoms and contains at least one phenylene group. In some embodiments L is a bridging group comprising 1-50 atoms selected from carbon atoms and hydrogen atoms and contains at least one phenylene group.

The arylene or heteroarylene group within L may be directly or indirectly covalently bound to P. The arylene or heteroarylene group within L may be directly covalently bound to P (i.e., there may be a covalent bond from P to an atom of the ring of the arylene or heteroarylene group). Alternatively, the arylene or heteroarylene group within L may be indirectly covalently bound to P (i.e., there may be a further bivalent group between P and an atom of the ring of the arylene or heteroarylene group). The further bivalent group may be a hydrocarbylene group, for example an alkylene group or alkenylene group, or may be a bivalent group containing one or more heteroatoms.

The arylene or heteroarylene group within L may be directly or indirectly covalently bound to Cy. The arylene or heteroarylene group within L may be directly covalently bound to Cy (i.e., there may be a covalent bond from Cy to an atom of the ring of the arylene or heteroarylene group). Alternatively, the arylene or heteroarylene group within L may be indirectly covalently bound to Cy (i.e., there may be a further bivalent group between Cy and an atom of the ring of the arylene or heteroarylene group). The further bivalent group may be a hydrocarbylene group, for example an alkylene group or alkenylene group, or may be a bivalent group containing one or more heteroatoms.

In some embodiments, L is a bridging group containing a contiguous chain of atoms connecting P with Cy, wherein the adjacent carbon atoms of a phenylene group form part of the contiguous chain of atoms.

In some embodiments L is selected from:

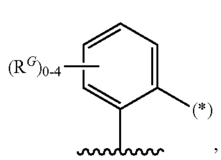

,
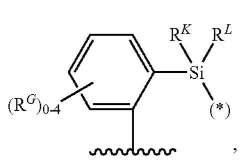

,

-continued

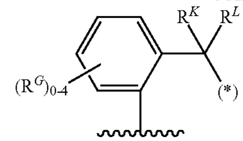

and
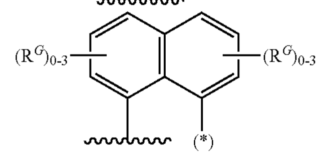

wherein ~~~~ indicates the point of attachment to P and (*) indicates the point of attachment to Cy; wherein each $R^G$ is independently selected from the group consisting of halogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR;

a silyl group of the formula —Si($R^a$)$_3$; and a germanyl group of the formula —Ge($R^a$)$_3$;

wherein two adjacent $R^G$ groups may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^K$ and $R^L$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^K$ and $R^L$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In embodiments each $R^G$ is independently selected from halogen and unsubstituted $C_{1-12}$ alkyl.

In some embodiments $R^e$ is absent (the phenylene group, or the naphthalene group is unsubstituted).

In embodiments $R^K$ and $R^L$ are each independently selected from hydrogen, unsubstituted $C_{1-12}$ alkyl group, and unsubstituted or substituted $C_{6-20}$ aryl group.

In embodiments $R^K$ and $R^L$ are each independently selected unsubstituted $C_{1-12}$ alkyl group, and unsubstituted or substituted $C_{6-20}$ aryl group.

In some embodiments $R^K$ and $R^L$ are each hydrogen.

In some embodiments L is of the formula:

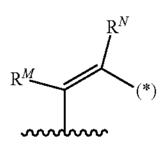

wherein $R^M$ and $R^N$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^M$ and $R^N$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group;

wherein ∿∿∿ indicates the point of attachment to P and (*) indicates the point of attachment to Cy.

In some embodiments, $R^M$ and $R^N$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^M$ and $R^N$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, the $R^M$ and $R^N$ groups are bonded to form a cyclic hydrocarbyl group.

In some embodiments, the $R^M$ and $R^N$ groups are bonded to form a phenylene group, the phenylene group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

In some embodiments, the $R^M$ and $R^N$ groups are bonded to form a phenylene group which is not further substituted.

In some embodiments L is of the formula:

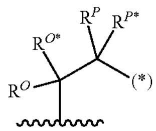

wherein $R^O$, $R^{O*}$, $R^P$ and $R^{P*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two groups among $R^O$, $R^{O*}$, $R^P$, $R^{P*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR, a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and wherein ∿∿∿ indicates the point of attachment to P and (*) indicates the point of attachment to Cy.

In some embodiments, $R^O$, $R^{O*}$, $R^P$ and $R^{P*}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^O$, $R^{O}$*, $R^P$ and $R^{P*}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, one $R^O$ group and one $R^P$ group are bonded to form a cyclic hydrocarbyl group.

In some embodiments, one $R^O$ group and one $R^P$ group are bonded to form a cyclohexyl group.

In some embodiments L is of the formula:

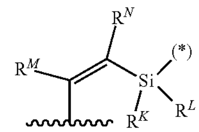

wherein $R^K$ and $R^L$ are each independently selected from hydrogen, unsubstituted $C_{1-12}$ alkyl group, and unsubstituted or substituted $C_{6-20}$ aryl group;

$R^M$ and $R^N$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^M$ and $R^N$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group;

wherein ∿∿∿ indicates the point of attachment to P and (*) indicates the point of attachment to Cy.

In some embodiments, $R^M$ and $R^N$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^M$ and $R^N$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, the $R^M$ and $R^N$ groups are bonded to form a cyclic hydrocarbyl group.

In some embodiments, the $R^M$ and $R^N$ groups are bonded to form a phenylene group, the phenylene group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

In some embodiments, the $R^M$ and $R^N$ groups are bonded to form a phenylene group which is not further substituted.

In some embodiments L is of the formula:

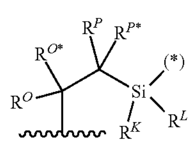

wherein $R^K$ and $R^L$ are each independently selected from hydrogen, unsubstituted $C_{1-12}$ alkyl group, and unsubstituted or substituted $C_{6-20}$ aryl group;

wherein $R^O$, $R^{O*}$, $R^P$ and $R^{P*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two groups among $R^O$, $R^{O*}$, $R^P$, $R^{P*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and wherein ∿∿∿ indicates the point of attachment to P and (*) indicates the point of attachment to Cy.

In some embodiments, $R^O$, $R^{O*}$, $R^P$ and $R^{P*}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^O$, $R^{O*}$, $R^P$ and $R^{P*}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, one $R^O$ group and one $R^P$ group are bonded to form a cyclic hydrocarbyl group.

In some embodiments, one $R^O$ group and one $R^P$ group are bonded to form a cyclohexyl group.

In some embodiments L is of the formula:

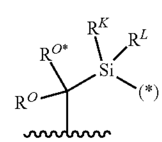

wherein $R^K$ and $R^L$ are each independently selected from hydrogen, unsubstituted $C_{1-12}$ alkyl group, and unsubstituted or substituted $C_{6-20}$ aryl group;

wherein $R^O$ and $R^{O*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two groups among $R^O$ and $R^{O*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and wherein ∿∿∿ indicates the point of attachment to P and (*) indicates the point of attachment to Cy.

In some embodiments, $R^O$ and $R^{O*}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^O$ and $R^{O*}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments L is of the formula:

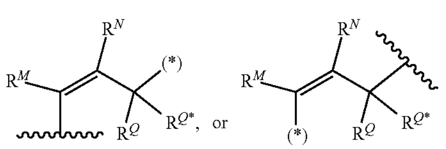

wherein $R^M$, $R^N$, $R^Q$, and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^M$ and $R^N$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein two groups among $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and wherein ∿∿∿ indicates the point of attachment to P and (*) indicates the point of attachment to Cy.

In some embodiments, $R^M$ and $R^N$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^M$ and $R^N$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, the $R^M$ and $R^N$ groups are bonded to form a cyclic hydrocarbyl group.

In some embodiments, the $R^M$ and $R^N$ groups are bonded to form a phenylene group, the phenylene group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si$(R^a)_3$, and a germanyl group of the formula —Ge$(R^a)_3$; wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

In some embodiments, the $R^M$ and $R^N$ groups are bonded to form a phenylene group which is not further substituted.

In some embodiments, $R^Q$ and $R^{Q*}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^Q$ and $R^{Q*}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In embodiments, a silyl group has the formula —Si$(R^a)_3$, wherein the $R^a$ groups are independently selected from a hydrogen atom, a $C_{1-8}$ alkyl or alkoxy group, a $C_{6-10}$ aryl group, and a $C_{6-10}$ aryloxy group.

In embodiments, a silyl group has the formula —Si$(R^a)_3$, wherein the $R^a$ groups are independently selected from a $C_{1-8}$ alkyl or alkoxy group, a $C_{6-10}$ aryl group, and a $C_{6-10}$ aryloxy group.

In some embodiments of the disclosure, an oxy group has the formula —OR', wherein the R' group is selected from the group consisting of a hydrogen atom, a $C_{1-10}$ alkyl group, and a $C_{6-10}$ aryl group.

In some embodiments of the disclosure, an oxy group has the formula —OR', wherein the R' group is selected from the group consisting of a $C_{1-10}$ alkyl group, and a $C_{6-10}$ aryl group.

In some embodiments of the disclosure, an amido group has the formula —NR'$_2$, wherein the R' groups are independently selected from the group consisting of a hydrogen atom, a $C_{1-10}$ alkyl group, a $C_{6-10}$ aryl group.

In some embodiments of the disclosure, an amido group has the formula —NR'$_2$, wherein the R' groups are independently selected from the group consisting of a $C_{1-10}$ alkyl group, and a $C_{6-10}$ aryl group.

In some embodiments of the disclosure, a phosphido group has the formula —PR'$_2$, wherein the R' groups are independently selected from the group consisting of a hydrogen atom, a $C_{1-10}$ alkyl group, and a $C_{6-10}$ aryl group.

In some embodiments of the disclosure, a phosphido group has the formula —PR'$_2$, wherein the R' groups are independently selected from the group consisting of a $C_{1-10}$ alkyl group, and a $C_{6-10}$ aryl group.

In some embodiments of the disclosure, a thiolate group has the formula —SR, wherein the R' group is selected from the group consisting of a hydrogen atom, a $C_{1-10}$ alkyl group, and a $C_{6-10}$ aryl group.

In some embodiments of the disclosure, a thiolate group has the formula —SR', wherein the R' group is selected from the group consisting of a $C_{1-10}$ alkyl group, and a $C_{6-10}$ aryl group.

In embodiments of the disclosure, the organometallic complex of formula I, is an organometallic complex represented by formula IA:

(IA)

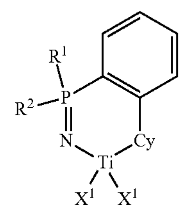

wherein $R^1$, $R^2$, $X^1$ and Cy are as defined above for formula I.

In embodiments of the disclosure, the organometallic complex of formula I, is an organometallic complex represented by formula IB:

(IB)

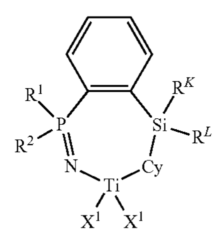

wherein $R^1$, $R^2$, $R^K$, $R^L$, $X^1$ and Cy are as defined above for formula I.

In embodiments of the disclosure, the organometallic complex of formula I, is an organometallic complex represented by formula IC:

(IC)

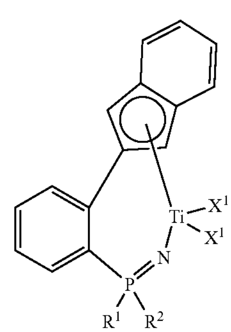

wherein each of $R^1$, $R^2$ and $X^1$ are as defined above for formula I.

In embodiments of the disclosure, the organometallic complex of formula I, is an organometallic complex represented by formula IC*:

(IC*)

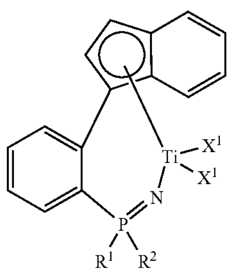

wherein each of $R^1$, $R^2$ and $X^1$ are as defined above for formula I.

In embodiments of the disclosure, the organometallic complex of formula I, is an organometallic complex represented by formula ID:

(ID)

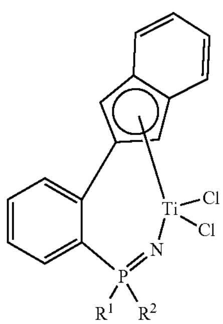

wherein $R^1$ and $R^2$ are as defined above for formula I.

In embodiments of the disclosure, the organometallic complex of formula I, is an organometallic complex represented by formula ID*:

(ID*)

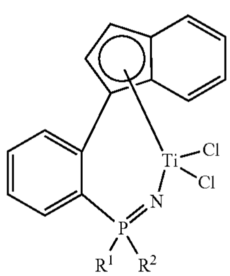

wherein $R^1$ and $R^2$ are as defined above for formula I.

In an embodiment of the disclosure, the organometallic complex of formula I, is an organometallic complex represented by formula IE:

(1E)

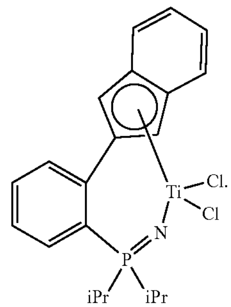

In an embodiment of the disclosure, the organometallic complex of formula I, is an organometallic complex represented by formula IE*:

(1E*)

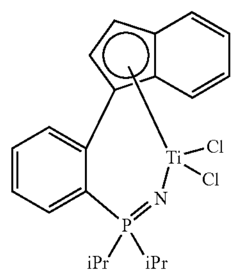

In an embodiment of the disclosure, the organometallic complex of formula I, is an organometallic complex represented by formula IF:

(1F)

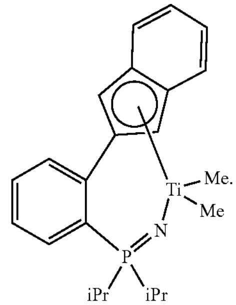

In an embodiment of the disclosure, the organometallic complex of formula I, is an organometallic complex represented by formula IF*:

(1F*)

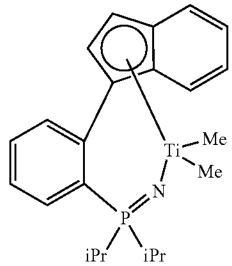

In embodiments of the disclosure, the organometallic complex of formula I, is an organometallic complex represented by formula II:

(II)

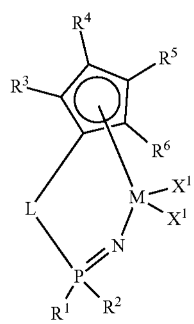

wherein M, $R^1$, $R^2$, $X^1$ and L are as defined above for formula I; and wherein $R^3$, $R^4$, $R^5$ and $R^6$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^3$, $R^4$, $R^5$ and $R^6$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^3$, $R^4$, $R^5$ and $R^6$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^3$, $R^4$, $R^5$ and $R^6$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^3$, $R^4$, $R^5$ and $R^6$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^3$, $R^4$, $R^5$ and $R^6$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^3$, $R^4$, $R^5$ and $R^6$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^3$, $R^4$, $R^5$ and $R^6$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^3$, $R^4$, $R^5$ and $R^6$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^3$, $R^4$, $R^5$ and $R^6$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^3$, $R^4$, $R^5$ and $R^6$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^3$, $R^4$, $R^5$ and $R^6$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^3$, $R^4$, $R^5$ and $R^6$ are each independently selected from the group consisting of hydrogen and a Ci-so hydrocarbyl group, which hydrocarbyl group is unsubstituted or further substituted by one or more than one halogen atom.

In some embodiments, $R^3$, $R^4$, $R^5$ and $R^6$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^3$, $R^4$, $R^5$ and $R^6$ are each hydrogen.

In embodiments of the disclosure, the organometallic complex of formula II, is an organometallic complex represented by formula III:

(III)

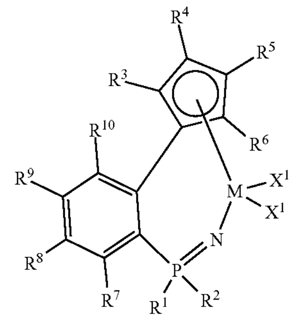

wherein M, $R^1$, $R^2$, $R^3$, $R^4$, $R^5$, $R^6$, and $X^1$ are as defined above for formulas I and II; and wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR',a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR, a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR, a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^7$, $R^8$, $R^9$ and $R^{10}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^7$, $R^8$, $R^9$ and $R^{10}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each independently selected from the group consisting of hydrogen and a Ci-so hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each hydrogen.

In embodiments of the disclosure, the organometallic complex of formula II, is an organometallic complex represented by formula IV:

(IV)

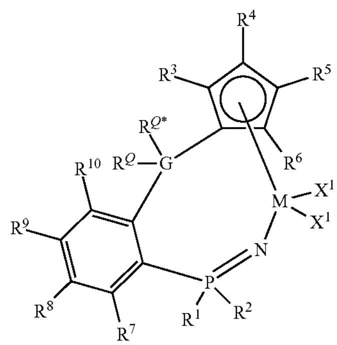

wherein M, $R^1$, $R^2$, $R^3$, $R^4$, $R^5$, $R^6$, and $X^1$ are as defined above for formulas I and II; and wherein G is a group 14 element;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments G is carbon, C, or silicon, Si, or germanium, Ge.

In some embodiments G is carbon, C, or silicon, Si.

In some embodiments G is carbon, C.

In some embodiments G is silicon, Si.

In some embodiments G is germanium, Ge.

In some embodiments, $R^Q$ and $R^{Q*}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^Q$ and $R^{Q*}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In embodiments, $R^Q$ and $R^{Q*}$ are each independently selected from the group consisting of hydrogen, a $C_{1-20}$ alkyl group and a $C_{6-20}$ aryl group.

In embodiments, $R^Q$ and $R^{Q*}$ are each independently a $C_{1-8}$ alkyl group.

In embodiments, $R^Q$ and $R^{Q*}$ are each independently a $C_{6-20}$ aryl group.

In embodiments, $R^Q$ is hydrogen and $R^{Q*}$ is a $C_{1-8}$ alkyl group.

In embodiments, $R^Q$ is hydrogen and $R^{Q*}$ is a $C_{6-20}$ aryl group.

In embodiments, $R^Q$ is hydrogen and $R^{Q*}$ is a methyl group.

In embodiments, $R^Q$ is hydrogen and $R^{Q*}$ is a phenyl group.

In embodiments, $R^Q$ and $R^{Q*}$ are each hydrogen.

In some embodiments, $R^7$, $R^8$, $R^9$ and $R^{10}$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^7$, $R^8$, $R^9$ and $R^{10}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^7$, $R^8$, $R^9$ and $R^{10}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each independently selected from the group consisting of hydrogen and a Ci-so hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each hydrogen.

In embodiments of the disclosure, the organometallic complex of formula I, is an organometallic complex represented by formula V:

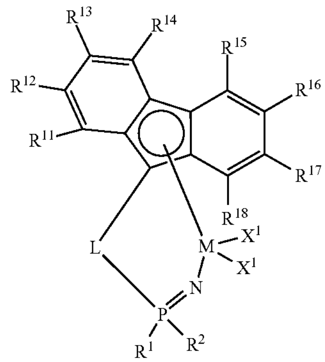

(V)

wherein M, $R^1$, $R^2$, $X^1$ and L are as defined above for formula I; and wherein $R^{11}$, $R^{12}$, $R^{13}$, $R^{14}$, $R^{15}$, $R^{16}$, $R^{17}$, $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^{11}$, $R^{12}$, $R^{13}$, $R^{14}$, $R^{15}$, $R^{16}$, $R^{17}$, $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{11}$, $R^{12}$, $R^{13}$, $R^{14}$, $R^{15}$, $R^{16}$, $R^{17}$, $R^{18}$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^{11}$, $R^{12}$, $R^{13}$, $R^{14}$, $R^{15}$, $R^{16}$, $R^{17}$, $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{11}$, $R^{12}$, $R^{13}$, $R^{14}$, $R^{15}$, $R^{16}$, $R^{17}$, and $R^{18}$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^{11}$, $R^{12}$, $R^{13}$, $R^{14}$, $R^{15}$, $R^{16}$, $R^{17}$ and $R^{18}$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{11}$, $R^{12}$, $R^{13}$, $R^{14}$, $R^{15}$, $R^{16}$, $R^{17}$ and $R^{18}$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^{11}$, $R^{12}$, $R^{13}$, $R^{14}$, $R^{15}$, $R^{16}$, $R^{17}$ and $R^{18}$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{11}$, $R^{12}$, $R^{13}$, $R^{14}$, $R^{15}$, $R^{16}$, $R^{17}$, $R^{18}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^{11}$, $R^{12}$, $R^{13}$, $R^{14}$, $R^{15}$, $R^{16}$, $R^{17}$, $R^{18}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^{11}$, $R^{12}$, $R^{13}$, $R^{14}$, $R^{15}$, $R^{16}$, $R^{17}$, $R^{18}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^{11}$, $R^{12}$, $R^{13}$, $R^{14}$, $R^{15}$, $R^{16}$, $R^{17}$, $R^{18}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^{11}$, $R^{12}$, $R^{13}$, $R^{14}$, $R^{15}$, $R^{16}$, $R^{17}$, $R^{18}$ are each independently selected from the group consisting of hydrogen and a $C_{1-30}$ hydrocarbyl group, which hydrocarbyl group is unsubstituted or further substituted by one or more than one halogen atom.

In some embodiments, $R^{11}$, $R^{12}$, $R^{13}$, $R^{14}$, $R^{15}$, $R^{16}$, $R^{17}$, $R^{18}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^{12}$ and $R^{17}$ are each independently an unsubstituted $C_{1-30}$ hydrocarbyl group.

In some embodiments, $R^{13}$ and $R^{16}$ are each independently an unsubstituted $C_{1-30}$ hydrocarbyl group.

In some embodiments, $R^{12}$ and $R^{17}$ are a $C_{1-20}$ alkyl group.

In some embodiments, $R^{13}$ and $R^{16}$ are a $C_{1-20}$ alkyl group.

In some embodiments, $R^{12}$ and $R^{17}$ are a $C_{6-20}$ aryl group.

In some embodiments, $R^{13}$ and $R^{16}$ are a $C_{6-20}$ aryl group.

In some embodiments, $R^{12}$ and $R^{17}$ are a tert-butyl group.

In some embodiments, $R^{13}$ and $R^{16}$ are a tert-butyl group.

In some embodiments, $R^{11}$, $R^{13}$, $R^{14}$, $R^{15}$, $R^{16}$ and $R^{18}$ are each hydrogen.

In some embodiments, $R^{11}$, $R^{12}$, $R^{14}$, $R^{15}$, $R^{17}$ and $R^{18}$ are each hydrogen.

In some embodiments, $R^{11}$, $R^{12}$, $R^{13}$, $R^{14}$, $R^{15}$, $R^{16}$, $R^{17}$ and $R^{18}$ are each hydrogen.

In some embodiments, $R^{11}$, $R^{13}$, $R^{14}$, $R^{15}$, $R^{16}$ and $R^{18}$ are each hydrogen, and $R^{12}$ and $R^{17}$ are each independently an unsubstituted $C_{1-30}$ hydrocarbyl group.

In some embodiments, $R^{11}$, $R^{13}$, $R^{14}$, $R^{15}$, $R^{16}$ and $R^{18}$ are each hydrogen, and $R^{12}$ and $R^{17}$ are each a tert-butyl group.

In some embodiments, $R^{11}$, $R^{12}$, $R^{14}$, $R^{15}$, $R^{17}$ and $R^{18}$ are each hydrogen, and $R^{13}$ and $R^{16}$ are each independently an unsubstituted $C_{1-30}$ hydrocarbyl group.

In some embodiments, $R^{11}$, $R^{12}$, $R^{14}$, $R^{15}$, $R^{17}$ and $R^{18}$ are each hydrogen, and $R^{13}$ and $R^{16}$ are each a tert-butyl group.

In embodiments of the disclosure, the organometallic complex of formula V, is an organometallic complex represented by formula VI:

(VI)

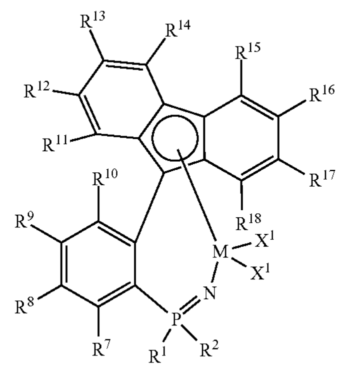

wherein M, $R^1$, $R^2$, $R^{11}$, $R^{12}$, $R^{13}$, $R^{14}$, $R^{15}$, $R^{16}$, $R^{17}$, $R^{18}$ and $X^1$ are as defined above for formulas I and V; and wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, an $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^7$, $R^8$, $R^9$ and $R^{10}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^7$, $R^8$, $R^9$ and $R^{10}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each independently selected from the group consisting of hydrogen and a Ci-so hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each hydrogen.

In some embodiments, $R^7$, $R^8$, $R^9$ and $R^{10}$ are each hydrogen; and $R^{11}$, $R^{12}$, $R^{13}$, $R^{14}$, $R^{15}$, $R^{16}$, $R^{17}$, $R^{18}$ are each independently selected from the group consisting of halogen, hydrogen, a $C_{1-30}$ alkyl group, and a $C_{6-30}$ aryl group.

In some embodiments, $R^7$, $R^8$, $R^9$ and $R^{10}$ are each hydrogen; $R^{11}$, $R^{13}$, $R^{14}$, $R^{15}$, $R^{17}$, and $R^{18}$ are each hydrogen, and $R^{12}$ and $R^{17}$ are each independently a $C_{1-20}$ alkyl group or a $C_{6-20}$ aryl group.

In some embodiments, $R^7$, $R^8$, $R^9$ and $R^{10}$ are each hydrogen; $R^{11}$, $R^{13}$, $R^{14}$, $R^{15}$, $R^{16}$ and $R^{18}$ are each hydrogen, and $R^{12}$ and $R^{17}$ are each a tert-butyl group.

In some embodiments, $R^7$, $R^8$, $R^9$ and $R^{10}$ are each hydrogen; $R^{11}$, $R^{12}$, $R^{14}$, $R^{15}$, $R^{17}$ and $R^{18}$ are each hydrogen, and $R^{13}$ and $R^{16}$ are each independently a $C_{1-20}$ alkyl group or a $C_{6-20}$ aryl group.

In some embodiments, $R^7$, $R^8$, $R^9$ and $R^{10}$ are each hydrogen; $R^{11}$, $R^{12}$, $R^{14}$, $R^{15}$, $R^{17}$ and $R^{18}$ are each hydrogen, and $R^{13}$ and $R^{16}$ are each a tert-butyl group.

In embodiments of the disclosure, the organometallic complex of formula VI, is an organometallic complex represented by formula VIa:

(VIa)

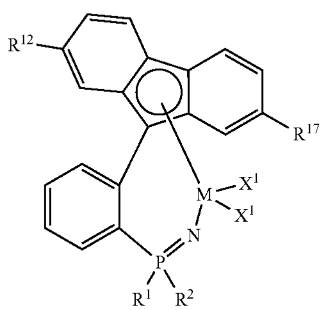

wherein M, $R^1$, $R^2$, $R^{12}$, $R^{17}$ and $X^1$ are as defined above for formulas I and V.

In embodiments of the disclosure, the organometallic complex of formula VI, is an organometallic complex represented by formula VIb:

(IVb)

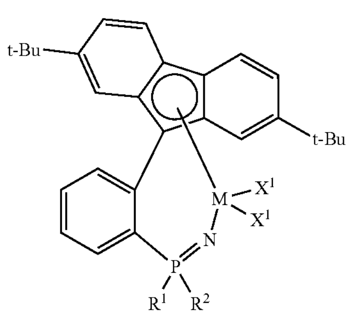

wherein M, $R^1$, $R^2$ and $X^1$ are as defined above for formula I.

In embodiments of the disclosure, the organometallic complex of formula VI, is an organometallic complex represented by formula IVc:

(IVc)

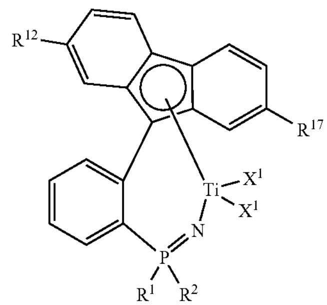

wherein $R^1$, $R^2$, $R^{12}$, $R^{17}$ and $X^1$ are as defined above for formulas I and V.

In embodiments of the disclosure, the organometallic complex of formula VI, is an organometallic complex represented by formula VId:

(VId)

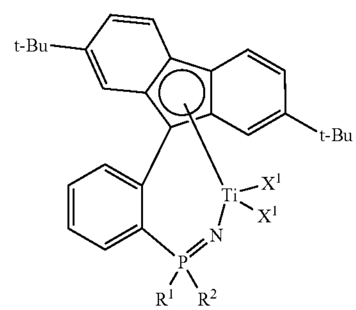

wherein $R^1$, $R^2$ and $X^1$ are as defined above for formula I.

In embodiments of the disclosure, the organometallic complex of formula VI, is an organometallic complex represented by formula VIe:

(VIe)

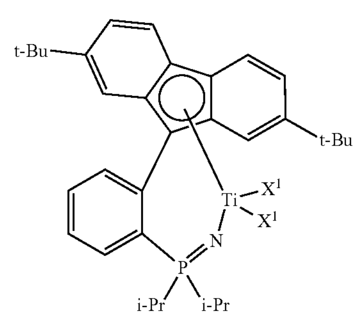

wherein $X^1$ is as defined above for formula I.

In an embodiment of the disclosure, the organometallic complex of formula VI, is an organometallic complex represented by formula VIf:

(VIf)

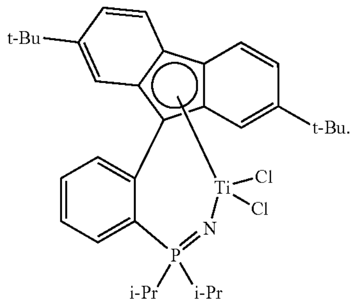

In an embodiment of the disclosure, the organometallic complex of formula VI, is an organometallic complex represented by formula VIg:

(VIg)

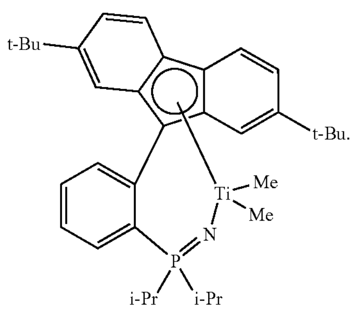

In an embodiment of the disclosure, the organometallic complex of formula VI, is an organometallic complex represented by formula VIh:

(VIh)

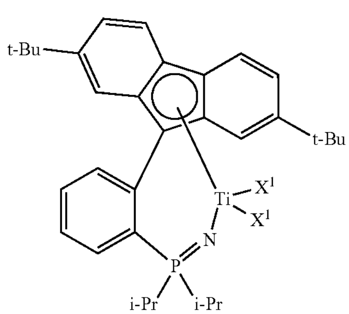

wherein M and $X^1$ are as defined above for formula I.

In an embodiment of the disclosure, the organometallic complex of formula VI, is an organometallic complex represented by formula Vii:

(VIi)

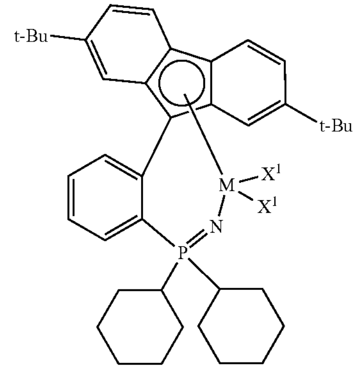

wherein M and $X^1$ are as defined above for formula I.

In embodiments of the disclosure, the organometallic complex of formula V, is an organometallic complex represented by formula VII:

(VII)

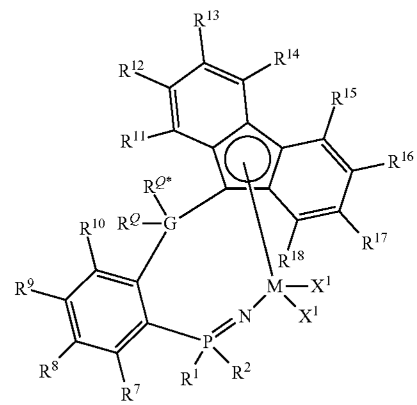

wherein M, $R^1$, $R^2$, $R^{11}$, $R^{12}$, $R^{13}$, $R^{14}$, $R^{15}$, $R^{16}$, $R^{17}$, $R^{18}$, and $X^1$ are as defined above for formulas I and V; and wherein G is a group 14 element;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments G is carbon, C, or silicon, Si, or germanium, Ge.

In some embodiments G is carbon, C, or silicon, Si.

In some embodiments G is carbon, C.

In some embodiments G is silicon, Si.

In some embodiments G is germanium, Ge.

In some embodiments, $R^Q$ and $R^{Q*}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^Q$ and $R^{Q*}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In embodiments, $R^Q$ and $R^{Q*}$ are each independently selected from the group consisting of hydrogen, a $C_{1-20}$ alkyl group and a $C_{6-20}$ aryl group.

In embodiments, $R^Q$ and $R^{Q*}$ are each independently a $C_{1-8}$ alkyl group.

In embodiments, $R^Q$ and $R^{Q*}$ are each independently a $C_{6-20}$ aryl group.

In embodiments, $R^Q$ is hydrogen and $R^{Q*}$ is a $C_{1-8}$ alkyl group.

In embodiments, $R^Q$ is hydrogen and $R^{Q*}$ is a $C_{6-20}$ aryl group.

In embodiments, $R^Q$ is hydrogen and $R^{Q*}$ is a methyl group.

In embodiments, $R^Q$ is hydrogen and $R^{Q*}$ is a phenyl group.

In embodiments, $R^Q$ and $R^{Q*}$ are each hydrogen.

In some embodiments, $R^7$, $R^8$, $R^9$ and $R^{10}$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^7$, $R^8$, $R^9$ and $R^{10}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^7$, $R^8$, $R^9$ and $R^{10}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each hydrogen.

In some embodiments, $R^7$, $R^8$, $R^9$ and $R^{10}$ are each hydrogen; and $R^{11}$, $R^{12}$, $R^{13}$, $R^{14}$, $R^{15}$, $R^{16}$, $R^{17}$, $R^{18}$ are each independently selected from the group consisting of halogen, hydrogen, a $C_{1-30}$ alkyl group, and a $C_{6-30}$ aryl group.

In some embodiments, $R^7$, $R^8$, $R^9$ and $R^{10}$ are each hydrogen; $R^{11}$, $R^{13}$, $R^{14}$, $R^{15}$, $R^{16}$ and $R^{18}$ are each hydrogen, and $R^{12}$ and $R^{17}$ are each independently a $C_{1-20}$ alkyl group or a $C_{6-20}$ aryl group.

In some embodiments, $R^7$, $R^8$, $R^9$ and $R^{10}$ are each hydrogen; $R^{11}$, $R^{13}$, $R^{14}$, $R^{15}$, $R^{16}$ and $R^{18}$ are each hydrogen, and $R^{12}$ and $R^{17}$ are each a tert-butyl group.

In some embodiments, $R^7$, $R^8$, $R^9$ and $R^{10}$ are each hydrogen; $R^{11}$, $R^{12}$, $R^{14}$, $R^{15}$, $R^{17}$ and $R^{18}$ are each hydrogen, and $R^{13}$ and $R^{16}$ are each independently a $C_{1-20}$ alkyl group or a $C_{6-20}$ aryl group.

In some embodiments, $R^7$, $R^8$, $R^9$ and $R^{10}$ are each hydrogen; $R^{11}$, $R^{12}$, $R^{14}$, $R^{15}$, $R^{17}$ and $R^{18}$ are each hydrogen, and $R^{13}$ and $R^{16}$ are each a tert-butyl group.

In embodiments of the disclosure, the organometallic complex of formula VII, is an organometallic complex represented by formula VIIa:

(VIIa)

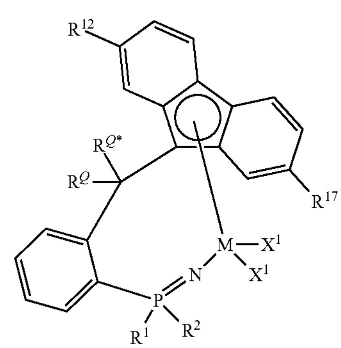

wherein M, $R^1$, $R^2$, $R^Q$, $R^{Q*}$, $R^{12}$, $R^{17}$ and $X^1$ are as defined above for formulas I, V and VII.

In embodiments of the disclosure, the organometallic complex of formula VII, is an organometallic complex represented by formula VIIb:

(VIIb)

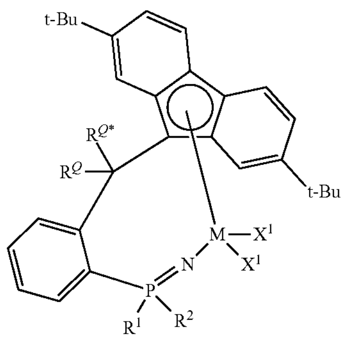

wherein M, $R^1$, $R^2$, $R^Q$, $R^{Q*}$ and $X^1$ are as defined above for formulas I and VII.

In embodiments of the disclosure, the organometallic complex of formula VII, is an organometallic complex represented by formula VIII:

(VIIc)

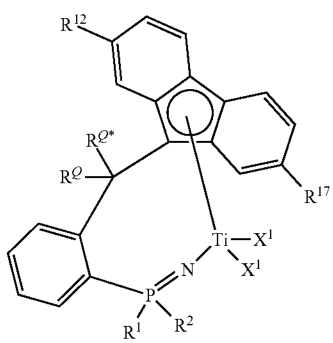

wherein $R^1$, $R^2$, $R^Q$, $R^{Q*}$, $R^{12}$, $R^{17}$ and $X^1$ are as defined above for formulas I, V and VII.

In embodiments of the disclosure, the organometallic complex of formula VII, is an organometallic complex represented by formula VIId:

(VIId)

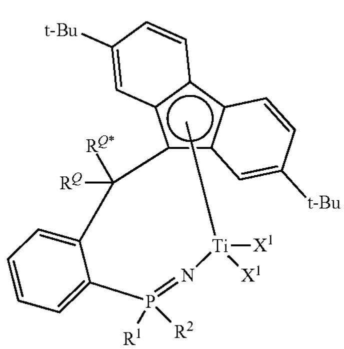

wherein $R^1$, $R^2$, $R^Q$, $R^{Q*}$ and $X^1$ are as defined above for formulas I and VII.

In embodiments of the disclosure, the organometallic complex of formula VII, is an organometallic complex represented by formula VIIe:

(VIIe)

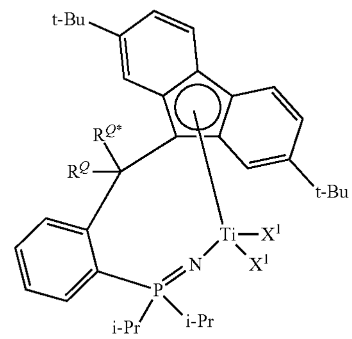

wherein $R^Q$, $R^{Q*}$ and $X^1$ are as defined above for formulas I and VII.

In embodiments of the disclosure, the organometallic complex of formula VII, is an organometallic complex represented by formula VIIf:

(VIIf)

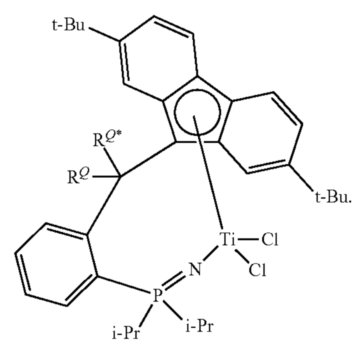

wherein $R^Q$ and $R^{Q*}$ are as defined above for formula VII.

In embodiments of the disclosure, the organometallic complex of formula VII, is an organometallic complex represented by formula VIIg:

(VIIg)

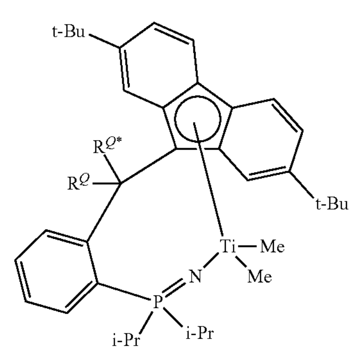

wherein $R^Q$ and $R^{Q*}$ are as defined above for formula VII.

In an embodiment of the disclosure, the organometallic complex of formula VII, is an organometallic complex represented by formula VIIh:

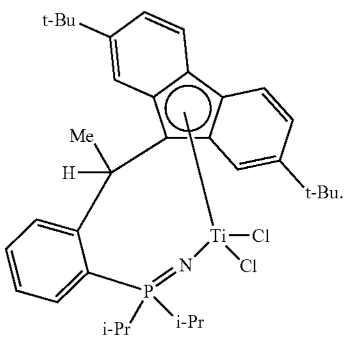

(VIIh)

In an embodiment of the disclosure, the organometallic complex of formula VII, is an organometallic complex represented by formula VIIi:

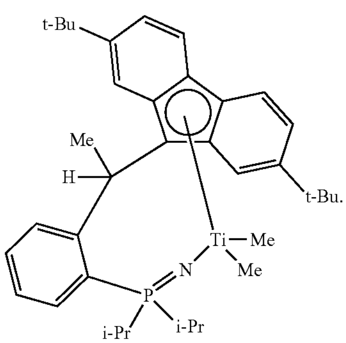

(VIIi)

In embodiments of the disclosure, the organometallic complex of formula VII, is an organometallic complex represented by formula VIIj:

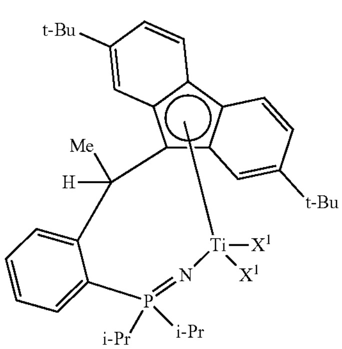

(VIIj)

wherein $X^1$ is as defined above for formula I.

In embodiments of the disclosure, the organometallic complex of formula I, is an organometallic complex represented by formula VIII:

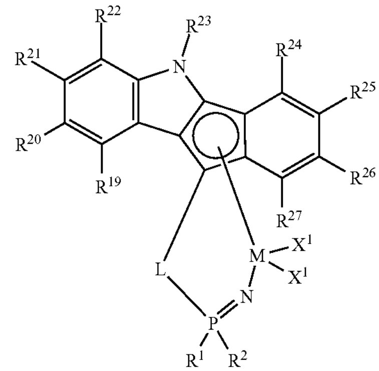

(VIII)

wherein M, $R^1$, $R^2$, $X^1$ and L are as defined above for formula I; and wherein $R^{23}$ is selected from the group consisting of hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein $R^{19}$, $R^{20}$, $R^{21}$, $R^{22}$, $R^{24}$, $R^{25}$, $R^{26}$, and $R^{27}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, $—NR'_2$;

a phosphido group, $—PR'_2$;

a thiolate group, —SR';

a silyl group of the formula $—Si(R^a)_3$; and a germanyl group of the formula $—Ge(R^a)_3$;

wherein two adjacent groups of $R^{19}$, $R^{20}$, $R^{21}$, $R^{22}$, $R^{24}$, $R^{25}$, $R^{26}$, and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR, a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{23}$ is selected from the group consisting of a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group.

In some embodiments, $R^{23}$ is selected from the group consisting of a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group.

In some embodiments, $R^{19}$, $R^{20}$, $R^{21}$, $R^{22}$, $R^{24}$, $R^{25}$, $R^{26}$, and $R^{27}$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^{19}$, $R^{20}$, $R^{21}$, $R^{22}$, $R^{24}$, $R^{25}$, $R^{26}$, and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR, a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{19}$, $R^{20}$, $R^{21}$, $R^{22}$, $R^{24}$, $R^{25}$, $R^{26}$, and $R^{27}$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^{19}$, $R^{20}$, $R^{21}$, $R^{22}$, $R^{24}$, $R^{25}$, $R^{26}$, and $R^{27}$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{19}$, $R^{20}$, $R^{21}$, $R^{22}$, $R^{24}$, $R^{25}$, $R^{26}$, and $R^{27}$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^{19}$, $R^{20}$, $R^{21}$, $R^{22}$, $R^{24}$, $R^{25}$, $R^{26}$, and $R^{27}$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{19}$, $R^{20}$, $R^{21}$, $R^{22}$, $R^{24}$, $R^{25}$, $R^{26}$, and $R^{27}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^{19}$, $R^{20}$, $R^{21}$, $R^{22}$, $R^{24}$, $R^{25}$, $R^{26}$, and $R^{27}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^{19}$, $R^{20}$, $R^{21}$, $R^{22}$, $R^{24}$, $R^{25}$, $R^{26}$, and $R^{27}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^{19}$, $R^{20}$, $R^{21}$, $R^{22}$, $R^{24}$, $R^{25}$, $R^{26}$, and $R^{27}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^{19}$, $R^{20}$, $R^{21}$, $R^{22}$, $R^{24}$, $R^{25}$, $R^{26}$, and $R^{27}$ are each independently selected from the group consisting of hydrogen and a $C_{1-30}$ hydrocarbyl group, which hydrocarbyl group is unsubstituted or further substituted by one or more than one halogen atom.

In some embodiments, $R^{19}$, $R^{20}$, $R^{21}$, $R^{22}$, $R^{24}$, $R^{25}$, $R^{26}$, and $R^{27}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^{20}$ is an unsubstituted $C_{1-30}$ hydrocarbyl group.

In some embodiments, $R^{20}$ is a $C_{1-8}$ alkyl group.

In some embodiments, $R^{19}$, $R^{21}$, $R^{22}$, $R^{24}$, $R^{25}$, $R^{26}$, and $R^{27}$ are each hydrogen.

In some embodiments, $R^{19}$, $R^{20}$, $R^{21}$, $R^{22}$, $R^{24}$, $R^{25}$, $R^{26}$, and $R^{27}$ are each hydrogen.

In some embodiments, $R^{20}$ is an unsubstituted $C_{1-30}$ hydrocarbyl group, and $R^{19}$, $R^{21}$, $R^{22}$, $R^{24}$, $R^{25}$, $R^{26}$, and $R^{27}$ are each hydrogen.

In some embodiments, $R^{20}$ is a $C_{1-8}$ alkyl group, and $R^{19}$, $R^{21}$, $R^{22}$, $R^{24}$, $R^{25}$, $R^{26}$, and $R^{2'}$ are each hydrogen.

In some embodiments, $R^{20}$ is a methyl group.

In some embodiments, $R^{20}$ is a phenyl group.

In some embodiments, $R^{23}$ is selected from the group consisting of hydrogen, a $C_{1-30}$ alkyl group, and a $C_{6-20}$ aryl group.

In some embodiments, $R^{23}$ is selected from the group consisting of a $C_{1-30}$ alkyl group, and a $C_{6-20}$ aryl group.

In some embodiments, $R^{23}$ is an unsubstituted $C_{1-30}$ hydrocarbyl group.

In some embodiments, $R^{23}$ is a $C_{1-8}$ alkyl group.

In some embodiments, $R^{23}$ is a methyl group.

In some embodiments, $R^{23}$ is a phenyl group.

In some embodiments, $R^{20}$ and $R^{23}$ are each independently an unsubstituted $C_{1-30}$ hydrocarbyl group, and $R^{19}$, $R^{21}$, $R^{22}$, $R^{24}$, $R^{25}$, $R^{26}$, and $R^{27}$ are each hydrogen.

In some embodiments, $R^{20}$ and $R^{23}$ are each independently a $C_{1-8}$ alkyl group, and $R^{19}$, $R^{21}$, $R^{22}$, $R^{24}$, $R^{25}$, $R^{26}$, and $R^{27}$ are each hydrogen.

In some embodiments, $R^{20}$ and $R^{23}$ are each a methyl group, and $R^{19}$, $R^{21}$, $R^{22}$, $R^{24}$, $R^{25}$, $R^{26}$, and $R^{27}$ are each hydrogen.

In embodiments of the disclosure, the organometallic complex of formula VIII, is an organometallic complex represented by formula IX:

(IX)

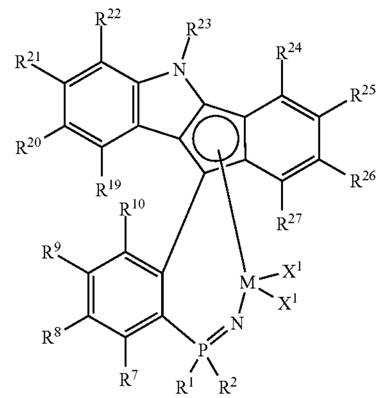

wherein M, $R^1$, $R^2$, $R^{19}$, $R^{20}$, $R^{21}$, $R^{22}$, $R^{23}$, $R^{24}$, $R^{25}$, $R^{26}$, $R^{27}$ and $X^1$ are as defined above for formulas I and VIII; and wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, $—NR'_2$;

a phosphido group, $—PR'_2$;

a thiolate group, —SR';

a silyl group of the formula $—Si(R^a)_3$; and a germanyl group of the formula $—Ge(R^a)_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula $—NR'_2$, a phosphido group of the formula $—PR'_2$, a thiolate group of the formula —SR', a silyl group of the formula $—Si(R^a)_3$, and a germanyl group of the formula $—Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^7$, $R^8$, $R^9$ and $R^{10}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^7$, $R^8$, $R^9$ and $R^{10}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each independently selected from the group consisting of hydrogen and a Ci-so hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each hydrogen.

In embodiments of the disclosure, the organometallic complex of formula IX, is an organometallic complex represented by formula IXa:

(IXa)

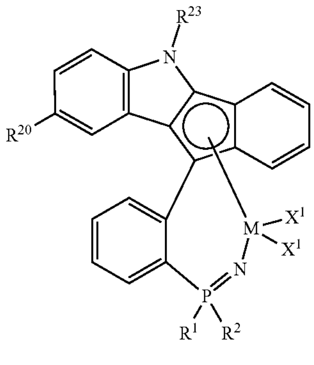

wherein M, $R^1$, $R^2$, $R^{20}$, $R^{23}$ and $X^1$ are as defined above for formulas I and VIII.

In embodiments of the disclosure, the organometallic complex of formula IX, is an organometallic complex represented by formula IXb:

(IXb)

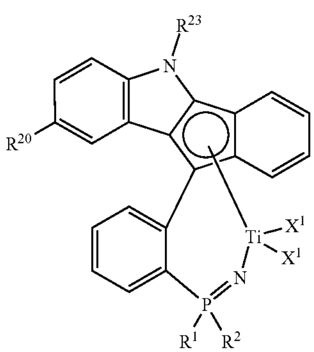

wherein $R^1$, $R^2$, $R^{20}$, $R^{23}$ and $X^1$ are as defined above for formulas I and VIII.

In embodiments of the disclosure, the organometallic complex of formula IX, is an organometallic complex represented by formula IXc:

(IXc)

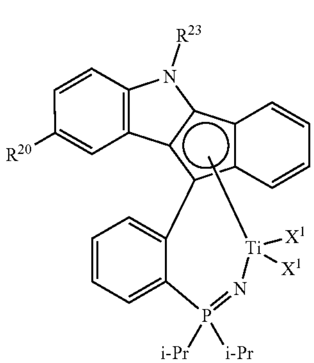

wherein $R^{20}$, $R^{23}$ and $X^1$ are as defined as above for formulas I and VIII.

In embodiments of the disclosure, the organometallic complex of formula IX, is an organometallic complex represented by formula IXd:

(IXd)

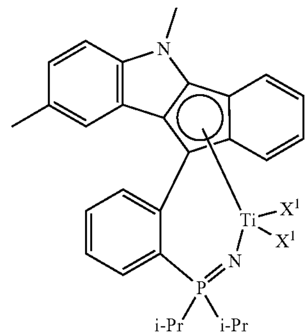

wherein $X^1$ is as defined above for formula I.

In an embodiment of the disclosure, the organometallic complex of formula IX, is an organometallic complex represented by formula IXe:

(IXe)

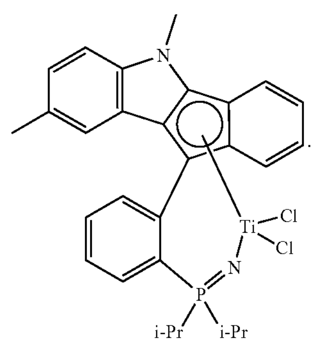

In an embodiment of the disclosure, the organometallic complex of formula IX, is an organometallic complex represented by formula IXf:

(IXf)

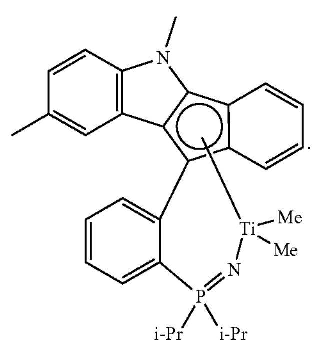

In an alternate embodiment of the disclosure, an organometallic complex is represented by formula X:

(X)

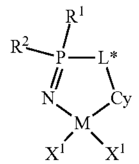

wherein M, $R^1$, $R^2$, Cy and $X^1$ are as defined above for formula I; and

L* is a bridging group containing at least one cycloalkylene, heterocycloalkylene, arylene or heteroarylene group.

The term "cycloalkylene" refers to a bivalent group containing a cycloaliphatic ring.

The term "heterocycloalkylene" refers to a bivalent group containing a heterocycloaliphatic ring. The term "arylene" refers to a bivalent group containing an aromatic ring. The term "heteroarylene" refers to a bivalent group containing a heteroaromatic ring.

In some embodiments L* is a bridging group containing at least one arylene or heteroarylene group.

In some embodiments L* is a bridging group containing at least one arylene group. In some embodiments L* is a bridging group containing at least one phenylene group.

In some embodiments L* is a bridging group comprising 1-50 atoms selected from carbon atoms, hydrogen atoms and heteroatoms and containing at least one arylene or heteroarylene group. In some embodiments L* is a bridging group comprising 1-50 atoms selected from carbon atoms, hydrogen atoms and heteroatoms and containing at least one arylene group. In some embodiments L* is a bridging group comprising 1-50 atoms selected from carbon atoms, hydrogen atoms and heteroatoms and containing at least one phenylene group. In some embodiments L* is a bridging group comprising 1-50 atoms selected from carbon atoms and hydrogen atoms and containing at least one phenylene group.

The arylene or heteroarylene group within L* may be directly or indirectly covalently bound to P. The arylene or heteroarylene group within L* may be directly covalently bound to P (i.e., there may be a covalent bond from P to an atom of the ring of the arylene or heteroarylene group). Alternatively, the arylene or heteroarylene group within L may be indirectly covalently bound to P (i.e., there may be a further bivalent group between P and an atom of the ring of the arylene or heteroarylene group). The further bivalent group may be a hydrocarbylene group, for example an alkylene group or alkenylene group, or may be a bivalent group containing one or more heteroatoms.

The arylene or heteroarylene group within L* may be directly or indirectly covalently bound to Cy. The arylene or heteroarylene group within L* may be directly covalently bound to Cy (i.e., there may be a covalent bond from P to an atom of the ring of the arylene or heteroarylene group). Alternatively, the arylene or heteroarylene group within L may be indirectly covalently bound to Cy (i.e., there may be a further bivalent group between Cy and an atom of the ring of the arylene or heteroarylene group). The further bivalent group may be a hydrocarbylene group, for example an alkylene group or alkenylene group, or may be a bivalent group containing one or more heteroatoms.

In some embodiments, L* contains a contiguous chain of atoms connecting P with Cy, wherein the contiguous chain contains 4 atoms or fewer. In some embodiments, L* contains a contiguous chain of atoms connecting P with Cy, wherein the contiguous chain contains 3 atoms or fewer. In some embodiments, L* contains a contiguous chain of atoms connecting P with Cy, wherein the contiguous chain contains 3 atoms. In some embodiments, L* contains a contiguous chain of atoms connecting P with Cy, wherein the contiguous chain contains 2 atoms.

In some embodiments, L* contains a contiguous chain of atoms connecting P with Cy, wherein the two ortho carbon atoms of the phenylene group form part of the contiguous chain of atoms.

In some embodiments L* is selected from:

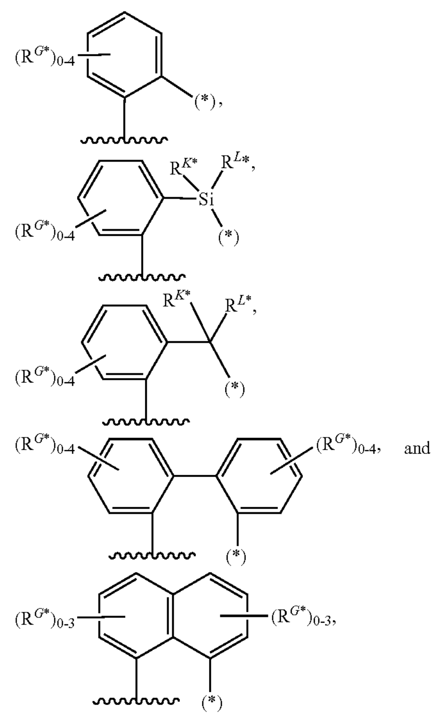

wherein ∿∿∿ indicates the point of attachment to P and (*) indicates the point of attachment to Cy; each $R^{G*}$ is independently selected from halogen and unsubstituted $C_{1-12}$ alkyl; and $R^{K*}$ and $R^{L*}$ are each independently selected from hydrogen, unsubstituted $C_{1-12}$ alkyl group, and unsubstituted or substituted $C_{6-20}$ aryl group.

In embodiments $R^{K*}$ and $R^{L*}$ are each independently selected unsubstituted $C_{1-12}$ alkyl group, and unsubstituted or substituted $C_{6-20}$ aryl group.

In some embodiments $R^{G*}$ is absent (the phenylene group, or the biphenylene group, or the naphthalene group is unsubstituted).

In some embodiments $R^{K*}$ and $R^{L*}$ are each hydrogen.

The Pre-Metallation Compound

An embodiment of the disclosure is a pre-metallation compound represented by the formula I-L:

(I-L)

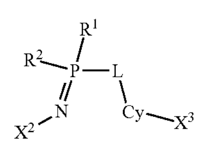

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$; wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

Cy is a cyclopentadienyl-type moiety and is covalently bound to L and $X^3$;

$X^2$ is hydrogen, or a silyl group of the formula —$Si(R^e)_3$, $X^3$ is hydrogen, or a silyl group of the formula —$Si(R^e)_3$, or a stannyl group of the formula $Sn(R^e)_3$;

wherein each $R^e$ is independently selected from the group consisting of hydrogen, a $C_{1-8}$ alkyl group, $C_{1-8}$ alkoxy group, $C_{6-20}$ aryloxy group, and a $C_{6-20}$ aryl group; and L is a bridging group containing a contiguous chain of atoms connecting P with Cy, wherein the contiguous chain contains 2 or 3 atoms.

In some embodiments, $X^2$ is hydrogen.

In some embodiments, $X^2$ is a silyl group of the formula —$Si(R^e)_3$, wherein each $R^e$ is independently selected from the group consisting of hydrogen, $C_{1-8}$ alkyl group, $C_{1-8}$ alkoxy group, $C_{6-20}$ aryloxy group and $C_{6-20}$ aryl group.

In some embodiments, $X^2$ is —$Si(Me)_3$.

In some embodiments, $X^3$ is hydrogen.

In some embodiments, $X^3$ is a silyl group of the formula —$Si(R^e)_3$, wherein each $R^e$ is independently selected from the group consisting of hydrogen, $C_{1-8}$ alkyl group, $C_{1-8}$ alkoxy group, $C_{6-20}$ aryloxy group and $C_{6-20}$ aryl group.

In some embodiments, $X^3$ is —$Si(Me)_3$.

In some embodiments, $R^1$ and $R^2$ are each independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$; wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group.

In some embodiments, $R^1$ and $R^2$ are each independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group.

In some embodiments, $R^1$ and $R^2$ are each a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group.

In some embodiments, $R^1$ and $R^2$ are each independently an unsubstituted $C_{1-30}$ hydrocarbyl group.

In some embodiments, $R^1$ and $R^2$ are each independently an unsubstituted $C_{1-20}$ hydrocarbyl group.

In some embodiments, $R^1$ and $R^2$ are each independently an unsubstituted $C_{1-12}$ hydrocarbyl group.

In some embodiments, $R^1$ and $R^2$ are each independently a $C_{1-20}$ alkyl group.

In some embodiments, $R^1$ and $R^2$ are each independently a $C_{1-12}$ alkyl group.

In some embodiments, $R^1$ and $R^2$ are each independently a $C_{1-9}$ alkyl group.

In some embodiments, $R^1$ and $R^2$ are each independently a branched $C_{3-8}$ alkyl group.

In some embodiments, $R^1$ and $R^2$ are each independently an $C_{6-20}$ aryl group.

In some embodiments, $R^1$ and $R^2$ are the same.

In some embodiments, $R^1$ and $R^2$ are each independently selected from the group consisting of isopropyl, cyclohexyl and tert-butyl.

In some embodiments, $R^1$ and $R^2$ are each an isopropyl group.

In some embodiments, $R^1$ and $R^2$ are each a cyclohexyl group.

In some embodiments, $R^1$ and $R^2$ are each a tert-butyl group.

In some embodiments, each R' is a $C_{1-8}$ alkyl group.

In some embodiments, each R' is a $C_{6-20}$ aryl group.

In some embodiments, each R' is a methyl group.

In some embodiments, each R' is a phenyl group.

In some embodiments, each $R^a$ is a $C_{1-8}$ alkyl group.

In some embodiments, each $R^a$ is a $C_{6-20}$ aryl group.

In some embodiments, each $R^a$ is a methyl group.

In some embodiments, each $R^a$ is an ethyl group.

In some embodiments, each $R^a$ is a phenyl group.

In some embodiments, each of $R^b$, $R^c$, $R^d$ is a $C_{1-12}$ alkyl group.

In some embodiments, each of $R^b$, $R^c$, $R^d$ is a $C_{1-9}$ alkyl group.

In some embodiments, each of $R^b$, $R^c$, $R^d$ is a $C_{1-6}$ alkyl group.

In some embodiments, each of $R^b$, $R^c$, $R^d$ is a branched $C_{3-8}$ alkyl group.

In some embodiments, each of $R^b$, $R^c$, $R^d$ is an isopropyl group.

In some embodiments, each of $R^b$, $R^c$, $R^d$ is a cyclohexyl group.

In some embodiments, each of $R^b$, $R^c$, $R^d$ is a tert-butyl group.

In some embodiments, $R^1$ and $R^2$ together with the P atom to which they are attached together form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group.

In some embodiments, $R^1$ and $R^2$ together with the P atom to which they are attached together form a 4-6 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group.

In some embodiments, $R^1$ and $R^2$ together with the P atom to which they are attached together form a 5-6 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group.

As used in the present disclosure when referring to a pre-metallation compound, or an un-metallated moiety, Cy is a "cyclopentadienyl-type moiety", and Cy-H represents the protonated form of a cyclopentadienyl-type ligand. Hence, Cy-H represents a pre-metallation moiety which contains a cyclopentadiene ring structure which can be deprotonated to form a 5-member carbon ring having delocalized π-bonding within the ring (e.g., aromaticity) and which may coordinate to a transition metal center as a cyclopentadienyl-type ligand.

As used in the present disclosure when referring to a pre-metallation compound, or an un-metallated moiety, Cy is a "cyclopentadienyl-type moiety", and Cy-Si($R^e$)$_3$ represents the silylated form of a cyclopentadienyl-type ligand. Hence, Cy-Si($R^e$)$_3$ represents a pre-metallation moiety which contains a cyclopentadiene ring structure which can be desilylated to form a 5-member carbon ring having delocalized π-bonding within the ring (e.g., aromaticity) and which may coordinate to a transition metal center as a cyclopentadienyl-type ligand.

As used in the present disclosure when referring to a pre-metallation compound, or an un-metallated moiety, Cy is a "cyclopentadienyl-type moiety", and Cy-Sn($R^e$)$_3$ represents the stannylated form of a cyclopentadienyl-type ligand. Hence, Cy-Sn($R^e$)$_3$ represents a pre-metallation moiety which contains a cyclopentadiene ring structure which can be destannylated to form a 5-member carbon ring having delocalized π-bonding within the ring (e.g., aromaticity) and which may coordinate to a transition metal center as a cyclopentadienyl-type ligand.

Thus, the term "cyclopentadienyl-type moiety" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl moieties are also contemplated for use in the current disclosure.

In embodiments of the disclosure, substituents for a cyclopentadienyl moiety, an indenyl moiety (or hydrogenated version thereof) and a fluorenyl moiety (or hydrogenated version thereof) may be selected from the group consisting of a $C_{1-30}$ hydrocarbyl group, which hydrocarbyl group may be unsubstituted or further substituted by for example a halogen (such as would be the case for a pentafluorobenzyl group, —$CH_2C_6F_5$), a $C_{1-20}$ alkoxy group, a $C_{6-20}$ aryl group, a $C_{6-20}$ aryloxy group (each of which may be further substituted by for example a halogen); an amido group which is unsubstituted or substituted by up to two $C_{1-8}$ alkyl groups; a phosphido group which is unsubstituted or substituted by up to two $C_{1-8}$ alkyl groups; a silyl group of the formula —Si($R^a$)$_3$ wherein each $R^a$ is independently selected from the group consisting of hydrogen, a $C_{1-8}$ alkyl group, and $C_{6-10}$ aryl group; and a germanyl group of the formula —Ge($R^a$)$_3$ wherein $R^a$ is as defined directly above.

In some embodiments, Cy is selected from the group consisting of heteroatom substituted cyclopentadienyl-type moieties, and heteroatom containing cyclopentadienyl-type moieties.

In some embodiments, Cy is selected from the group consisting of substituted or unsubstituted indeno[1,2-b]indolyl and indeno[2,1-b]indolyl moieties.

In some embodiments, Cy is selected from the group consisting of unsubstituted or substituted cyclopentadienyl moieties; unsubstituted or substituted cyclopentenophenanthryl moieties and hydrogenated versions thereof, unsubstituted or substituted indenyl moieties and hydrogenated versions thereof, unsubstituted or substituted fluorenyl moieties and hydrogenated versions thereof, unsubstituted or substituted octahydrofluorenyl moieties; and unsubstituted or substituted azulenyl ligands.

In some embodiments, Cy is a cyclopentadienyl moiety which is unsubstituted or substituted by up to four substituents independently selected from the group consisting of

- halogen;
- hydrogen;
- a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;
- a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;
- an oxy group, —OR';
- an amido group, —NR'$_2$;
- a phosphido group, —PR'$_2$;
- a thiolate group, —SR';
- a silyl group of the formula —Si($R^a$)$_3$; and
- a germanyl group of the formula —Ge($R^a$)$_3$;
- wherein two adjacent substituents on the cyclopentadienyl moiety may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, Cy is an indenyl moiety which is unsubstituted or substituted by up to six substituents independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent substituents on the indenyl moiety optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, Cy is an fluorenyl moiety which is unsubstituted or substituted by up to eight substituents independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent substituents on the fluorenyl moiety may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

A person skilled in the art understands that an indenyl moiety is a hydrocarbyl group derived from the compound indene:

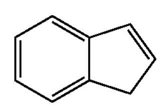

indene

A person skilled in the art understands that a fluorenyl moiety is a hydrocarbyl group derived from the compound fluorene:

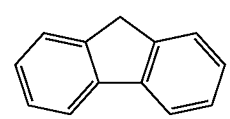

fluorene

Like cyclopentadienyl, an indenyl, or a fluorenyl hydrocarbyl moiety is, after deprotonation, able to coordinate to a metal centre by $\eta^5$-bonding (or in some cases, $\eta^3$-bonding, or in some cases, $\eta^1$-bonding)

In some embodiments, Cy is an unsubstituted or substituted indenyl moiety.

In some embodiments, Cy is an unsubstituted indenyl moiety.

In some embodiments, Cy is a substituted indenyl moiety.

In some embodiments, Cy is an unsubstituted or substituted fluorenyl moiety.

In some embodiments, Cy is an unsubstituted fluorenyl moiety.

In some embodiments, Cy is a substituted fluorenyl moiety.

In some embodiments, Cy is an unsubstituted indenyl moiety attached to the L group at the 1-position or the 2-position, wherein the positions on the indenyl rings are numbered as follows:

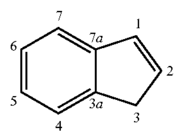

In some embodiments, Cy is unsubstituted indenyl moiety attached to the L group at the 1-position.

In some embodiments, Cy is unsubstituted indenyl moiety attached to the L group at the 2-position.

In some embodiments, Cis of the formula:

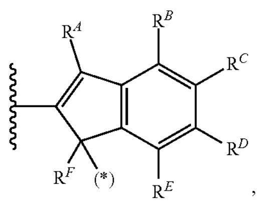

, or

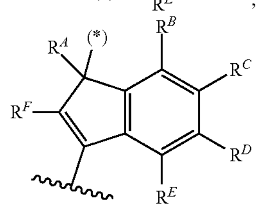

including their double bond isomers; wherein ∿∿∿ indicates the point of attachment to L and (*) indicates the point of attachment to $X^3$; and each of $R^A$, $R^B$, $R^C$, $R^D$, $R^E$ and $R^F$ are independently selected from H, $C_{1-12}$ hydrocarbyl and $C_{1-12}$ heteroatom-containing hydrocarbyl. In some embodiments each of $R^A$, $R^B$, $R^C$, $R^D$, $R^E$ and $R^F$ are independently selected from H and unsubstituted $C_{1-6}$ alkyl. In some embodiments each of $R^A$, $R^B$, $R^C$, $R^D$, $R^E$ and $R^F$ are H. In some embodiments, two adjacent groups of $R^B$, $R^C$, $R^D$ and $R^E$ are bonded to form a ring.

In some embodiments, Cy is of the formula:

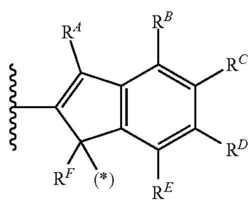

including its double bond isomers; wherein ∿∿∿ indicates the point of attachment to L and (*) indicates the point of attachment to $X^3$; and each of $R^A$, $R^B$, $R^C$, $R^D$, $R^E$ and $R^F$ are independently selected from H, $C_{1-12}$ hydrocarbyl and $C_{1-12}$ heteroatom-containing hydrocarbyl. In some embodiments each of $R^A$, $R^B$, $R^C$, $R^D$, $R^E$ and $R^F$ are independently selected from H and unsubstituted $C_{1-6}$ alkyl. In some embodiments each of $R^A$, $R^B$, $R^c$, $R^D$, $R^E$ and $R^F$ are H. In some embodiments, two adjacent groups of $R^B$, $R^c$, $R^D$ and $R^E$ are bonded to form a ring.

In some embodiments, L is a bridging group containing a contiguous chain of atoms connecting P with Cy, wherein the contiguous chain contains 3 atoms. In some embodiments, L is a bridging group containing a contiguous chain of atoms connecting P with Cy, wherein the contiguous chain contains 2 atoms. By the phrase "contiguous chain of atoms" it is meant that the atoms being referred to are bonded together in sequence, and to P at one end, and to Cy at the other end.

In some embodiments, L is a bridging group containing at least one cyclic hydrocarbyl group or at least one cyclic heteroatom containing hydrocarbyl group.

In some embodiments, L is a bridging group containing at least one cycloalkylene, heterocycloalkylene, arylene or heteroarylene group. The term "cycloalkylene" refers to a bivalent group containing a cycloaliphatic ring. The term "heterocycloalkylene" refers to a bivalent group containing a heterocycloaliphatic ring. The term "arylene" refers to a bivalent group containing an aromatic ring. The term "heteroarylene" refers to a bivalent group containing a heteroaromatic ring.

In some embodiments, L is a bridging group containing at least one arylene or heteroarylene group.

In some embodiments, L is a bridging group containing at least one cycloalkylene, or heterocycloalkylene group.

In some embodiments, L is a bridging group comprising 1-50 atoms selected from carbon atoms, hydrogen atoms and heteroatoms and containing at least one phenylene group.

In some embodiments L is a bridging group containing at least one arylene group. In some embodiments L is a bridging group containing at least one phenylene group.

In some embodiments L is a bridging group comprising 1-50 atoms selected from carbon atoms, hydrogen atoms and heteroatoms and contains at least one arylene or heteroarylene group. In some embodiments L is a bridging group comprising 1-50 atoms selected from carbon atoms, hydrogen atoms and heteroatoms and contains at least one arylene group. In some embodiments L is a bridging group comprising 1-50 atoms selected from carbon atoms, hydrogen atoms and heteroatoms and contains at least one phenylene group. In some embodiments L is a bridging group comprising 1-50 atoms selected from carbon atoms and hydrogen atoms and contains at least one phenylene group.

The arylene or heteroarylene group within L may be directly or indirectly covalently bound to P. The arylene or heteroarylene group within L may be directly covalently bound to P, i.e., there may be a covalent bond from P to an atom of the ring of the arylene or heteroarylene group. Alternatively, the arylene or heteroarylene group within L may be indirectly covalently bound to P, i.e., there may be a further bivalent group between P and an atom of the ring of the arylene or heteroarylene group. The further bivalent group may be a hydrocarbylene group, for example an alkylene group or alkenylene group, or may be a bivalent group containing one or more heteroatoms.

The arylene or heteroarylene group within L may be directly or indirectly covalently bound to Cy. The arylene or heteroarylene group within L may be directly covalently bound to Cy, i.e., there may be a covalent bond from Cy to an atom of the ring of the arylene or heteroarylene group. Alternatively, the arylene or heteroarylene group within L may be indirectly covalently bound to Cy, i.e., there may be a further bivalent group between Cy and an atom of the ring of the arylene or heteroarylene group. The further bivalent group may be a hydrocarbylene group, for example an alkylene group or alkenylene group, or may be a bivalent group containing one or more heteroatoms.

In some embodiments, L is a bridging group containing a contiguous chain of atoms connecting P with Cy, wherein the adjacent carbon atoms of a phenylene group form part of the contiguous chain of atoms.

In some embodiments L is selected from:

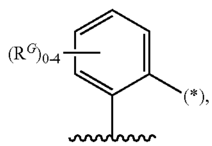

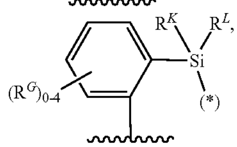

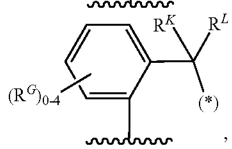

, and

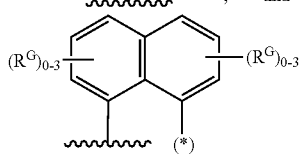

wherein ∿∿∿ indicates the point of attachment to P and (*) indicates the point of attachment to Cy; wherein each $R^G$ is independently selected from the group consisting of halogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent $R^G$ groups may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^K$ and $R^L$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^K$ and $R^L$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In embodiments each $R^G$ is independently selected from halogen and unsubstituted $C_{1-12}$ alkyl.

In some embodiments Reis absent (the phenylene group, or the naphthalene group is unsubstituted).

In embodiments $R^K$ and $R^L$ are each independently selected from hydrogen, unsubstituted $C_{1-12}$ alkyl group, and unsubstituted or substituted $C_{6-20}$ aryl group.

In embodiments $R^K$ and $R^L$ are each independently selected unsubstituted $C_{1-12}$ alkyl group, and unsubstituted or substituted $C_{6-20}$ aryl group.

In some embodiments $R^K$ and $R^L$ are each hydrogen.

In some embodiments L is of the formula:

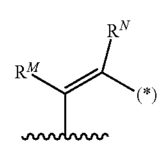

wherein $R^M$ and $R^N$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^M$ and $R^N$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and wherein ∿∿∿ indicates the point of attachment to P and (*) indicates the point of attachment to Cy.

In some embodiments, $R^M$ and $R^N$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^M$ and $R^N$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, the $R^M$ and $R^N$ groups are bonded to form a cyclic hydrocarbyl group.

In some embodiments, the $R^M$ and $R^N$ groups are bonded to form a phenylene group, the phenylene group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

In some embodiments, the $R^M$ and $R^N$ groups are bonded to form a phenylene group which is not further substituted.

In some embodiments L is of the formula:

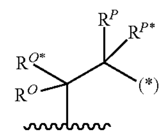

wherein $R^O$, $R^{O*}$, $R^P$ and $R^{P*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two groups among $R^O$, $R^{O*}$, $R^P$, $R^{P*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and wherein ~~~~ indicates the point of attachment to P and (*) indicates the point of attachment to Cy.

In some embodiments, $R^O$, $R^{O*}$, $R^P$ and $R^{P*}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^O$, $R^{O*}$, $R^P$ and $R^{P*}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, one $R^O$ group and one $R^P$ group are bonded to form a cyclic hydrocarbyl group.

In some embodiments, one $R^O$ group and one $R^P$ group are bonded to form a cyclohexyl group.

In some embodiments L is of the formula:

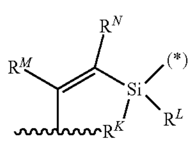

wherein $R^K$ and $R^L$ are each independently selected from hydrogen, unsubstituted $C_{1-12}$ alkyl group, and unsubstituted or substituted $C_{6-20}$ aryl group;

$R^M$ and $R^N$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^M$ and $R^N$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR, a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and wherein ~~~~ indicates the point of attachment to P and (*) indicates the point of attachment to Cy.

In some embodiments, $R^M$ and $R^N$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^M$ and $R^N$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, the $R^M$ and $R^N$ groups are bonded to form a cyclic hydrocarbyl group.

In some embodiments, the $R^M$ and $R^N$ groups are bonded to form a phenylene group, the phenylene group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

In some embodiments, the $R^M$ and $R^N$ groups are bonded to form a phenylene group which is not further substituted.

In some embodiments L is of the formula:

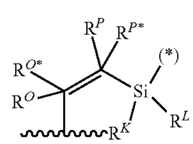

wherein $R^K$ and $R^L$ are each independently selected from hydrogen, unsubstituted $C_{1-12}$ alkyl group, and unsubstituted or substituted $C_{6-20}$ aryl group;

wherein $R^O$, $R^{O*}$, $R^P$ and $R^{P*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two groups among $R^O$, $R^{O*}$, $R^P$, $R^{P*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and wherein ∿∿∿ indicates the point of attachment to P and (*) indicates the point of attachment to Cy.

In some embodiments, $R^O$, $R^{O*}$, $R^P$ and $R^{P*}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^O$, $R^{O*}$, $R^P$ and $R^{P*}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, one $R^O$ group and one $R^P$ group are bonded to form a cyclic hydrocarbyl group.

In some embodiments, one $R^O$ group and one $R^P$ group are bonded to form a cyclohexyl group.

In some embodiments L is of the formula:

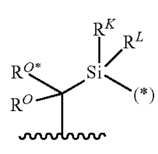

wherein $R^K$ and $R^L$ are each independently selected from hydrogen, unsubstituted $C_{1-12}$ alkyl group, and unsubstituted or substituted $C_{6-20}$ aryl group;

wherein $R^O$ and $R^{O*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two groups among $R^O$ and $R^{O*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and wherein ∿∿∿ indicates the point of attachment to P and (*) indicates the point of attachment to Cy.

In some embodiments, $R^O$ and $R^{O*}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^O$ and $R^{O*}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments L is of the formula:

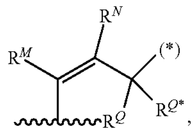

, or

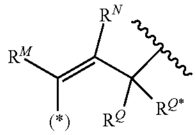

wherein $R^M$, $R^N$, $R^Q$, and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^M$ and $R^N$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein two groups among $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group;

wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group; and wherein ∿∿∿∿ indicates the point of attachment to P and (*) indicates the point of attachment to Cy.

In some embodiments, $R^M$ and $R^N$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^M$ and $R^N$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, the $R^M$ and $R^N$ groups are bonded to form a cyclic hydrocarbyl group.

In some embodiments, the $R^M$ and $R^N$ groups are bonded to form a phenylene group, the phenylene group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

In some embodiments, the $R^M$ and $R^N$ groups are bonded to form a phenylene group which is not further substituted.

In some embodiments, $R^Q$ and $R^{Q*}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^Q$ and $R^{Q*}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In embodiments, a silyl group has the formula —Si($R^a$)$_3$, wherein the $R^a$ groups are independently selected from a hydrogen atom, a $C_{1-8}$ alkyl or alkoxy group, a $C_{6-10}$ aryl group, and a $C_{6-10}$ aryloxy group.

In embodiments, a silyl group has the formula —Si($R^a$)$_3$, wherein the $R^a$ groups are independently selected from a $C_{1-8}$ alkyl or alkoxy group, a $C_{6-10}$ aryl group, and a $C_{6-10}$ aryloxy group.

In some embodiments of the disclosure, an oxy group has the formula —OR', wherein the R' group is selected from the group consisting of a hydrogen atom, a $C_{1-10}$ alkyl group, and a $C_{6-10}$ aryl group.

In some embodiments of the disclosure, an oxy group has the formula —OR', wherein the R' group is selected from the group consisting of a $C_{1-10}$ alkyl group, and a $C_{6-10}$ aryl group.

In some embodiments of the disclosure, an amido group has the formula —$NR'_2$, wherein the R' groups are independently selected from the group consisting of a hydrogen atom, a $C_{1-10}$ alkyl group, a $C_{6-10}$ aryl group.

In some embodiments of the disclosure, an amido group has the formula —$NR'_2$, wherein the R' groups are independently selected from the group consisting of a $C_{1-10}$ alkyl group, and a $C_{6-10}$ aryl group.

In some embodiments of the disclosure, a phosphido group has the formula —$PR'_2$, wherein the R' groups are independently selected from the group consisting of a hydrogen atom, a $C_{1-10}$ alkyl group, and a $C_{6-10}$ aryl group.

In some embodiments of the disclosure, a phosphido group has the formula —$PR'_2$, wherein the R' groups are independently selected from the group consisting of a $C_{1-10}$ alkyl group, and a $C_{6-10}$ aryl group.

In some embodiments of the disclosure, a thiolate group has the formula —SR', wherein the R' group is selected from the group consisting of a hydrogen atom, a $C_{1-10}$ alkyl group, and a $C_{6-10}$ aryl group.

In some embodiments of the disclosure, a thiolate group has the formula —SR', wherein the R' group is selected from the group consisting of a $C_{1-10}$ alkyl group, and a $C_{6-10}$ aryl group.

In embodiments of the disclosure, the pre-metallation compound of formula I-L, is a pre-metallation compound represented by formula I-L-H:

(I-L-H)

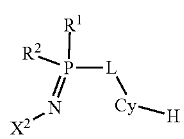

wherein $R^1$, $R^2$, L, Cy, and $X^2$ are as defined above for formula I-L.

In embodiments of the disclosure, the pre-metallation compound of formula I-L, is a pre-metallation compound represented by formula I-L-2H:

(I-L-2H)

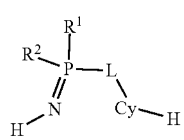

wherein $R^1$, $R^2$, L, and Cy are as defined above for formula I-L.

In embodiments of the disclosure, the pre-metallation compound of formula I-L, is a pre-metallation compound represented by formula II-L:

(II-L)

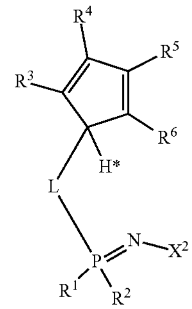

or double bond isomers of formula II-L which are available by migration of the hydrogen, H* within the cyclopentadienyl ring;

wherein $R^1$, $R^2$, L and $X^2$ are as defined above for formula I-L; and wherein $R^3$, $R^4$, $R^5$ and $R^6$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^3$, $R^4$, $R^5$ and $R^6$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^3$, $R^4$, $R^5$ and $R^6$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^3$, $R^4$, $R^5$ and $R^6$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^3$, $R^4$, $R^5$ and $R^6$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^3$, $R^4$, $R^5$ and $R^6$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^3$, $R^4$, $R^5$ and $R^6$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^3$, $R^4$, $R^5$ and $R^6$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^3$, $R^4$, $R^5$ and $R^6$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^3$, $R^4$, $R^5$ and $R^6$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^3$, $R^4$, $R^5$ and $R^6$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^3$, $R^4$, $R^5$ and $R^6$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^3$, $R^4$, $R^5$ and $R^6$ are each independently selected from the group consisting of hydrogen and a $C_{1-30}$ hydrocarbyl group, which hydrocarbyl group is unsubstituted or further substituted by one or more than one halogen atom.

In some embodiments, $R^3$, $R^4$, $R^5$ and $R^6$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^3$, $R^4$, $R^5$ and $R^6$ are each hydrogen.

In embodiments of the disclosure, the pre-metallation compound of formula II-L, is a pre-metallation compound represented by formula III-L:

(III-L)

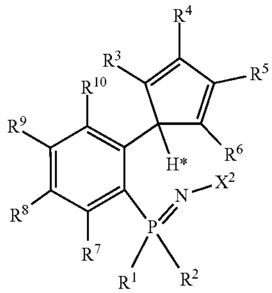

or double bond isomers of formula III-L which are available by migration of the hydrogen, H* within the cyclopentadienyl ring;

wherein $R^1$, $R^2$, $R^3$, $R^4$, $R^5$, $R^6$, and $X^2$ are as defined above for formulas I-L and II-L;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR',a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^7$, $R^8$, $R^9$ and $R^{10}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^7$, $R^8$, $R^9$ and $R^{10}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each independently selected from the group consisting of hydrogen and a Ci-so hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each hydrogen.

In embodiments of the disclosure, the pre-metallation compound of formula II-L, is a pre-metallation compound represented by formula IV-L:

(IV-L)

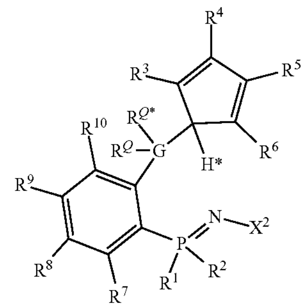

or double bond isomers of formula IV-L which are available by migration of the hydrogen, H* within the cyclopentadienyl ring;

wherein $R^1$, $R^2$, $R^3$, $R^4$, $R^5$, $R^6$, and $X^2$ are as defined above for formulas I-L and II-L;

wherein G is a group 14 element;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group, —PR'$_2$;

a thiolate group, —SR;

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments G is carbon, C, or silicon, Si, or germanium, Ge.

In some embodiments G is carbon, C, or silicon, Si.

In some embodiments G is carbon, C.

In some embodiments G is silicon, Si.

In some embodiments G is germanium, Ge.

In some embodiments, $R^Q$ and $R^{Q*}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^Q$ and $R^{Q*}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In embodiments, $R^Q$ and $R^{Q*}$ are each independently selected from the group consisting of hydrogen, a $C_{1-20}$ alkyl group and a $C_{6-20}$ aryl group.

In embodiments, $R^Q$ and $R^{Q*}$ are each independently a $C_{1-8}$ alkyl group.

In embodiments, $R^Q$ and $R^{Q*}$ are each independently a $C_{6-20}$ aryl group.

In embodiments, $R^Q$ is hydrogen and $R^{Q*}$ is a $C_{1-8}$ alkyl group.

In embodiments, $R^Q$ is hydrogen and $R^{Q*}$ is a $C_{6-20}$ aryl group.

In embodiments, $R^Q$ is hydrogen and $R^{Q*}$ is a methyl group.

In embodiments, $R^Q$ is hydrogen and $R^{Q*}$ is a phenyl group.

In embodiments, $R^Q$ and $R^{Q*}$ are each hydrogen.

In some embodiments, $R^7$, $R^8$, $R^9$ and $R^{10}$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^7$, $R^8$, $R^9$ and $R^{10}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^7$, $R^8$, $R^9$ and $R^{10}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each hydrogen.

In embodiments of the disclosure, the pre-metallation compound of formula I-L, is a pre-metallation compound represented by formula V-L:

(V-L)

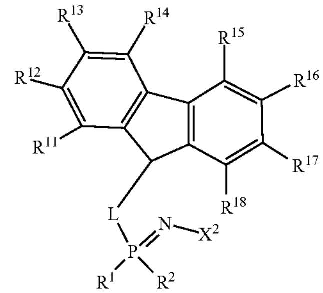

wherein $R^1$, $R^2$, L and $X^2$ are as defined above for formula I-L;

wherein $R^{11}$, $R^{12}$, $R^{13}$, $R^{14}$, $R^{15}$, $R^{16}$, $R^{17}$, $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^{11}$, $R^{12}$, $R^{13}$, $R^{14}$, $R^{15}$, $R^{16}$, $R^{17}$, $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{11}$, $R^{12}$, $R^{13}$, $R^{14}$, $R^{15}$, $R^{16}$, $R^{17}$, $R^{18}$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^{11}$, $R^{12}$, $R^{13}$, $R^{14}$, $R^{15}$, $R^{16}$, $R^{17}$, $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{11}$, $R^{12}$, $R^{13}$, $R^{14}$, $R^{15}$, $R^{16}$, $R^{17}$ and $R^{18}$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^{11}$, $R^{12}$, $R^{13}$, $R^{14}$, $R^{15}$, $R^{16}$, $R^{17}$ and $R^{18}$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{11}$, $R^{12}$, $R^{13}$, $R^{14}$, $R^{15}$, $R^{16}$, $R^{17}$ and $R^{18}$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^{11}$, $R^{12}$, $R^{13}$, $R^{14}$, $R^{15}$, $R^{16}$, $R^{17}$ and $R^{18}$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{11}$, $R^{12}$, $R^{13}$, $R^{14}$, $R^{15}$, $R^{16}$, $R^{17}$, $R^{18}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^{11}$, $R^{12}$, $R^{13}$, $R^{14}$, $R^{15}$, $R^{16}$, $R^{17}$, $R^{18}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^{11}$, $R^{12}$, $R^{13}$, $R^{14}$, $R^{15}$, $R^{16}$, $R^{17}$, $R^{18}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^{11}$, $R^{12}$, $R^{13}$, $R^{14}$, $R^{15}$, $R^{16}$, $R^{17}$, $R^{18}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^{11}$, $R^{12}$, $R^{13}$, $R^{14}$, $R^{15}$, $R^{16}$, $R^{17}$, $R^{18}$ are each independently selected from the group consisting of hydrogen and a $C_{1-30}$ hydrocarbyl group, which hydrocarbyl group is unsubstituted or further substituted by one or more than one halogen atom.

In some embodiments, $R^{11}$, $R^{12}$, $R^{13}$, $R^{14}$, $R^{15}$, $R^{16}$, $R^{17}$, $R^{18}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^{12}$ and $R^{17}$ are each independently an unsubstituted $C_{1-30}$ hydrocarbyl group.

In some embodiments, $R^{13}$ and $R^{16}$ are each independently an unsubstituted $C_{1-30}$ hydrocarbyl group.

In some embodiments, $R^{12}$ and $R^{17}$ are a $C_{1-20}$ alkyl group.

In some embodiments, $R^{13}$ and $R^{16}$ are a $C_{1-20}$ alkyl group.

In some embodiments, $R^{12}$ and $R^{17}$ are a $C_{6-20}$ aryl group.

In some embodiments, $R^{13}$ and $R^{16}$ are a $C_{6-20}$ aryl group.

In some embodiments, $R^{12}$ and $R^{17}$ are a tert-butyl group.

In some embodiments, $R^{13}$ and $R^{16}$ are a tert-butyl group.

In some embodiments, $R^{11}$, $R^{12}$, $R^{13}$, $R^{14}$, $R^{15}$, $R^{16}$, $R^{17}$ and $R^{18}$ are each hydrogen.

In some embodiments, $R^{11}$, $R^{13}$, $R^{14}$, $R^{15}$, $R^{16}$ and $R^{18}$ are each hydrogen.

In some embodiments, $R^{11}$, $R^{13}$, $R^{14}$, $R^{15}$, $R^{17}$ and $R^{18}$ are each hydrogen.

In some embodiments, $R^{11}$, $R^{13}$, $R^{14}$, $R^{15}$, $R^{16}$ and $R^{18}$ are each hydrogen, and $R^{12}$ and $R^{17}$ are each independently an unsubstituted $C_{1-30}$ hydrocarbyl group.

In some embodiments, $R^{11}$, $R^{13}$, $R^{14}$, $R^{15}$, $R^{16}$ and $R^{18}$ are each hydrogen, and $R^{12}$ and $R^{17}$ are each a tert-butyl group.

In some embodiments, $R^{11}$, $R^{13}$, $R^{14}$, $R^{15}$, $R^{17}$ and $R^{18}$ are each hydrogen, and $R^{13}$ and $R^{16}$ are each independently an unsubstituted $C_{1-30}$ hydrocarbyl group.

In some embodiments, $R^{11}$, $R^{13}$, $R^{14}$, $R^{15}$, $R^{17}$ and $R^{18}$ are each hydrogen, and $R^{13}$ and $R^{16}$ are each a tert-butyl group.

In embodiments of the disclosure, the pre-metallation compound of formula V-L, is a pre-metallation compound represented by formula VI-L:

(VI-L)

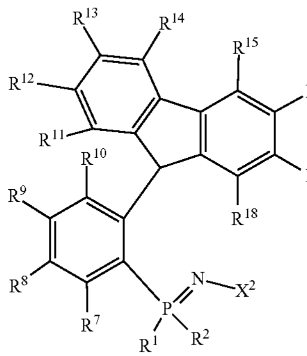

wherein $R^1$, $R^2$, $R^{11}$, $R^{12}$, $R^{13}$, $R^{14}$, $R^{15}$, $R^{16}$, $R^{17}$, $R^{18}$, and $X^2$ are as defined above for formulas I-L and V-L;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^7$, $R^8$, $R^9$ and $R^{10}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^7$, $R^8$, $R^9$ and $R^{10}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each hydrogen.

In some embodiments, $R^7$, $R^8$, $R^9$ and $R^{10}$ are each hydrogen; and $R^{11}$, $R^{12}$, $R^{13}$, $R^{14}$, $R^{15}$, $R^{16}$, $R^{17}$, $R^{18}$ are each independently selected from the group consisting of halogen, hydrogen, a $C_{1-30}$ alkyl group, and a $C_{6-30}$ aryl group.

In some embodiments, $R^7$, $R^8$, $R^9$ and $R^{10}$ are each hydrogen; $R^{11}$, $R^{13}$, $R^{14}$, $R^{15}$, $R^{16}$ and $R^{18}$ are each hydrogen, and $R^{12}$ and $R^{17}$ are each independently a $C_{1-20}$ alkyl group or a $C_{6-20}$ aryl group.

In some embodiments, $R^7$, $R^8$, $R^9$ and $R^{10}$ are each hydrogen; $R^{11}$, $R^{13}$, $R^{14}$, $R^{15}$, $R^{16}$ and $R^{18}$ are each hydrogen, and $R^{12}$ and $R^{17}$ are each a tert-butyl group.

In some embodiments, $R^7$, $R^8$, $R^9$ and $R^{10}$ are each hydrogen; $R^{11}$, $R^{12}$, $R^{14}$, $R^{15}$, $R^{17}$ and $R^{18}$ are each hydrogen, and $R^{13}$ and $R^{16}$ are each independently a $C_{1-20}$ alkyl group or a $C_{6-20}$ aryl group.

In some embodiments, $R^7$, $R^8$, $R^9$ and $R^{10}$ are each hydrogen; $R^{11}$, $R^{12}$, $R^{14}$, $R^{15}$, $R^{17}$ and $R^{18}$ are each hydrogen, and $R^{13}$ and $R^{16}$ are each a tert-butyl group.

In embodiments of the disclosure, the pre-metallation compound of formula V-L, is a pre-metallation compound represented by formula VII-L:

(VII-L)

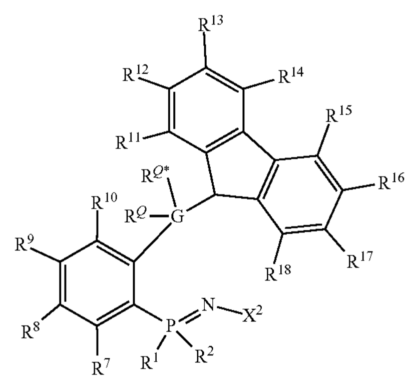

wherein $R^1$, $R^2$, $R^{11}$, $R^{12}$, $R^{13}$, $R^{14}$, $R^{15}$, $R^{16}$, $R^{17}$, $R^{18}$, and $X^2$ are as defined above for formulas I-L and V-L;

wherein G is a group 14 element;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR, a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments G is carbon, C, or silicon, Si, or germanium, Ge.

In some embodiments G is carbon, C, or silicon, Si.

In some embodiments G is carbon, C.

In some embodiments G is silicon, Si.

In some embodiments G is germanium, Ge.

In some embodiments, $R^Q$ and $R^{Q*}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^Q$ and $R^{Q*}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In embodiments, $R^Q$ and $R^{Q*}$ are each independently selected from the group consisting of hydrogen, a $C_{1-20}$ alkyl group and a $C_{6-20}$ aryl group.

In embodiments, $R^Q$ and $R^{Q*}$ are each independently a $C_{1-8}$ alkyl group.

In embodiments, $R^Q$ and $R^{Q*}$ are each independently a $C_{6-20}$ aryl group.

In embodiments, $R^Q$ is hydrogen and $R^{Q*}$ is a $C_{1-8}$ alkyl group.

In embodiments, $R^Q$ is hydrogen and $R^{Q*}$ is a $C_{6-20}$ aryl group.

In embodiments, $R^Q$ is hydrogen and $R^{Q*}$ is a methyl group.

In embodiments, $R^Q$ is hydrogen and $R^{Q*}$ is a phenyl group.

In embodiments, $R^Q$ and $R^{Q*}$ are each hydrogen.

In some embodiments, $R^7$, $R^8$, $R^9$ and $R^{10}$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —NR'$_2$, a phosphido group, —PR'$_2$, a thiolate group, —SR', a silyl group of the formula —Si($R^a$)$_3$, and a germanyl group of the formula —Ge($R^a$)$_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^7$, $R^8$, $R^9$ and $R^{10}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^7$, $R^8$, $R^9$ and $R^{10}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each hydrogen.

In some embodiments, $R^7$, $R^8$, $R^9$ and $R^{10}$ are each hydrogen; and $R^{11}$, $R^{12}$, $R^{13}$, $R^{14}$, $R^{15}$, $R^{16}$, $R^{17}$, $R^{18}$ are each independently selected from the group consisting of halogen, hydrogen, a $C_{1-30}$ alkyl group, and a $C_{6-30}$ aryl group.

In some embodiments, $R^7$, $R^8$, $R^9$ and $R^{10}$ are each hydrogen; $R^{11}$, $R^{13}$, $R^{14}$, $R^{15}$, $R^{16}$ and $R^{18}$ are each hydrogen, and $R^{12}$ and $R^{17}$ are each independently a $C_{1-20}$ alkyl group or a $C_{6-20}$ aryl group.

In some embodiments, $R^7$, $R^8$, $R^9$ and $R^{10}$ are each hydrogen; $R^{11}$, $R^{13}$, $R^{14}$, $R^{15}$, $R^{16}$ and $R^{18}$ are each hydrogen, and $R^{12}$ and $R^{17}$ are each a tert-butyl group.

In some embodiments, $R^7$, $R^8$, $R^9$ and $R^{10}$ are each hydrogen; $R^{11}$, $R^{13}$, $R^{14}$, $R^{15}$, $R^{17}$ and $R^{18}$ are each hydrogen, and $R^{13}$ and $R^{16}$ are each independently a $C_{1-20}$ alkyl group or a $C_{6-20}$ aryl group.

In some embodiments, $R^7$, $R^8$, $R^9$ and $R^{10}$ are each hydrogen; $R^{11}$, $R^{12}$, $R^{14}$, $R^{15}$, $R^{17}$ and $R^{18}$ are each hydrogen, and $R^{13}$ and $R^{16}$ are each a tert-butyl group.

In embodiments of the disclosure, the pre-metallation compound of formula I-L, is a pre-metallation compound represented by formula VIII-L:

(VIII-L)

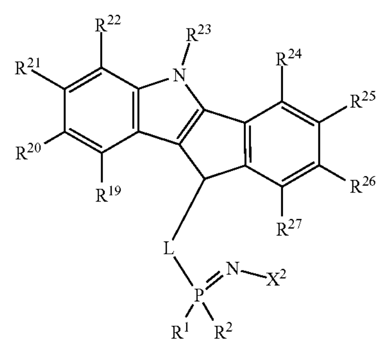

wherein $R^1$, $R^2$, L and $X^2$ are as defined above for formula I-L;

wherein $R^{23}$ is selected from the group consisting of hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein $R^{19}$, $R^{20}$, $R^{21}$, $R^{22}$, $R^{24}$, $R^{25}$, $R^{26}$, and $R^{27}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^{19}$, $R^{20}$, $R^{21}$, $R^{22}$, $R^{24}$, $R^{25}$, $R^{26}$, and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{23}$ is selected from the group consisting of a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group.

In some embodiments, $R^{23}$ is selected from the group consisting of a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group.

In some embodiments, $R^{19}$, $R^{20}$, $R^{21}$, $R^{22}$, $R^{24}$, $R^{25}$, $R^{26}$, and $R^{27}$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^{19}$, $R^{20}$, $R^{21}$, $R^{22}$, $R^{24}$, $R^{25}$, $R^{26}$, and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{19}$, $R^{20}$, $R^{21}$, $R^{22}$, $R^{24}$, $R^{25}$, $R^{26}$, and $R^{27}$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^{19}$, $R^{20}$, $R^{21}$, $R^{22}$, $R^{24}$, $R^{25}$, $R^{26}$, and $R^{27}$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{19}$, $R^{20}$, $R^{21}$, $R^{22}$, $R^{24}$, $R^{25}$, $R^{26}$, and $R^{27}$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^{19}$, $R^{20}$, $R^{21}$, $R^{22}$, $R^{24}$, $R^{25}$, $R^{26}$, and $R^{27}$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^{19}$, $R^{20}$, $R^{21}$, $R^{22}$, $R^{24}$, $R^{25}$, $R^{26}$, and $R^{2'}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^{19}$, $R^{20}$, $R^{21}$, $R^{22}$, $R^{24}$, $R^{25}$, $R^{26}$, and $R^{27}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^{19}$, $R^{20}$, $R^{21}$, $R^{22}$, $R^{24}$, $R^{25}$, $R^{26}$, and $R^{27}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^{19}$, $R^{20}$, $R^{21}$, $R^{22}$, $R^{24}$, $R^{25}$, $R^{26}$, and $R^{27}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^{19}$, $R^{20}$, $R^{21}$, $R^{22}$, $R^{24}$, $R^{25}$, $R^{26}$, and $R^{27}$ are each independently selected from the group consisting of hydrogen and a $C_{1-30}$ hydrocarbyl group, which hydrocarbyl group is unsubstituted or further substituted by one or more than one halogen atom.

In some embodiments, $R^{19}$, $R^{20}$, $R^{21}$, $R^{22}$, $R^{24}$, $R^{25}$, $R^{26}$, and $R^{27}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^{20}$ is an unsubstituted $C_{1-30}$ hydrocarbyl group.

In some embodiments, $R^{20}$ is a $C_{1-8}$ alkyl group.

In some embodiments, $R^{19}$, $R^{20}$, $R^{21}$, $R^{22}$, $R^{24}$, $R^{25}$, $R^{26}$, and $R^{27}$ are each hydrogen.

In some embodiments, $R^{20}$ is an unsubstituted $C_{1-30}$ hydrocarbyl group, and $R^{19}$, $R^{21}$, $R^{22}$, $R^{24}$, $R^{25}$, $R^{26}$, and $R^{27}$ are each hydrogen.

In some embodiments, $R^{20}$ is a $C_{1-8}$ alkyl group, and $R^{19}$, $R^{21}$, $R^{22}$, $R^{24}$, $R^{25}$, $R^{26}$, and $R^{2'}$ are each hydrogen.

In some embodiments, $R^{20}$ is a methyl group.

In some embodiments, $R^{20}$ is a phenyl group.

In some embodiments, $R^{23}$ is selected from the group consisting of hydrogen, a $C_{1-30}$ alkyl group, and a $C_{6-20}$ aryl group.

In some embodiments, $R^{23}$ is selected from the group consisting of a $C_{1-30}$ alkyl group, and a $C_{6-20}$ aryl group.

In some embodiments, $R^{23}$ is an unsubstituted $C_{1-30}$ hydrocarbyl group.

In some embodiments, $R^{23}$ is a $C_{1-8}$ alkyl group.

In some embodiments, $R^{23}$ is a methyl group.

In some embodiments, $R^{23}$ is a phenyl group.

In some embodiments, $R^{20}$ and $R^{23}$ are each independently an unsubstituted $C_{1-30}$ hydrocarbyl group, and $R^{19}$, $R^{21}$, $R^{22}$, $R^{24}$, $R^{25}$, $R^{26}$, and $R^{27}$ are each hydrogen.

In some embodiments, $R^{20}$ and $R^{23}$ are each independently a $C_{1-8}$ alkyl group, and $R^{19}$, $R^{21}$, $R^{22}$, $R^{24}$, $R^{25}$, $R^{26}$, and $R^{27}$ are each hydrogen.

In some embodiments, $R^{20}$ and $R^{23}$ are each a methyl group, and $R^{19}$, $R^{21}$, $R^{22}$, $R^{24}$, $R^{25}$, $R^{26}$, and $R^{27}$ are each hydrogen.

In embodiments of the disclosure, the pre-metallation compound of formula VIII-L, is a pre-metallation compound represented by formula IX-L:

(IX-L)

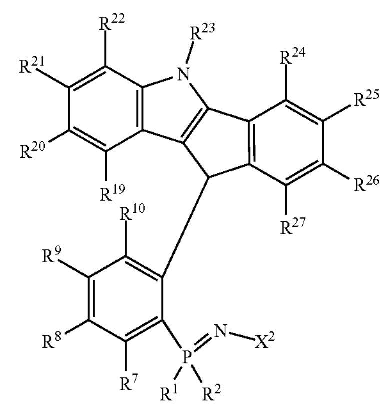

wherein $R^1$, $R^2$, $R^{19}$, $R^{20}$, $R^{21}$, $R^{22}$, $R^{23}$, $R^{24}$, $R^{25}$, $R^{26}$, $R^{27}$ and $X^2$ are as defined above for formulas I-L and VIII-L; and wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic hydrocarbyl group, the cyclic hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen; hydrogen; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; where two adjacent groups of $R^7$, $R^8$, $R^9$ and $R^{10}$ may optionally be bonded to form a cyclic heteroatom containing hydrocarbyl group, the cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group, —$NR'_2$, a phosphido group, —$PR'_2$, a thiolate group, —SR', a silyl group of the formula —$Si(R^a)_3$, and a germanyl group of the formula —$Ge(R^a)_3$; wherein each R' is independently selected from the group consisting of hydrogen, $C_{1-20}$ alkyl group, and $C_{6-20}$ aryl group and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

In some embodiments, $R^7$, $R^8$, $R^9$ and $R^{10}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^7$, $R^8$, $R^9$ and $R^{10}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^7$, $R^8$, $R^9$ and $R^{10}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each hydrogen.

The Metallation Reaction

An embodiment of the disclosure is a process to make an organometallic complex (a pre-polymerization catalyst), wherein the process comprises reacting a compound represented by the formula I-L-H:

(I-L-H)

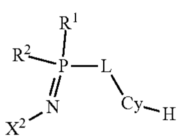

with a group 4 transition metal compound with the formula $MX^*_4$, wherein

M is Ti, Zr, or Hf, each X* is independently selected from the group consisting of halogen, hydrogen, an amido group of the formula —$NR^{\epsilon}_2$, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group; wherein each $R^{\epsilon}$ is independently selected from the group consisting of hydrogen, $C_{1-20}$ alkyl group, and $C_{6-20}$ aryl group;

$X^2$ is a silyl group of the formula —$Si(R^e)_3$, wherein each $R^e$ is independently selected from the group consisting of hydrogen, a $C_{1-8}$ alkyl group, $C_{1-8}$ alkoxy group, $C_{6-20}$ aryloxy group and a $C_{6-20}$ aryl group; and wherein $R^1$, $R^2$, L, and Cy are as defined above for formula I-L.

An embodiment of the disclosure is a process to make an organometallic complex (a pre-polymerization catalyst), wherein the process comprises reacting a compound represented by the formula I-L-2H:

(I-L-2H)

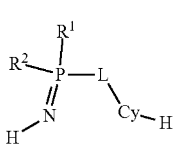

with a base followed by reaction with a group 4 transition metal compound with the formula $MX^*_4$, wherein M is Ti, Zr, or Hf, each X* is independently selected from the group consisting of halogen, hydrogen, an amido group of the formula —$NR^{\epsilon}_2$, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group; wherein each $R^{\epsilon}$ is independently selected from the group consisting of hydrogen, $C_{1-20}$ alkyl group, and $C_{6-20}$ aryl group; and wherein $R^1$, $R^2$, L, and Cy are as defined above for formula I-L.

In embodiments each X* is a halogen.

In embodiments each X* is chloride.

In embodiments, each $R^e$ is methyl.

In embodiments, M is Ti.

In embodiments, M is Hf.

In some embodiments, $MX^*_4$ is $TiCl_4$.

In some embodiment, $MX^*_4$ is $Ti(NMe_2)Cl_2$.

In some embodiments, $MX^*_4$ is $Ti(NMe_2)_4$.

In some embodiments each X* is independently selected from the group consisting of a halogen atom and an amido group having the formula —$NR^{\epsilon}2$, wherein the $R^{\epsilon}$ groups are independently selected from the group consisting of a hydrogen atom, a $C_{1-10}$ alkyl group and a $C_{6-10}$ aryl group.

In some embodiments each X* is independently selected from the group consisting of a chloride atom and amido group having the formula —$NR^{\epsilon}_2$, wherein the $R^{\epsilon}$ groups are independently selected from the group consisting of a hydrogen atom, a $C_{1-10}$ alkyl group and a $C_{6-10}$ aryl group.

In some embodiments each X* is independently selected from the group consisting of a chloride and a dimethyl amido group, —$NMe_2$.

In embodiments, each X* is a dimethyl amido group, —$NMe_2$.

In embodiments, $X^2$ is a trimethylsilyl group, —$SiMe_3$.

In embodiments of the disclosure, the base that may be used in the metallation reaction (for the production of the organometallic complex) include organic alkali metal compounds, such as for example, organolithium compounds such as methyl lithium, ethyl lithium, n-butyl lithium, sec-butyl lithium, tert-butyl lithium, lithium trimethylsilylacetylide, lithium acetylide, trimethylsilylmethyl lithium, vinyl lithium, phenyl lithium and allyl lithium.

In embodiments, the amount of the base used can be a range of 0.5 to 5 moles of base per 1 mole of the compound having formula I-L-2H. In further embodiments, the amount of the base used can be a range of 1.0 to 3.0 moles of base per 1 mole of the compound having formula I-L-2H, or can be a range of 1.5 to 2.5 moles of base per 1 mole of the compound having formula I-L-2H, or can be a range of 1.8 to 2.3 moles of base per 1 mole of the compound having formula I-L-2H, or about 2 moles of base per 1 mole of the compound having formula I-L-2H.

In some embodiments, the base may be used in combination with an amine compound. Such an amine compound includes primary amine compounds such as methylamine, ethylamine, n-propylamine, isopropylamine, n-butylamine, tert-butylamine, n-octylamine, n-decylamine, aniline and ethylenediamine, secondary amine compounds such as dimethylamine, diethylamine, di-n-propylamine, di-n-butylamine, di-tert-butylamine, di-n-octylamine, di-n-decylamine, pyrrolidine, hexamethyldisilazane and diphenylamine, and tertiary amine compounds such as trimethylamine, triethylamine, tri-n-propylamine, tri-n-butylamine, diisopropylethylamine, tri-n-octylamine, tri-n-decylamine, triphenylamine, N,N-dimethylaniline, N,N,N',N'-tetramethylethylenediamine, N-methylpyrrolidine and 4-dimethylaminopyridine.

The used amount of such an amine compound is in embodiments of the disclosure in a range of 10 moles or fewer, from 0.5 to 10 moles, or from 1 to 3 moles of amine compound per 1 mole of the base.

The metallation reaction is generally carried out in an inert solvent. In embodiments, such a solvent includes aprotic solvents, for example, aromatic hydrocarbon solvents such as benzene or toluene, aliphatic hydrocarbon solvents such as hexane or heptane, ether solvents such as diethyl ether, tetrahydrofuran or 1,4-dioxane, amide solvents such as hexamethylphosphoric amide or dimethylformamide, polar solvents such as acetonitrile, dichloromethane, 1,2-dichloroethane, propionitrile, acetone, diethyl ketone, methyl isobutyl ketone and cyclohexanone, and halogenated solvents such as chlorobenzene or dichlorobenzene. In embodiments, these solvents may be used alone or as a mixture of two or more of them.

The metallation reaction may be generally carried out by adding a compound having formula I-L-H and the group 4 transition metal compound having the formula $MX^*_4$ to a solvent, and various orders of compound addition are contemplated for use in various embodiments of the disclosure. In some embodiments, a compound having formula I-L-H and the group 4 transition metal compound having the formula $MX^*_4$ may be added simultaneously.

The metallation reaction may be generally carried out by adding a compound having formula I-L-2H and the base to the solvent and then adding the group 4 transition metal compound having the formula $MX^*_4$, although other orders of compound addition are contemplated for use in various embodiments of the disclosure. In some embodiments, a solid that may be precipitated after adding a compound having formula I-L-2H and the base to the solvent and may be removed from the reaction system and then added to the same solvent as described above and then the group 4 transition metal compound having the formula $MX^*_4$ may be added thereto. In some embodiments, a compound having formula I-L-2H, the base and the group 4 transition metal compound having the formula $MX^*_4$ may be added simultaneously.

In embodiments, the organometallic complex may be obtained from the reaction mixture thus obtained, using conventional methods, such as, filtrating off a produced precipitate or removing solvents under vacuum to give the organometallic complex as a product, which can be optionally washed with solvent.

Organometallic Complex Precursors

In some embodiments of the disclosure and without wishing to be bound by theory, organometallic complexes represented by formulas I through IX may be formed in situ from organometallic complexes represented by the formula I-M (shown below) in the presence of one or more than one reagent which facilitates the loss of $X^3$ as well as one activatable $X^1$ ligand so that the cyclopentadienyl-type moiety can coordinate to the metal centre, M as a cyclopentadienyl-type ligand, via η-bonding.

Reagents capable of facilitating the loss of $X^3$ are in some embodiments of the disclosure catalyst activators and co-catalysts as described below and include boron-based activators, alkylaluminoxane co-catalysts and organoaluminum compounds.

Accordingly, in further embodiments of the present disclosure a pre-polymerization catalyst is an organometallic complex represented by formula I-M:

(I-M)

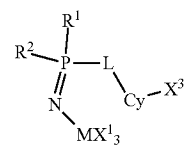

wherein M, $R^1$, $R^2$, L, and $X^1$ are as defined above for formula I; and Cy and $X^3$ are as defined above for formula I-L.

In embodiments of the disclosure, $X^3$ is hydrogen.

The Olefin Polymerization Catalyst System

In an olefin polymerization catalyst system, the organometallic complex (the pre-polymerization catalyst) is used in combination with a catalyst activator in order to form an active polymerization catalyst for olefin polymerization. Without wishing to be bound by theory, catalyst activators generate an active "cationic" metal center, by way of removing an activatable ligand from the metal center of a pre-polymerization catalyst (by for example, protonolysis, or by electrophilic abstraction).

A catalyst activator (also known as a "co-catalyst") used to activate the pre-polymerization catalyst can be any suitable catalyst activator (or co-catalyst) known to persons skilled in the art, including one or more activators selected from the group consisting of the so-called ionic activators, which includes boron-based activators; alkylaluminoxanes; and organoaluminum compounds.

A catalyst activator may optionally be used together with an alkylating agent, which are also well known in the art and includes alkylaluminoxane compounds, organoaluminum compounds and dialkyl zinc compounds.

Boron-based catalyst activators, also known as "ionic activators", are well known to persons skilled in the art. Alkylaluminoxanes which may also serve as catalyst activators or co-catalysts are likewise well known to persons skilled in the art.

Without wishing to be bound by theory, aluminum-based species such as alkylaluminoxanes, and organoaluminum compounds may act as catalyst activators per se, and/or as alkylating agents and/or as scavenging compounds (e.g., they react with species which adversely affect the polymerization activity of organometallic complex, and which may be present in a polymerization reactor).

In an embodiment of the disclosure, in addition to the organometallic complex (the pre-polymerization catalyst), an olefin polymerization catalyst system comprises at least one boron-based catalyst activator.

In an embodiment of the disclosure, in addition to the organometallic complex (the pre-polymerization catalyst), an olefin polymerization catalyst system comprises at least one boron-based catalyst activator, and at least one alkylaluminoxane co-catalyst.

In some embodiments of the disclosure, an olefin polymerization catalyst system may additionally include organoaluminum compounds as co-catalysts.

In some embodiments of the disclosure, an olefin polymerization catalyst system may additionally include hindered phenol compounds.

Without wishing to be bound by theory, the alkylaluminoxanes used in the present disclosure are complex aluminum compounds of the formula: $R_2Al^1O(RAl^1O)_mAl^1R_2$, wherein each R is independently selected from the group consisting of $C_{1-20}$ hydrocarbyl groups and m is from 3 to 50.

In an embodiment of the disclosure, R of the alkylaluminoxane, is a methyl group and m is from 10 to 40.

The alkylaluminoxanes are typically used in substantial molar excess compared to the amount of group 4 transition metal in the organometallic complex (e.g., the pre-polymerization catalyst). In embodiments, the $Al^1$:group 4 transition metal molar ratios may be from about 5:1 to about 10,000:1, or from about 10:1 to about 1000:1, or from about 30:1 to about 500:1.

A person skilled in the art will know that the amount of alkylaluminoxane used relative to the group 4 transition metal in the organometallic complex can be optimized in order to remove (or titrate out) impurities present in a polymerization process. In some embodiments, the $Al^1$: group 4 transition metal molar ratio is optimized to maximize the olefin polymerization catalyst system activity and may be in the range of from about 0.1:1 to greater than 100:1 or higher than 100:1.

In an embodiment of the disclosure, the alkylaluminoxane co-catalyst is methylaluminoxane (MAO).

In an embodiment of the disclosure, the alkylaluminoxane co-catalyst is modified methylaluminoxane (MMAO).

It is well known in the art, that alkylaluminoxanes can serve multiple roles as a catalyst alkylator, a catalyst activator, and a scavenger. Hence, an alkylaluminoxane activator is often used in combination with activatable ligands such as halogens.

The boron-based catalyst activator (which in some embodiments is also known as an "ionic activator") may be selected from the group consisting of: (i) compounds of the formula $[R^{34}]^+[B(R^{35})_4]^-$ wherein B is a boron atom, $R^{34}$ is a cyclic $C_{5-7}$ aromatic cation or a triphenyl methyl cation and each $R^{35}$ is independently selected from the group consisting of phenyl groups which are unsubstituted or substituted with from 3 to 5 substituents selected from the group consisting of a fluorine atom, a $C_{1-4}$ alkyl or alkoxy group which is unsubstituted or substituted by a fluorine atom; and a silyl group of the formula —Si—$(R^*)_3$; wherein each R* is independently selected from the group consisting of a hydrogen atom and a $C_{1-4}$ alkyl group; and (ii) compounds of the formula $[(R^{36})_tZH]^+[B(R^{35})_4]^-$ wherein B is a boron atom, H is a hydrogen atom, Z is a nitrogen atom or phosphorus atom, t is 2 or 3 and $R^{36}$ is selected from the group consisting of $C_{1-30}$ alkyl groups, a phenyl group which is unsubstituted or substituted by up to three $C_{1-4}$ alkyl groups, or one $R^{36}$ taken together with a nitrogen atom may form an anilinium group and $R^{35}$ is as defined above; and (iii) compounds of the formula $B(R^{35})_3$ wherein $R^{35}$ is as defined above, and adducts thereof, for example, hydrosilane-$B(C_6F_5)_3$.

In some embodiments, in the above compounds, preferably $R^{35}$ is a pentafluorophenyl group, and $R^{34}$ is a triphenylmethyl cation, Z is a nitrogen atom and $R^{36}$ is a $C_{1-4}$ alkyl group or one $R^{36}$ taken together with a nitrogen atom forms an anilinium group (e.g., $PhR^{36}{}_2NH^+$ which is substituted by two $R^{36}$ groups such as for example two $C_{1-4}$ alkyl groups).

Examples of boron-based catalyst activator compounds capable of ionizing a single site catalyst (e.g., the pre-polymerization catalyst) and which may be used in embodiments of the disclosure include the following: triethylammonium tetra(phenyl)boron, tripropylammonium tetra (phenyl)boron, tri(n-butyl)ammonium tetra(phenyl)boron, trimethylammonium tetra(p-tolyl)boron, trimethylammonium tetra(o-tolyl)boron, tributylammonium tetrakis(pentafluorophenyl)boron, tripropylammonium tetrakis(o,p-dimethylphenyl)boron, tributylammonium tetrakis(m,m-dimethylphenyl)boron, tributylammonium tetrakis(p-trifluoromethylphenyl)boron, tributylammonium tetrakis (pentafluorophenyl)boron, tri(n-butyl)ammonium tetra (o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetrakis(pentafluorophenyl)boron, dicyclohexylammonium tetra(phenyl)boron, triphenylphosphonium tetra(phenyl)boron, tri(methylphenyl)phosphonium tetra(phenyl)boron, tri (dimethylphenyl)phosphonium tetra(phenyl)boron, tropylium tetrakis(pentafluorophenyl) borate, triphenylmethylium tetrakispentafluorophenyl borate, benzene (diazonium) tetrakis(pentafluorophenyl) borate, tropylium phenyltris-(pentafluorophenyl) borate, triphenylmethylium phenyl-tris(pentafluorophenyl) borate, benzene (diazonium) phenyltris(pentafluorophenyl) borate, tropylium tetrakis (2,3,5,6-tetrafluorophenyl) borate, triphenylmethylium tetrakis(2,3,5,6-tetrafluorophenyl) borate, benzene (diazonium) tetrakis(3,4,5-trifluorophenyl) borate, tropylium tetrakis(3,4,5-trifluorophenyl) borate, benzene (diazonium) tetrakis(3,4,5-trifluorophenyl) borate, tropylium tetrakis(1,2,2-trifluoroethenyl) borate, triphenylmethylium tetrakis(1,2,2-trifluoroethenyl) borate, benzene (diazonium) tetrakis(1,2,2-trifluoroethenyl) borate, tropylium tetrakis(2,3,4,5-tetrafluorophenyl) borate, triphenylmethylium tetrakis (2,3,4,5-tetrafluorophenyl) borate, and benzene (diazonium) tetrakis(2,3,4,5-tetrafluorophenyl) borate.

Further specific examples of boron-based catalyst activator compounds capable of ionizing a single site catalyst (e.g., the pre-polymerization catalyst) and which may be used in embodiments of the present disclosure are disclosed in U.S. Pat. Nos. 5,919,983, 6,121,185, 10,730,964 and 11,041,031. The boron-based catalyst activator, [(hydrogenated tallow alkyl)$_2$(Me)NH][$B(C_6F_5)_4$] is also known as "bis(hydrogenated-tallowalkyl) methylammonium tetrakis(pentafluorophenyl)borate" and has the formula: $[(C_{18-22}H_{37-45})_2(Me)NH][B(C_6F_5)_4]$.

In embodiments of the disclosure, the boron-based catalyst activator comprises [(hydrogenated tallow alkyl)$_2$(Me)NH][$B(C_6F_5)_4$; and/or N,N-dimethylanilinium tetrakis(pentafluorophenyl) borate (["$Me_2NHPh][B(C_6F_5)_4]$"); and/or triphenylmethylium tetrakis(pentafluorophenyl) borate (["$Ph_3C][B(C_6F_5)_4]$"); and/or tris(pentafluorophenyl) boron.

In embodiments of the disclosure, the boron-based catalyst activator comprises [(hydrogenated tallow alkyl)$_2$(Me)NH][$B(C_6F_5)_4$; or N,N-dimethylanilinium tetrakis(pentafluorophenyl) borate (["$Me_2NHPh][B(C_6F_5)_4]$"), or triphenylmethylium tetrakis(pentafluorophenyl) borate (["$Ph_3C][B(C_6F_5)_4]$"), or tris(pentafluorophenyl) boron.

In embodiments of the disclosure, the boron-based catalyst activator comprises N,N-dimethylanilinium tetrakis (pentafluorophenyl) borate (["$Me_2NHPh][B(C_6F_5)_4]$"), and/or triphenylmethylium tetrakis(pentafluorophenyl) borate (["$Ph_3C][B(C_6F_5)_4]$"), and/or tris(pentafluorophenyl) boron.

In embodiment of the disclosure, the boron-based catalyst activator comprises N,N-dimethylanilinium tetrakis(pentafluorophenyl) borate (["$Me_2NHPh][B(C_6F_5)_4]$"), or triphenylmethylium tetrakis(pentafluorophenyl) borate (["$Ph_3C$][$B(C_6F_5)_4$]"), or tris(pentafluorophenyl) boron.

In an embodiment of the disclosure, the boron-based catalyst activator comprises an ionic activator selected from the group consisting of [(hydrogenated tallow alkyl)$_2$(Me)NH][$B(C_6F_5)_4$; N,N-dimethylanilinium tetrakis(pentafluorophenyl) borate (["$Me_2NHPh$][$B(C_6F_5)_4$]"), and triphenylmethylium tetrakis(pentafluorophenyl) borate (["$Ph_3C$][$B(C_6F_5)_4$]").

In an embodiment of the disclosure, the boron-based catalyst activator is N,N-dimethylanilinium tetrakis(pentafluorophenyl) borate (["$Me_2NHPh$][$B(C_6F_5)_4$]") In an embodiment of the disclosure, the boron-based catalyst activator is triphenylmethylium tetrakis(pentafluorophenyl) borate (["$Ph_3C$][$B(C_6F_5)_4$]") In an embodiment of the disclosure, the boron-based catalyst activator is [(hydrogenated tallow alkyl)$_2$(Me)NH][$B(C_6F_5)_4$.

In an embodiment of the disclosure, the boron-based catalyst activator is trihydrocarbylammonium tetrakis(pentafluorophenyl) borate ([$R^Z{}_3NH$][$B(C_6F_5)_4$], where each $R^Z$ is independently a $C_{1-40}$ branched alkyl group, a $C_{1-40}$ linear alkyl group, or a $C_{6-30}$ aryl group, wherein each of the branched alkyl group, the linear alkyl group, or the aryl group is unsubstituted or further substituted by one or more halogen, $C_{1-30}$ alkyl group, $C_{6-20}$ aryl group, $C_{6-20}$ aryloxide group, $C_{7-20}$ alkylaryloxy group, and/or $C_{7-20}$ arylalkyloxy group.

In embodiments, the boron-based catalyst activator may be used in amounts which provide a molar ratio of group 4 transition metal (e.g. titanium or hafnium in the pre-polymerization catalyst) to boron that will be from about 1:0.5 to about 1:10, or from about 1:1 to about 1:6.

Optionally, in embodiments of the disclosure, the olefin polymerization catalyst system may further include an organoaluminum compound defined by the formula:

$$Al(R^{37})_m(OR^{38})_n(X^{¥})_p$$

wherein $R^{37}$ and $R^{38}$ are each independently $C_1$ to $C_{20}$ hydrocarbyl groups; X is a halide; m+n+p=3; and m>1.

In an embodiment of the disclosure, the organoaluminum compound used is defined by the formula:

$$Al(R^{37})_x(OR^{38})_y$$

wherein x is from 1 to 3, x+y=3, $R^{37}$ is a $C_1$ to $C_{10}$ hydrocarbyl group, and $R^{38}$ is an alkyl or an aryl group.

In an embodiment of the disclosure, the organoaluminum compound used is defined by the formula:

$$Al(R^{37})_3$$

wherein $R^{37}$ is a $C_1$ to $C_{20}$ hydrocarbyl group.

In an embodiment of the disclosure, the organoaluminum compound used is defined by the formula:

$$Al(R^{37})_3$$

wherein $R^{37}$ is a $C_{6-20}$ aryl group, which aryl group is unsubstituted or substituted with one or more than one fluorine.

In particular embodiments, organoaluminum compounds include triethylaluminum, triisobutyl aluminum, tri-n-octylaluminum and diethyl aluminum ethoxide.

Optionally, in embodiments of the disclosure, the olefin polymerization catalyst system may further include a dialkyl zinc compound defined by the formula:

$$Zn(R^{39})_2$$

wherein each $R^{39}$ is independently a $C_1$ to $C_{20}$ alkyl group.

Optionally, in embodiments of the disclosure, the olefin polymerization catalyst system may further include a hindered phenol compound.

In embodiments of the present disclosure, a hindered phenol compound is used in combination with an organometallic complex (a pre-polymerization catalyst), and an alkylaluminoxane co-catalyst to provide an olefin polymerization catalyst system. In embodiments of the present disclosure, a hindered phenol compound is used in combination with an organometallic complex (a pre-polymerization catalyst), an alkylaluminoxane co-catalyst and an organoaluminum compound to provide an olefin polymerization catalyst system. In embodiments of the present disclosure, a hindered phenol compound is used in combination with an organometallic complex (a pre-polymerization catalyst), a boron-based catalyst activator and an alkylaluminoxane co-catalyst to provide an olefin polymerization catalyst system. In embodiments of the present disclosure, a hindered phenol compound is used in combination with an organometallic complex (a pre-polymerization catalyst), a boron-based catalyst activator, an alkylaluminoxane co-catalyst and an organoaluminum compound to provide an olefin polymerization catalyst system. In embodiments of the present disclosure, a hindered phenol compound is used in combination with an organometallic complex (a pre-polymerization catalyst), a boron-based catalyst activator, an alkylaluminoxane co-catalyst, an organoaluminum compound and a dialkyl zinc compound to provide an olefin polymerization catalyst system.

Generally, hindered phenol compounds (or "sterically hindered" phenol compounds) are phenols having one or more bulky substituent, such as a sterically bulky hydrocarbyl group, non-limited examples of which include a tert-butyl group and a 1-adamantyl group.

In embodiments of the disclosure, a hindered phenol compound, will have a sterically bulky hydrocarbyl group on at least one or both of the carbon atoms adjacent to the carbon atom bonded to a hydroxy group (e.g., a bulky hydrocarbyl group is located at one or both of the 2 and 6 locations of a hindered phenol moiety).

In embodiments of the disclosure, a hindered phenol compound, comprises a 2,6-dihydrocarbyl group substituted hindered phenol moiety.

In embodiments of the disclosure, a hindered phenol compound comprises a 2,6-dihydrocarbyl group substituted hindered phenol moiety, which moiety is further optionally substituted at one or more of the 3, 4 and 5 locations with a hydrocarbyl group or a heteroatom containing hydrocarbyl group.

Non-limiting examples of hindered phenol compounds which may be employed in embodiments of the present disclosure include butylated phenolic antioxidants, butylated hydroxytoluene; 2,6-di-tertiarybutyl-4-ethyl phenol ("BHEB"); 4,4'-methylenebis (2,6-di-tertiary-butylphenol); 1,3,5-trimethyl-2,4,6-tris (3,5-di-tert-butyl-4-hydroxybenzyl)benzene and octadecyl-3-(3',5'-di-tert-butyl-4'-hydroxyphenyl) propionate.

In embodiments, a hindered phenol compound is present in an amount which provides a molar ratio of aluminum from an alkylaluminoxane co-catalyst to the hindered phenol compound (i.e., the ratio of $Al^1$:hindered phenol compound) of from about 1:1 to about 10:1, or from about 2:1 to about 5:1.

Optionally, in embodiments, a hindered phenol compound is added to an alkylaluminoxane co-catalyst or added to an organoaluminum compound prior to contact of the alkylaluminoxane or the organoaluminum compound with one or more other components of the olefin polymerization catalyst system (e.g., the pre-polymerization catalyst).

An embodiment of the disclosure is an olefin polymerization catalyst system comprising: i) an organometallic complex (a pre-polymerization catalyst) as described as above; and ii) a catalyst activator.

An embodiment of the disclosure is an olefin polymerization catalyst system comprising: i) an organometallic complex (a pre-polymerization catalyst) as described as above; and ii) a catalyst activator selected from the group consisting of an alkylaluminoxane co-catalyst, an organoaluminum compound, a boron-based catalyst activator, and mixtures thereof.

An embodiment of the disclosure is an olefin polymerization catalyst system comprising: i) an organometallic complex (a pre-polymerization catalyst) as described as above; and ii) a catalyst activator which comprises a boron-based catalyst activator.

An embodiment of the disclosure is an olefin polymerization catalyst system comprising: i) an organometallic complex (a pre-polymerization catalyst) as described as above; and ii) a catalyst activator which comprises an alkylaluminoxane co-catalyst.

An embodiment of the disclosure is an olefin polymerization catalyst system comprising: i) an organometallic complex (a pre-polymerization catalyst) as described as above; and ii) a catalyst activator which comprises an organoaluminum compound.

An embodiment of the disclosure is an olefin polymerization catalyst system comprising: i) an organometallic complex (a pre-polymerization catalyst) as described as above; and ii) a catalyst activator which comprises a boron-based catalyst activator; and an alkylaluminoxane co-catalyst.

An embodiment of the disclosure is an olefin polymerization catalyst system comprising: i) an organometallic complex (a pre-polymerization catalyst) as described as above; and ii) a catalyst activator which comprises a boron-based catalyst activator; and an organoaluminum compound.

An embodiment of the disclosure is an olefin polymerization catalyst system comprising: i) an organometallic complex (a pre-polymerization catalyst) as described as above; and ii) a catalyst activator which comprises a boron-based catalyst activator, an alkylaluminoxane co-catalyst, and an organoaluminum compound.

An embodiment of the disclosure is an olefin polymerization catalyst system comprising: i) an organometallic complex (a pre-polymerization catalyst) as described as above; ii) a catalyst activator which comprises a boron-based catalyst activator; and iii) a dialkylzinc compound.

An embodiment of the disclosure is an olefin polymerization catalyst system comprising: i) an organometallic complex (a pre-polymerization catalyst) as described as above; ii) a catalyst activator which comprises a boron-based catalyst activator, and an alkylaluminoxane co-catalyst; and iii) a dialkylzinc compound.

An embodiment of the disclosure is an olefin polymerization catalyst system comprising: i) an organometallic complex (a pre-polymerization catalyst) as described as above; ii) a catalyst activator which comprises a boron-based catalyst activator, an alkylaluminoxane co-catalyst, and an organoaluminum compound; and iii) a dialkylzinc compound.

An embodiment of the disclosure is an olefin polymerization catalyst system comprising: i) an organometallic complex (a pre-polymerization catalyst) as described as above; ii) catalyst activator which comprises a boron-based catalyst activator, and an alkylaluminoxane co-catalyst; and iii) a hindered phenol compound.

An embodiment of the disclosure is an olefin polymerization catalyst system comprising: i) an organometallic complex (a pre-polymerization catalyst) as described as above; ii) a catalyst activator which comprises a boron-based catalyst activator, an alkylaluminoxane co-catalyst, and an organoaluminum compound; and iii) a hindered phenol compound.

An embodiment of the disclosure is an olefin polymerization catalyst system comprising: i) an organometallic complex (a pre-polymerization catalyst) as described as above; ii) a catalyst activator which comprises a boron-based catalyst activator, an alkylaluminoxane co-catalyst; iii) a dialkylzinc compound; and iv) a hindered phenol compound.

An embodiment of the disclosure is an olefin polymerization catalyst system comprising: i) an organometallic complex (a pre-polymerization catalyst) as described as above; ii) a catalyst activator which comprises a boron-based catalyst activator, an alkylaluminoxane co-catalyst, and an organoaluminum compound; iii) a dialkylzinc compound; and iv) a hindered phenol compound.

An embodiment of the disclosure is an olefin polymerization catalyst system comprising: i) an organometallic complex (a pre-polymerization catalyst) as described as above; ii) a catalyst activator which comprises an alkylaluminoxane co-catalyst; and iii) a hindered phenol compound.

An embodiment of the disclosure is an olefin polymerization catalyst system comprising: i) an organometallic complex (a pre-polymerization catalyst) as described as above; ii) a catalyst activator which comprises an alkylaluminoxane co-catalyst, and an organoaluminum compound; and iii) a hindered phenol compound.

The Polymerization Process

An embodiment of the disclosure is a polymerization process comprising polymerizing ethylene optionally with one or more than one alpha-olefin in the presence of an olefin polymerization catalyst system as described above.

An embodiment of the disclosure is a polymerization process comprising polymerizing ethylene optionally with one or more than one $C_3$-$C_{12}$ alpha-olefin in the presence of an olefin polymerization catalyst system as described above.

An alternative embodiment of the disclosure is a polymerization process comprising polymerizing one or more than one alpha-olefin, in the presence of an olefin polymerization catalyst system as described above.

An alternative embodiment of the disclosure is a polymerization process comprising polymerizing one or more than one $C_3$-$C_{12}$ alpha-olefin, such as for example propylene, in the presence of an olefin polymerization catalyst system as described above.

The olefin polymerization catalyst system of the present disclosure may be used in any conventional olefin polymerization process, such as gas phase polymerization, slurry phase polymerization or solution phase polymerization. In embodiments, the use of a "heterogenized" catalyst system is preferred for use in gas phase and slurry phase polymerization while a homogeneous catalyst is preferred for use in a solution phase polymerization. A heterogenized catalyst system may be formed by supporting the pre-polymerization catalyst, or the components of the olefin polymerization catalyst system, on a support, such as for example, a silica support. Silica support materials as well as suitable alternative support materials are well known to persons skilled in the art.

In an embodiment of the disclosure, the polymerization process comprises polymerizing ethylene optionally with one or more than one $C_3$-$C_{12}$ alpha-olefin.

In an embodiment of the disclosure, the polymerization process comprises polymerizing ethylene with one or more than one alpha-olefin selected from the group consisting of propylene, 1-butene, 1-pentene, 1-hexene, 1-octene, 1-decene and mixtures thereof.

In an embodiment of the disclosure, the polymerization process comprises polymerizing ethylene with one or more than one alpha-olefin selected from the group consisting of 1-butene, 1-hexene, 1-octene and mixtures thereof.

In an embodiment of the disclosure, the polymerization process comprises polymerizing ethylene with one or more than one alpha-olefin selected from the group consisting of 1-butene, 1-hexene, and 1-octene.

In an embodiment of the disclosure, the polymerization process comprises polymerizing ethylene with 1-octene.

When gas phase polymerization is employed, in various embodiments, the pressures employed may be in the range of from 1 to 1000 psi, or from 50 to 400 psi, or from 100 to 300 psi; while in various embodiments, the temperatures employed may be in the range of from 30° C. to 130° C., or from 65° C. to 110° C. Stirred bed or fluidized bed gas phase reactor systems may be used in embodiments of the disclosure for a gas phase polymerization process. Such gas phase processes are widely described in the literature (see for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228). One or more reactors may be used and may be configured in series with one another.

In general, a fluidized bed gas phase polymerization reactor employs a "bed" of polymer particles and catalyst particles (e.g., heterogenized olefin polymerization catalyst system particles or heterogenized olefin polymerization catalyst system component particles) which are fluidized by a flow of monomer (e.g. ethylene), comonomer (e.g. alpha-olefin) and other optional components which are at least partially gaseous. Heat is generated by the enthalpy of polymerization of the monomer (and comonomers) flowing through the bed. Un-reacted monomer, comonomer and other optional gaseous components exit the fluidized bed and are contacted with a cooling system to remove this heat. The cooled gas stream, including monomer, comonomer and optional other components (such as condensable liquids), is then re-circulated through the polymerization zone, together with "make-up" monomer (and comonomer) to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

Polymerization is generally conducted substantially in the absence of catalyst poisons. Compounds such as organoaluminum compounds may be employed as scavenging agents for poisons to increase the catalyst activity. Some specific non-limiting examples of scavenging agents are metal alkyls, including aluminum alkyls, such as triisobutylaluminum. Conventional adjuvants may be included in the process, provided they do not interfere with the operation of the polymerization catalyst in forming the desired polyolefin. For example, hydrogen or a metal or non-metal hydride (e.g., a silyl hydride) may be used as a chain transfer agent in the process. In embodiments, hydrogen may be used in amounts up to about 10 moles of hydrogen per mole of total monomer feed.

Detailed descriptions of slurry phase polymerization processes are widely reported in the patent literature. Also known as "particle form polymerization", a slurry phase polymerization process where the temperature is kept below the temperature at which the polymer goes into solution is described in U.S. Pat. No. 3,248,179. Slurry processes include those employing a loop reactor and those utilizing a single stirred reactor, or a plurality of loop and/or stirred reactors in series, parallel, and combinations thereof. Non-limiting examples of slurry phase polymerization processes include continuous loop or stirred tank processes. Further examples of slurry phase polymerization processes are described in for example U.S. Pat. No. 4,613,484.

Slurry polymerization processes are conducted in the presence of diluent, generally a hydrocarbon diluent such as an alkane (including isoalkanes), an aromatic, or a cycloalkane diluent. In embodiments, the diluent may also be the alpha-olefin comonomer used in a copolymerization with ethylene. Alkane diluents include propane, butanes, (i.e., normal butane and/or isobutane), pentanes, hexanes, heptanes, and octanes. The monomer and comonomers may be soluble in (or miscible with) the diluent, but the polymer is not (under polymerization conditions). In an embodiment, the polymerization temperature may be from about 5° C. to about 200° C. In further embodiments, the polymerization temperature is less than about 120° C., or from about 10° C. to about 110° C. The slurry phase polymerization reaction temperature is selected so that a polymer (e.g., an ethylene copolymer) is produced in the form of solid particles. The reaction pressure is influenced by the choice of diluent and reaction temperature. For example, in embodiments, the pressure may range from 15 to 45 atmospheres (about 220 to 660 psi or about 1500 to about 4600 kPa) when isobutane is used as diluent to approximately twice that, from 30 to 90 atmospheres (about 440 to 1300 psi or about 3000 to 9100 kPa) when propane is used (see, for example, U.S. Pat. No. 5,684,097). The pressure in a slurry phase polymerization process is generally kept high enough to keep at least part of the polymerizable monomer and comonomer(s) (e.g., ethylene and optionally one or more than one alpha-olefin) in the liquid phase.

In an embodiment, the slurry phase polymerization reaction takes place in a jacketed closed loop reactor having an internal stirrer (e.g., an impeller) and which further contains at least one settling leg. Olefin polymerization catalyst system components (suspended on an inert support, or not suspended), monomers/comonomers and diluents may be fed to the slurry phase polymerization reactor as liquids or suspensions as appropriate. The slurry circulates through the loop reactor and the jacket is used to control the temperature of the reactor. Through a series of let-down valves the slurry enters a settling leg and then is let down in pressure to flash the diluent and unreacted monomers/comonomers and to recover the product polymer, generally in a cyclone. The diluent and unreacted monomers/comonomers are recovered and recycled back to the reactor.

In an embodiment of the disclosure, the polymerization process is a solution phase polymerization process carried out in a solvent.

In an embodiment of the disclosure, the polymerization process is a continuous solution phase polymerization process carried out in a solvent.

Solution polymerization processes for the homopolymerization of ethylene or the copolymerization of ethylene with one or more than one alpha-olefin are well known in the art (see for example U.S. Pat. Nos. 6,372,864 and 6,777,509). These processes are in various embodiments conducted in the presence of an inert hydrocarbon solvent, typically, a $C_{5-12}$ hydrocarbon which may be unsubstituted or substituted by $C_{1-4}$ alkyl group such as pentane, methyl pentane, hexane, heptane, octane, cyclohexane, methylcyclohexane and hydrogenated naphtha. An example of a suitable solvent which is commercially available and which may be used in embodiments of the disclosure is "Isopar E" (a $C_{8-12}$ aliphatic solvent, from Exxon Chemical Co.).

The polymerization temperature in a conventional solution phase process may be from about 80° C. to about 300° C. In an embodiment of the disclosure the polymerization temperature in a solution phase polymerization process is from about 120° C. to about 250° C. In further embodiments, a solution phase polymerization process is carried out at a temperature of at least 140° C., or at least 160° C., or at least 170° C., or at least 180° C., or at least 190° C. In further embodiments, the polymerization temperature in a solution phase polymerization process may be from about 120° C. to about 330° C., or from about 130° C. to about 320° C., or from about 140° C. to about 320° C., or from about 150° C. to about 320° C., or from about 160° C. to about 320° C., or from about 140° C. to about 300° C., or from about 150° C. to about 300° C., or from about 160° C. to about 300° C., or from about 140° C. to about 280° C., or from about 150° C. to about 280° C. or from about 160° C. to about 280° C., or from about 140° C. to about 260° C., or from about 150° C. to about 260° C. or from about 160° C. to about 260° C., or from about 140° C. to about 240° C., or from about 150° C. to about 240° C., or from about 160° C. to about 240° C., or from about 140° C. to about 220° C., or from about 150° C. to about 220° C., or from about 160° C. to about 220° C.

The polymerization pressure in a solution phase polymerization process may be a "medium pressure process", meaning that the pressure in the reactor is less than about 6,000 psi (about 42,000 kiloPascals or kPa). In embodiments of the disclosure, the polymerization pressure in a solution phase polymerization process may be from about 10,000 to about 40,000 kPa, or from about 14,000 to about 22,000 kPa (i.e., from about 2,000 psi to about 3,000 psi).

Suitable comonomers for copolymerization with ethylene include $C_{3-20}$ alpha-olefins (including mono- and di-olefins). Some non-limiting examples of comonomers which may be copolymerized with ethylene in embodiments of the disclosure include $C_{3-12}$ alpha-olefins which are unsubstituted or substituted by up to two $C_{1-6}$ alkyl groups; $C_{8-12}$ vinyl aromatic monomers which are unsubstituted or substituted by up to two substituents selected from the group consisting of $C_{1-4}$ alkyl groups; and $C_{4-12}$ straight chained or cyclic diolefins which are unsubstituted or substituted by a $C_{1-4}$ alkyl group. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornenes, alkenyl-substituted norbornenes and the like (e.g., 5-methylene-2-norbornene, 5-ethylidene-2-norbornene, and bicyclo-(2,2,1)-hepta-2,5-diene).

In an embodiment of the disclosure, a solution phase polymerization process comprises polymerizing ethylene with one or more than one alpha-olefin selected from the group consisting of propylene, 1-butene, 1-pentene, 1-hexene, 1-octene, 1-decene and mixtures thereof.

In an embodiment of the disclosure, a solution phase polymerization process comprises polymerizing ethylene with one or more than one alpha-olefin selected from the group consisting of 1-butene, 1-hexene, 1-octene and mixtures thereof.

In an embodiment of the disclosure, a solution phase polymerization process comprises polymerizing ethylene with one or more than one alpha-olefin selected from the group consisting of 1-butene, 1-hexene, and 1-octene.

In an embodiment of the disclosure, a solution phase polymerization process comprises polymerizing ethylene with 1-octene.

In solution polymerization, the monomer and optional comonomer(s) are dissolved/dispersed in a solvent either prior to being fed to the reactor (or for gaseous monomers (or comonomers) the monomer (or comonomer) may be fed to a reactor so that it will dissolve in the polymerization reaction mixture). Prior to mixing, the solvent, monomer and optional comonomers are generally purified to remove potential catalyst poisons such as water, oxygen or metal impurities. The feedstock purification may employ standard well-known practices in the art, such as for example the use of molecular sieves, alumina beds and oxygen removal catalysts, all of which are known to be useful for the purification of polymerizable monomers. The solvent itself, as well, (e.g., methyl pentane, cyclohexane, hexane or toluene) may be treated in a similar manner to remove potential catalyst poisons.

The feedstock monomer, comonomers or other solution process components (e.g., solvent) may be heated or cooled prior to feeding to a solution phase polymerization reactor.

In embodiments of the disclosure, the olefin polymerization catalyst system components (e.g., an organometallic complex and a catalyst activator, and optionally a hindered phenol) may be premixed in the solvent used for the polymerization reaction or they may be fed as separate streams to a polymerization reactor. In some embodiments, premixing may be desirable to provide a reaction time for the olefin polymerization catalyst system components prior to entering a polymerization reaction zone (e.g., a polymerization reactor). Examples, of such an "in line mixing" technique are described in a number of patents, such as, for example, U.S. Pat. No. 5,589,555.

In an embodiment of the disclosure, a solution phase polymerization process is a continuous process. By the term "continuous process" it is meant that the polymerization process flows (e.g., solvent, ethylene, optional alpha-olefin comonomer, olefin polymerization catalyst system components, etc.) are continuously fed to a polymerization zone (e.g., a polymerization reactor) where a polymer (e.g., ethylene homopolymer or ethylene copolymer) is formed and from which the polymer is continuously removed via a process flow effluent steam.

In an embodiment of the disclosure, a solution phase polymerization process is carried out in at least one continuously stirred tank reactor (a "CSTR").

In an embodiment of the disclosure, a solution phase polymerization process is carried out in at least two polymerization reactors which are arranged in series or in parallel to one another.

In an embodiment of the disclosure, a solution phase polymerization process is carried out in at least three polymerization reactors which are arranged in series or in parallel to one another.

In an embodiment of the disclosure, a solution phase polymerization process is carried out in at least two sequentially arranged continuously stirred tank reactors (with the process flows being transferred from a first upstream CSTR to a second downstream CSTR).

In an embodiment of the disclosure, a solution phase polymerization process is carried out in at least two continuously stirred tank reactors which are arranged in parallel with one another (with the process flows being transferred from each of a first CSTR and a second CSTR and then combined).

In some embodiments, a continuous solution phase polymerization process comprises a first stirred tank polymerization reactor having a mean reactor temperature of from about 100° C. to about 140° C., and a second stirred tank polymerization reactor having a mean temperature of at least about 10° C., or at least about 20° C. greater than the mean reactor temperature of the first reactor.

In some embodiments, a continuous solution phase polymerization process comprises a first stirred tank polymerization reactor having a mean reactor temperature of from about 100° C. to about 160° C., and a second stirred tank polymerization reactor having a mean temperature of at least about 10° C., or at least about 20° C. greater than the mean reactor temperature of the first reactor.

In an embodiment of the disclosure, a solution phase polymerization process is carried out in at least one tubular reactor.

In an embodiment of the disclosure, a solution phase polymerization process is carried out in two continuously stirred tank reactors, arranged sequentially or in parallel, and a tubular reactor which receives process flows from the second continuously stirred tank reactor (sequential arrangement), or from the combination of the first and second continuously stirred tank reactors (parallel arrangement).

In an embodiment of the disclosure, a solution phase polymerization process is carried out in two sequentially arranged continuously stirred tank reactors, and a tubular reactor which receives process flows from the second continuously stirred tank reactor.

In a solution phase polymerization process generally, a reactor is operated under conditions which achieve a thorough mixing of the reactants and the residence time (or alternatively, the "hold up time") of the olefin polymerization catalyst (e.g., the activated single site catalyst complex) in a reactor will depend on the design and the capacity of the reactor.

In embodiments, the residence time of the olefin polymerization catalyst (e.g., the activated single site catalyst complex) in a given reactor will be from a few seconds to about 20 minutes. In further embodiments, the residence time of an olefin polymerization catalyst (e.g., the activated single site catalyst complex) in a given reactor will be less than about 10 minutes, or less than about 5 minutes, or less than about 3 minutes.

In embodiments of the disclosure, at least 60 weight percent (wt %) of the ethylene fed to a CSTR reactor is polymerized by an olefin polymerization catalyst system into an ethylene homopolymer or an ethylene copolymer. In further embodiments at least 70 wt %, or at least 80 wt %, or at least 85 wt %, or at least 90 wt %, or at least 95 wt %, of the ethylene fed to a CSTR reactor is polymerized by an olefin polymerization catalyst system into an ethylene homopolymer or an ethylene copolymer.

If more than one CSTR is employed, olefin polymerization catalyst system components can be added to each of the CSTR(s) in order to maintain a high polymer production rate in each reactor.

If more than one CSTR is employed, the olefin polymerization catalyst used in each CSTR may be based on the same type of polymerization catalyst or it made be based on different types of polymerization catalyst.

In an embodiment of the disclosure, the same type of olefin polymerization catalyst is used in each CSTR of two or more CSTR reactors.

In an embodiment, a mixed catalyst system is used in which one olefin polymerization catalyst is a single site catalyst (for example, the olefin polymerization catalyst system described according to the present disclosure) and one olefin polymerization catalyst is a Ziegler-Natta catalyst, where the single site catalyst is employed in a first CSTR and the Ziegler-Natta catalyst is employed in a second CSTR and where the reactors are arranged sequentially or in parallel.

The term "tubular reactor" is meant to convey its conventional meaning: namely a simple tube, which unlike a CSTR is generally not agitated using an impeller, stirrer or the like. In embodiments, a tubular reactor will have a length/diameter (L/D) ratio of at least 10/1. In embodiments, a tubular reactor is operated adiabatically. By way of a general non-limiting description and without wishing to be bound by theory, in a tubular reactor, as a polymerization reaction progresses, the monomer (e.g., ethylene) and/or comonomer (e.g., alpha-olefin) is increasingly consumed and the temperature of the solution increases along the length of the tube (which may improve the efficiency of separating the unreacted comonomer from the polymer solution). In embodiments, the temperature increase along the length of a tubular reactor may be greater than about 3° C. In embodiments, a tubular reactor is located downstream of a CSTR, and the discharge temperature from the tubular reactor may be at least about 3° C. greater than the discharge temperature from the CSTR (and from which process flows are fed to the tubular reactor).

In embodiments, a tubular reactor may have feed ports for the addition of additional polymerization catalyst system components such as single site pre-polymerization catalysts, Ziegler-Natta catalyst components, catalyst activators, cocatalysts, and hindered phenol compounds, or for the addition of monomer, comonomer, hydrogen, etc. In an alternative embodiment, no additional polymerization catalyst components are added to a tubular reactor.

In an embodiment, the total volume of a tubular reactor used in combination with at least one CSTR is at least about 10 volume percent (vol %) of the volume of at the least one CSTR, or from about 30 vol % to about 200 vol % of the at least one CSTR (for clarity, if the volume of the at least one CSTR is 1000 liters, then the volume of the tubular reactor is at least about 100 liters, or from about 300 to 2000 liters).

In embodiments, on leaving the reactor system, nonreactive components may be removed (and optionally recovered) and the resulting polymer (e.g., an ethylene copolymer or an ethylene homopolymer) may be finished in a conventional manner (e.g., using a devolatilization process). In an embodiment, a two-stage devolatilization process may be employed to recover a polymer composition from a polymerization process solvent. Suitable devolatilization processes which may be used in embodiments of the disclosure have been described in U.S. Pat. Nos. 9,963,529; 10,538,654 and 10,626,256.

Alternate Phosphine Oxidation Method

An embodiment of the disclosure is a method to oxidize a phosphine compound having an ortho substituted phenyl group.

An embodiment of the disclosure is a method to oxidize a phosphine compound having a substituted aryl group.

An embodiment of the disclosure is a method for making a compound represented by formula I-P-TMS:

(I-P-TMS)

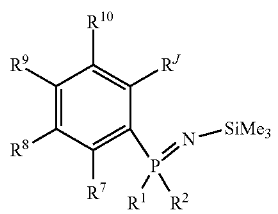

the method comprising:

combining a phosphine compound represented by formula I-P:

(I-P)

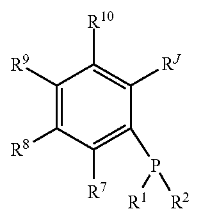

with hexachloroethane, $Cl_3C—CCl_3$; and hexamethyldisilazane, $[(CH_3)_3Si]_2NH$;

wherein $R^J$ is selected from the group consisting of a hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group, an amido group of the formula —NR'$_2$, a phosphido group of the formula —PR'$_2$, a thiolate group of the formula —SR', a silyl group of the formula —Si$(R^a)_3$, and a germanyl group of the formula —Ge$(R^a)_3$; and a heteroatom containing hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group an amido group of the formula —NR'$_2$, a phosphido group of the formula —PR'$_2$, a thiolate group of the formula —SR', a silyl group of the formula —Si$(R^a)_3$, and a germanyl group of the formula —Ge$(R^a)_3$;

wherein $R^1$ and $R^2$ are each independently selected from a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, SR';

a silyl group of the formula —Si$(R^a)_3$; and a germanyl group of the formula —Ge$(R^a)_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group —NR'$_2$, a phosphido group —PR'$_2$, a thiolate group —SR', a silyl group of the formula —Si$(R^a)_3$, and a germanyl group of the formula —Ge$(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

An embodiment of the disclosure is a method for making a compound represented by formula II-P-TMS:

(II-P-TMS)

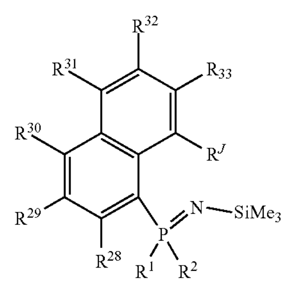

the method comprising combining a phosphine compound represented by formula II-P:

(II-P)

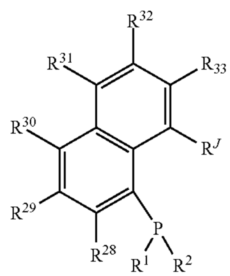

with hexachloroethane, $Cl_{3C}$'$CCl_3$; and hexamethyldisilazane, $[(CH_3)_3Si]_2NH$;

wherein $R^J$ is selected from the group consisting of a hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$; and a heteroatom containing hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein $R^1$ and $R^2$ are each independently selected from a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group;

wherein $R^{28}$, $R^{29}$, $R^{30}$, $R^{31}$, $R^{32}$ and $R^{33}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —$NR'_2$;

a phosphido group-$PR'_2$;

a thiolate group SR';

a silyl group of the formula —$Si(R^a)_3$; and a germanyl group of the formula —$Ge(R^a)_3$;

wherein two adjacent groups of $R^{28}$, $R^{29}$, $R^{30}$, $R^{31}$, $R^{32}$ and $R^{33}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group —$NR'_2$, a phosphido group —$PR'_2$, a thiolate group —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

An embodiment of the disclosure is a method for making a compound represented by formula I-P-TMS:

(I-P-TMS)

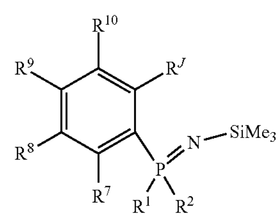

the method comprising:

a first reaction step (i), in which a phosphine compound represented by formula I-P:

(I-P)

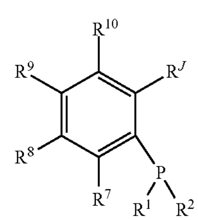

is combined with a source of chloride or bromide selected from the group consisting of $Cl_2$, $Br_2$, and hexachloroethane, $Cl_3C—CCl_3$; and a second reaction step (ii), in which hexamethyldisilazane, $[(CH_3)_3Si]_2NH$ is combined with a reaction product formed in the first reaction step;

wherein $R^J$ is selected from the group consisting of a hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$; and a heteroatom containing hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^1$ and $R^2$ are each independently selected from a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group, —PR'$_2$;

a thiolate group, SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group —NR'$_2$, a phosphido group —PR'$_2$, a thiolate group —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

An embodiment of the disclosure is a method for making a compound represented by formula II-P-TMS:

(II-P-TMS)

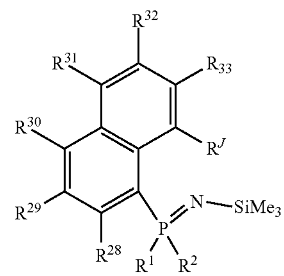

the method comprising:

a first reaction step (i), in which a phosphine compound represented by formula II-P:

(II-P)

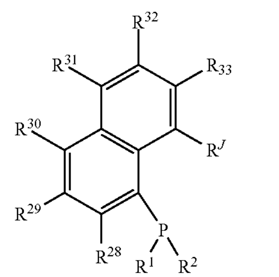

is combined with a source of chloride or bromide selected from the group consisting of $Cl_2$, $Br_2$, and hexachloroethane, $Cl_3C$—$CCl_3$; and a second reaction step (ii), in which hexamethyldisilazane, $[(CH_3)_3Si]_2NH$ is combined with a reaction product formed in the first reaction step;

wherein $R^J$ is selected from the group consisting of a hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$; and a heteroatom containing hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^1$ and $R^2$ are each independently selected from a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group;

wherein $R^{28}$, $R^{29}$, $R^{30}$, $R^{31}$, $R^{32}$ and $R^{33}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group-PR'$_2$;

a thiolate group SR';

a silyl group of the formula —Si($R^a$)$_3$; and a germanyl group of the formula —Ge($R^a$)$_3$;

wherein two adjacent groups of $R^{28}$, $R^{29}$, $R^{30}$, $R^{31}$, $R^{32}$ and $R^{33}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group —NR'$_2$, a phosphido group —PR'$_2$, a thiolate group —SR', a silyl group of the formula —Si($R^a$)$_3$, and a germanyl group of the formula —Ge ($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

An embodiment of the disclosure is a method for making a compound represented by formula I-P-TMS:

(I-P-TMS)

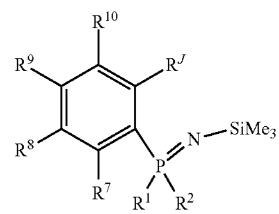

the method comprising:

a first reaction step (i), in which a phosphine compound represented by formula I-P:

(I-P)

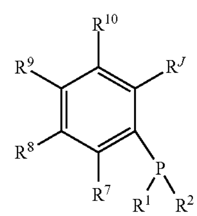

is combined with hexachloroethane, $Cl_3C—CCl_3$; and a second reaction step (ii), in which hexamethyldisilazane, $[(CH_3)_3Si]_2NH$ is combined with a reaction product formed in the first reaction step;

wherein $R^J$ is selected from the group consisting of a hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$; and a heteroatom containing hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^1$ and $R^2$ are each independently selected from a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group —PR'$_2$;

a thiolate group SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group —NR'$_2$, a phosphido group —PR'$_2$, a thiolate group —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

An embodiment of the disclosure is a method for making a compound represented by formula II-P-TMS:

(II-P-TMS)

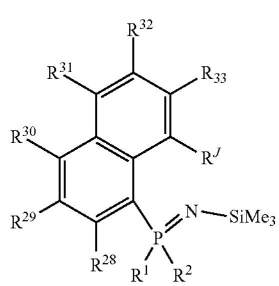

the method comprising:

a first reaction step (i), in which a phosphine compound represented by formula II-P:

(II-P)

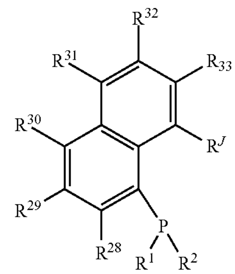

is combined with hexachloroethane, $Cl_3C$—$CCl_3$; and a second reaction step (ii), in which hexamethyldisilazane, $[(CH_3)_3Si]_2NH$ is combined with a reaction product formed in the first reaction step;

wherein $R^J$ is selected from the group consisting of a hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$; and a heteroatom containing hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^1$ and $R^2$ are each independently selected from a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group;

wherein $R^{28}$, $R^{29}$, $R^{30}$, $R^{31}$, $R^{32}$ and $R^{33}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group-PR'$_2$;

a thiolate group SR';

a silyl group of the formula —Si($R^a$)$_3$; and a germanyl group of the formula —Ge($R^a$)$_3$;

wherein two adjacent groups of $R^{eg}$, $R^{29}$, $R^{30}$, $R^{31}$, $R^{32}$ and $R^{33}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group —NR'$_2$, a phosphido group —PR'$_2$, a thiolate group —SR', a silyl group of the formula —Si($R^a$)$_3$, and a germanyl group of the formula —Ge ($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

In embodiments, the phosphine compound, I-P and the hexachloroethane, $Cl_3C$—$CCl_3$, are combined in a molar ratio of about 1:1.

In embodiments, the phosphine compound, II-P and the hexachloroethane, $Cl_3C$—$CCl_3$, are combined in a molar ratio of about 1:1.

In embodiments, a molar excess of the hexamethyldisilazane, $[(CH_3)_3Si]_2NH$ is combined with the reaction product formed in the first reaction step (i) when using the phosphine compound I-P.

In embodiments, a molar excess of the hexamethyldisilazane, $[(CH_3)_3Si]_2NH$ is combined with the reaction product formed in the first reaction step (i) when using the phosphine compound II-P.

In embodiments, a molar ratio of the hexamethyldisilazane, $[(CH_3)_3Si]_2NH$ to the phosphine compound I-P is greater than 1.0, or equal to or greater than 1.5, or equal to or greater than 2.0, or equal to or greater than 2.5, or equal to or greater than 3.0, or equal to or greater than 3.5, or equal to or greater then 4.0, or equal to or greater then 4.5, or equal to or greater than 5.0, or from about 1.5 to about 5.0, or from about 1.5 to about 4.5, or from about 1.5 to about 4.0, or from about 2.0 to about 4.0, or from about 2.5 to about 3.5.

In embodiments, a molar ratio of the hexamethyldisilazane, $[(CH_3)_3Si]_2NH$ to the phosphine compound II-P is greater than 1.0, or equal to or greater than 1.5, or equal to or greater than 2.0, or equal to or greater than 2.5, or equal to or greater than 3.0, or equal to or greater than 3.5, or equal to or greater then 4.0, or equal to or greater then 4.5, or equal to or greater than 5.0, or from about 1.5 to about 5.0, or from about 1.5 to about 4.5, or from about 1.5 to about 4.0, or from about 2.0 to about 4.0, or from about 2.5 to about 3.5.

In embodiments, a molar ratio of the hexamethyldisilazane, $[(CH_3)_3Si]_2NH$ to the reaction product formed in the first reaction step (i) when using the phosphine compound I-P is greater than 1.0, or equal to or greater than 1.5, or equal to or greater than 2.0, or equal to or greater than 2.5, or equal to or greater than 3.0, or equal to or greater than 3.5, or equal to or greater then 4.0, or equal to or greater then 4.5, or equal to or greater than 5.0, or from about 1.5 to about 5.0, or from about 1.5 to about 4.5, or from about 1.5 to about 4.0, or from about 2.0 to about 4.0, or from about 2.5 to about 3.5.

In embodiments, a molar ratio of the hexamethyldisilazane, $[(CH_3)_3Si]_2NH$ to the reaction product formed in the first reaction step (i) when using the phosphine compound II-P is greater than 1.0, or equal to or greater than 1.5, or equal to or greater than 2.0, or equal to or greater than 2.5, or equal to or greater than 3.0, or equal to or greater than 3.5, or equal to or greater then 4.0, or equal to or greater then 4.5, or equal to or greater than 5.0, or from about 1.5 to about 5.0, or from about 1.5 to about 4.5, or from about 1.5 to about 4.0, or from about 2.0 to about 4.0, or from about 2.5 to about 3.5.

In embodiments, the phosphine compound, (I-P), the hexachloroethane, $Cl_3C$—$CCl_3$; and the hexamethyldisilazane, $[(CH_3)_3Si]_2NH$ are combined in a polar solvent.

In embodiments, the phosphine compound, (II-P), the hexachloroethane, $Cl_3C$—$CCl_3$; and the hexamethyldisilazane, $[(CH_3)_3Si]_2NH$ are combined in a polar solvent. In embodiments, steps (i) and (ii) are each carried out in a polar reaction solvent.

In embodiments of the disclosure, a polar reaction solvent is selected from the group consisting of dichloromethane, 1,2-dichloroethane, diethyl acetate, pyridine, acetone, dimethylformamide, dimethyl sulfoxide, acetonitrile, tetrahydrofuran and mixtures thereof.

In embodiments of the disclosure, a polar reaction solvent is selected from the group consisting of dichloromethane, 1,2-dichloroethane, acetonitrile, tetrahydrofuran and mixtures thereof.

In embodiments of the disclosure, a polar reaction solvent is selected from the group consisting of dichloromethane, 1,2-dichloroethane and mixtures thereof.

In embodiments, the product of the first reaction step (i) is not isolated from the reaction solvent before carrying out the second reactor step (ii).

In embodiments, steps (i) and (ii) are both carried out in a single reaction vessel.

In embodiments, steps (i) and (ii) are both carried out in a single reaction vessel, and the product of the first reaction step (i) is not isolated from the reaction solvent before carrying out the second reactor step (ii).

In embodiments of the disclosure, the phosphine compound, (I-P), or the phosphine compound, (II-P); the hexachloroethane, $Cl_3C$—$CCl_3$; and the hexamethyldisilazane, $[(CH_3)_3Si]_2NH$ are combined at ambient temperature.

In embodiments, steps (i) and (ii) are each carried out at ambient temperature.

In embodiments, the compound represented by formula I-P-TMS or II-P-TMS may be obtained from the reaction mixture using conventional methods, such as, filtration, extraction, precipitation, crystallization, recrystallization, removing solvents under vacuum, washing with solvent or diluent, and the like, as well as combinations thereof.

In embodiments, a Bronsted base is added to a reaction product formed by the combination of the phosphine compound, (I-P), or the phosphine compound, (II-P); the hexachloroethane, $Cl_3C$—$CCl_3$; and the hexamethyldisilazane, $[(CH_3)_3Si]_2NH$, in order to give a compound represented by formula I-P-TMS or II-P-TMS.

In embodiments, a Bronsted base is added to a reaction product formed in the second reaction step (ii) in order to give a compound represented by formula I-P-TMS or II-P-TMS.

In some embodiments, the Bronsted base may be an amido salt compound. Such an amido salt compound includes for example $[((CH_3)_3Si)_2N]K$.

In some embodiments, the Bronsted base may be an amine compound. Such an amine compound includes primary amine compounds such as methylamine, ethylamine, n-propylamine, isopropylamine, n-butylamine, tert-butylamine, n-octylamine, n-decylamine, aniline and ethylenediamine, secondary amine compounds such as dimethylamine, diethylamine, di-n-propylamine, di-n-butylamine, di-tert-butylamine, di-n-octylamine, di-n-decylamine, pyrrolidine, hexamethyldisilazane and diphenylamine, and tertiary amine compounds such as trimethylamine, triethylamine, tri-n-propylamine, tri-n-butylamine, dii sopropylethylamine, tri-n-octylamine, tri-n-decylamine, triphenylamine, N,N-dimethylaniline, N,N,N',N'-tetramethylethylenediamine, N-methylpyrrolidine and 4-dimethylaminopyridine.

In embodiments, $R^1$ and $R^2$ are each independently an unsubstituted $C_{1-30}$ hydrocarbyl group.

In embodiments, $R^1$ and $R^2$ are independently selected from the group consisting of a primary alkyl group, a secondary alkyl group, a tertiary alkyl group, and an aryl group.

In embodiments, $R^1$ and $R^2$ are secondary alkyl groups.

In embodiments, $R^1$ and $R^2$ are tertiary alkyl groups.

In embodiments, $R^1$ and $R^2$ are each independently selected from the group consisting of isopropyl, cyclohexyl and tert-butyl.

In embodiments, $R^1$ and $R^2$ are each independently selected from the group consisting of isopropyl and cyclohexyl.

In some embodiments, $R^7$, $R^8$, $R^9$ and $R^{10}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^7$, $R^8$, $R^9$ and $R^{10}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^7$, $R^8$, $R^9$ and $R^{10}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ hydrocarbyl group, which hydrocarbyl group is unsubstituted or further substituted by one or more than one halogen atom.

In some embodiments, $R^7$, $R^8$, $R^9$ and $R^{10}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In embodiments, $R^7$, $R^8$, $R^9$ and $R^{10}$ are each hydrogen.

In some embodiments, $R^{eg}$, $R^{29}$, $R^{30}$, $R^{31}$, $R^{32}$ and $R^{33}$ are each independently selected from the group consisting of halogen, hydrogen, a $C_{1-30}$ alkyl group, a $C_{1-30}$ alkoxy group, a $C_{7-30}$ alkylaryl group, a $C_{7-30}$ arylalkyl group, a $C_{6-30}$ aryl group, a $C_{6-30}$ aryloxide group, a $C_{7-30}$ alkylaryloxy group, and a $C_{7-30}$ arylalkyloxy group.

In some embodiments, $R^7$, $R^8$, $R^9$ and $R^{10}$ are each independently selected from the group consisting of halogen, hydrogen, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group.

In some embodiments, $R^{28}$, $R^{29}$, $R^{30}$, $R^{31}$, $R^{32}$ and $R^{33}$ are each independently selected from the group consisting of halogen, hydrogen, and a $C_{1-30}$ hydrocarbyl group, which hydrocarbyl group is unsubstituted or further substituted by one or more than one halogen atom.

In some embodiments, $R^{28}$, $R^{29}$, $R^{30}$, $R^{31}$, $R^{32}$ and $R^{33}$ are each independently selected from the group consisting of halogen, hydrogen, and a $C_{1-30}$ heteroatom containing hydrocarbyl group, which heteroatom containing hydrocarbyl group is unsubstituted or further substituted by one or more than one halogen atom.

In some embodiments, $R^{28}$, $R^{29}$, $R^{30}$, $R^{31}$, $R^{32}$ and $R^{33}$ are each independently selected from the group consisting of hydrogen and a $C_{1-30}$ hydrocarbyl group, which hydrocarbyl group is unsubstituted or further substituted by one or more than one halogen atom.

In some embodiments, $R^{28}$, $R^{29}$, $R^{30}$, $R^{31}$, $R^{32}$ and $R^{33}$ are each independently selected from the group consisting of hydrogen and a $C_{1-30}$ heteroatom containing hydrocarbyl group, which heteroatom containing hydrocarbyl group is unsubstituted or further substituted by one or more than one halogen atom.

In embodiments, $R^{28}$, $R^{29}$, $R^{30}$, $R^{31}$, $R^{32}$ and $R^{33}$ are each hydrogen.

The following examples are presented for the purpose of illustrating selected embodiments of this disclosure; it being understood that the examples presented do not limit the claims presented.

EXAMPLES

General

General Experimental Methods

All reactions involving air- and/or moisture-sensitive compounds were conducted under nitrogen using standard Schlenk techniques or in an inert atmosphere glovebox; reaction solvents were purified using the system described by Pangborn et al. (Pangborn, A. B. G.; Grubbs, R. H.; Rosen, R. K.; Timmers, F. J. *Organometallics* 1996, 15, 1518) and then stored over activated molecular sieves in an inert atmosphere glovebox. Solvents for air- and moisture-stable reactions were purchased from VWR and used as received. Deuterated solvents were purchased from CIL and stored over activated 13× molecular sieves. Celite was purchased from Sigma-Aldrich, oven-dried, and stored in the glovebox for use with moisture-sensitive chemistry. Cesium fluoride (CsF) was purchased from Sigma-Aldrich and was dried at 150° C. under vacuum prior to use. Tetrakis(dimethylamido)titanium(IV) ($Ti(NMe_2)_4$) was purchased from Strem Chemicals and used as received. MMAO-7 (7 wt % solution in Isopar-E), diethylaluminum ethoxide (DEAL-E; 25 wt % in heptane), triethylaluminum (TEAL; 25 wt % in heptane), and triisobutylaluminum (TIBAL; 25 wt % solution in hexanes) were purchased from Nouryon and used as received. Triphenylcarbenium tetrakis (pentafluorophenyl)borate, $(Ph_3C)[B(C_6F_5)_4]$, abbreviated TB herein, was purchased from Albemarle Corp. and used as received. Di(hydrogenated tallow)methylammonium ('Armeenium') tetrakis(pentafluorophenyl)borate (11.0 wt % in methylcyclohexane), abbreviated AB herein, was purchased from Boulder Scientific. All other reagents were purchased from Sigma-Aldrich and used as received.

$Ti(NMe_2)_2Cl_2$ was prepared following the procedure in Wang, C.; Erker, G.; Kehr, G.; Wedeking, K.; Fröhlich, R. *Organometallics* 2005, 24, 4760.

PPh(i-Pr)$_2$ was prepared following the procedure in Bontemps, S.; Sircoglou, M.; Bouhadir, G; Puschmann, H.; Howard, J. A. K.; Dyer, P. W.; Miqueu, K.; Bourissou, D. *Chemistry'A European Journal* 2008, 14(2), 731.

2-Indenyl boronic acid was prepared following the procedure in Ijpeij, E. G.; Beijer, F. H.; Arts, H. J.; Newton, C.; de Vries, J. G.; Gruter, G. M. *J. Org. Chem.* 2002, 67, 169.

2-Bromophenyl-diisopropylphosphine was prepared following the procedure in DeMott, J.; Gu, W.; McCulloch, B. J.; Herbert, D. E.; Goshert, M. D.; Walensky, J. R.; Zhou, J.; Ozerov, O. V. *Organometallics* 2015, 34, 16, 3930.

Indenyllithium was prepared following the procedure in Ker, V.; Lam, P.; Jiang, Y.; Hoang, P.; Carter, C.; Morrison, D. US20140100343 A1, 2014.

Tri-tert-butylphosphinimine titanium trichloride (t-$Bu_3PNTiCl_3$) was prepared following the procedure in Gao, X.; He, Zhiwei. CA2820501 A1, 2014.

NMR spectra were recorded on a Bruker 400 MHz spectrometer (400.1 MHz for $^1H$, 162 MHz for $^{31}P$). Single crystal X-ray diffraction was performed on a Bruker PLATFORM/APEX II CCD diffractometer. Additional experimental details regarding X-ray diffraction studies are compiled in Tables 1 through 4.

Molecular weight (GPC-RI $M_w$, $M_n$ and $M_z$ in g/mol) and molecular weight distribution (GPC-RI $M_w/M_n$) data for continuous solution copolymerization experiments were obtained using conventional size exclusion (gel permeation) chromatography (SEC, or GPC). Accordingly, polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect SEC columns from oxidative degradation. The sample injection volume was 200 μL. The SEC raw data were processed with the Cirrus GPC software. The SEC columns were calibrated with narrow distribution polystyrene standards. The polystyrene molecular weights were converted to polyethylene molecular weights using the Mark-Houwink equation, as described in the ASTM standard test method D6474.

In some cases, weight average molecular weights (GPC-IR4 $M_w$) are provided for copolymers produced in continuous solution copolymerization experiments using a different GPC instrument. Those were analyzed using a Polymer Char GPC-IR4 instrument equipped with three GPC columns to rapidly determine polymer $M_w$. Accordingly, a polymer sample (5 to 7 mg) was weighed into the sample vial and loaded onto the auto-sampler. The vial was filled with 6 ml 1,2,4-trichlorobenzene (TCB), heated to 160° C. with shaking for 160 minutes. 2,6-Di-tert-butyl-4-methylphenol (BHT) was added to the TCB in a concentration of 250 ppm to stabilize the polymer against oxidative degradation. Sample solutions were chromatographed at 140° C. on the Polymer Char GPC-IR4 chromatography unit equipped with three GPC columns (e.g., PL Mixed B) using TCB as the mobile phase with a flow rate of 1.0 mL/minute, with an Infrared IR4 as the concentration detector. BHT was added to the mobile phase at a concentration of 250 ppm to protect SEC columns from oxidative degradation. The sample injection volume was 200 μL. The SEC raw data were processed using a Microsoft Excel macro. The SEC columns were calibrated with narrow distribution polystyrene standards. The polystyrene molecular weights were converted to polyethylene molecular weights using the Mark-Houwink equation, as described in the ASTM standard test method D6474.

FTIR branch frequencies (reported as $CH_3$/1000 C) were determined from a polymer plaque on a Thermo-Nicolet 750 Magna-IR Spectrophotometer using the method as described in the ASTM standard test method D6645. The polymer plaque is prepared using a compression molding device (Wabash-Genesis Series press) based on ASTM standard test method D1928 (currently replaced with D4703).

Synthetic Methods and Crystallographic Experimental Data

Compound 1a

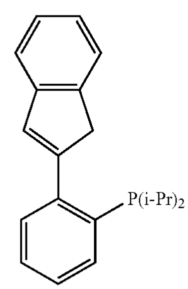

2-Indenylboronic acid (4 g, 14.64 mmol), 2-bromophenyl-diisopropylphosphine (2.6 g, 16.25 mmol), $Pd(PPh_3)_4$ (0.85 g, 0.74 mmol), $Cs_2CO_3$ (9.5 g, 29.16 mmol), and 1,4-dioxane (200 mL) were combined and heated at 100° C. for 3 days. The volatiles were removed under vacuum and the residue was extracted with heptane (3×80 mL) and filtered through a pad of Celite. Volatiles were removed under vacuum and the resulting yellow liquid was purified via distillation through a Kugelrohr distillation apparatus. Yield: 3.2 g, 71%. $^1H$ NMR ($CD_2Cl_2$): δ 7.57 (m, 1H), 7.46 (m, 1H), 7.39 (dt, J=7.5 and 0.8 Hz, 1H), 7.35 (m, 3H), 7.27 (m, 1H), 7.17 (dt, J=7.4 and 1.2 Hz, 1H), 6.81 (dt, J=0.7 and 0.7 Hz, 1H), 3.91 (s, 2H), 2.08 (m, 2H), 1.07 (dd, J=7.8 and 7.0 Hz, 6H), 0.91 (q, J=6.9 and 5.0

Compound 1b

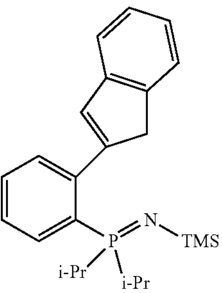

To a toluene solution (10 mL) of Compound 1a (2.5 g, 8.11 mmol) was added azidotrimethylsilane (2.63 g, 22.81 mmol). The mixture was heated at 100° C. over 3 days. Volatiles were removed under vacuum and the resulting dark green oil was used without further purification. $^1$H NMR ($CD_2Cl_2$): δ 8.06 (m, 1H), 7.48 (d, J=8.0 Hz, 1H), 7.42 (m, 3H), 7.30 (t, J=7.4 Hz, 1H), 7.21 (m, 2H), 6.70 (br. s, 1H), 3.74 (s, 2H), 1.94 (m, 2H), 1.12 (dd, J=8.8 and 6.8 Hz, 6H), 0.87 (dd, J=9.2 and 7.1 Hz, 6H), 0.02 (s, 9H). $^{31}$P{$^1$H} NMR ($CD_2Cl_2$): δ 23.6.

Compound 1c

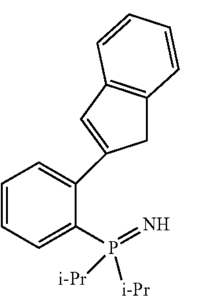

Compound 1b (6.8 g, 17.19 mmol), CsF (2.87 g, 18.89 mmol), MeOH (5 mL), and THE (60 mL) were mixed and heated at 60° C. overnight. The volatiles were removed under vacuum and the residue was extracted with toluene (3×50 mL) and filtered through a pad of Celite. Volatiles were removed under vacuum and the resulting dark red oil was used without further purification. NMR spectroscopic data corresponding to the major (desired) product is listed. $^1$H NMR ($CD_2Cl_2$): δ 7.76 (m, 1H), 7.65 (m, 2H), 7.56 (m, 1H), 7.45 (m, 4H), 7.25 (m, 3H), 3.91 (s, 2H), 2.14 (m, 2H), 1.16 (m, 6H), 0.95 (m, 6H). $^{31}$P{$^1$H} NMR ($CD_2Cl_2$): δ 43.04.

Complex 1

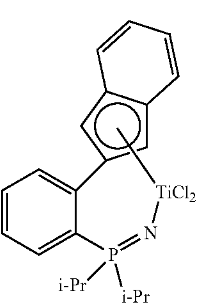

To a THE solution (50 mL) of crude Compound 1c (as obtained above, 3.13 g, 9.68 mmol) was added a solution of n-BuLi (6 mL, 9.6 mmol, 1.6 M in hexane). The reaction was stirred at ambient temperature over 2 hours and the obtained solution was slowly added into a THE solution (50 mL) of $Ti(NMe_2)_2Cl_2$ (2.0 g, 9.67 mmol) dropwise at −78° C. After the reaction was warmed to ambient temperature and stirred overnight, all volatiles were removed under vacuum. The residue was extracted with toluene (3×50 mL) and filtered through a pad of Celite. To the combined filtrate was added chlorotrimethylsilane (4.2 g, 38.66 mmol). The obtained mixture was heated at 90° C. overnight. The solution was concentrated under vacuum and the residue was recrystallized from toluene (20 mL) to give a dark green solid. Yield: 1.8 g, 43%. $^1$H NMR ($CD_2Cl_2$): δ 7.66 (m, 1H), 7.62 (m, 3H), 7.58 (m, 1H), 7.51 (m, 1H), 7.32 (m, 2H), 6.35 (s, 2H), 2.33 (m, 2H), 1.25 (dd, J=9.9 and 7.0 Hz, 6H), 1.16 (dd, J=10.0 and 7.2, 6H). $^{31}$P{$^1$H} NMR ($CD_2Cl_2$): δ 32.9.

The coordination sphere of Complex 1 was confirmed by single crystal X-ray crystallography (see details in Table 1). The ORTEP diagram for Complex 1 is provided in FIG. 1.

TABLE 1

Crystallographic Experimental Details for Complex 1

| | |
|---|---|
| **A. Crystal Data** | |
| formula | $C_{21}H_{24}Cl_2NPTi$ |
| formula weight | 440.18 |
| crystal colour and habit [a] | green block |
| crystal dimensions (mm) | 0.52 × 0.16 × 0.11 |
| crystal system | monoclinic |
| space group | $P2_1/c$ (No. 14) |
| unit cell parameters [b] | |
| a (Å) | 11.4405(11) |
| b (Å) | 11.4763(11) |
| c (Å) | 16.1858(16) |
| β (deg) | 96.7161(15) |
| V (Å3) | 2110.5(4) |
| Z | 4 |
| ρcalcd (g cm$^{-3}$) | 1.385 |
| μ (mm$^{-1}$) | 0.740 |
| **B. Data Collection and Refinement Conditions** | |
| diffractometer | Bruker PLATFORM/APEX II CCD [c] |
| radiation (λ [Å]) | graphite-monochromated Mo Kα (0.71073) |
| temperature (° C.) | −80 |
| scan type | ω scans (0.3°) (20 s exposures) |
| data collection 2θ limit (deg) | 58.36 |
| total data collected | 32944 ($-15 \le h \le 15$, $-15 \le k \le 15$, $-22 \le l \le 22$) |
| independent reflections | 5712 ($R_{int}$ = 0.0281) |
| number of observed reflections (NO) | 4962 [$F_o^2 \ge 2\sigma(F_o^2)$] |
| structure solution method | intrinsic phasing (SHELXT-2014 [d]) |
| refinement method | full-matrix least-squares on $F^2$ (SHELXL-2018 [e]) |
| absorption correction method | Gaussian integration (face-indexed) |
| range of transmission factors | 0.9502-0.7227 |
| data/restraints/parameters | 5712/0/235 |
| goodness-of-fit (S)[f] [all data] | 1.058 |
| final R indices [g] | |

TABLE 1-continued

| Crystallographic Experimental Details for Complex 1 | |
|---|---|
| $R_1$ [$F_o^2 \geq 2\sigma(F_o^2)$] | 0.0334 |
| $wR_2$ [all data] | 0.0926 |
| largest difference peak and hole | 0.570 and −0.523 e $Å^{-3}$ |

Notes for TABLE 1:

[a] Obtained by recrystallization from a toluene/heptane/pentane/dichloromethane solution.

[b] Obtained from least-squares refinement of 9962 reflections with 5.04 ° < 2q < 58.24°.

[c] Programs for diffractometer operation, data collection, data reduction and absorption correction were those supplied by Bruker.

[d] Sheldrick, G. M. *Acta Crystallogr*. 2015, A71, 3-8. (SHELXT-2014)

[e] Sheldrick, G. M. *Acta Crystallogr*. 2015, C71, 3-8. (SHELXL-2018/3)

[f] $S = [\Sigma w(F_o^2 - F_c^2)2/(n - p)]^{1/2}$ (n = number of data; p = number of parameters varied; $w = [s^2(F_o^2) + (0.0446P)^2 + 0.9554P]^{-1}$ where $P = [Max(F_o^2, 0) + 2F_c^2]/3$).

[g] $R_1 = \Sigma||F_o| - [Fc||/\Sigma|F_o]$; $wR_2 = [\Sigma w(F_o^2 - F_c^2)^2/\Sigma w(F_o^4)]^{1/2}$.

Compound 2a

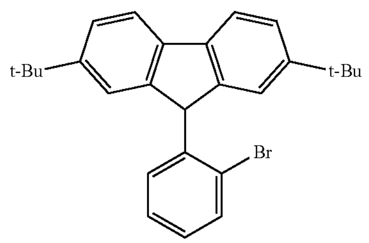

To a THE solution (60 mL) of 2,7-di-tert-butylfluorene (8.5 g, 30.52 mmol) was added a solution of n-BuLi (19.1 mL, 30.56 mmol, 1.6 M in hexane) slowly at ambient temperature. After the reaction was stirred for 2 hours, anhydrous $ZnCl_2$ (6.3 g, 46.23 mmol) was added as a solid. The mixture was stirred overnight and then to the mixture was added 1,2-diboromobenzene (7.2 g, 30.52 mmol), $Pd(PPh_3)_4$ (1.76 g, 1.52 mmol), and additional THE (100 mL). The reaction was heated to reflux over 4 days. After being cooled to ambient temperature, the reaction was quenched with saturated aqueous $NH_4Cl$ solution (200 mL) and extracted with toluene (3×150 mL). The combined organic layers were washed with brine (150 mL) and water (200 mL). The resulting organic layer was dried over anhydrous $Na_2SO_4$ and filtered. The volatiles from the filtrate were removed under vacuum and the residue was extracted with boiling heptane (3×150 mL) and filtered through a pad of Celite. The heptane solution was concentrated to ca. 20 mL. After all solids were dissolved in the solution with heating, the resulting solution was left at ambient temperature. The resulting white solid precipitate was isolated by filtration and dried under vacuum. Yield: 7.0 g, 53%. $^1H$ NMR ($CD_2Cl_2$): δ 7.71 (m, 3H), 7.43 (m, 4H), 7.07 (m, 2H), 6.46 (m, 1H), 5.71 (s, 1H), 1.30 (s, 18H).

Compound 2b

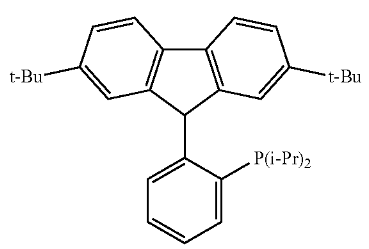

Compound 2a (4.5 g, 10.38 mmol) was dissolved in a mixture of THE (100 mL) and $Et_2O$ (100 mL). The solution was cooled to −115° C.±5° C. with a liquid $N_2$/EtOH bath. To the solution was added a solution of n-BuLi (6.5 mL, 10.4 mmol, 1.6 M in hexane) dropwise over 30 minutes with stirring. The temperature of the cooling bath was maintained at −115° C.±5° C. over 2 hours. To the reaction mixture at −115° C. was added neat chlorodiisopropylphosphine (1.59 g, 10.42 mmol) dropwise. The reaction mixture was allowed to warm slowly to ambient temperature while stirring overnight. The volatiles were removed under vacuum and the residue was extracted into toluene (3×50 mL) and filtered through a pad of Celite. After the solvent of the combined filtrate was removed under vacuum, the product was recrystallized from boiling heptane (15 mL). Yield: 3.0 g, 61%. $^1H$ NMR ($CD_2Cl_2$): δ 7.70 (d, J=8.0 Hz, 2H), 7.60 (dt, J=7.8 and 1.7 Hz, 1H), 7.40 (ddd, J=8.1, 1.7, and 0.6 Hz, 2H), 7.26 (t, J=0.7 Hz 2H), 7.22 (td, J=7.4 and 1.3 Hz, 1H), 7.05 (td, J 8.1 and 1.1 Hz, 1H), 6.52 (d, J 12.6 Hz, 1H), 6.36 (ddd, J=7.8, 4.0, and 1.3 Hz, 1H), 2.30 (m, 2H), 1.29 (m, 6H), 1.26 (s, 18H), 1.13 (dd, J=11.5 and 6.7 Hz, 6H). $^{31}P\{^1H\}$ NMR ($CD_2Cl_2$): δ −6.0.

Compound 2c

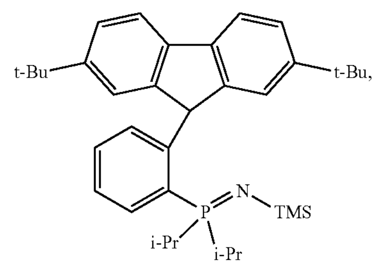

Synthetic Route A

Compound 2b (6.0 g, 12.75 mmol), azidotrimethylsilane (5.0 mL, 4.4 g, 38 mmol), and toluene (40 mL) were mixed and heated at 100° C. over 5 days. After the reaction was cooled to ambient temperature, all volatiles were removed under vacuum. The product was obtained in high purity and quantitative yield and was used without further purification. $^1H$ NMR ($CD_2Cl_2$): δ 7.68 (d, 3H), 7.42 (m, 1H), 7.38 (m, 2H), 7.33 (s, br, 2H), 7.19 (m, 2H), 6.36 (m, 1H), 2.46 (m, 2H), 1.32 (dd, 6H), 1.27 (s, 18H), 1.20 (dd, H), −0.22 (s, 9H). $^{31}P$ NMR ($CD_2Cl_2$): δ 24.3. $^1H$ NMR (toluene-$d_8$): 7.94-7.77 (br. m, 1H), 7.71 (d, J=8 Hz, 2H), 7.55 (s, 2H), 7.36 (dd, J=8 and 2 Hz, 2H), 6.81 (t, J=7 Hz, 1H), 6.64 (t, J=7 Hz, 1H), 6.50 (dd, J=8 and 4 Hz, 1H), 2.15-2.01 (m, 2H), 1.28 (s, 18H), 1.25 (dd, J 16 and 7 Hz, 6H), 1.08 (dd, J=16 and 7 Hz, 6H), 0.07 (s, 9H). $^{31}P\{^1H\}$ NMR (toluene-$d_8$): δ 22.9.

Compound 2c, Synthetic Route B

To a solution of Compound 2b (4.71 g, 10 mmol) in $CH_2Cl_2$ (30 ml) in a 100 mL vial was slowly added a $CH_2Cl_2$ solution (25 ml) of hexachloroethane (2.37 g, 10 mmol).

The vial containing the hexachloroethane solution was rinsed with portions of $CH_2Cl_2$ (3×2 ml) and the rinsing solutions were added to the reaction vial. After stirring at ambient temperature for 20 minutes, neat $HN(SiMe_3)_2$ (4.8 g, 30 mmol) was added. A white precipitate began to form after ~10 minutes and the mixture was stirred for a further 3 hours at ambient temperature. Toluene (12 ml) was added, and the mixture was pumped to dryness (Note: The higher boiling solvent, toluene, was added to facilitate removal of tetrachloroethylene by-product and excess $HN(SiMe_3)_2$).

The residue was triturated with pentane (~60 mL) while stirring for 20 minutes, the solid isolated by filtration, and the solid further rinsed with portions of pentane (3×5 mL). The pentane filtrate was concentrated under vacuum down to a volume of ~10 mL when the product began to crystallize. The remaining solvent was removed under vacuum to give the product as a colourless crystalline solid. Yield: 5.55 g, 99%. NMR spectra of Compound 2c obtained by Synthetic Route B were identical to those of Compound 2c obtained by Synthetic Route A.

A person skilled in the art will recognize that Synthetic Route B may provide a more facile route to a phosphinimine compound such as, for example, Compound 2c, when compared to Synthetic Route A. Synthetic Route A requires reaction with trimethylsilylazide ($Me_3SiN_3$), refluxing temperatures, and several days to effect oxidation of a phosphine compound (e.g. Compound 2b) into a phosphinimine compound (e.g. Compound 2c), whereas Synthetic Route B, can be carried out at ambient temperature, using less hazardous reagents and shorter reaction times.

Compound 2d

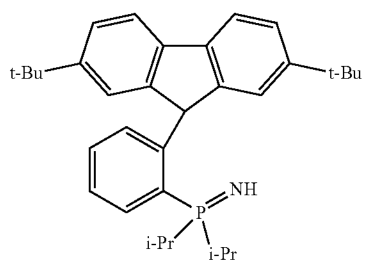

Compound 2c (4.15 g, 7.44 mmol), obtained by either Synthetic Route A or B, CsF (1.4 g, 9.22 mmol), THE (30 mL), and MeOH (20 mL) were combined, and the stirred mixture was heated at 60° C. overnight. After the reaction was cooled to ambient temperature and all volatiles were removed under vacuum, the residue was extracted with hot toluene (3×50 mL) and filtered through a pad of Celite. The solvent of the combined filtrate was removed under vacuum, and the obtained solid was dissolved in boiling heptane (20 mL). A white precipitate formed upon storing at ambient temperature overnight. After the mother liquor was decanted, the product as a white solid was washed with pentane (3×10 mL) and dried under vacuum. Yield: 3.0 g, 83%. $^1$H NMR ($CD_2Cl_2$): δ 7.70 (d, J=8.0 Hz, 3H), 7.50 (t, J=9.2 Hz, 1H), 7.40 (dd, J=8.1 and 1.9 Hz, 2H), 7.24 (m, 3H), 7.14 (m, 1H), 6.41 (m, 1H), 2.56 (m, 2H), 1.35 (dd, J=15.0 and 6.9 Hz, 6H), 1.26 (s, 18H), 1.23 (m, 6H). $^{31}$P{$^1$H} NMR ($CD_2Cl_2$): δ 44.7.

Complex 2

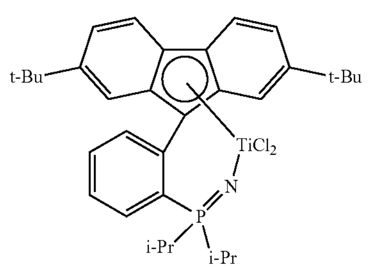

A solution of n-BuLi (8 mL, 12.8 mmol, 1.6 M in hexane) was added dropwise to a toluene solution (100 mL) of Compound 2d (3.1 g, 6.38 mmol) at −78° C. After the addition of n-BuLi, the cold bath was removed, and the reaction was allowed to warm to ambient temperature and stirred for 2 hours. The obtained red solution was cooled to −78° C. again, and a toluene solution (40 mL) of $Ti(NMe_2)_2Cl_2$ (1.32 g, 6.38 mmol) was added slowly. The reaction was warmed to ambient temperature and stirred overnight. After all volatiles were removed under vacuum, the residue was extracted with toluene (3×50 mL) and filtered through a pad of Celite. Chlorotrimethylsilane (7.0 g, 64.4 mmol) was added into the combined filtrate. The mixture was heated at 90° C. and stirred over 3 days. After all volatiles were removed under vacuum, the obtained dark-red solid was washed with hot toluene (3×30 mL) and dried under vacuum. Yield: 2.5 g, 63%. $^1$H NMR ($CD_2Cl_2$): δ 7.95 (dd, J=8.9 and 0.8 Hz, 2H), 7.80-7.64 (m, 4H), 7.59 (dd, J=9.0 and 1.8 Hz, 2H), 6.92 (m, 2H), 2.34 (m, 2H), 1.23 (s, 18H), 1.21 (m, 6H), 1.17 (m, 6H). $^{31}$P{$^1$H} NMR ($CD_2Cl_2$): δ 33.0.

Figure 2:
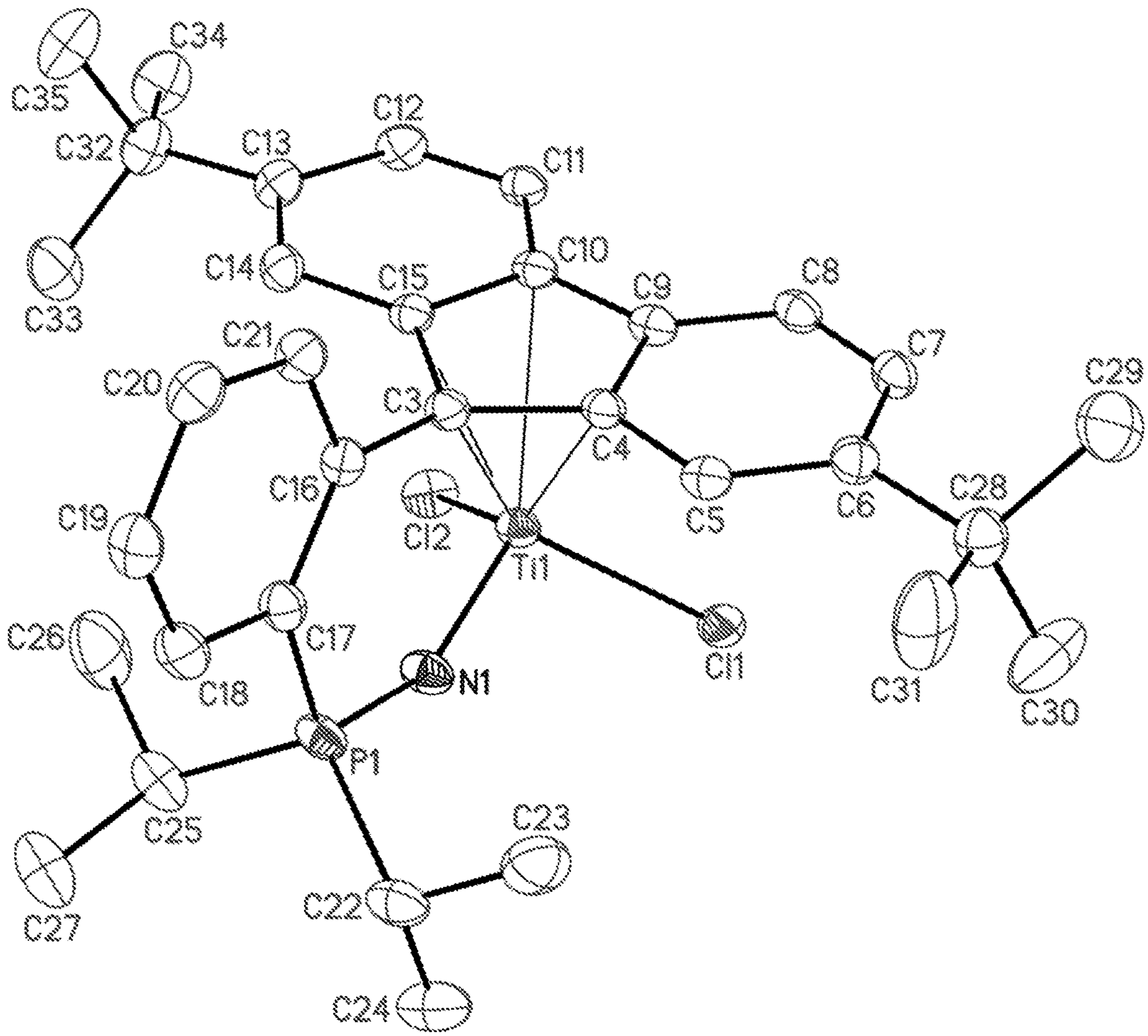
FIG. 2 shows the Oak Ridge Thermal Ellipsoid Plot (ORTEP) of an organometallic complex, Complex 2, of the present disclosure. The ORTEP is a representation of the molecular structure of an organometallic complex of the present disclosure as determined by X-ray diffraction.

The coordination sphere of Complex 2 was confirmed by single crystal X-ray crystallography (see details in Table 2). The ORTEP diagram for Complex 2 is provided in FIG. 2.

TABLE 2

| Crystallographic experimental details for Complex 2 | |
|---|---|
| A. Crystal Data | |
| formula | $C_{34}H_{43}Cl_5NPTi$ ($C_{33}H_{42}Cl_2NPTi$•$CHCl_3$) |
| formula weight | 721.81 |
| crystal colour and habit [a] | orange plate |
| crystal dimensions (mm) | 0.24 × 0.20 × 0.06 |
| crystal system | monoclinic |
| space group | $P2_1/c$ (No. 14) |
| unit cell parameters [b] | |
| a (Å) | 13.141(3) |
| b (Å) | 17.973(3) |
| c (Å) | 16.466(3) |
| β (deg) | 111.645(3) |
| V (Å3) | 3614.7(12) |
| Z | 4 |
| ρcalcd (g cm$^{-3}$) | 1.326 |
| μ (mm$^{-1}$) | 0.675 |
| B. Data Collection and Refinement Conditions | |
| diffractometer | Bruker PLATFORM/APEX II CCD [c] |
| radiation (λ [Å]) | graphite-monochromated Mo Kα (0.71073) |
| temperature (° C.) | $\Sigma w(F_o^2 - F_c^2 80$ |
| scan type | ω scans (0.3°) (30 s exposures) |
| data collection 2θ limit (deg) | 52.85 |
| total data collected | 36843 (−16 ≤ h ≤ 16, −22 ≤ k ≤ 22, −20 ≤ l ≤ 20) |
| independent reflections | 7411 ($R_{int}$ = 0.0726) |
| number of observed reflections (NO) | 5263 [$F_o^2 \geq 2\sigma(F_o^2)$] |
| structure solution method | intrinsic phasing (SHELXT-2014 [d]) |
| refinement method | full-matrix least-squares on $F^2$ (SHELXL-2018 [e]) |
| absorption correction method | Gaussian integration (face-indexed) |
| range of transmission factors | 1.0000-0.8717 |
| data/restraints/parameters | 7411/52[f]/439 |
| goodness-of-fit (S) [g] [all data] | 1.041 |
| final R indices [h] | |

TABLE 2-continued

| Crystallographic experimental details for Complex 2 | |
|---|---|
| $R_1$ [$F_o^2 \geq 2\sigma(F_o^2)$] | 0.0493 |
| $wR_2$ [all data] | 0.1348 |
| largest difference peak and hole | 0.528 and −0.624 e Å$^{-3}$ |

Notes for TABLE 2:

[a] Obtained by recrystallization from a pentane/toluene/dichloromethane/cyclohexane/chloroform solution. (Crystal obtained from NMR tube A)

[b] Obtained from least-squares refinement of 5775 reflections with 5.14° < 2□ < 46.70°.

[c] Programs for diffractometer operation, data collection, data reduction and absorption correction were those supplied by Bruker.

[d] Sheldrick, G. M. *Acta Crystallogr.* 2015, A71, 3-8. (SHELXT-2014)

[e] Sheldrick, G. M. *Acta Crystallogr.* 2015, C71, 3-8. (SHELXL-2018/3)

[f] The C-C distances within the disordered tert-butyl group (carbon atoms C28, C29, C30, C31, C29A, C30A and C31A) were restrained to be approximately the same by use of the SHELXL SADI instruction. The C13-C32 and C13-C32A distances were restrained to be approximately the same by use of SADI. The rigid-bond restraint was applied to the anisotropic displacement parameters of the carbon atoms of the other disordered tert-butyl group by use of the RIGU instruction.

[g] $S = [\Sigma w(F_o^2 - F_c^2)2/(n - p)]^{1/2}$ (n = number of data; p = number of parameters varied; $w = [s^2(F_o^2) + (0.0558P)^2 + 2.0267P]^{-1}$ where $P = [Max(F_o^2, 0)+2F_c^2]/3$).

[h] $R_1 = \Sigma||F_o| - [Fc||/\Sigma|F_o|$]; $wR_2 = [\Sigma w(F_o^2 - F_c^2)^2/\Sigma w(F_o^4)]^{1/2}$.

Complex 3

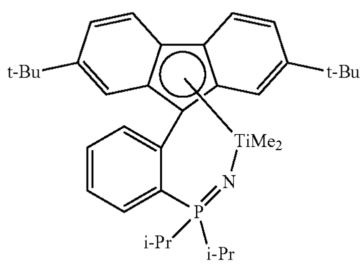

Complex 2 (2.5 g, 4.05 mmol) and a solution of methylmagnesium bromide (5.4 mL, 16.2 mmol, 3 M in $Et_2O$) were combined in toluene (150 mL) and the mixture was stirred at ambient temperature overnight. All volatiles were removed, and the residue was completely dried under vacuum over 3 hours. The product was extracted with toluene (3×50 mL) and filtered through a pad of Celite. The combined filtrate was reduced to ca. 20 mL and layered with heptane (20 mL) and cooled to −35° C. to precipitate the product as a brown solid. Yield: 1.5 g, 64%. $^1H$ NMR ($CD_2Cl_2$): δ 8.12 (dd, J=8.9 and 0.8 Hz, 2H), 7.62-7.52 (m, 3H), 7.49 (m, 1H), 7.43 (dd, J=8.8 and 1.7 Hz, 2H), 6.72 (m, 2H), 2.29 (m, 2H), 1.21 (m, 6H), 1.19 (s, 18H), 1.11 (dd, J=16.3 and 7.1 Hz, 6H), −0.95 (s, 6H, $TiCH_3$). $^{31}P\{^1H\}$ NMR ($CD_2Cl_2$): δ 24.5.

Figure 3:
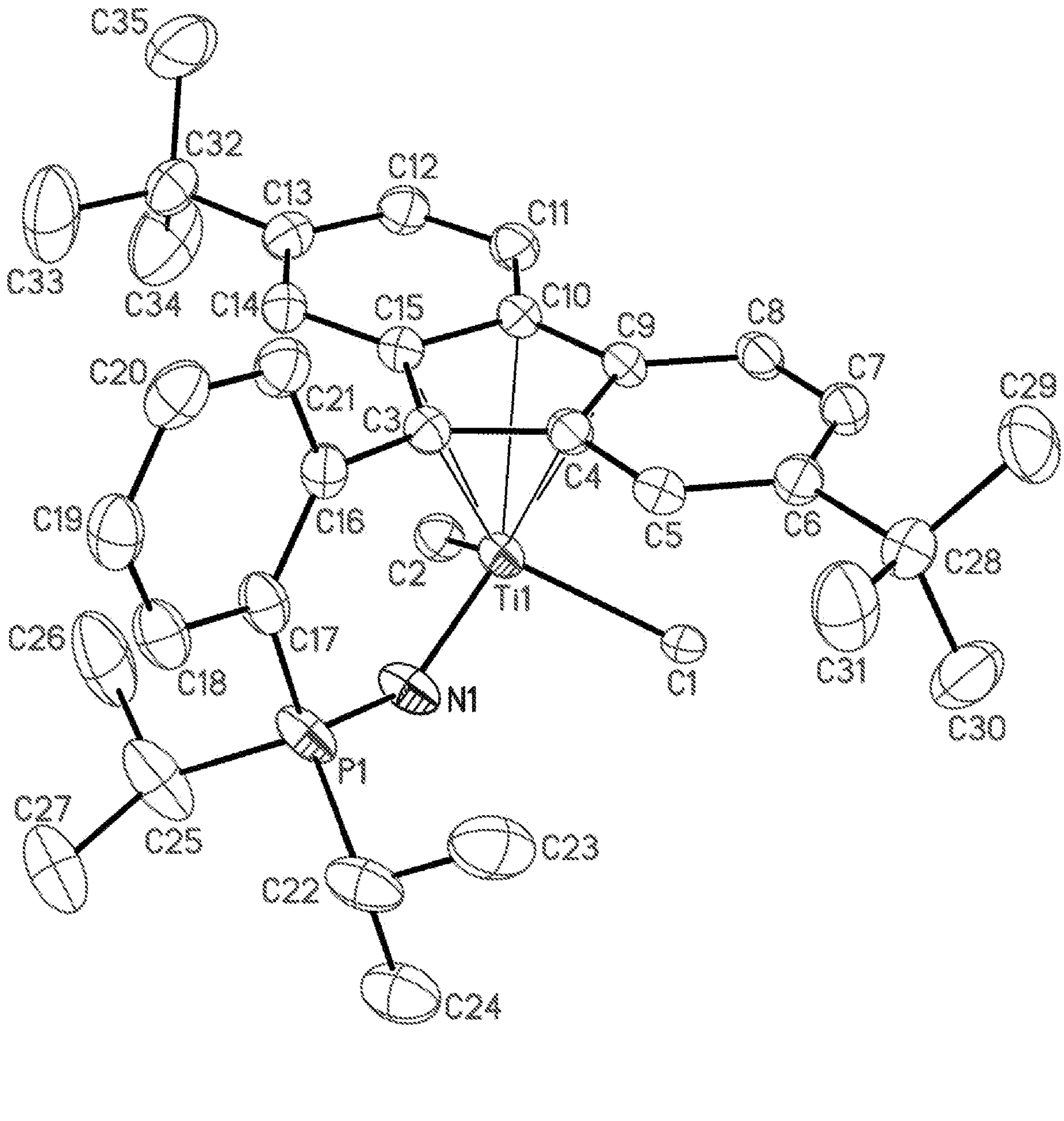
FIG. 3 shows the Oak Ridge Thermal Ellipsoid Plot (ORTEP) of an organometallic complex, Complex 3, of the present disclosure. The ORTEP is a representation of the molecular structure of an organometallic complex of the present disclosure as determined by X-ray diffraction.

The coordination sphere of Complex 3 was confirmed by single crystal X-ray crystallography (see details in Table 3). The ORTEP diagram for Complex 3 is provided in FIG. 3.

TABLE 3

| Crystallographic Experimental Details for Complex 3 | |
|---|---|
| **A. Crystal Data** | |
| formula | $C_{36}H_{50}Cl_2NPTi$ ($C_{35}H_{48}NPTi \cdot CH_2Cl_2$) |
| formula weight | 646.54 |
| crystal colour and habit [a] | Yellow fragment |
| crystal dimensions (mm) | 0.30 × 0.27 × 0.12 |
| crystal system | monoclinic |
| space group | $P2_1/c$ (No. 14) |
| unit cell parameters [b] | |
| a (Å) | 12.453(3) |
| b (Å) | 18.038(5) |
| c (Å) | 16.936(4) |
| β (deg) | 109.782(3) |
| V (Å3) | 3579.8(15) |
| Z | 4 |
| ρcalcd (g cm$^{-3}$) | 1.200 |
| μ (mm$^{-1}$) | 0.457 |
| **B. Data Collection and Refinement Conditions** | |
| diffractometer | Bruker PLATFORM/APEX II CCD [c] |
| radiation (λ [Å]) | graphite-monochromated Mo Kα (0.71073) |
| temperature (° C.) | −80 |
| scan type | ω scans (0.3°) (45 s exposures) |
| data collection 2θ limit (deg) | 51.55 |
| total data collected | 31244 ($-15 \leq h \leq 15$, $-22 \leq k \leq 22$, $-20 \leq l \leq 20$) |
| independent reflections | 6830 ($R_{int}$ = 0.0747) |
| number of observed reflections (NO) | 4479 [$F_o^2 \geq 2\sigma(F_o^2)$] |
| structure solution method | intrinsic phasing (SHELXT-2014 [d]) |
| refinement method | full-matrix least-squares on $F^2$ (SHELXL-2018 [e,f]) |
| absorption correction method | Gaussian integration (face-indexed) |
| range of transmission factors | 1.0000-0.8274 |
| data/restraints/parameters | 6830/0/345 |
| goodness-of-fit (S) [g] [all data] | 1.036 |
| final R indices [h] | |
| $R_1$ [$F_o^2 \geq 2\sigma(F_o^2)$] | 0.0746 |
| $wR_2$ [all data] | 0.2149 |
| largest difference peak and hole | 0.796 and −0.515 e Å$^{-3}$ |

Notes for TABLE 3:

[a] Obtained by recrystallization from a dichloromethane/pentane solution.

[b] Obtained from least-squares refinement of 4915 reflections with 4.52° < 2□ < 45.44°.

[c] Programs for diffractometer operation, data collection, data reduction and absorption correction were those supplied by Bruker.

[d] Sheldrick, G. M. *Acta Crystallogr.* 2015, A71, 3-8. (SHELXT-2014)

[e] Sheldrick, G. M. *Acta Crystallogr.* 2015, C71, 3-8. (SHELXL-2018/3)

[f] Attempts to refine peaks of residual electron density as disordered or partial-occupancy solvent dichloromethane chlorine or carbon atoms were unsuccessful. The data were corrected for disordered electron density through use of the SQUEEZE procedure as implemented in PLATON (Spek, A. L. *Acta Crystallogr.* 2015, C71, 9-18. PLATON - a multipurpose crystallographic tool. Utrecht University, Utrecht, The Netherlands). A total solvent-accessible void volume of 553 Å$^3$ with a total electron count of 156 (consistent with 4 molecules of solvent dichloromethane, or 1 molecule per formula unit of the target molecule) was found in the unit cell.

[g] $S = [\Sigma w(F_o^2 - F_c^2)2/(n - p)]^{1/2}$ (n = number of data; p = number of parameters varied; $w = [s^2(F_o^2) + (0.0941P)^2 + 4.6324P]^{-1}$ where $P = [Max(F_o^2, 0) + 2F_c^2]/3$).

[h] $R_1 = \Sigma||F_o| - [Fc||/\Sigma|F_o|$]; $wR_2 = [\Sigma w(F_o^2 - F_c^2)^2/\Sigma w(F_o^4)]^{1/2}$.

Compound 4a

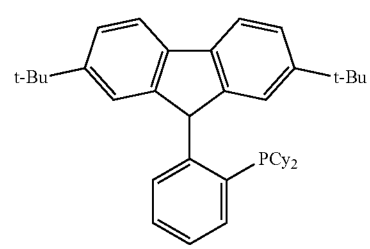

Compound 2a (3.56 g, 8.2 mmol) was dissolved in a mixture of THE (60 mL) and $Et_2O$ (80 mL). The solution was cooled to −115° C.±5° C. with a liquid $N_2$/EtOH bath. To the solution was added a solution of n-BuLi (5.4 mL, 8.06 mmol, 1.6 M in hexane, diluted with an additional 7 mL of pentane) dropwise over 30 minutes with stirring. The temperature of the cooling bath was maintained at −115° C.±5° C. over 2 hours. To the reaction mixture at −115° C. was added a THE solution (7 mL) of chlorodicyclohexylphosphine (2.0 g, 8.6 mmol) dropwise. The reaction mixture was allowed to warm slowly to ambient temperature while stirring overnight. The volatiles were removed under vacuum and the residue was extracted into toluene (40 mL) and filtered through a pad of Celite. Volatiles were removed under vacuum. $^{31}$P NMR analysis of the crude material (toluene-$d_8$) showed two resonances at δ −6.1 (suspected to be n-BuPCy2 by-product) and −15.3 ppm (desired product). The off-white solid was dissolved in hot heptane (25 mL), filtered, and left to crystallize over 16 h. The yellow mother liquor was decanted and the colourless solid was washed with portions of cold pentane (2×5 mL) and then dried under vacuum. Yield: 4.0 g, 90%. $^1$H NMR (toluene-$d_8$): δ 7.75 (d, J 7.4 Hz, 2H), 7.52 (br. s, 2H), 7.50 (br. s, 1H), 7.40 (dd, J=8.1 and 2.0 Hz, 3H), 7.00-6.96 (m, 1H), 6.86 (d, J=13.7 Hz, 1H), 6.76-6.72 (m, 1H), 6.54 (ddd, J=8.0, 4.2, and 1.4 Hz, 1H), 2.08-2.05 (m, 2H), 1.93-1.83 (m, 6H), 1.74-1.70 (m, 2H), 1.52-1.35 (m, 10H), 1.28 (s, 18H). $^{31}$P{$^1$H} (toluene-$d_8$): δ −15.3.

Compound 4b

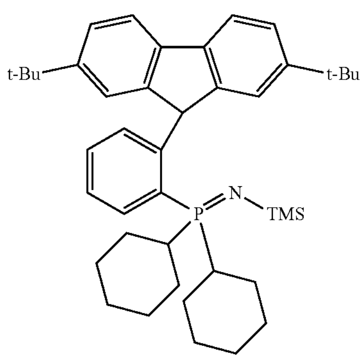

To a $CH_2Cl_2$ solution (20 mL) of Compound 4a (2.13 g, 4.0 mmol) was added $HN(SiMe_3)_2$ (2.4 mL, 12 mmol), followed by a $CH_2Cl_2$ solution (10 mL) of hexachloroethane (0.92 g, 4.0 mmol) to give a cloudy white reaction mixture. After stirring for 1 hour, an aliquot was taken and dried under vacuum. Analysis by $^1$H NMR spectroscopy suggested that the reaction contained Compound 4b in ~90% purity. The mixture was filtered, and the filtrate was concentrated under vacuum to give a colourless sticky solid that was used without further purification. $^1$H NMR ($CDCl_3$): δ 7.71 (s, 1H), 7.61 (d, J 7.9 Hz, 2H), 7.38-7.33 (m, 5H), 7.20-7.14 (m, 4H), 6.42 (ddd, J=7.9, 7.6, and 1.4 Hz 1H), 2.20-2.15 (m, 4H), 1.96-1.77 (m, 8H), 1.55-1.36 (m, 8H), 1.29 (m, 21H), −0.21 (s, 9H). $^{31}$P{$^1$H} NMR ($CDCl_3$): δ 18.3.

Compound 4c

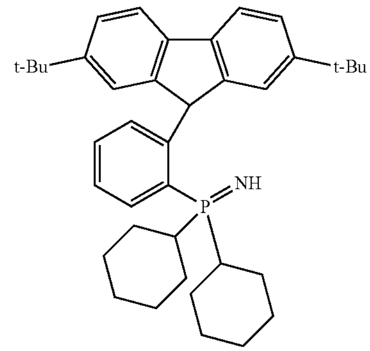

To a THE solution (30 mL) of crude Compound 4b (~90% purity, as described above) was added a MeOH solution (20 mL) of CsF (0.88 g, 6.0 mmol) with stirring at ambient temperature. The headspace of the reaction mixture was evacuated briefly, and the mixture was heated to 60° C. overnight. The solvent was removed under vacuum, the residue taken up into hot toluene (80 mL), and the mixture was filtered through Celite. The volatiles were removed under vacuum and the resulting solid was washed and decanted with cold pentane (2×5 mL) and the remaining colourless solid was determined to be the desired product. Yield: 1.3 g, 61%. $^1$H NMR ($CD_2Cl_2$): δ 7.69 (d, J 7.2 Hz, 2H), 7.46-7.40 (m, 1H), 7.38 (dd, J=8.4 and 2.8 Hz, 2H), 7.25-7.21 (m, 3H), 7.18-7.11 (m, 1H), 6.40-6.37 (m, 1H), 7.25 (s, 2H), 2.29-2.20 (overlapping m, 2H), 1.95-1.81 (m, 4H), 1.77-1.73 (m, 2H), 1.57-1.29 (overlapping m, 12H), 1.27 (s, 18H). $^{31}$P NMR ($CD_2Cl_2$): δ 39.2.

Complex 4

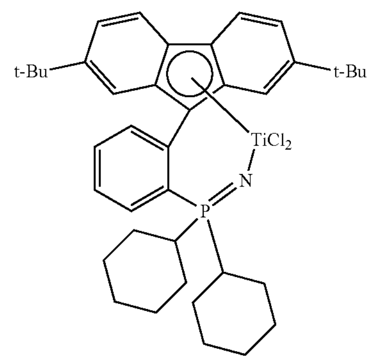

A solution of n-BuLi (9.9 mL, 16 mmol, 1.6 M in hexane) was added dropwise to a THE solution (150 mL) of Compound 4c (4.28 g, 7.6 mmol) at −78° C. After the addition of n-BuLi, the cold bath was removed, and the reaction was allowed to warm to ambient temperature and stirred for 2 hours. The obtained red solution was cooled to −78° C. again, and a toluene solution (60 mL) of $Ti(NMe_2)_2Cl_2$ (1.56 g, 7.6 mmol) was added slowly. The reaction was warmed to ambient temperature and stirred overnight. After all volatiles were removed under vacuum, the residue was taken up into toluene (200 mL) and filtered through a pad of Celite. Chlorotrimethylsilane (9.6 mL, 75.5 mmol) was added into the combined filtrate and the mixture was heated at 90° C. with stirring over 2 days. After all volatiles were removed under vacuum, the obtained dark-red solid was washed with pentane (5×10 mL) and dried under vacuum. Yield: 1.9 g, 25%. $^1$H NMR ($CD_2Cl_2$): δ 7.93 (d, J=9.0 Hz, 2H), 7.76-7.62 (m, 4H), 7.61-7.56 (m, 2H), 6.92 (s, 2H), 2.09-1.66 (m, 12H), 1.43-1.28 (m, 12H), 1.23 (s, 18H). $^{31}P\{^1H\}$ NMR ($CD_2Cl_2$): δ 27.2.

Complex 5

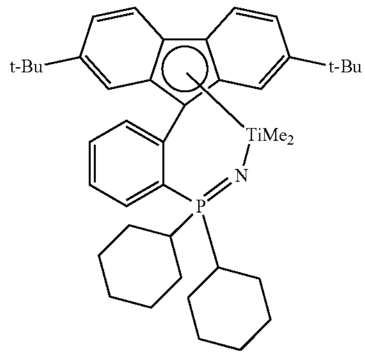

To a toluene solution (40 mL) of Complex 4 (1.18 g, 1.7 mmol) was added a solution of methylmagnesium bromide (1.2 mL, 3.8 mmol, 3.0 M in $Et_2O$) at ambient temperature which resulted in a rapid colour change from red to dark brown/black. After stirring for 10 minutes, volatiles were removed under vacuum, and the residue rigorously dried under vacuum for 3 hours. The residue was taken up into toluene (40 mL) and filtered, and the resulting filtrate was concentrated to dryness under vacuum. The dark green/brown solid was washed with portions of pentane (2×5 mL) then dried under vacuum. Yield: 0.64 g, 58%. $^1$H NMR ($CDCl_3$): δ 8.11 (d, J=9.8 Hz, 2H), 7.59-7.53 (m, 4H), 7.43 (dd, J=8.5 and 1.0 Hz, 2H), 6.71 (d, J=1.1 Hz, 2H), 2.04-1.68 (m, 12H), 1.45-1.23 (m, 12H), 1.21 (s, 18H), −0.85 (s, 6H). $^{31}P\{^1H\}$ NMR ($CDCl_3$): δ 18.8.

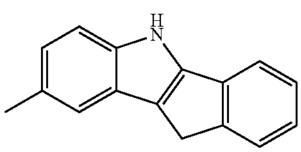

8-Methyl-5,10-dihydroindeno[1,2-b]indole

This material was prepared substantially as described by Grandini, C. et al. in *Organometallics,* 2004, 23, 344-360.

1-Indanone (5.02 g, 38.0 mmol), p-tolylhydrazine hydrochloride (6.03 g, 38.0 mmol) and p-toluenesulfonic acid monohydrate (0.3 g) were suspended in i-PrOH (150 mol). A condenser was attached, and the mixture was refluxed for 45 min, during which the reaction mixture became a yellow-orange suspension. The reaction mixture was cooled to 0° C. for 15 minutes and filtered. The filter cake was rinsed with i-PrOH until the filtrate ran colorless. Residual volatiles were removed under reduced pressure, affording the desired product as a white solid. Yield: 7.45 g, 89%. $^1$H NMR ($CDCl_3$) δ 8.23 (br, 1H), 7.53 (d, J=7.4 Hz, 1H), 7.45 (m, 2H), 7.32 (m, 2H), 7.20 (t, J=7.4 Hz, 1H), 7.01 (d, J=8.5 Hz, 1H), 3.71 (s, 2H), 2.48 (s, 3H).

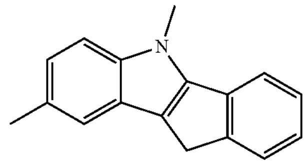

5,8-Dimethyl-5,10-dihydroindeno[1,2-b]indole

8-Methyl-5,10-dihydroindeno[1,2-b]indole (1.73 g, 7.88 mmol) and potassium tert-butoxide (885 mg, 7.88 mmol) were dissolved in THE (60 mL) and the translucent yellow solution was stirred for 1 hour. Iodomethane (0.49 mL, 1.12 g, 7.88 mmol) was added through a syringe which resulted in the instant formation of a white precipitate. After 30 minutes, the reaction mixture was poured into saturated aqueous $NH_4Cl$ (100 mL) and extracted with $CH_2Cl_2$ (100 mL). The organic extracts were rinsed with water (2×50 mL), brine (50 mL), dried over anhydrous $Na_2SO_4$, filtered, and removed under reduced pressure to afford a pale-yellow solid. The crude product was purified by recrystallization from hot heptane, affording the desired product as an off-white solid. Yield: 1.64 g, 89%. $^1$H NMR ($CDCl_3$) δ 7.66 (d, J=7.5 Hz, 1H), 7.55 (d, J=7.5 Hz, 1H), 7.45 (s, 1H), 7.36 (t, J=7.5 Hz, 1H), 7.31-7.20 (m, 1H), 7.08 (d, J=8.3 Hz, 1H), 4.04 (s, 3H), 3.70 (s, 2H), 2.51 (s, 3H).

Compound 6a

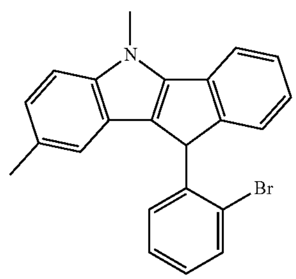

To a THE solution (80 mL) of 5,8-dimethyl-5,10-dihydroindeno[1,2-b]indole (4.67 g, 20.0 mmol) was added a solution of n-BuLi (12.5 mL, 21.0 mmol, 1.6 M in hexanes) dropwise at ambient temperature. The reaction mixture was stirred overnight, affording a bright orange-red solution. To the reaction was added as a THE solution (40 mL) of anhydrous zinc chloride (4.09 g, 30.0 mmol) and the resulting pale yellow reaction mixture was stirred for 3 hours. Following successive addition of $Pd(PPh_3)_4$ (1.16 g, 1.00 mmol) and 1,2-dibromobenzene (4.72 g, 20.0 mmol), the headspace of the flask was evacuated briefly, and the reaction mixture was heated to 65-67° C. for 5 days. The reaction mixture was concentrated under reduced pressure to ~30 mL and partitioned between water and toluene (75 mL each). The organic layer was combined with further toluene extracts (2×30 mL) of the aqueous layer. The combined organic layer was washed with water (2×30 mL) then brine (30 mL), and then dried over anhydrous $Na_2SO_4$. The dark red-brown, turbid extract was filtered to remove a white solid from the dark red-brown filtrate. The filtrate was concentrated under reduced pressure. Recrystallization from hot heptane led to some improvement of the purity of the material. A second purification was performed by redissolving the material in minimal dichloromethane, adding heptane and heating to 90° C. for 15 min under a flow of $N_2$ to evaporate the dichloromethane and afford a precipitate. Cooling to −35° C. followed by decantation and drying the isolated solid under vacuum afforded the product in ~92% purity (4.04 g, 10.4 mmol, 52% yield). Further purification of this material by column chromatography (EtOAc/heptane, gradient elution up to ~5% v/v EtOAc, $R_f$=0.22 (TLC, 4% EtOAc in heptane)) gave 1.54 g of the desired product in >95% purity by NMR. $^1$H NMR ($CDCl_3$): δ 7.73 (dd, J=8.0 and 1.2 Hz, 1H), 7.66 (dm, J=7.5 Hz, 1H), 7.48 (dm, J=7.6 Hz, 1H), 7.35 (m, 1H), 7.29 (d, J=8.4 Hz, 1H), 7.17 (m, 2H), 7.11-7.02 (m, 2H), 7.00 (td, J=7.6 and 1.1 Hz, 1H), 6.61 (dd, J=7.8 and 1.5 Hz, 1H), 5.60 (s, 1H), 4.09 (s, 3H), 2.40 (s, 3H).

Compound 6b

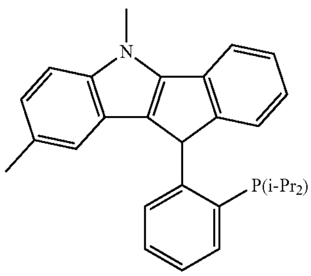

Compound 6a (1.13 g, 2.92 mmol) was dissolved in the mixture of THE (10 mL) and $Et_2O$ (50 mL). The solution was cooled to −115° C.±5° C. using a liquid $N_2$/EtOH bath. To the solution was added a solution of n-BuLi (1.91 mL, 3.06 mmol, 1.6 M in hexane) dropwise over 5 minutes with stirring. The temperature of the cooling bath was maintained at −115° C.±5° C. over 2 hours. To the reaction mixture at −115° C. was added a THE solution (10 mL) of chlorodiisopropylphosphine (0.47 g, 3.06 mmol) dropwise. The reaction mixture was allowed to warm slowly to ambient temperature while stirring overnight. The resulting pale-yellow solution was concentrated under vacuum, triturated with heptane (20 mL), concentrated to dryness under vacuum, the residue extracted into toluene (3×50 mL), and then filtered by filter cannula. After the solvent of the combined filtrate was removed under vacuum, the residue was washed and decanted twice with cold pentane (−35° C.) and then dried under vacuum to give a colourless solid. Analysis by $^1$H NMR showed that the material was a mixture of the desired phosphine (Compound 6b) and unreacted starting material (Compound 6a) in a ratio of ~3:1, as well as other impurities. The crude material was taken forward without further purification for the synthesis of Compound 6c and purified at that stage. The $^{31}$P NMR spectrum of the crude material showed only one resonance. $^{31}$P{$^1$H} NMR (toluene-$d_8$): δ −7.5.

Compound 6c

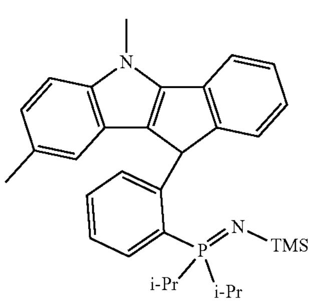

To a toluene solution (50 mL) of crude Compound 6b as described above (740 mg, assuming 1.74 mmol of Compound 6b) was added an excess of hexachloroethane, $C_2Cl_6$ (900 mg, 4 mmol), and the mixture was stirred to dissolve the reagents. A colourless precipitate began to form and the mixture was left to sit for 4 hours. The mixture was decanted, and the resulting solid was washed and decanted with portions of toluene (3×3 mL) and dried under vacuum. The residue was taken up into $CH_2Cl_2$ (20 mL) and neat $HN(SiMe_3)_2$ (2.0 mL, 9.5 mmol) was added dropwise via syringe. A colourless precipitate began to form and the mixture was left to sit at ambient temperature overnight. The resulting mixture was filtered and the colourless solid, once dried under vacuum, was determined to be the desired product in high purity (>95%). Yield: 0.73 g, 82%. $^1$H NMR ($CDCl_3$): δ 7.63 (d, J=7.5 Hz, 1H), 7.38 (m, 2H), 7.33 (s, 1H), 7.27 (m, 2H), 7.18 (s, 1H), 7.11 (m, 2H), 7.00 (m, 2H), 6.56 (m, 1H), 4.09 (s, 3H), 2.53 (sept., J=7.0 Hz, 1H), 2.44 (sept., J=7.0 Hz, 1H), 2.33 (s, 3H), 1.36 (m, 6H), 1.24 (m, 6H), −0.21 (s, 9H). $^{31}$P{$^1$H} NMR ($CDCl_3$): δ 22.9 ppm.

Compound 6d

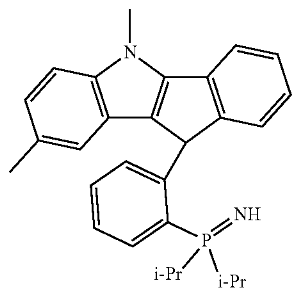

To a solution of Compound 6c (740 mg, 1.44 mmol) in dry methanol (5 mL) and THE (15 mL) was added CsF (329 mg, 2.16 mmol). The mixture was heated to 50° C. while stirring overnight. Volatiles were removed under vacuum to afford a white sticky solid residue. The residue was extracted with toluene (3×10 mL) and filtered through Celite. The filtrate was concentrated to dryness under vacuum to afford a colourless solid. Yield: 0.64 g, quantitative. $^1$H NMR ($CDCl_3$): δ 7.65 (d, J=7.5 Hz, 1H), 7.49 (td, J=8.8 and 1.0 Hz, 1H), 7.30 (td, J=7.5 and 1.1 Hz, 1H), 7.24 (m, 4H), 7.10 (m, 2H), 7.04 (s, 1H), 6.99 (dd, J=8.4 and 1.4 Hz, 1H), 6.61 (ddd, J=7.8, 3.3, and 1.0 Hz, 1H), 4.08 (s, 3H), 2.64 (m, 2H), 2.33 (s, 3H), 1.42 (m, 6H), 1.29 (m, 6H). $^{31}$P{$^1$H} NMR ($CDCl_3$): δ 44.4.

Complex 6

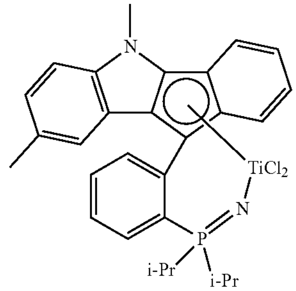

To a THE solution (30 mL) of Compound 6d (625 mg, 1.42 mmol) at −78° C. was added a solution of n-BuLi (1.8 mL, 2.9 mmol, 1.6 M hexanes) dropwise by cannula, which caused an immediate colour change to bright purple. The mixture was allowed to warm slowly to ambient temperature and was then concentrated under vacuum to give a purple solid. The solid material was triturated with toluene (20 mL), which produced an orange slurry, and then concentrated under vacuum while heating to 45° C. The process of trituration and concentration was repeated once more. Analysis of the solid residue by $^1$H NMR spectroscopy indicated that some residual THE was still present, and the spectrum appeared broadened. Toluene (40 mL) was added, and the mixture was cooled to −78° C. To the rapidly stirred slurry was added a toluene solution (20 mL) of $Ti(NMe_2)_2Cl_2$ (243 mg, 1.49 mmol) dropwise via cannula. The resulting dark red mixture was stirred at −78° C. for 10 minutes, and then allowed to slowly warm to ambient temperature. After removal of the volatiles under vacuum, the dark red solid was redissolved in toluene (20 mL) and the mixture was filtered through a sintered glass frit. Excess chlorotrimethylsilane (1.5 mL, 16 mmol) was added to the solution and the headspace was partially evacuated prior to heating the mixture to 90° C. for 2 days. The resulting mixture was cooled to ambient temperature and then concentrated to dryness under vacuum. After the solid residue was taken up into toluene (8 mL), a portion of heptane (10 mL) was added, and the resulting solid was isolated by filtration and was rinsed with additional portions of heptane. The resulting dark red solid was dried under vacuum. Yield: 440 mg, 55%. $^1$H NMR ($CDCl_3$): δ 7.94 (d, J 8.6 Hz, 1H), 7.72 (m, 3H), 7.39 (m, 1H), 7.25 (m, 1H), 7.17 (d, J=8.6 Hz, 2H), 7.07 (m, 2H), 6.82 (s, 1H), 4.17 (s, 3H), 2.39 (sept., J=8.2 Hz, 1H), 2.29 (sept., J=7.2 Hz, 1H), 2.26 (s, 3H), 1.19 (m, 12H). $^{31}P\{^1H\}$ NMR ($CDCl_3$): δ 31.0 ppm.

Complex 7

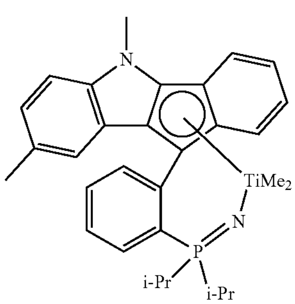

To a toluene solution/suspension (10 mL) of Complex 6 (440 mg, 0.79 mmol) at ambient temperature was added a solution of methylmagnesium bromide (0.6 mL, 1.7 mmol, 3.0 M in $Et_2O$). An immediate colour change from dark red to a bright orange occurred. The mixture was stirred for 2 hours and then volatiles were removed under vacuum. The residue was triturated with toluene (10 mL) and then concentrated to dryness under vacuum. The residue was triturated with pentane (10 mL) and then concentrated again under vacuum. The residue was taken up into toluene (10 mL) and the suspension was filtered through a pad of Celite. The bright yellow/orange filtrate was concentrated under vacuum to give a sticky orange glassy semi-solid. Addition of pentane (5 mL) and agitation caused the amorphous solid to form a bright yellow powder which was isolated by decantation and dried under vacuum. The filter pad was extracted with further portions of warm toluene and the above process was repeated to obtain further portions of the pure solid yellow product. Yield: 345 mg, 84% yield. $^1$H NMR (toluene-$d_8$): δ 7.88 (d, J=8.6 Hz, 1H), 7.36 (m, 1H, ArH), 7.16 (t, J=7.6 Hz, 1H), 7.10-6.88 (m, 7H, overlapping with tol-$d_8$ signals), 3.69 (s, 3H), 2.18 (s, 3H), 1.80 (m, 2H), 1.04 (m, 6H) 0.86 (m, 6H), −0.12 (s, 3H), −0.31 (s, 3H). $^{31}P\{^1H\}$ NMR (toluene-$d_8$): δ 22.3 ppm.

Compound 8a

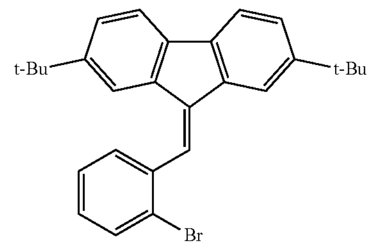

Compound 8a was prepared using a modification of a procedure provided in Yamaguchi, E., Abe, A., Itoh, A. *Asian Journal of Organic Chemistry* 2022, 11, e202200039.

To a toluene solution (30 mL) of KOtBu (14.25 g, 127 mmol) and 2,7-di-tert-butylfluorene (17.68 g, 63.5 mmol) with stirring at −78° C. was added dry MeOH (130 mL).

After allowing the mixture to warm to ambient temperature, a MeOH solution (30 mL) of 2-bromobenzaldehyde (11.75 g, 63.5 mmol) was added and the resulting mixture was heated to reflux at 85° C. for ~20 hours. After cooling to ambient temperature, the reaction mixture was concentrated to dryness under vacuum and then $Et_2O$ (200 mL) was added to form a yellow slurry. The mixture was cooled to ~5° C. for 2 hours, then subjected to filtration, and then the filtrate was concentrated to dryness under vacuum to give a yellow solid. This solid residue was ground to a powder, triturated with MeOH (250 mL) for 1 hour, and then isolated by filtration. The yellow solid was further washed with portions of MeOH (3×20 mL) and then dried under vacuum. Yield: 24.6 g, 87%. $^1$H NMR (toluene-$d_8$): δ 7.88 (s, 1H), 7.52 (s, 1H), 7.51-7.42 (m, 3H), 7.42-7.35 (m, 2H), 7.33 (dd, J=1.8 and 1.7 Hz, 1H), 7.23 (dd, J=8.0 and 1.7, 1H), 6.98 (m, 1H), 6.80 (t, J=8.2 Hz, 1H), 1.33 (s, 9H), 1.11 (s, 9H).

Compound 8b

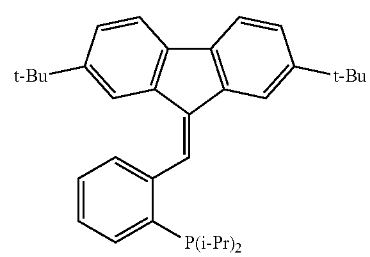

To a solution of Compound 8a (12.0 g, 26.9 mmol) in THE (120 mL) and $Et_2O$ (80 mL) with stirring at −78° C. was added a solution of n-BuLi (17.5 mL, 28.0 mmol, 1.6 M in hexanes) dropwise via cannula over 20 minutes. An immediate colour change from yellow to red occurred and a precipitate began to form after several minutes. The resulting slurry was stirred at −78° C. for 2 hours and then a $Et_2O$ solution (10 mL) of chlorodiisopropylphosphine (4.27 g, 28.0 mmol) was added dropwise via cannula. After allowing the reaction mixture to warm to ambient temperature overnight, the resulting pale-yellow solution was concentrated to dryness under vacuum. The solid residue was taken up into pentane (100 ml), stirred for 30 minutes, and then filtered. The filtrate was concentrated to ~5 mL and then cooled to −35° C. overnight to crystallize the product. The mother liquor was decanted, and the resulting solid was washed and decanted with cold (−35° C.) pentane (~10 mL) and then dried under vacuum. Yield: 11.8 g, 91%. $^{1}$H NMR (toluene-$d_8$): δ 8.39 (s, 1H), 8.01 (s, 1H), 7.60 (m, 1H), 7.53 (d, J=8.0 Hz, 1H), 7.52-7.47 (m, 2H), 7.41-7.35 (m, 1H), 7.32 (dd, J=8.0 and 1.7 Hz, 1H), 7.24 (dd, J=8.0 and 1.6, 1H), 7.20-7.13 (m, 2H), 1.90 (d of sept., J=7.0 and 1.3 Hz, 2H), 1.29 (s, 9H), 1.18 (s, 9H), 0.97-0.85 (two overlapping dd, 12H). $^{31}$P{$^{1}$H} NMR (toluene-$d_8$): δ −3.8.

Compound 8c

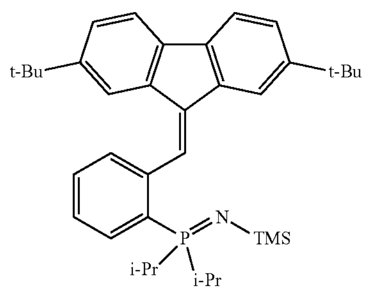

To a $CH_2Cl_2$ solution (~60 mL) of Compound 8b (10.0 g, 20.7 mmol) chilled to −35° C. was slowly added an ambient-temperature $CH_2Cl_2$ solution (10 mL) hexachloroethane (4.90 g, 20.7 mmol). The resulting solution was stirred at ambient temperature for 1 hour and then neat $HN(SiMe_3)_2$ (10 g, 62 mmol) was added in a dropwise manner. The mixture, which became turbid after ~10 minutes, was stirred at ambient temperature overnight. After the resulting slurry was concentrated under vacuum to ~40 mL, toluene (40 mL) was added and the slurry was concentrated to dryness under vacuum to remove solvents, excess $HN(SiMe_3)_2$, and tetrachloroethylene by-product. The residue was taken up into pentane (70 mL), filtered, and the filter pad washed with additional portions of pentane (3×5 mL). The yellow filtrate was concentrated under vacuum until crystallization began to occur (~10 mL) and then cooled to −35° C. overnight. The yellow crystalline solid was isolated by decantation and then washed with portions of cold pentane (2×5 mL) and dried under vacuum. Yield: 11.2 g, 95%. $^{1}$H NMR (toluene-$d_8$): δ 8.20 (s, 1H), 7.99 (s, 1H), 7.92 (dd, J=11.2 and 8.0 Hz, 1H), 7.51 (d, J=7.9 Hz, 1H), 7.48 (d, J=7.9 Hz, 1H), 7.40 (dd, J=7.9 and 3.6 Hz, 1H), 7.34 (dd, J=8.0 and 1.7 Hz, 1H), 7.25-7.17 (m, 2H), 7.17-7.11 (m, 2H), 2.06 (sept., J=6.8 Hz, 2H), 1.44 (s, 9H), 1.16 (s, 9H), 0.99 (dd, J=15.6 and 7.0 Hz, 6H), 0.86 (dd, J=16.1 and 7.0 Hz, 6H), 0.41 (s, 9H). $^{31}$P NMR (toluene-$d_8$): δ 22.0.

Compound 8d

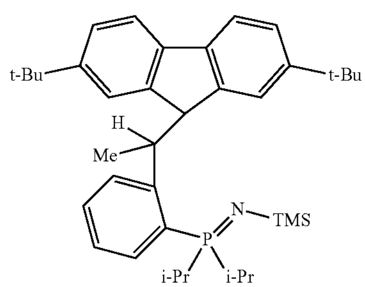

To a chilled (−35° C.) THE solution (60 mL) of Compound 8c (6.75 g, 11.8 mmol) was added a solution of methyllithium (7.7 mL, 12.3 mmol, 1.6 M in $Et_2O$) dropwise via syringe. An immediate colour change to green and then dark red occurred as more MeLi solution was added. The resulting red solution was stirred for ~20 hours and then cooled to −35° C. To the chilled solution was added dry MeOH with stirring until the dark red colour had faded and a colour change to light green occurred. The mixture was stirred for an additional 20 minutes and then concentrated to dryness under vacuum. The residue was taken up into pentane (80 mL) then concentrated to ~20 mL and then cooled to −35° C. The solid product was isolated by decantation and then washed with portions of cold pentane (2×5 mL) and dried under vacuum. Yield: 6.90 g, 99%. $^{1}$H NMR ($CD_2Cl_2$): δ 7.82 (dd, J=7.8 and 3.4 Hz, 1H), 7.64-7.55 (m, 3H), 7.53 (d, J=8.0 Hz, 1H), 7.48 (dd, J=12.2 and 8.5, 1H), 7.38 (dd, J=8.0 and 1.7 Hz, 1H), 7.33-7.26 (m, 1H), 7.21 (dd, J=8.0 and 1.7 Hz, 1H), 6.58 (s, 1H), 4.34 (br. m, 1H), 4.19 (d, J=10.2 Hz, 1H), 2.09 (d of sept., J=7.2 and 2.0 Hz, 1H), 1.79 (sept., J=7.3 Hz, 1H), 1.52 (d, J=6.5 Hz, 3H), 1.37 (s, 9H), 1.06 (s, 9H), 1.01 (dd, J=15.8 and 7.0 Hz, 3H), 0.73 (dd, J=15.5 and 7.0 Hz, 3H), 0.67 (dd, J=15.5 and 7.0 Hz, 3H), 0.63 (dd, J=15.5 and 7.0 Hz, 3H), −0.25 (s, 9H). $^{31}$P{$^{1}$H} NMR ($CD_2Cl_2$): δ 22.3.

Compound 8e

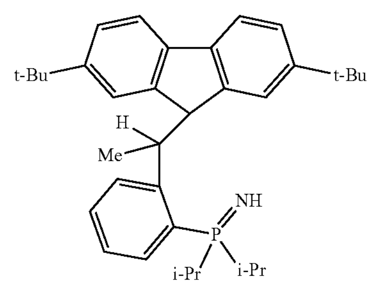

Compound 8d (6.9 g, 11.8 mmol) and CsF (1.80 g, 11.8 mmol) were dissolved in a mixture of THE (30 mL) and dry MeOH (30 mL) in a 100 mL hypo-vial equipped with a stir bar. The vial was sealed and vented with a small gauge needle and the reaction mixture was stirred for 20 hours. A small aliquot of the reaction mixture was dried under vacuum and then analyzed by $^{1}$H NMR to reveal that the reaction had gone to completion. The reaction mixture was then concentrated to dryness under vacuum, the residue taken up into toluene (30 mL), and the slurry filtered through a pad of Celite. The filter pad was washed with portions of toluene (3×6 mL) and the combined light green filtrate was concentrated to dryness under vacuum. Although crystallization of a colourless solid was observed once the solution had been concentrated to ~10 mL, the material was completely dried under vacuum. The residue was taken up into pentane (30 mL) and then cooled to −35° C. The green mother liquor was decanted and discarded, and the solid was washed with portions of cold pentane before isolating and drying under vacuum to give the desired product as a colourless solid. Yield: 4.77 g, 78%. $^{1}$H NMR (toluene-$d_8$): δ 8.50 (s, 1H), 7.65 (d, J=4.4 Hz, 1H), 7.63 (d, J=4.4 Hz, 1H), 7.39 (dt, J=8.5 and 3.3 Hz, 1H), 7.32 (dd, J 8.0 and 1.7 Hz, 1H), 7.28 (m, 1H), 7.11 (m, 2H), 6.90 (s, 1H), 5.90 (br. m, 1H), 4.69 (d, J=4.4 Hz, 1H), 2.08-1.97 (m, 1H), 1.96-1.82 (m, 1H), 1.43 (s, 9H), 1.27 (s, 9H), 1.10 (dd, J=14.9 and 7.1 Hz, 3H), 1.00 (dd, J=14.6 and 6.9 Hz, 3H), 0.87 (dd, J=15.3 and 7.1 Hz, 3H), 0.81 (d, J=7.2 Hz, 3 Hz), 0.74 (dd, J=15.3 and 7.1 Hz, 3H), 0.16 (br. s, 1H). $^{31}P$ NMR (toluene-$d_8$): δ 43.4.

Complex 8

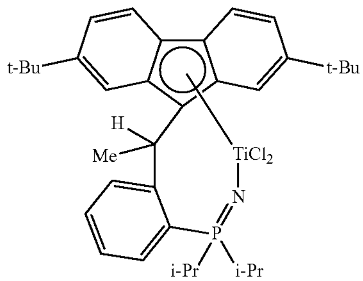

To a toluene/THF (20/1 vol/vol, total 50 mL) solution of Compound 8e (4.66 g, 9.08 mmol) was added a solution of n-BuLi (11.8 mL, 18.9 mmol, 1.6 M in hexanes) dropwise at ambient temperature. The resulting slurry was cooled to −78° C. and then a toluene solution (50 ml) of $Ti(NMe_2)_2Cl_2$ was added dropwise while the mixture was stirred rapidly. The reaction mixture became an orange solution after the slurry was allowed to warm slowly to ambient temperature overnight. The solution was heated at 50° C. for 1 hour and then cooled back to ambient temperature. Excess chlorotrimethylsilane (9.85 g, 90.7 mmol) was added to the solution and the resulting mixture was heated to 90° C. overnight. The resulting dark red mixture was cooled to ambient temperature and then at 0° C. for 3 hours after which time a red solid had crystallized. The red solid was isolated by filtration, washed with pentane (20 mL), and dried under vacuum. $^1H$ NMR analysis showed that the product contained approximately one equivalent of toluene of solvation. Yield of Complex 8·($C_7H_8$): 2.2 g, 33%. $^1H$ NMR ($CD_2Cl_2$): δ 8.21 (dd, J=8.0 and 4.1 Hz, 1H), 7.90 (dd, J 8.6 and 1.0 Hz, 1H), 7.86-7.78 (m, 2H), 7.62-7.52 (m, 3H), 7.50-7.42 (m, 1H), 7.36 (dd, J=8.6 and 1.7 Hz, 1H), 7.28-7.21 (m, 1H), 7.20-7.10 (m, 2H), 6.26 (s, 1H), 5.83 (q, J=7.1 Hz, 1H), 2.66-2.54 (m, 1H), 2.48-2.36 (m, 1H), 2.34 (s, solvated toluene-$CH_3$), 1.99 (d, J=7.1 Hz, 3H), 1.42 (s, 9H), 1.36 (dd, J=17.3 and 7.2 Hz, 3H), 1.31 (dd, J=16.4 and 6.8 Hz, 3H), 1.18 (dd, J=17.2 and 7.2 Hz, 3H), 1.13 (dd, J=16.7 and 6.9 Hz, 3H), 1.00 (s, 9H). $^{31}P\{^1H\}$ NMR ($CD_2Cl_2$): 30.4.

Complex 9

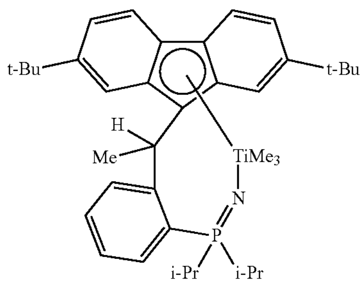

To a solution/suspension of Complex 8·($C_7H_8$) (1.1 g, 1.5 mmol) in toluene (5 mL) and $Et_2O$ (30 mL) at ambient temperature was added a solution of methylmagnesium bromide (1.3 mL, 3.9 mmol, 3.0 M in $Et_2O$). The mixture was stirred for 2 hours and then volatiles were removed under vacuum. The residue was taken up into toluene (40 mL) and the resulting yellow-orange slurry was filtered through a pad of Celite. The filtrate concentrated under vacuum to give the desired product as an orange crystalline solid. $^1H$ NMR analysis showed that the product contained approximately one equivalent of toluene of solvation. Yield of Complex 9·(1 $C_7H_8$): 0.97 g, 93%. $^1H$ NMR (toluene-$d_8$): δ 8.09 (d, J=8.8 Hz, 1H), 8.03 (d, J=8.9 Hz, 1H), 7.80 (dd, J=8.0 and 3.9 Hz, 1H), 7.55 (s, 1H), 7.43 (dd, J=8.8 and 1.6 Hz, 1H), 7.30 (t, J=7.3 Hz, 1H), 7.24 (dd, J=8.9 and 1.7 Hz, 1H), 7.13-6.88 (m, 5H), 6.12 (s, 1H), 5.44 (q, J=7.3 Hz, 1H), 2.12 (s, solvated toluene-$CH_3$), 2.02-1.86 (m, 2H), 1.81 (d, J=7.1 Hz, 3H), 1.44 (s, 9H), 1.20 (dd, J=15.4 and 6.5 Hz, 3H), 1.07 (dd, J=16.4 and 7.3 Hz, 3H), 0.95 (dd, J=15.7 and 7.0 Hz, 3H), 0.82 (dd, J=16.1 and 7.3 Hz, 3H), −0.18 (s, 3H), −0.52 (s, 3H). $^{31}P\{^1H\}$ NMR (toluene-$d_8$): δ 16.7.

Complex 10

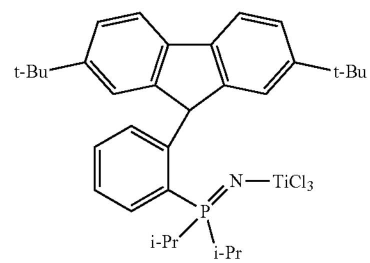

To a THE solution (100 mL) of Compound 2d (3.2 g, 6.59 mmol), a solution of n-BuLi (4.1 mL, 6.56 mmol, 1.6 M in hexane) was added at ambient temperature. After stirring for 3 hours at ambient temperature, the mixture was cooled to −78° C. and a THE solution (200 mL) of $Ti(NMe_2)_2Cl_2$ (1.36 g, 6.57 mmol) was added dropwise. The reaction mixture was allowed to warm slowly to ambient temperature overnight while stirring. After all volatiles were removed under vacuum, the residue was extracted with toluene (3×50 mL) and filtered through a pad of Celite. To the combined filtrate was added chlorotrimethylsilane (4.0 g, 36.8 mmol) and the obtained mixture was heated at 90° C. overnight. After being cooled to ambient temperature, all volatiles were removed under vacuum, and the obtained solid was dissolved in hot toluene (15 mL). After being cooled to −35° C. overnight, the colourless solid product precipitated and was isolated by decantation and drying under vacuum. Yield: 2.6 g, 65%. $^1H$ NMR ($CD_2Cl_2$): δ 7.73 (d, J=8.0 Hz, 2H), 7.62 (br. s, 1H), 7.45 (ddd, J=8.0, 1.8, and 0.4 Hz, 2H), 7.39 (m, 1H), 7.32 (m, 1H), 7.24 (s, 2H), 6.56 (ddd, J=7.8, 4.4, and 1.0 Hz, 1H), 6.45 (br. s, 1H), 3.02 (m or overlapping septets, 2H), 1.70 (dd, J=17.5 and 7.0 Hz, 6H), 1.47 (dd, J=17.5 and 7.0 Hz, 6H), 1.28 (s, 18). $^{31}P\{^1H\}$ NMR ($CD_2Cl_2$): δ 44.1.

Figure 4:
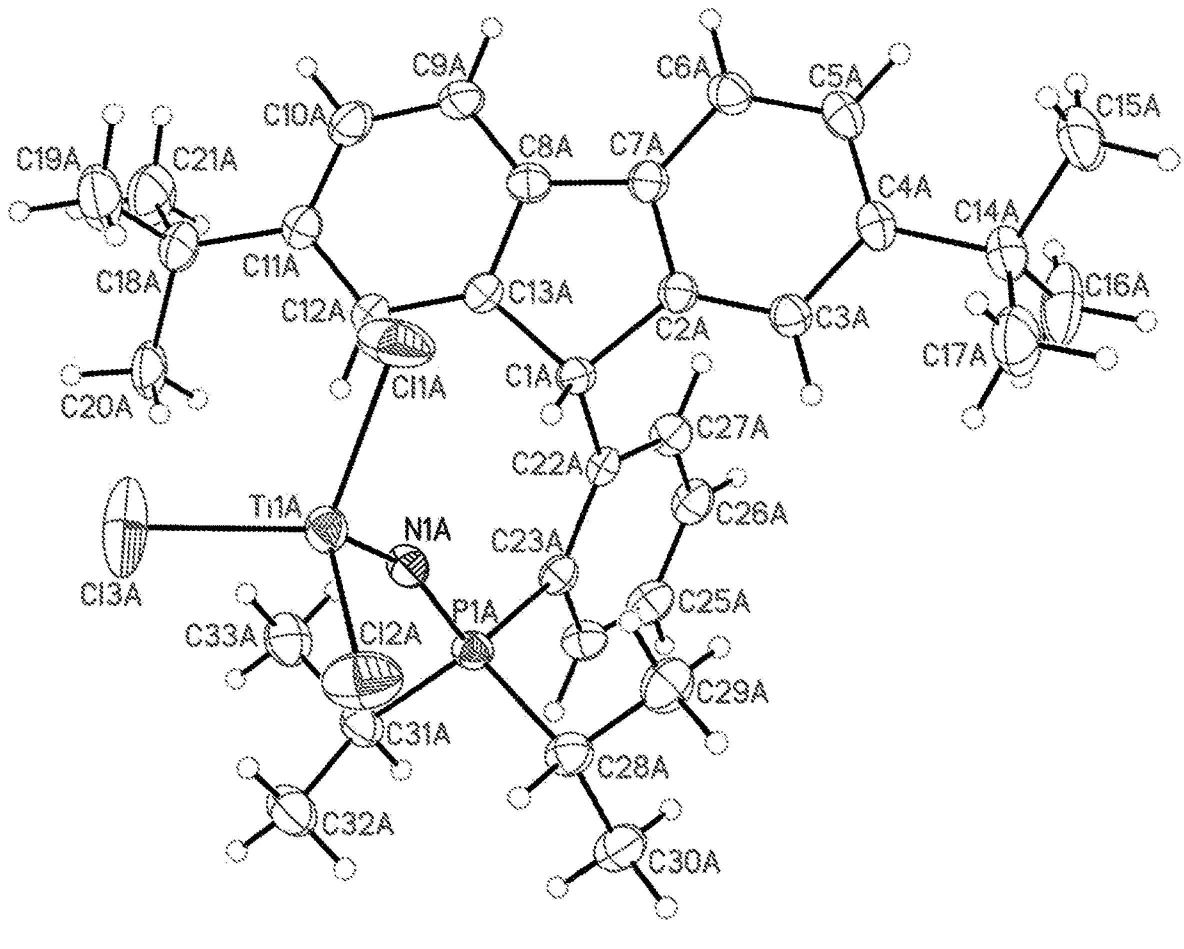
FIG. 4 shows the Oak Ridge Thermal Ellipsoid Plot (ORTEP) of an organometallic complex, Complex 10, of the present disclosure. The ORTEP is a representation of the molecular structure of an organometallic complex of the present disclosure as determined by X-ray diffraction.

The coordination sphere of Complex 10 was confirmed by single crystal X-ray crystallography (see details in Table 4). The ORTEP diagram for Complex 10 is provided in FIG. 4

TABLE 4

| Crystallographic Experimental Details for Complex 10 | |
|---|---|
| A. Crystal Data | |
| formula | $C_{36.50}H_{51}Cl_3NPTi$ ($C_{33}H_{43}Cl_3NPTi•0.5C_7H_{16}$) |
| formula weight | 689.00 |
| crystal colour and habit [a] | colourless block |

TABLE 4-continued

| Crystallographic Experimental Details for Complex 10 | |
|---|---|
| crystal dimensions (mm) | 0.39 × 0.12 × 0.07 |
| crystal system | orthorhombic |
| space group | $Pca2_1$ (No. 29) |
| unit cell parameters [b] | |
| a (Å) | 17.6688(14) |
| b (Å) | 16.3720(13) |
| c (Å) | 25.967(2) |
| β (deg) | 7511.5(10) |
| V (Å3) | 8 |
| Z | 1.219 |
| ρcalcd (g $cm^{-3}$) | 0.509 |
| B. Data Collection and Refinement Conditions | |
| diffractometer | Bruker PLATFORM/APEX II CCD [c] |
| radiation (λ [Å]) | graphite-monochromated Mo Kα (0.71073) |
| temperature (° C.) | −80 |
| scan type | ω scans (0.3°) (45 s exposures) |
| data collection 2θ limit (deg) | 51.53 |
| total data collected | 67896 (−21 ≤ h ≤ 21, −19 ≤ k ≤ 19, −31 ≤ l ≤31) |
| independent reflections | 14367 ($R_{int}$ = 0.0597) |
| number of observed reflections (NO) | 10913 [$F_o^2 \geq 2\sigma(F_o^2)$] |
| structure solution method | intrinsic phasing (SHELXT-2014 [d]) |
| refinement method | full-matrix least-squares on $F^2$ (SHELXL-2018 [e,f]) |
| absorption correction method | Gaussian integration (face-indexed) |
| range of transmission factors | 1.0000-0.8409 |
| data/restraints/parameters | 14367/474 [g]/873 |
| Flack absolute structure parameter [h] | 0.016(13) |
| goodness-of-fit (S) [i] [all data] | 1.035 |
| final R indices [j] | |
| $R_1$ [$F_o^2 \geq 2\sigma(F_o^2)$] | 0.0445 |
| $wR_2$ [all data] | 0.1142 |
| largest difference peak and hole | 0.397 and −0.312 e $Å^{-3}$ |

Notes for TABLE 4:

[a] Obtained by recrystallization from a mixture of toluene, heptane, pentane and dichloromethane.

[b] Obtained from least-squares refinement of 9888 reflections with 4.62° < 2θ <43.04°.

[c] Programs for diffractometer operation, data collection, data reduction and absorption correction were those supplied by Bruker.

[d] Sheldrick, G. M. *Acta Crystallogr.* 2015, A71, 3-8. (SHELXT-2014)

[e] Sheldrick, G. M. *Acta Crystallogr.* 2015, C71, 3-8. (SHELXL-2018/3)

[f] Attempts to refine peaks of residual electron density as disordered or partial-occupancy solvent heptane carbon atoms were unsuccessful. The data were corrected for disordered electron density through use of the SQUEEZE procedure as implemented in PLATON (Spek, A. L. *Acta Crystallogr.* 2015, C71, 9-18. PLATON - a multipurpose crystallographic tool. Utrecht University, Utrecht, The Netherlands). A total solvent-accessible void volume of 798 $Å^3$ with a total electron count of 229 (consistent with 4 molecules of solvent heptane, or 0.5 molecules per formula unit of the titanium complex) was found in the unit cell.

[g] A total of 62 same distance (SADI) restraints were applied to the disordered groups within both molecule A and molecule B to ensure consistent geometry (i.e., bond lengths & angles) between both parts. Likewise, a total of 411 rigid-bond (RIGU) restraints were applied to the anisotropic displacement parameters of the disordered groups.

[h] Flack, H. D. *Acta Crystallogr.* 1983, A39, 876-881; Flack, H. D .; Bernardinelli, G. *Acta Crystallogr.* 1999, A55, 908-915; Flack, H. D .; Bernardinelli, G. J. *Appl. Cryst.* 2000, 33, 1143-1148. The Flack parameter will refine to a value near zero if the structure is in the correct configuration and will refine to a value near one for the inverted configuration.

[i] $S = [\Sigma w(F_o^2 - F_c^2)2/(n - p)]^{1/2}$ (n = number of data; p = number of parameters varied; $w = [\sigma^2(F_o^2) + (0.0528P)^2 + 0.9847P]^{-1}$ where $P = [Max(F_o^2, 0)+2F_c^2]/3$).

[j] $R_1 = \Sigma||F_o| - [Fc||/\Sigma|F_o|]$; $wR_2 = [\Sigma w(F_o^2 - F_c^2)^2/\Sigma w(F_o^4)]^{1/2}$.

Complex 10 (Alternate Route)

To a toluene solution (20 mL) of Compound 2c (2.99 g, 5.36 mmol) was added dropwise a toluene solution (20 mL) of $TiCl_4$ (1.016 g, 5.36 mmol). The resulting green solution/slurry was heated to reflux for 5 hours which then resulted in a clear, orange-tinted solution. Volatiles were removed under vacuum to produce a white crystalline solid. Yield: 3.60 g, 92%. Analysis by $^1$H NMR in toluene-$d_8$ and $CD_2Cl_2$ showed the presence of approximately 0.8 equivalents of toluene of solvation. NMR spectroscopic data were otherwise identical to those of Complex 10 prepared using $Ti(NMe_2)_2Cl_2$ as described above.

Complex 11

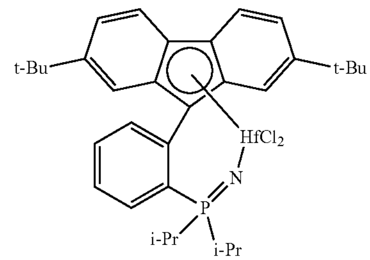

To a toluene solution of Compound 2d (4.0 g, 8.24 mmol) at −78° C. was slowly added a solution of n-BuLi (10.3 mL, 16.48 mmol, 1.6 M in hexane). After the mixture was stirred for 3 hours at −78° C., $Hf(NEt_2)_2Cl_2$ (2.78 g, 8.34 mmol) was added as a solid and the resulting mixture was allowed to warm slowly to ambient temperature with stirring overnight. All volatiles were removed under vacuum, and the product was extracted with portions of toluene (3×50 mL) and the combined extracts were filtered through a pad of Celite. To the combined filtrates was added $SiCl_4$ (6.0 g, 35.31 mmol) and the mixture was heated at 90° C. for 3 days. After the mixture was concentrated to dryness under vacuum, the residue was dissolved in boiling toluene (~25 mL) and then filtered while hot. The desired product precipitated as the filtrate cooled and was isolated by filtration and dried under vacuum. Yield: 4.4 g, 73%. $^1$H NMR ($CD_2Cl_2$): δ 8.07 (dd, J 8.9 and 0.7 Hz, 2H), 7.65 (m, 3H), 7.50 (m, 3H), 7.01 (m, 2H), 2.33 (m, 2H), 1.24 (s, 18H), 1.17 (m, 12H). $^{31}P\{^1H\}$ NMR ($CD_2Cl_2$): δ 31.2.

Complex 12

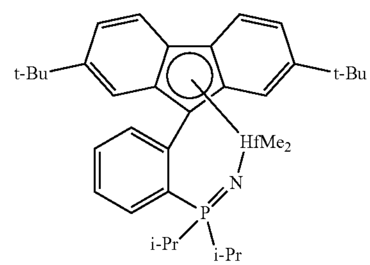

To a toluene suspension (100 mL) of Complex 11 (4.4 g, 6.0 mmol) was added a solution of methylmagnesium bromide (6.0 mL, 18 mmol, 3.0 M in $Et_2O$) with stirring at ambient temperature. After the mixture was stirred overnight, the reaction mixture was concentrated to dryness under vacuum. The residue was extracted with portions of toluene (3×50 mL) and the combined extracts were filtered through a pad of Celite. After the filtrate was concentrated to dryness under vacuum, the obtained residue was redissolved in toluene (100 mL) and filtered through a pad of Celite. This process was repeated three times to remove any unreacted $CH_3MgBr$. The final solid product was obtained by recrystallization of the crude material from a mixture of toluene and heptane. Yield: 3.1 g, 73%. $^1$H NMR ($CD_2Cl_2$): δ 8.09 (dd, J=8.9 and 0.7, 2H), 7.56 (m, 3H), 7.41 (m, 3H), 6.91 (m, 2H), 2.67 (m, 2H), 1.23 (s, 18H), 1.49 (dd, J=8.6 and 7.0 Hz, 6H), 1.10 (dd, J=8.7 and 7.1 Hz, 6H). $^{31}P\{^1H\}$ NMR ($CD_2Cl_2$): δ 26.4.

Complex 13

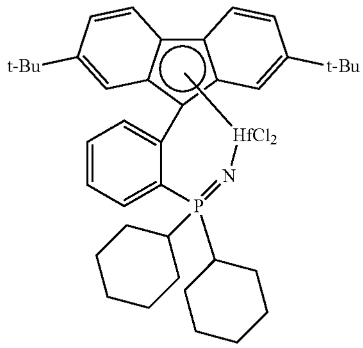

To a toluene solution (100 mL) of Compound 4c (2.27 g, 4.0 mmol) at −78° C. was added a solution of n-BuLi (5.3 mL, 8.4 mmol, 1.6 M in hexanes) dropwise turning the solution bright orange. After the n-BuLi addition, the cold bath was removed, and the reaction mixture was warmed to ambient temperature and stirred for 2 hours. After cooling the resulting red solution back to −78° C., a toluene suspension (60 mL) of $Hf(NEt_2)_2Cl_2$ (2.16 g, 4.0 mmol) was added in portions by cannula over 10 minutes and the reaction was allowed to warm slowly in the cold bath overnight. The reaction mixture was then concentrated to dryness under vacuum and then the residue was taken up into toluene (50 mL) and filtered. To the filtrate was added chlorotrimethylsilane (5.1 mL, 40.1 mmol) and then the headspace of the flask was briefly evacuated. The flask was sealed with a Teflon stopper and the mixture was heated at 90° C. with stirring for 2 days. The reaction mixture was concentrated under vacuum. Analysis of the residue by $^1H$ NMR suggested that the reaction was incomplete, so the residue was taken back up into toluene and treated with another portion of chlorotrimethylsilane (3 mL, 3.0 mmol) and heated to 90° C. for an additional day as described above. The reaction mixture was concentrated to dryness under vacuum, the residue taken up into toluene (50 mL), and the slurry filtered. The filtrate was concentrated under vacuum to give the product as a yellow solid. Yield: 2.6 g, 80%. $^1H$ NMR ($CD_2Cl_2$): δ 8.06 (d, J=9.2 Hz, 2H), 7.64-7.61 (m, 4H), 7.50-7.48 (m, 2H), 7.00 (s, 2H), 2.05-1.68 (m, 16H), 1.32-1.27 (m, 16H), 1.26 (s, 18H). $^{31}P\{^1H\}$ NMR ($CD_2Cl_2$): δ 24.7.

Complex 14

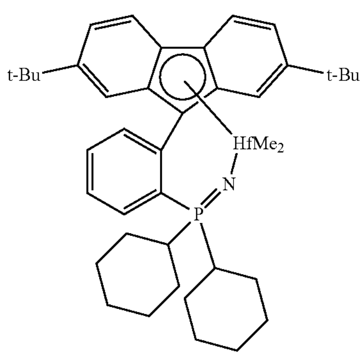

To a toluene solution (7 mL) of Complex 14 (0.50 g, 0.6 mmol) was added a solution of methylmagnesium bromide (0.40 mL, 1.4 mmol, 3.0 M in $Et_2O$) dropwise at ambient temperature. After stirring at ambient temperature for 5 minutes, the reaction mixture was concentrated to dryness under vacuum to give a yellow-brown solid residue. The residue was triturated with pentane (50 mL) and concentrated to dryness two times to remove residual $Et_2O$. The residue was then taken up into toluene (15 mL), filtered, and the filtrate concentrated to dryness under vacuum. The solid residue was washed with portions of pentane (3×3 mL) and then dried under vacuum to give the product as an off-white solid. $^1H$ NMR analysis showed that the product contained approximately one equivalent of toluene of solvation. Yield: 0.3 g, 53% $^1H$ NMR ($CDCl_3$): δ 8.08 (d, J=9.6 Hz, 2H), 7.55-7.54 (m, 4H), 7.44-7.38 (m, 4H), 7.25 (m, 2H, tol.), 7.20 (m, 3H, tol.), 6.89 (br. s, 2H), 2.37 (s, 3H, tol.), 1.98 (br. m, 5H), 1.80 (br. m, 6H), 1.68 (br. m, 6H), 1.27-1.24 (m, 23H), −1.42 (s, 6H). $^{31}P\{^1H\}$ NMR ($CDCl_3$): δ 21.0

Compound 15a

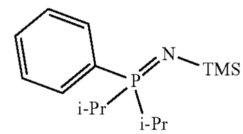

To a toluene (30 mL) solution of phenyldiisopropylphosphine (3.5 g, 18.02 mmol) was added azidotrimethylsilane (4.56 g, 5.2 mL, 39.5 mmol) at ambient temperature. The mixture was heated at 100° C. overnight. The solution was then cooled to ambient temperature, and the product was obtained as a white solid after all volatiles were removed under vacuum. Yield: 5.0 g, 98%. $^1H$ NMR ($CD_2Cl_2$): δ 7.65 (m, 2H), 7.45 (m, 3H), 2.20 (m, 2H), 1.07 (dd, J=8.4 and 7.0 Hz, 6H), 0.93 (dd, J=8.8 and 7.1 Hz, 6H), 0.05 (s, 9H). $^{31}P\{^1H\}$ NMR ($CD_2Cl_2$): δ 21.6.

Complex 15

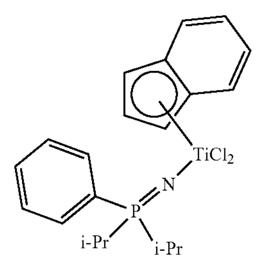

To a toluene solution (200 mL) of $TiCl_4$ (4.75 g, 25 mmol) was added EtOH (1.15 g, 25.0 mmol) and the resulting mixture was heated at 60° C. overnight. After the obtained red solution was cooled to ambient temperature, all volatiles were removed under vacuum. The residue was taken up into toluene (50 mL) and then solid Compound 15a (4.5 g, 16.0 mmol) was added. The reaction mixture was heated to 90° C. overnight. After the mixture was concentrated to dryness under vacuum, the product was taken up into THE (100 mL) and the resulting solution was cooled to −78° C. A THE solution (50 mL) of freshly prepared indenyl lithium (1.95 g, 16.0 mmol) was added dropwise via cannula. The mixture was then allowed to warm slowly to ambient temperature while stirring overnight. After the mixture was concentrated to dryness under vacuum, the residue was taken up into toluene (50 mL), filtered through a pad of Celite, and the filter cake extracted with further portions of toluene (2×50 mL). The filtrate was concentrated to dryness under vacuum and the residue was recrystallized twice from toluene layered with heptane, isolated by decantation, and dried under vacuum. Yield: 1.4 g, 19%. $^{1}H$ NMR ($CD_2Cl_2$): δ 7.79 (m, 2H), 7.66 (m, 2H), 7.60 (m, 2H), 7.27 (m, 2H), 7.16 (m, 2H), 6.99 (t, J=3.4 Hz, 1H), 6.63 (d, J=3.3 Hz, 1H), 2.52 (m, 2H), 1.33 (dd, J=9.6 and 7.0, 6H), 1.12 (dd, J=10.3 and 7.1 Hz, 6H). $^{31}P\{^{1}H\}$ NMR ($CD_2Cl_2$): δ 30.9.

Compound 16a

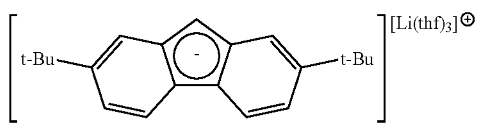

To a THE solution (50 mL) of 2,7-di-tert-butylfluorene (7.94 g, 28.5 mmol) was added a solution of n-BuLi (18.7 mL, 29.9 mmol, 1.6 M in hexanes) dropwise at ambient temperature resulting in a bright orange coloration, a moderate exotherm, and effervescence. After stirring at ambient temperature overnight, the bright orange solution was concentrated to dryness under vacuum affording a bright yellow powder. Recrystallization from toluene and heptane, followed by isolation and drying under vacuum, afforded the desired product as a bright yellow crystalline solid. Yield: 12.4 g, 87% yield. $^{1}H$ NMR (toluene-$d_8$): δ 8.19 (d, J=8.4 Hz, 2H), 7.71 (s, 2H), 7.02 (m, 2H), 6.14 (s, 1H), 2.96 (m, 12H, THF), 1.53 (s, 18H), 1.25 (m, 12H, THF).

Complex 16

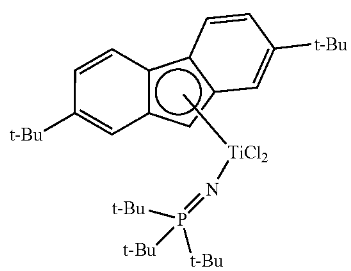

To a THE suspension (30 mL) of $t\text{-}Bu_3PNTiCl_3$ (1.853 g, 5.00 mmol) was added a toluene solution (20 mL) of Compound 16a (2.50 g, 5.00 mmol) resulting in an instant colour change from yellow to dark red coloration, the dissolution of the yellow suspended $t\text{-}Bu_3PNTiCl_3$, and the formation of a new precipitate. After stirring at ambient temperature for 2 hours, the reaction mixture was concentrated to dryness under vacuum. The residue was slurried in a portion of pentane and evaporated again to afford a dark red-violet powder. The residue was extracted into $CH_2Cl_2$ and filtered, the filtrate concentrated to saturation, layered with pentane, and cooled to −35° C. overnight to afford the desired product as a dark red-violet crystalline solid. Concentration of the liquors afforded further crops of the product. Combined yield: 2.31 g, 75% yield. $^{1}H$ NMR ($CDCl_3$) δ 7.85 (d, J=8.5 Hz, 2H), 7.53 (m, 2H), 7.44 (dd, J=8.5 and 1.8 Hz, 2H), 6.64 (s, 1H), 1.40 (d, J=14.0 Hz, 27H), 1.36 (s, 18H). $^{31}P\{^{1}H\}$ NMR ($CDCl_3$) δ 49.3.

Complex 17

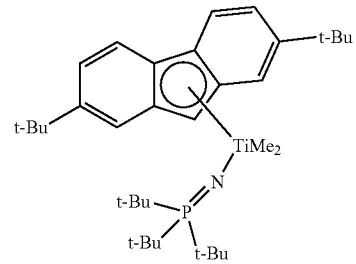

To a red-violet $Et_2O$ slurry (30 mL) of Compound 16b (1.07 g, 1.75 mmol) was added a solution of methylmagnesium bromide (1.28 mL, 3.85 mmol, 3.0 M in $Et_2O$) which resulted in the dissolution of the suspended material and the formation of a bright yellow suspension. After stirring at ambient temperature for 15 minutes the reaction mixture was concentrated to dryness under vacuum. The yellow solid residue was extracted with portions of pentane and filtered through a pad of Celite to afford a yellow filtrate. The filter cake was rinsed with pentane until extracts ran colorless. Concentration of the combined pentane filtrate afforded the desired product as a yellow powder. Yield: 0.68 g, 68% yield. $^{1}H$ NMR (toluene-$d_8$) δ 8.12 (d, J=8.7 Hz, 2H), 7.42 (dd, J 8.7 and 1.7 Hz, 2H), 7.36 (m, 2H), 6.04 (s, 1H), 1.37 (s, 18H), 1.23 (d, J=12.9 Hz, 27H), −0.46 (s, 6H). $^{31}P\{^{1}H\}$ NMR (toluene-$d_8$) δ 31.3.

Solution Phase Polymerization: Continuous Ethylene/1-Octene Copolymerization

Solution phase polymerizations were conducted on a continuous polymerization unit (CPU) using cyclohexane as the solvent and a stirred 70 mL reactor operated between 140° C. and 240° C. An upstream mixing reactor having a 20 mL volume was operated at 5° C. lower than the polymerization reactor. The mixing reactor was used to pre-heat the ethylene, octene, and make-up solvent streams. Catalyst feeds such as an ortho-xylene or cyclohexane solutions of the organometallic complex (the pre-polymerization catalyst); the boron-based catalyst activator, $(Ph_3C)[B(C_6F_5)_4]$ (TB) or [(hydrogenated tallow alkyl)$_2$(Me)NH]$[B(C_6F_5)_4]$ (AB); the aluminum-based co-catalyst, $Et_3Al$ (TEAL), $i\text{-}Bu_3Al$ (TIBAL), $Et_2AlOEt$ (DEAL-E), or alkylaluminoxane (MMAO-7); the hindered phenol modifier, 2,6-di-tert-butyl-4-ethylphenol (BHEB); and additional make-up cyclohexane solvent flow were either combined in-line as desired or added directly to the reactor in a continuous process. In certain experiments, defined as 'in-reactor' under Borate Addition Method in the Tables, the solution of boron-based activator was added directly to the reactor and separated from the other catalyst components. In certain experiments, defined as 'in-line' under Borate Addition Method in the Tables, the solution of boron-based activator was combined in-line with the solution of pre-polymerization catalyst and the combined flow either added directly to the reactor or combined with the flow (or combined flows) of aluminum-based co-catalyst and BHEB (if used). In certain experiments, defined as 'in-line' under Aluminum Addition Method, the solution of pre-polymerization catalyst (or combined solution of pre-polymerization catalyst and boron-based activator) was combined in-line with the solution of aluminum-based co-catalyst and in these cases, the contact (or hold-up) time in the tubing prior to reaching the reactor was maintained at approximately 25 seconds by the addition or subtraction of cyclohexane make-up solvent flow. Otherwise, the solution of aluminum-based co-catalyst and BHEB (if used) was added directly to the reactor and separated from the solutions of pre-polymerization catalyst and boron-based co-catalyst (defined as 'in-reactor' under Aluminum Addition Method). In all experiments where BHEB was used, solutions of MMAO-7 and BHEB were combined upstream of the branch point for contact with other catalyst components which was upstream of the reactor. The total solution flow for all feeds into the reactor was maintained at 27 mL/min.

Ethylene/1-octene copolymers were made using 1-octene/ethylene weight ratios as stated in the Tables, or ethylene homopolymers were made by turning off the flow of 1-octene. The ethylene was fed at different rates depending on the reactor temperature: 2.10 g/min at 140° C., 2.70 g/min at 160° C., 3.50 g/min at 190° C., 3.80 g/min at 200° C., 4.10 g/min at 210° C., 4.48 g/min at 220° C., 4.77 g/min at 230° C., 4.93 g/min at 240° C., with the exception of polymerization run numbers (poly. run nos.) 63 and 64 where the ethylene flow rate at 220° C. was 4.30 g/min. The CPU system operated at a pressure of 10.5 MPa. The solvent, monomer, and comonomer streams were purified by purification trains before being fed to the reactor. The polymerization activity, $k_p$ (expressed in $mM^{-1} \cdot min^{-1}$), is defined as:

$$k_p = \left(\frac{Q}{100-Q}\right)\left(\frac{1}{[M]}\right)\left(\frac{1}{HUT}\right)$$

where Q is ethylene conversion (%) (measured using an online NIR detector), [M] is catalyst concentration in the reactor (M=Ti or Hf; concentration in mM), and HUT is hold up time in the reactor (a value of 2.6 min was used).

Copolymer samples were collected with a target of 90±1% ethylene conversion (Q) (except for polymerization run numbers 45 and 46, which had Q targets of 80 and 70%, respectively), dried in a vacuum oven, and then ground and homogenized prior to analysis. In cases where the 90% target was not able to be met due to low catalyst activity, no polymer sample was taken.

Copolymerization conditions are listed in Tables 5, 7, 9, and 11, and copolymerization results and copolymer properties are listed in Tables 6, 8, 10, and 12.

Additional conditions for the runs listed in Tables 5 and 6, Tables 7 and 8, and Tables 11 and 12: The boron-based activator was $(Ph_3C)[B(C_6F_5)_4]$ (TB) and the aluminum-based co-catalyst was MMAO-7. For the runs listed in Tables 11 and 12, the borate addition method was 'in-line' with either Complex 12 or 14, and the combined flow of aluminum-based co-catalyst and BHEB (if used) was fed direct to the reactor ('in-reactor')

Additional conditions for the runs listed in Tables 9 and 10: Pre-polymerization Complex 3 was used; the reaction temperature was 220° C.; the 1-octene/ethylene ratio was 0.30 wt/wt; the ethylene flow rate was 4.48 g/min; the borate addition method was 'in-line' with Complex 3, and the combined flow of aluminum-based co-catalyst and BHEB (if used) was fed direct to the reactor ('in-reactor'). Data from polymerization run numbers 38 and 39 are repeated in Tables 9 and 10 for the purpose of comparison.

TABLE 5

Continuous Ethylene/1-Octene Copolymerization Conditions - 140, 160, and 190° C. Experiments with Ti-based Catalysts

| Poly. Run No. | Catalyst Complex No. | Borate Addition Method | Aluminum Addition Method | Reactor Temp. (° C.) | Ethylene Flow (g/min) | B/Ti (molar ratio) | Al/Ti (molar ratio) | BHEB/Al (molar ratio) | 1-Octene/Ethylene Ratio (wt/wt) |
|---|---|---|---|---|---|---|---|---|---|
| 1 | Complex 1 | in-reactor | in-reactor | 140 | 2.10 | 1.2 | 40.0 | 0.5 | 0.15 |
| 2 | Complex 1 | in-reactor | in-reactor | 140 | 2.10 | 1.2 | 40.0 | 0.5 | 0.30 |
| 3 | Complex 1 | in-reactor | in-reactor | 140 | 2.10 | 1.2 | 40.0 | 0.5 | 0.50 |
| 4 | Complex 1 | in-reactor | in-reactor | 160 | 2.70 | 1.2 | 40.0 | 0.5 | 0.30 |
| 5 | Complex 1 | in-reactor | in-reactor | 190 | 3.50 | 1.2 | 40.0 | 0.5 | 0 |
| 6 | Complex 1 | in-reactor | in-reactor | 190 | 3.50 | 1.2 | 40.0 | 0.5 | 0.15 |
| 7 | Complex 1 | in-reactor | in-reactor | 190 | 3.50 | 1.2 | 40.0 | 0.5 | 0.30 |
| 8 | Complex 1 | in-reactor | in-reactor | 190 | 3.50 | 1.2 | 40.0 | 0.5 | 0.50 |
| 9 | Complex 1 | in-reactor | in-reactor | 190 | 3.50 | 1.2 | 40.0 | — | 0.30 |
| 10 | Complex 3 | in-line | — | 140 | 2.10 | 1.0 | — | — | 0.70 |
| 11 | Complex 3 | in-line | — | 160 | 2.70 | 1.0 | — | — | 0.15 |
| 12 | Complex 3 | in-line | — | 160 | 2.70 | 1.0 | — | — | 0.30 |
| 13 | Complex 3 | in-line | — | 160 | 2.70 | 1.0 | — | — | 0.50 |
| 14 | Complex 3 | in-line | in-reactor | 160 | 2.70 | 1.4 | 5.0 | 0.6 | 0.30 |
| 15 | Complex 3 | in-line | in-reactor | 160 | 2.70 | 1.4 | 5.0 | 0.6 | 0.50 |
| 16 | Complex 3 | in-line | in-reactor | 160 | 2.70 | 1.4 | 5.0 | 0.6 | 0.70 |
| 17 | Complex 3 | in-line | in-reactor | 190 | 3.50 | 1.4 | 5.0 | 0.6 | 0.15 |
| 18 | Complex 3 | in-line | in-reactor | 190 | 3.50 | 1.4 | 5.0 | 0.6 | 0.30 |
| 19 | Complex 3 | in-line | in-reactor | 190 | 3.50 | 1.4 | 5.0 | 0.6 | 0.50 |
| 20 | Complex 3 | in-line | in-reactor | 190 | 3.50 | 1.4 | 5.0 | — | 0.30 |
| 21 | Complex 3 | in-line | — | 190 | 3.50 | 1.4 | — | — | 0.30 |
| 22 | Complex 5 | in-line | in-reactor | 190 | 3.50 | 1.2 | 5.0 | 0.3 | 0.30 |
| 23 | Complex 7 | in-line | in-reactor | 190 | 3.50 | 1.8 | 5.0 | 0.3 | 0.30 |
| 24 | Complex 9 | in-line | in-reactor | 190 | 3.50 | 2.2 | 2.5 | 0.3 | 0.30 |
| 25 | Complex 10 | in-reactor | in-line | 160 | 2.70 | 1.2 | 15.1 | 0.7 | 0.30 |
| 26 | Complex 10 | in-reactor | in-line | 190 | 3.50 | 1.2 | 15.1 | 0.7 | 0.30 |
| 27 | Complex 15 | in-reactor | in-reactor | 140 | 2.10 | 1.2 | 80.0 | 0.3 | 0.15 |
| 28 | Complex 15 | in-reactor | in-reactor | 140 | 2.10 | 1.2 | 80.0 | 0.3 | 0.30 |
| 29 | Complex 15 | in-reactor | in-reactor | 140 | 2.10 | 1.2 | 80.0 | 0.3 | 0.50 |
| 30 | Complex 15 | in-reactor | in-reactor | 160 | 2.70 | 1.2 | 80.0 | 0.3 | 0.30 |
| 31 | Complex 15 | in-reactor | in-reactor | 190 | 3.50 | 1.2 | 80.0 | 0.3 | 0 |
| 32 | Complex 17 | in-line | in-reactor | 140 | 2.10 | 1.4 | 20.0 | 0.6 | 0.30 |

TABLE 5-continued

Continuous Ethylene/1-Octene Copolymerization Conditions - 140, 160, and 190° C. Experiments with Ti-based Catalysts

| Poly. Run No. | Catalyst Complex No. | Borate Addition Method | Aluminum Addition Method | Reactor Temp. (° C.) | Ethylene Flow (g/min) | B/Ti (molar ratio) | Al/Ti (molar ratio) | BHEB/Al (molar ratio) | 1-Octene/Ethylene Ratio (wt/wt) |
|---|---|---|---|---|---|---|---|---|---|
| 33 | Complex 17 | in-line | in-reactor | 160 | 2.70 | 1.4 | 20.0 | 0.6 | 0.30 |
| 34 | Complex 17 | in-line | in-reactor | 190 | 3.50 | 1.4 | 20.0 | 0.6 | 0.30 |

TABLE 6

Continuous Ethylene/1-Octene Copolymerization Results - 140, 160, and 190° C. Experiments with Ti-based Catalysts

| Poly. Run No. | [Ti] (μM) | Ethylene Conversion (Q %) | $k_p$ ($mM^{-1} \cdot min^{-1}$) | FTIR BrF (no./1000 C.) | FTIR BrF (Wt %) | GPC-RI $M_n$ | GPC-RI $M_w$ | GPC-RI $M_z$ | GPC-RI $M_w/M_n$ | GPC-IR4 $M_w$ |
|---|---|---|---|---|---|---|---|---|---|---|
| 1 | 4.07 | 90.31 | 879 | 10.3 | 7.8 | 38,268 | 69,476 | 114,276 | 1.82 | — |
| 2 | 4.07 | 89.33 | 791 | 17.6 | 12.7 | 29,633 | 52,924 | 82,602 | 1.79 | — |
| 3 | 4.44 | 89.22 | 716 | 27.0 | 18.6 | 23,173 | 42,525 | 68,416 | 1.84 | — |
| 4 | 6.67 | 90.62 | 557 | 17.5 | 12.6 | 19,976 | 36,126 | 55,617 | 1.81 | — |
| 5 | 7.41 | 90.61 | 501 | 0.8 | 0.6 | 26,298 | 49,164 | 79,836 | 1.87 | — |
| 6 | 8.89 | 89.85 | 383 | 8.3 | 6.3 | 19,470 | 33,730 | 51,175 | 1.73 | — |
| 7 | 8.89 | 89.12 | 354 | 15.0 | 11.0 | 14,529 | 26,832 | 41,239 | 1.85 | — |
| 8 | 11.11 | 89.70 | 301 | 24.2 | 16.9 | 10,544 | 20,733 | 33,250 | 1.97 | — |
| 9 | 8.89 | 30.45 | 19 | No sample | — | — | — | — | — | — |
| 10 | 0.18 | 89.21 | 17,886 | 35.1 | 23.2 | 136,224 | 303,701 | 564,532 | 2.23 | 316,000 |
| 11 | 0.31 | 89.52 | 10,559 | 8.0 | 6.1 | 123,832 | 290,362 | 611,997 | 2.34 | 333,000 |
| 12 | 0.28 | 89.17 | 11,400 | 14.9 | 10.9 | 115,519 | 238,214 | 446,766 | 2.06 | 288,000 |
| 13 | 0.29 | 89.70 | 11,594 | 25.5 | 17.7 | 110,550 | 209,758 | 374,455 | 1.90 | 251,000 |
| 14 | 0.32 | 90.18 | 10,898 | 16.1 | 11.7 | 126,990 | 267,426 | 531,410 | 2.11 | — |
| 15 | 0.32 | 89.29 | 9,894 | 25.3 | 17.6 | 104,388 | 221,070 | 419,373 | 2.12 | — |
| 16 | 0.42 | 90.32 | 8,612 | 34.0 | 22.6 | 94,507 | 182,307 | 311,544 | 1.93 | — |
| 17 | 0.66 | 90.10 | 5,325 | 8.1 | 6.2 | 99,107 | 184,459 | 315,611 | 1.86 | — |
| 18 | 0.51 | 89.43 | 6,389 | 14.8 | 10.9 | 76,880 | 159,486 | 284,784 | 2.07 | — |
| 19 | 0.56 | 90.54 | 6,626 | 24.7 | 17.2 | 64,104 | 124,082 | 212,169 | 1.94 | — |
| 20 | 0.65 | 90.23 | 5,480 | 15.2 | 11.1 | 68,852 | 153,387 | 271,846 | 2.23 | — |
| 21 | 1.02 | 90.25 | 3,495 | 15.2 | 11.1 | 79,285 | 150,606 | 252,230 | 1.90 | — |
| 22 | 2.78 | 89.94 | 1,237 | 14.7 | 10.8 | 84,298 | 167,656 | 287,725 | 1.99 | — |
| 23 | 2.22 | 90.45 | 1,639 | 15.3 | 11.2 | 68,078 | 149,419 | 254,143 | 2.19 | — |
| 24 | 2.78 | 90.39 | 1,302 | 14.4 | 10.6 | 72,998 | 154,252 | 289,841 | 2.11 | — |
| 25 | 3.89 | 90.66 | 960 | 16.5 | 12.0 | 142,292 | 286,569 | 563,942 | 2.01 | — |
| 26 | 3.78 | 89.84 | 900 | 16.1 | 11.8 | 80,504 | 172,886 | 348,126 | 2.15 | — |
| 27 | 8.15 | 89.70 | 411 | 4.5 | 3.5 | 65,711 | 113,092 | 173,113 | 1.72 | — |
| 28 | 11.85 | 90.70 | 316 | 9.7 | 7.3 | 50,143 | 86,725 | 131,790 | 1.73 | — |
| 29 | 11.85 | 90.20 | 299 | 13.4 | 9.9 | 42,633 | 73,807 | 113,606 | 1.73 | — |
| 30 | 25.19 | 89.50 | 131 | 8.0 | 6.1 | 45,942 | 82,671 | 129,269 | 1.80 | — |
| 31 | 14.81 | 79.06 | 98 | No sample | — | — | — | — | — | — |
| 32 | 12.96 | 60.82 | 46 | No sample | — | — | — | — | — | — |
| 33 | 12.96 | 56.00 | 38 | No sample | — | — | — | — | — | — |
| 34 | 11.11 | 37.00 | 20 | No sample | — | — | — | — | — | — |

A catalyst derived from Complex 1 which is linked through the 1,2-phenylene to the 2-indenyl moiety has higher copolymerization activities and higher 1-octene comonomer incorporation efficiency than a catalyst derived from unbridged Complex 15 which is not linked through the P-phenyl and the indenyl moiety (compare polymerization runs 1 through 3 to runs 27 through 29, respectively, and run 4 to run 30). Catalyst derived from Complex 1 is also active at 190° C. and can achieve the 90% ethylene conversion target (see polymerization runs 5 to 8), while catalyst derived from Complex 15 was much less active at 190° C. and unable to achieve the conversion target, even at high catalyst concentration (compare polymerization run 5 to run 31). The Al/Ti ratio that led to the highest activity for the catalyst derived from unbridged Complex 15 was found to be Al/Ti=80, which is higher than the optimal Al/Ti ratios found for other catalysts of the present disclosure, like those derived from Complexes 1, 3, 5, 7, and 9.

A catalyst composition derived from Complex 1 was not competent when the hindered phenol modifier BHEB was removed (compare polymerization run 9 to run 8). Without being bound by theory, it is speculated that the 2-indenyl substituent in Complex 1 does not offer enough steric protection to the active site and makes the catalyst susceptible to attack by Lewis acidic species in the un-modified MMAO-7 leading to catalyst deactivation. This deficiency is addressed in the design of other Complexes, such as Complexes 3, 5, 7, and 9, which have sterically bulkier i-coordinated cyclopentadienyl substituents and exhibit robustness towards a range of aluminum-based co-catalysts.

Complex 1 and Complex 15, bearing chloride activatable ligands, required alkylaluminoxane co-catalyst to form active catalyst compositions, but Complex 3, which has dimethyl activatable ligands, can be run without an alkylaluminoxane co-catalyst (or other moisture scavenging compounds) and surprisingly achieves very high activity (for example, compare polymerization run 10 to runs 1 through 3; runs 11 through 13 to run 4; and run 21 to run 7). Despite being run without an aluminum-based co-catalyst (scavenger), the polydispersities ($M_w/M_n$) of copolymers from runs 10 through 13 and run 21 are ~2, suggesting that the catalyst is robust towards impurities and behaves as a single-site catalyst. Complex 3 is nevertheless compatible with an alkylaluminoxane co-catalyst, which is desirable for commercial application as reactor feeds in a commercial polymerization reactor may contain varying levels of impurities (for example, compare polymerization run 14 to run 12).

Surprisingly, catalysts derived from Complex 3 are capable of high activity, high 1-octene incorporation, and high copolymer molecular weight when activated with a boron-based activator, such as TB, and optionally in the presence of an aluminum-based co-catalyst, such as MMAO-7, and optionally a hindered phenol modifier, such as BHEB (compare polymerization runs 10 through 21 to other runs in the table). Those skilled in the art will recognize the potential of Complex 3 for use as a catalyst to produce high molecular weight copolymers with high efficiency at high temperatures. Catalysts derived from Complex 3 maintain high activity, high molecular weight capability, and narrow polydispersity (indicative of single-site behaviour) at 190° C. even in the absence of BHEB or both MMAO-7 and BHEB (compare polymerization runs 20 and 21 to run 18), although the highest activity is obtained with all four catalyst components (see run 18). Additionally, it was found that relatively low ratios of Al/Ti (e.g., Al/Ti=5) were required to achieve the maximum polymerization activities for catalyst compositions derived from Complex 3 (see polymerization runs 14 through 19, for example).

Pre-polymerization catalyst complexes with different alkyl substitution (e.g., cyclohexyl) at the phosphinimine P atom (Complex 5, run 22), or with a different i-coordinated cyclopentadienyl-type ligand such as an indeno[1,2-b]indolyl moiety (Complex 7, run 23), or with a 3-atom bridge between the phosphinimine P atom and the η-coordinated fluorenyl ligand (Complex 9, run 24) also lead to catalysts with high activity and high copolymer molecular weight capability at high temperature (190° C.).

Complex 10, with the ligand precursor bound to $TiCl_3$ through the phosphinimine N only, surprisingly leads to active catalysts when activated with TB, MMAO-7, and BHEB (see polymerization runs 25 and 26) and have similar 1-octene comonomer incorporation and copolymer MW capability to catalysts derived from Complex 3 (compare run 25 with runs 12 and 14 and compare run 26 with run 18). Without wishing to be bound by theory, the above observation is strongly suggestive that catalysts derived from Complex 10 and Complex 3 lead to similar active species in the reactor when activated by TB, MMAO-7, and BHEB, albeit with lower activity for catalysts derived from Complex 10 due to the additional steps (e.g., alkylation at Ti, and alkane elimination to form a η-coordinated fluorenyl) that must occur in situ prior to a forming an active catalytic species.

As discussed above for Complex 15 compared to Complex 1, unbridged complexes bearing phosphinimine and η-coordinated ancillary ligands similar to those structural moieties in the bridged Complexes, lead to poorer performing catalysts. For example, a catalyst derived from Complex 17, which has phosphinimine and fluorenyl ancillary ligands that are not linked or bridged, was not able to reach the target of 90% ethylene conversion at 140, 160, or 190° C., even at high catalyst concentrations in the reactor when activated in a similar way to the related bridged phosphinimine/fluorenyl system Complex 3 (see polymerization runs 32 through 34).

Attempts to synthesize an unbridged complex with ligand fragments like those of Complex 3 (i.e., with diisopropylphenylphosphinimine and η-coordinated 2,7-di-tert-butylfluorenyl ancillary ligands), were unsuccessful. This observation highlights another advantage of the bridged ligand design that enables a range of different bridged phosphinimine/η-coordinated cyclopentadienyl complexes to be synthesized.

TABLE 7

Continuous Ethylene/1-Octene Copolymerization Conditions - 200 to 240° C. Experiments with Ti-based Catalysts

| Poly. Run No. | Catalyst Complex No. | Borate Addition Method | Aluminum Addition Method | Reactor Temp. (° C.) | Ethylene Flow (g/min) | B/Ti (molar ratio) | A1/Ti (molar ratio) | BHEB/ A1 (molar ratio) | 1-Octene/ Ethylene Ratio (wt/wt) |
|---|---|---|---|---|---|---|---|---|---|
| 35 | Complex 3 | in-line | in-reactor | 200 | 3.80 | 1.4 | 5.0 | 0.6 | 0.30 |
| 36 | Complex 3 | in-line | in-reactor | 210 | 4.10 | 1.4 | 5.1 | 0.6 | 0.30 |
| 37 | Complex 3 | in-line | in-reactor | 220 | 4.48 | 1.4 | 5.0 | 0.6 | 0 |
| 38 | Complex 3 | in-line | in-reactor | 220 | 4.48 | 1.4 | 5.0 | 0.6 | 0.30 |
| 39 | Complex 3 | in-line | in-reactor | 220 | 4.48 | 1.4 | 5.0 | — | 0.30 |
| 40 | Complex 3 | in-line | — | 220 | 4.48 | 1.4 | — | — | 0.30 |
| 41 | Complex 3 | in-line | — | 220 | 4.48 | 1.0 | — | — | 0 |
| 42 | Complex 3 | in-line | — | 220 | 4.48 | 1.0 | — | — | 0.15 |
| 43 | Complex 3 | in-line | — | 220 | 4.48 | 1.0 | — | — | 0.30 |
| 44 | Complex 3 | in-line | — | 220 | 4.48 | 1.0 | — | — | 0.50 |
| 45 | Complex 3 | in-line | — | 220 | 4.48 | 1.0 | — | — | 0.30 |
| 46 | Complex 3 | in-line | — | 220 | 4.48 | 1.0 | — | — | 0.30 |
| 47 | Complex 3 | in-line | — | 230 | 4.77 | 1.0 | — | — | 0.30 |
| 48 | Complex 3 | in-line | — | 230 | 4.77 | 1.0 | — | — | 0 |
| 49 | Complex 3 | in-line | — | 240 | 4.93 | 1.0 | — | — | 0.30 |
| 50 | Complex 3 | in-line | — | 240 | 4.93 | 1.0 | — | — | 0 |
| 51 | Complex 5 | in-line | in-reactor | 220 | 4.48 | 1.2 | 5.0 | 0.3 | 0.30 |
| 52 | Complex 5 | in-line | in-reactor | 220 | 4.48 | 1.2 | 5.0 | — | 0.30 |
| 53 | Complex 5 | in-line | in-reactor | 230 | 4.77 | 1.2 | 5.0 | 0.3 | 0.30 |
| 54 | Complex 5 | in-line | in-reactor | 240 | 4.93 | 1.2 | 5.0 | 0.3 | 0.30 |
| 55 | Complex 7 | in-line | in-reactor | 220 | 4.48 | 1.8 | 5.0 | 0.3 | 0.30 |

TABLE 7-continued

Continuous Ethylene/1-Octene Copolymerization Conditions - 200 to 240° C. Experiments with Ti-based Catalysts

| Poly. Run No. | Catalyst Complex No. | Borate Addition Method | Aluminum Addition Method | Reactor Temp. (° C.) | Ethylene Flow (g/min) | B/Ti (molar ratio) | A1/Ti (molar ratio) | BHEB/ A1 (molar ratio) | 1-Octene/ Ethylene Ratio (wt/wt) |
|---|---|---|---|---|---|---|---|---|---|
| 56 | Complex 7 | in-line | in-reactor | 220 | 4.48 | 1.8 | 5.0 | — | 0.30 |
| 57 | Complex 7 | in-line | in-reactor | 230 | 4.77 | 1.4 | 10.0 | 0.6 | 0.30 |
| 58 | Complex 7 | in-line | in-reactor | 240 | 4.93 | 1.4 | 10.0 | 0.6 | 0.30 |
| 59 | Complex 9 | in-line | in-reactor | 220 | 4.48 | 2.2 | 2.5 | 0.3 | 0.30 |
| 60 | Complex 9 | in-line | in-reactor | 220 | 4.48 | 2.2 | 2.5 | — | 0.30 |
| 61 | Complex 9 | in-line | in-reactor | 230 | 4.77 | 1.4 | 10.0 | 0.6 | 0.30 |
| 62 | Complex 9 | in-line | in-reactor | 240 | 4.93 | 1.4 | 10.0 | 0.6 | 0.30 |
| 63 | Complex 10 | in-reactor | in-line | 220 | 4.30 | 1.2 | 15.0 | 0.7 | 0.30 |
| 64 | Complex 10 | in-line | in-line | 220 | 4.30 | 1.8 | 30.0 | 0.7 | 0.30 |

TABLE 8

Continuous Ethylene/1-Octene Copolymerization Results - 200 to 240° C. Experiments with Ti-based Catalysts

| Poly. Run No. | [Ti] (μM) | Ethylene Conversion (Q %) | $k_p$ ($mM^{-1} \cdot min^{-1}$) | FTIR BrF (no./1000 C.) | FTIR BrF (Wt %) | GPC-RI $M_n$ | GPC-RI $M_w$ | GPC-RI $M_z$ | GPC-RI $M_w/M_n$ | GPC-IR4 $M_w$ |
|---|---|---|---|---|---|---|---|---|---|---|
| 35 | 0.69 | 89.85 | 4,903 | 14.9 | 10.9 | 73,109 | 133,680 | 221,215 | 1.83 | — |
| 36 | 1.17 | 90.66 | 3,200 | 16.0 | 11.7 | 54,527 | 106,641 | 180,321 | 1.96 | — |
| 37 | 4.44 | 89.65 | 750 | 2.3 | 1.8 | 76,284 | 160,031 | 293,188 | 2.10 | — |
| 38 | 1.89 | 90.81 | 2,012 | 16.0 | 11.7 | 46,188 | 88,020 | 142,871 | 1.91 | — |
| 39 | 2.04 | 90.26 | 1,750 | 16.2 | 11.8 | 44,281 | 88,871 | 148,780 | 2.01 | — |
| 40 | 2.85 | 90.66 | 1,309 | 16.3 | 11.8 | 43,818 | 86,090 | 145,237 | 1.96 | — |
| 41 | 5.56 | 89.18 | 570 | 2.3 | 1.8 | 38,006 | 105,012 | 234,875 | 2.76 | 158,000 |
| 42 | 2.78 | 90.34 | 1,295 | 9.3 | 7.0 | 51,366 | 108,284 | 188,105 | 2.11 | 111,000 |
| 43 | 2.78 | 90.70 | 1,350 | 16.2 | 11.8 | 43,994 | 85,585 | 148,703 | 1.95 | 84,100 |
| 44 | 2.78 | 90.70 | 1,350 | 25.0 | 17.4 | 34,655 | 66,799 | 111,078 | 1.93 | 66,800 |
| 45 | 1.11 | 79.55 | 1,346 | 11.4 | 8.6 | 73,652 | 138,068 | 231,322 | 1.87 | 138,000 |
| 46 | 0.94 | 69.70 | 936 | 9.2 | 6.9 | 90,676 | 177,129 | 313,907 | 1.95 | 181,000 |
| 47 | 5.00 | 90.29 | 715 | 17.1 | 12.4 | 33,578 | 65,042 | 106,555 | 1.94 | 64,200 |
| 48 | 13.89 | 91.00 | 280 | 3.3 | 2.6 | 65,538 | 124,396 | 210,403 | 1.90 | 126,000 |
| 49 | 8.89 | 89.40 | 365 | 16.7 | 12.1 | 29,216 | 56,004 | 91,070 | 1.92 | 55,500 |
| 50 | 16.67 | 89.75 | 202 | 3.7 | 2.9 | 57,867 | 114,256 | 204,789 | 1.97 | 111,000 |
| 51 | 4.81 | 90.31 | 745 | 16.4 | 11.9 | 46,915 | 88,416 | 144,394 | 1.88 | — |
| 52 | 7.22 | 90.42 | 503 | 16.5 | 12.0 | 48,235 | 90,659 | 149,739 | 1.88 | — |
| 53 | 7.59 | 90.37 | 476 | 16.6 | 12.1 | 35,017 | 66,985 | 106,864 | 1.91 | — |
| 54 | 9.81 | 89.68 | 341 | 16.2 | 11.8 | 30,019 | 57,695 | 93,065 | 1.92 | — |
| 55 | 3.91 | 89.95 | 880 | 15.4 | 11.3 | 32,270 | 84,625 | 145,511 | 2.62 | — |
| 56 | 3.47 | 89.83 | 980 | 15.3 | 11.2 | 35,795 | 86,120 | 147,141 | 2.41 | — |
| 57 | 9.11 | 90.35 | 395 | 15.7 | 11.5 | 32,637 | 70,500 | 116,013 | 2.16 | — |
| 58 | 10.44 | 90.22 | 340 | 15.3 | 11.2 | 26,345 | 59,060 | 96,942 | 2.24 | — |
| 59 | 8.56 | 90.17 | 413 | 13.8 | 10.2 | 38,371 | 83,499 | 139,460 | 2.18 | — |
| 60 | 8.56 | 90.50 | 428 | 14.1 | 10.4 | 36,763 | 83,420 | 141,385 | 2.27 | — |
| 61 | 17.22 | 89.73 | 195 | 15.1 | 11.1 | 33,714 | 70,400 | 115,213 | 2.09 | — |
| 62 | 29.44 | 90.18 | 120 | 15.9 | 11.6 | 25,836 | 55,090 | 91,797 | 2.13 | — |
| 63 | 6.22 | 89.10 | 506 | 15.4 | 11.3 | 40,173 | 86,095 | 149,625 | 2.14 | — |
| 64 | 2.37 | 90.08 | 1,478 | n.d. | — | — | — | — | — | — |

At reactor temperatures ranging from 200 up to 240° C. catalysts derived from Complexes 3, 5, 7, and 9 are capable of moderate to high activity, high 1-octene incorporation, and high copolymer molecular weight when activated with a boron-based activator, such as TB, and optionally in the presence of an aluminum-based co-catalyst, such as MMAO-7, and optionally a hindered phenol modifier, such as BHEB (see polymerization runs 35 through 62). Surprisingly, catalysts derived from Complexes 3, 5, 7, and 9 maintain useful performance attributes (e.g., high 1-octene incorporation efficiency with high (co-)polymer molecular weight capability) and single-site behaviour (i.e., producing polymers with narrow polydispersities of $M_w/M_n$~2 in most cases and $M_w/M_n$<3 in all cases) up to at least 240° C. (see polymerization runs 49, 54, 58, and 62), even in the absence of MMAO and/or BHEB (see, for example, polymerization runs 49 and 50).

Polymerization runs 45 and 46 using a catalyst derived from Complex 3 were run with ethylene conversion (Q) targets of 80 and 70%, respectively, and show the responsiveness of the catalyst towards varying ethylene concentration for the purpose of modulating 1-octene comonomer incorporation and copolymer molecular weight (compare runs 45 and 46 to run 43 with Q=90%).

Similar to the observations at lower temperature, at a reactor temperature of 220° C. a catalyst derived from the phosphinimine-coordinated Complex 10 produces copolymer with similar 1-octene incorporation and copolymer molecular weight to the catalyst derived from Complex 3, strongly suggesting that they produce similar catalytic species in the reactor (compare polymerization run 63 to run 38). Furthermore, the activity of a catalyst derived from Complex 10 was improved significantly by changing catalyst ratios and by changing the order of addition of catalyst components (compare run 64 to run 63).

Generally, a higher reaction temperature leads to a higher rate of catalyst deactivation, reducing catalyst activity. However higher reaction temperature may be desirable because it leads to energy savings. For example, a higher reaction temperature reduces the energy input needed to heat the solution in downstream distillation steps. In this regard, catalysts derived from Complexes 3, 5, 7, 9, and 10 provide remarkable high temperature performance. For example, catalysts derived from Complex 3 provide high polymerization activity, high comonomer incorporation and high molecular weight at temperatures exceeding 190° C. Further, the examples show that Complex 3 performs well in the presence or absence of an alkylaluminoxane cocatalyst and when present has the potential to maintain activity even in the absence of a hindered phenol modifier.

TABLE 9

Continuous Ethylene/1-Octene Copolymerization Conditions –220° C. Experiments with Complex 3

| Poly. Run No. | Borate Activator | Aluminum Co-Catalyst | B/Ti (molar ratio) | Al/Ti (molar ratio) | BHEB/A1 (molar ratio) |
|---|---|---|---|---|---|
| 65 | TB | TEAL | 1.4 | 5.0 | 0.3 |
| 66 | TB | TEAL | 1.4 | 5.0 | — |
| 66 | TB | TIBAL | 1.4 | 5.0 | 0.3 |
| 67 | TB | TIBAL | 1.4 | 5.0 | — |
| 38 (Table 7) | TB | MMAO | 1.4 | 5.0 | 0.6 |
| 39 (Table 7) | TB | MMAO | 1.4 | 5.0 | — |
| 68 | TB | DEAL-E | 1.4 | 10.0 | 0.3 |
| 69 | TB | DEAL-E | 1.4 | 10.0 | — |
| 70 | AB | MMAO | 1.8 | 5.0 | 0.3 |
| 71 | AB | MMAO | 1.8 | 5.0 | — |
| 72 | AB | DEAL-E | 1.8 | 20.0 | 0.3 |
| 73 | AB | DEAL-E | 1.8 | 20.0 | — |

TABLE 10

Continuous Ethylene/1-Octene Copolymerization Results - 220° C. Experiments with Complex 3

| Poly. Run No. | [Ti] (μM) | Ethylene Conversion (Q %) | $k_p$ ($mM^{-1} \cdot min^{-1}$) | FTIR BrF (no./1000 C.) | FTIR BrF (Wt %) | GPC-RI $M_n$ | GPC-RI $M_w$ | GPC-RI $M_z$ | GPC-RI $M_w/M_n$ |
|---|---|---|---|---|---|---|---|---|---|
| 64 | 5.56 | 90.22 | 638 | 17.6 | 12.7 | 44,298 | 88,286 | 143,009 | 1.99 |
| 65 | 8.89 | 90.43 | 409 | 16.6 | 12.1 | 48,002 | 90,198 | 143,542 | 1.88 |
| 66 | 4.86 | 89.87 | 702 | 15.7 | 11.5 | 54,477 | 96,945 | 155,065 | 1.78 |
| 67 | 6.67 | 90.30 | 537 | 16.2 | 11.8 | 43,911 | 92,627 | 158,276 | 2.11 |
| 38 (Table 8) | 1.89 | 90.81 | 2,012 | 16.0 | 11.7 | 46,188 | 88,020 | 142,871 | 1.91 |
| 39 (Table 8) | 2.04 | 90.26 | 1,750 | 16.2 | 11.8 | 44,281 | 88,871 | 148,780 | 2.01 |
| 68 | 2.28 | 90.10 | 1,537 | 15.3 | 11.2 | 46,313 | 94,065 | 163,293 | 2.03 |
| 69 | 2.36 | 90.29 | 1,515 | 15.6 | 11.4 | 43,161 | 89,204 | 154,083 | 2.07 |
| 70 | 1.89 | 90.20 | 1,874 | 15.7 | 11.5 | 40,992 | 87,428 | 145,977 | 2.13 |
| 71 | 1.89 | 90.18 | 1,870 | 15.7 | 11.5 | 48,826 | 92,529 | 153,824 | 1.90 |
| 72 | 1.81 | 89.81 | 1,878 | 15.4 | 11.3 | 53,455 | 107,226 | 180,456 | 2.01 |
| 73 | 1.81 | 90.06 | 1,930 | 15.6 | 11.4 | 51,768 | 105,002 | 179,728 | 2.03 |

Complex 3 can be activated with trityl (TB) or ammonium (AB) borate activators and in the presence of a range of aluminum-based co-catalysts and optionally the hindered phenol BHEB to produce similarly performing catalysts (1-octene incorporation and MW performance) while maintaining single-site behaviour (narrow polydispersity) at high reactor temperature (220° C.). The highest activities were obtained using either TB or AB activator with either MMAO or DEAL-E scavenger and optionally BHEB (see polymerization runs 38 and 39 and runs 68 through 73).

TABLE 11

Continuous Ethylene/1-Octene Copolymerization Conditions - 140, 160, and 190° C. Experiments with Hf-based Catalysts

| Poly. Run No. | Catalyst Complex No. | Reactor Temp. (° C.) | Ethylene Flow (g/min) | B/Hf (molar ratio) | A1/Hf (molar ratio) | BHEB/ A1 (molar ratio) | 1-Octen / Ethylene Ratio (wt/wt) |
|---|---|---|---|---|---|---|---|
| 74 | Complex 12 | 140 | 2.10 | 0.8 | — | — | 0 |
| 75 | Complex 12 | 140 | 2.10 | 0.8 | — | — | 0.30 |
| 76 | Complex 12 | 140 | 2.10 | 1.4 | — | — | 0.30 |
| 77 | Complex 12 | 140 | 2.10 | 1.4 | 20.0 | 0.6 | 0.30 |
| 78 | Complex 12 | 160 | 2.70 | 0.8 | — | — | 0 |
| 79 | Complex 12 | 160 | 2.70 | 0.8 | — | — | 0.30 |
| 80 | Complex 12 | 160 | 2.70 | 0.8 | 20.0 | 0.6 | 0.30 |
| 81 | Complex 12 | 190 | 3.50 | 1.4 | — | — | 0 |
| 82 | Complex 12 | 190 | 3.50 | 1.4 | — | — | 0.30 |
| 83 | Complex 14 | 160 | 2.70 | 1.6 | — | — | 0 |
| 84 | Complex 14 | 160 | 2.70 | 1.6 | — | — | 0.30 |
| 85 | Complex 14 | 190 | 3.50 | 1.4 | — | — | 0 |
| 86 | Complex 14 | 190 | 3.50 | 1.4 | — | — | 0.30 |

TABLE 12

Continuous Ethylene/1-Octene Copolymerization Results - 140, 160, and 190° C. Experiments with Hf-based Catalysts

| Poly. Run No. | [Ti] (μM) | Ethylene Conversion (Q %) | $k_p$ ($mM^{-1} \cdot min^{-1}$) | FTIR BrF (no./1000 C.) | FTIR BrF (Wt %) | GPC-RI $M_n$ | GPC-RI $M_w$ | GPC-RI $M_z$ | GPC-RI $M_w/M_n$ |
|---|---|---|---|---|---|---|---|---|---|
| 74 | 1.67 | 89.87 | 2,047 | — | — | 2,456 | 5,908 | 9,833 | 2.41 |
| 75 | 2.33 | 90.10 | 1,500 | — | — | 1,412 | 3,269 | 5,404 | 2.32 |
| 76 | 12.96 | 96.23 | 758 | No sample | — | — | — | — | — |
| 77 | 12.96 | 30.96 | 13 | No sample | — | — | — | — | — |
| 78 | 1.56 | 90.38 | 2,323 | — | — | 2,709 | 6,552 | 11,473 | 2.42 |
| 79 | 2.04 | 90.80 | 1,864 | 24.8 | 17.3 | 1,597 | 3,550 | 5,944 | 2.22 |
| 80 | 12.96 | 27.12 | 11 | No sample | — | — | — | — | — |
| 81 | 2.48 | 89.76 | 1,359 | — | — | 3,211 | 6,335 | 10,273 | 1.97 |
| 82 | 3.15 | 90.34 | 1,143 | 27.6 | 18.9 | 814 | 1,917 | 3,926 | 2.36 |
| 83 | 0.63 | 90.38 | 5,738 | — | — | 2,925 | 7,001 | 11,750 | 2.39 |
| 84 | 0.96 | 90.73 | 3,909 | 22.5 | 15.8 | 2,322 | 4,353 | 6,638 | 1.87 |
| 85 | 0.87 | 90.20 | 4,067 | — | — | 919 | 3,936 | 10,459 | 4.28 |
| 86 | 1.15 | 90.13 | 3,059 | 23.7 | 16.6 | 1,379 | 3,425 | 6,333 | 2.48 |

Catalysts derived from hafnium-based Complexes 12 and 14 and boron-based activator TB have moderate to high activities for ethylene homopolymerization or ethylene/1-octene copolymerization at reactor temperatures up to at least 190° C. In contrast to catalyst compositions derived from the Ti-based Complexes 3, 5, 7, and 9, the catalyst compositions derived from Complexes 12 and 14 are sensitive to the presence of the MMAO/BHEB co-catalyst and are strongly deactivated (compare polymerization run 77 to run 76 and compare run 80 to run 79).

Catalysts derived from hafnium-based Complexes 12 and 14 produce low molecular weight homopolymers or copolymers with high content of 1-octene. Low molecular weight polyethylene products have commercial applications as, for example, pigment dispersing agents for plastics, and as additives for molding processes or for hot melt adhesives.

Non-limiting embodiments of the present disclosure include the following:

Embodiment 1. An organometallic complex represented by formula I:

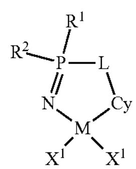

(I)

wherein

M is Ti, Zr or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si$(R^a)_3$; a germanyl group of the formula —Ge$(R^a)_3$; and a phosphinimine group of the formula —N═P$(R^b)(R^c)(R^d)$; wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

each $X^1$ is an activatable ligand;

Cy is a cyclopentadienyl-type ligand covalently bound to L and coordinated to M via η-bonding; and L is a bridging group containing a contiguous chain of atoms connecting P with Cy, wherein the contiguous chain contains 2 or 3 atoms.

Embodiment 2. The organometallic complex according to Embodiment 1 which is represented by formula II:

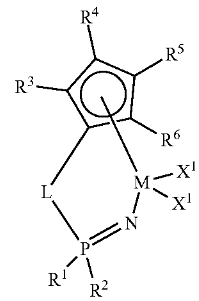

(II)

wherein M, $R^1$, $R^2$, L and $X^1$ are as defined for formula I;

wherein $R^3$, $R^4$, $R^5$ and $R^6$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group, —PR'$_2$;

a thiolate group, —SR';

a silyl group of the formula —Si$(R^a)_3$; and a germanyl group of the formula —Ge$(R^a)_3$;

wherein two adjacent groups of $R^3$, $R^4$, $R^5$ and $R^6$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si$(R^a)_3$, and a germanyl group of the formula —Ge$(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 3. The organometallic complex according to Embodiment 2 which is represented by formula III:

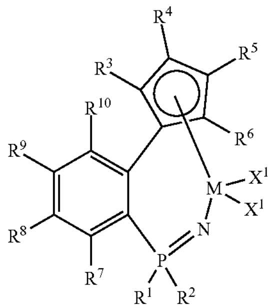

(III)

wherein M, $R^1$, $R^2$, $R^3$, $R^4$, $R^5$, $R^6$ and $X^1$ are as defined for formulas I and II;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, $—NR'_2$;

a phosphido group, $—PR'_2$;

a thiolate group. —SR;

a silyl group of the formula $—Si(R^a)_3$; and a germanyl group of the formula $—Ge(R^a)_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula $—NR'_2$, a phosphido group of the formula $—PR'_2$, a thiolate group of the formula —SR',a silyl group of the formula $—Si(R^a)_3$, and a germanyl group of the formula $—Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 4. The organometallic complex according to Embodiment 2 which is represented by formula IV:

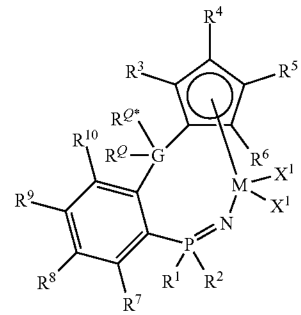

(IV)

wherein M, $R^1$, $R^2$, $R^3$, $R^4$, $R^5$, $R^6$ and $X^1$ are as defined for formulas I and II;

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula $—NR'_2$, a phosphido group of the formula $—PR'_2$, a thiolate group of the formula —SR', a silyl group of the formula $—Si(R^a)_3$, and a germanyl group of the formula $—Ge(R^a)_3$;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group, —PR'$_2$;

a thiolate group, —SR';

a silyl group of the formula —Si(R$^a$)$_3$; and a germanyl group of the formula —Ge(R$^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si(R$^a$)$_3$, and a germanyl group of the formula —Ge(R$^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 5. The organometallic complex according to Embodiment 1 which is represented by formula V:

(V)

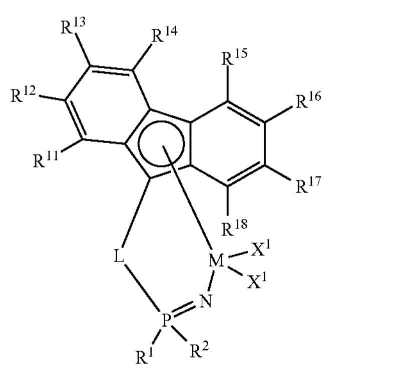

wherein M, $R^1$, $R^2$, L and $X^1$ are as defined for formula I;

wherein $R^{11}$, $R^{12}$, $R^{13}$, $R^{14}$, $R^{15}$, $R^{16}$, $R^{17}$, $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group, —PR'$_2$;

a thiolate group, —SR';

a silyl group of the formula —Si(R$^a$)$_3$; and a germanyl group of the formula —Ge(R$^a$)$_3$;

wherein two adjacent groups of $R^{11}$, $R^{12}$, $R^{13}$, $R^{14}$, $R^{15}$, $R^{16}$, $R^{17}$, $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si(R$^a$)$_3$, and a germanyl group of the formula —Ge(R$^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 6. The organometallic complex according to Embodiment 5 which is represented by formula VI:

(VI)

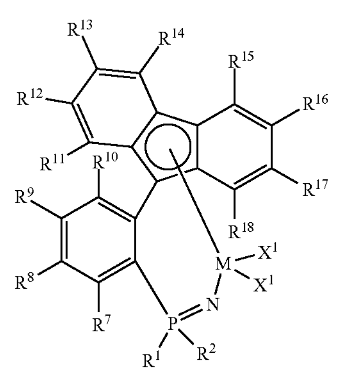

wherein M, $R^1$, $R^2$, $R^{11}$, $R^{12}$, $R^{13}$, $R^{14}$, $R^{15}$, $R^{16}$, $R^{17}$, $R^{18}$ and $X^1$ are as defined for formulas I and V;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 7. The organometallic complex according to Embodiment 6 wherein M is Ti.

Embodiment 8. The organometallic complex according to Embodiment 6 or 7, wherein $R^7$, $R^8$, $R^9$ and $R^{10}$ are each hydrogen.

Embodiment 9. The organometallic complex according to any one of Embodiments 6 to 8, wherein $R^1$ and $R^2$ are each independently an unsubstituted $C_{1-30}$ hydrocarbyl group.

Embodiment 10. The organometallic complex according to any one of Embodiments 6 to 9, wherein $R^1$ and $R^2$ are each independently selected from the group consisting of isopropyl, cyclohexyl and tert-butyl.

Embodiment 11. The organometallic complex according to any one of Embodiments 6 to 10, wherein $R^{12}$ and $R^{17}$ are each independently an unsubstituted $C_{1-30}$ hydrocarbyl group, and $R^{11}$, $R^{13}$, $R^{14}$, $R^{15}$, $R^{16}$ and $R^{18}$ are each hydrogen.

Embodiment 12. The organometallic complex according to any one of Embodiments 6 to 11, wherein $R^{12}$ and $R^{17}$ are each a tert-butyl group.

Embodiment 13. The organometallic complex according to any one of Embodiments 6 to 12, wherein each $X^1$ is independently selected from the group consisting of a $C_{1-6}$ alkyl group, a $C_{7-10}$ arylalkyl group, and a halogen.

Embodiment 14. The organometallic complex according to any one of Embodiments 6 to 13, wherein each $X^1$ is independently selected from the group consisting of a methyl group and Cl.

Embodiment 15. The organometallic complex according to Embodiment 5 which is represented by formula VII:

(VII)

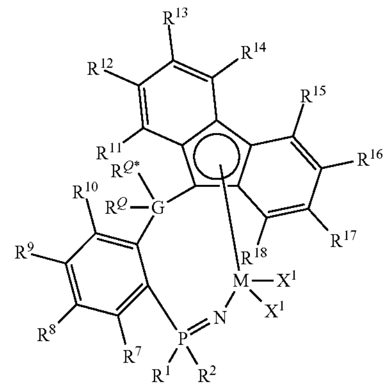

wherein M, $R^1$, $R^2$, $R^{11}$, $R^{12}$, $R^{13}$, $R^{14}$, $R^{15}$, $R^{16}$, $R^{17}$, $R^{18}$ and $X^1$ are as defined for formulas I and V;

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 16. The organometallic complex according to Embodiment 15, wherein M is Ti.

Embodiment 17. The organometallic complex according to Embodiment 15 or 16, wherein $R^7$, $R^8$, $R^9$ and $R^{10}$ are each hydrogen.

Embodiment 18. The organometallic complex according to any one of Embodiments 15 to 17, wherein $R^1$ and $R^2$ are each independently an unsubstituted $C_{1-30}$ hydrocarbyl group.

Embodiment 19. The organometallic complex according to any one of Embodiments 15 to 18, wherein $R^1$ and $R^2$ are each independently selected from the group consisting of isopropyl, cyclohexyl and tert-butyl.

Embodiment 20. The organometallic complex according to any one of Embodiments 15 to 19, wherein $R^{12}$ and $R^{17}$ are each independently an unsubstituted $C_{1-30}$ hydrocarbyl group, and $R^{11}$, $R^{13}$, $R^{14}$, $R^{15}$, $R^{16}$ and $R^{18}$ are each hydrogen.

Embodiment 21. The organometallic complex according to any one of Embodiments 15 to 20, wherein $R^{12}$ and $R^{17}$ are each a tert-butyl group.

Embodiment 22. The organometallic complex according to any one of Embodiments 15 to 21, wherein G is carbon.

Embodiment 23. The organometallic complex according to any one of Embodiments 15 to 22, wherein $R^Q$ and $R^{Q*}$ are each independently selected from the group consisting of hydrogen, a $C_{1-20}$ alkyl group and a $C_{6-20}$ aryl group.

Embodiment 24. The organometallic complex according to any one of Embodiments 15 to 23, wherein $R^Q$ is hydrogen and $R^{Q*}$ is a $C_{1-8}$ alkyl group.

Embodiment 25. The organometallic complex according to any one of Embodiments 15 to 24, wherein each $X^1$ is independently selected from the group consisting of a $C_{1-6}$ alkyl group, a $C_{7-10}$ arylalkyl group, and a halogen.

Embodiment 26. The organometallic complex according to any one of Embodiments 15 to 25, wherein each $X^1$ is independently selected from the group consisting of a methyl group and Cl.

Embodiment 27. The organometallic complex according to Embodiment 1 which is represented by formula VIII:

(VIII)

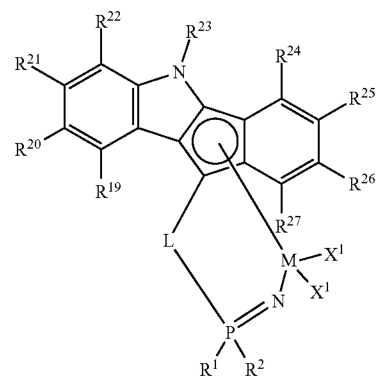

wherein M, $R^1$, $R^2$, L and $X^1$ are as defined for formula I;

wherein $R^{23}$ is selected from the group consisting of hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein $R^{19}$, $R^{20}$, $R^{21}$, $R^{22}$, $R^{24}$, $R^{25}$, $R^{26}$, and $R^{27}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^{19}$, $R^{20}$, $R^{21}$, $R^{22}$, $R^{24}$, $R^{25}$, $R^{26}$, and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 28. The organometallic complex according to Embodiment 27 which is represented by formula IX:

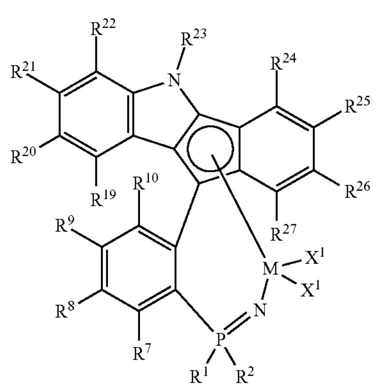

(IX)

wherein M, $R^1$, $R^2$, $R^{19}$, $R^{20}$, $R^{21}$, $R^{22}$, $R^{23}$, $R^{24}$, $R^{25}$, $R^{26}$, $R^{27}$ and $X^1$ are as defined for formulas I and VIII;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 29. The organometallic complex according to Embodiment 28, wherein M is Ti.

Embodiment 30. The organometallic complex according to Embodiment 28 or 29, wherein $R^7$, $R^8$, $R^9$ and $R^{10}$ are each hydrogen.

Embodiment 31. The organometallic complex according to any one of Embodiments 28 to 30, wherein $R^1$ and $R^2$ are each independently an unsubstituted $C_{1-30}$ hydrocarbyl group.

Embodiment 32. The organometallic complex according to any one of Embodiments 28 to 31, wherein $R^1$ and $R^2$ are each independently selected from the group consisting of isopropyl, cyclohexyl and tert-butyl.

Embodiment 33. The organometallic complex according to any one of Embodiments 28 to 32, wherein $R^{23}$ is an unsubstituted $C_{1-30}$ hydrocarbyl group.

Embodiment 34. The organometallic complex according to any one of Embodiments 28 to 33, wherein $R^{23}$ is a $C_{1-8}$ alkyl group.

Embodiment 35. The organometallic complex according to any one of Embodiments 28 to 34, wherein $R^{20}$ is an unsubstituted $C_{1-30}$ hydrocarbyl group.

Embodiment 36. The organometallic complex according to any one of Embodiments 28 to 35, wherein $R^{20}$ is an $C_{1-8}$ alkyl group.

Embodiment 37. The organometallic complex according to any one of Embodiments 28 to 34, wherein $R^{20}$ is an unsubstituted $C_{1-30}$ hydrocarbyl group, and $R^{19}$, $R^{21}$, $R^{22}$, $R^{24}$, $R^{25}$, $R^{26}$, and $R^{27}$ are each hydrogen.

Embodiment 38. The organometallic complex according to Embodiment 37, wherein $R^{20}$ is a $C_{1-8}$ alkyl group.

Embodiment 39. The organometallic complex according to any one of Embodiments 28 to 38, wherein each $X^1$ is independently selected from the group consisting of a $C_{1-6}$ alkyl group, a $C_{7-10}$ arylalkyl group, and a halogen.

Embodiment 40. The organometallic complex according to any one of Embodiments 28 to 39, wherein each $X^1$ is independently selected from the group consisting of a methyl group and Cl.

Embodiment 41. An olefin polymerization catalyst system comprising:

i) an organometallic complex represented by formula I:

(I)

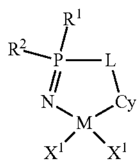

wherein

M is Ti, Zr or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$); wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

each $X^1$ is an activatable ligand;

Cy is a cyclopentadienyl-type ligand covalently bound to L and coordinated to M via η-bonding; and L is a bridging group containing a contiguous chain of atoms connecting P with Cy, wherein the contiguous chain contains 2 or 3 atoms; and ii) a catalyst activator.

Embodiment 42. The olefin polymerization catalyst system according to Embodiment 41, wherein the organometallic complex is represented by formula II:

(II)

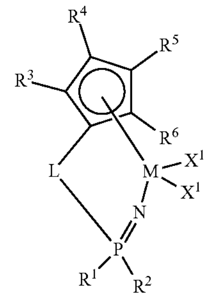

wherein M, $R^1$, $R^2$, L and $X^1$ are as defined for formula I;

wherein $R^3$, $R^4$, $R^5$ and $R^6$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^3$, $R^4$, $R^5$ and $R^6$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 43. The olefin polymerization catalyst system according to Embodiment 42, wherein the organometallic complex is represented by formula III:

(III)

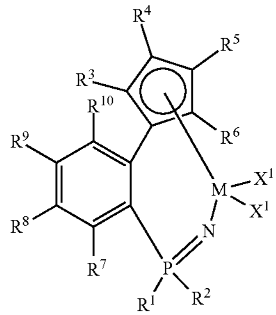

wherein M, $R^1$, $R^2$, $R^3$, $R^4$, $R^5$, $R^6$ and $X^1$ are as defined for formulas I and II;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; an oxy group, —OR';

an amido group, —NR'$_2$;

a phosphido group, —PR'$_2$;

a thiolate group. —SR';

a silyl group of the formula —Si$(R^a)_3$; and a germanyl group of the formula —Ge$(R^a)_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si$(R^a)_3$, and a germanyl group of the formula —Ge$(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 44. The olefin polymerization catalyst system according to Embodiment 42, wherein the organometallic complex is represented by formula IV:

(IV)

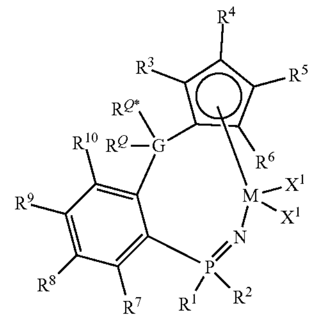

wherein M, $R^1$, $R^2$, $R^3$, $R^4$, $R^5$, $R^6$ and $X^1$ are as defined for formulas I and II;

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si$(R^a)_3$, and a germanyl group of the formula —Ge$(R^a)_3$;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 45. The olefin polymerization catalyst system according to Embodiment 41, wherein the organometallic complex is represented by formula V:

(V)

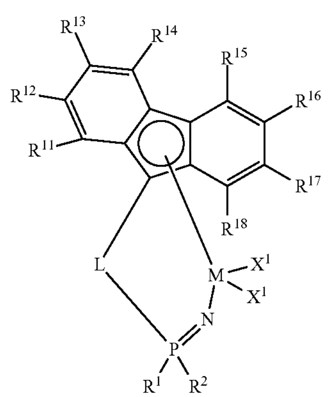

wherein M, $R^1$, $R^2$, L and $X^1$ are as defined for formula I;

wherein $R^{11}$, $R^{12}$, $R^{13}$, $R^{14}$, $R^{15}$, $R^{16}$, $R^{17}$, $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^{11}$, $R^{12}$, $R^{13}$, $R^{14}$, $R^{15}$, $R^{16}$, $R^{17}$, $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR, a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 46. The olefin polymerization catalyst system according to Embodiment 45, wherein the organometallic complex is represented by formula VI:

(VI)

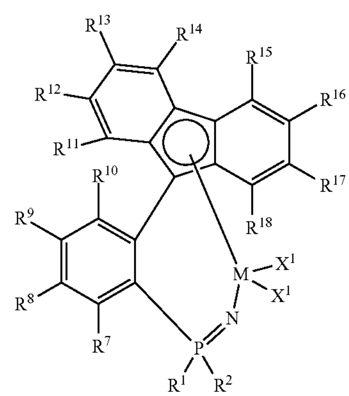

wherein M, $R^1$, $R^2$, $R^{11}$, $R^{12}$, $R^{13}$, $R^{14}$, $R^{15}$, $R^{16}$, $R^{17}$, $R^{18}$ and $X^1$ are as defined for formulas I and V;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 47. The olefin polymerization catalyst system according to Embodiment 46, wherein M is Ti.

Embodiment 48. The olefin polymerization catalyst system according to Embodiment 46 or 47, wherein $R^7$, $R^8$, $R^9$ and $R^{10}$ are each hydrogen.

Embodiment 49. The olefin polymerization catalyst system according to any one of Embodiments 46 to 48, wherein $R^1$ and $R^2$ are each independently an unsubstituted $C_{1-30}$ hydrocarbyl group.

Embodiment 50. The olefin polymerization catalyst system according to any one of Embodiments 46 to 49, wherein $R^1$ and $R^2$ are each independently selected from the group consisting of isopropyl, cyclohexyl and tert-butyl.

Embodiment 51. The olefin polymerization catalyst system according to any one of Embodiments 46 to 50, wherein $R^{12}$ and $R^{17}$ are each independently an unsubstituted $C_{1-30}$ hydrocarbyl group, and $R^{11}$, $R^{13}$, $R^{14}$, $R^{15}$, $R^{16}$ and $R^{18}$ are each hydrogen.

Embodiment 52. The olefin polymerization catalyst system according to any one of Embodiments 46 to 51, wherein $R^{12}$ and $R^{17}$ are each a tert-butyl group.

Embodiment 53. The olefin polymerization catalyst system according to any one of Embodiments 46 to 52, wherein each $X^1$ is independently selected from the group consisting of a $C_{1-6}$ alkyl group, a $C_{7-10}$ arylalkyl group, and a halogen.

Embodiment 54. The olefin polymerization catalyst system according to any one of Embodiments 46 to 53, wherein each $X^1$ is independently selected from the group consisting of a methyl group and Cl.

Embodiment 55. The olefin polymerization catalyst system according to Embodiment 45, wherein the organometallic complex is represented by formula VII:

(VII)

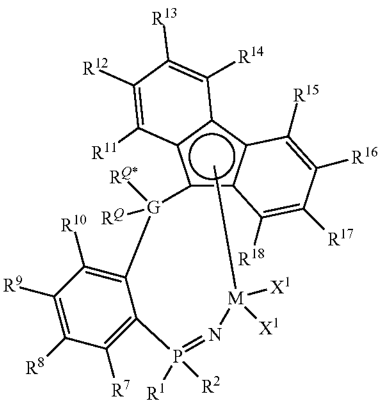

wherein M, $R^1$, $R^2$, $R^{11}$, $R^{12}$, $R^{13}$, $R^{14}$, $R^{15}$, $R^{16}$, $R^{17}$, $R^{18}$ and $X^1$ are as defined for formulas I and V;

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, $—NR'_2$;

a phosphido group, $—PR'_2$;

a thiolate group, —SR';

a silyl group of the formula $—Si(R^a)_3$; and a germanyl group of the formula $—Ge(R^a)_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula $—NR'_2$, a phosphido group of the formula $—PR'_2$, a thiolate group of the formula —SR', a silyl group of the formula $—Si(R^a)_3$, and a germanyl group of the formula $—Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 56. The olefin polymerization catalyst system according to Embodiment 55, wherein M is Ti.

Embodiment 57. The olefin polymerization catalyst system according to Embodiment 55 or 56, wherein $R^7$, $R^8$, $R^9$ and $R^{10}$ are each hydrogen.

Embodiment 58. The olefin polymerization catalyst system according to any one of Embodiments 55 to 57, wherein $R^1$ and $R^2$ are each independently an unsubstituted $C_{1-30}$ hydrocarbyl group.

Embodiment 59. The olefin polymerization catalyst system according to any one of Embodiments 55 to 58, wherein $R^1$ and $R^2$ are each independently selected from the group consisting of isopropyl, cyclohexyl and tert-butyl.

Embodiment 60. The olefin polymerization catalyst system according to any one of Embodiments 55 to 59, wherein $R^{12}$ and $R^{17}$ are each independently an unsubstituted $C_{1-30}$ hydrocarbyl group, and $R^{11}$, $R^{13}$, $R^{14}$, $R^{15}$, $R^{16}$, and $R^{18}$ are each hydrogen.

Embodiment 61. The olefin polymerization catalyst system according to any one of Embodiments 55 to 60, wherein $R^{12}$ and $R^{17}$ are each a tert-butyl group.

Embodiment 62. The olefin polymerization catalyst system according to any one of Embodiments 55 to 61, wherein G is carbon.

Embodiment 63. The olefin polymerization catalyst system according to any one of Embodiments 55 to 62, wherein $R^Q$ and $R^{Q*}$ are each independently selected from the group consisting of hydrogen, a $C_{1-20}$ alkyl group and a $C_{6-20}$ aryl group.

Embodiment 64. The olefin polymerization catalyst system according to any one of Embodiments 55 to 63, wherein $R^Q$ is hydrogen and $R^{Q*}$ is a $C_{1-8}$ alkyl group.

Embodiment 65. The olefin polymerization catalyst system according to any one of Embodiments 55 to 64, wherein each $X^1$ is independently selected from the group consisting of a $C_{1-6}$ alkyl group, a $C_{7-10}$ arylalkyl group, and a halogen.

Embodiment 66. The olefin polymerization catalyst system according to any one of Embodiments 55 to 65, wherein each $X^1$ is independently selected from the group consisting of a methyl group and Cl.

Embodiment 67. The olefin polymerization catalyst system according to Embodiment 41, wherein the organometallic complex is represented by formula VIII:

(VIII)

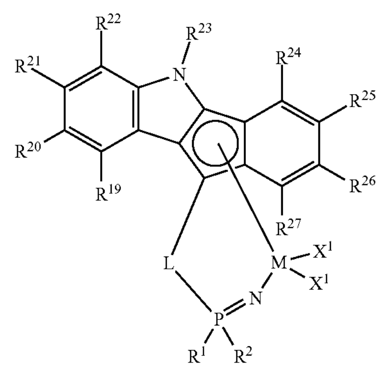

wherein M, $R^1$, $R^2$, L and $X^1$ are as defined for formula I;

wherein $R^{23}$ is selected from the group consisting of hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein $R^{19}$, $R^{20}$, $R^{21}$, $R^{22}$, $R^{24}$, $R^{25}$, $R^{26}$, and $R^{27}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^{19}$, $R^{20}$, $R^{21}$, $R^{22}$, $R^{24}$, $R^{25}$, $R^{26}$, and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 68. The olefin polymerization catalyst system according to Embodiment 67, wherein the organometallic complex is represented by formula IX:

(IX)

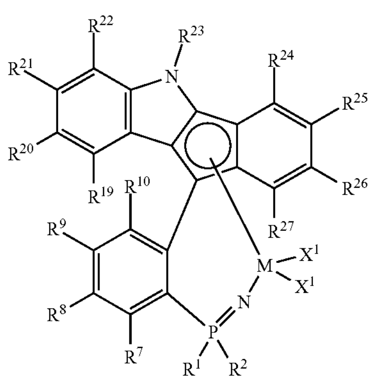

wherein M, $R^1$, $R^2$, $R^{19}$, $R^{20}$, $R^{21}$, $R^{22}$, $R^{23}$, $R^{24}$, $R^{25}$, $R^{26}$, $R^{27}$ and $X^1$ are as defined for formulas I and VIII;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 69. The olefin polymerization catalyst system according to Embodiment 68, wherein M is Ti.

Embodiment 70. The olefin polymerization catalyst system according to Embodiment 68 or 69, wherein $R^7$, $R^8$, $R^9$ and $R^{10}$ are each hydrogen.

Embodiment 71. The olefin polymerization catalyst system according to any one of Embodiments 68 to 70, wherein $R^1$ and $R^2$ are each independently an unsubstituted $C_{1-30}$ hydrocarbyl group.

Embodiment 72. The olefin polymerization catalyst system according to any one of Embodiments 68 to 71, wherein $R^1$ and $R^2$ are each independently selected from the group consisting of isopropyl, cyclohexyl and tert-butyl.

Embodiment 73. The olefin polymerization catalyst system according to any one of Embodiments 68 to 72, wherein $R^{23}$ is an unsubstituted $C_{1-30}$ hydrocarbyl group.

Embodiment 74. The olefin polymerization catalyst system according to any one of Embodiments 68 to 73, wherein $R^{23}$ is a $C_{1-8}$ alkyl group.

Embodiment 75. The olefin polymerization catalyst system according to any one of Embodiments 68 to 74, wherein $R^{20}$ is an unsubstituted $C_{1-30}$ hydrocarbyl group.

Embodiment 76. The olefin polymerization catalyst system according to any one of Embodiments 68 to 75, wherein $R^{20}$ is an unsubstituted $C_{1-8}$ alkyl group.

Embodiment 77. The olefin polymerization catalyst system according to any one of Embodiments 68 to 74, wherein $R^{20}$ is an unsubstituted $C_{1-30}$ hydrocarbyl group, and $R^{19}$, $R^{21}$, $R^{22}$, $R^{24}$, $R^{25}$, $R^{26}$, and $R^{2'}$ are each hydrogen.

Embodiment 78. The olefin polymerization catalyst system according to Embodiment 77, wherein $R^{20}$ is a $C_{1-8}$ alkyl group.

Embodiment 79. The olefin polymerization catalyst system according to any one of Embodiments 68 to 78, wherein each $X^1$ is independently selected from the group consisting of a $C_{1-6}$ alkyl group, a $C_{7-10}$ arylalkyl group, and a halogen.

Embodiment 80. The olefin polymerization catalyst system according to any one of Embodiments 68 to 79, wherein each $X^1$ is independently selected from the group consisting of a methyl group and Cl.

Embodiment 81. The olefin polymerization catalyst system according to any one of Embodiments 41 to 80, wherein the catalyst activator is selected from the group consisting of an alkylaluminoxane co-catalyst, an organoaluminum compound, a boron-based catalyst activator, and mixtures thereof.

Embodiment 82. The olefin polymerization catalyst system according to Embodiment 81, wherein the boron-based catalyst activator is selected from the group consisting of [(hydrogenated tallow alkyl)$_2$(Me)NH][$B(C_6F_5)_4$]; N,N-dimethylanilinium tetrakis(pentafluorophenyl) borate ([“$Me_2NHPh$][$B(C_6F_5)_4$]”); and triphenylmethylium tetrakis(pentafluorophenyl) borate ([“$Ph_3C$][$B(C_6F_5)_4$]”).

Embodiment 83. A polymerization process comprising polymerizing ethylene optionally with one or more than one $C_3$-$C_{12}$ alpha-olefin in the presence of an olefin polymerization catalyst system comprising:

i) an organometallic complex represented by formula I:

(I)

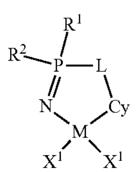

wherein

M is Ti, Zr or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$); wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

each $X^1$ is an activatable ligand;

Cy is a cyclopentadienyl-type ligand covalently bound to L and coordinated to M via η-bonding; and L is a bridging group containing a contiguous chain of atoms connecting P with Cy, wherein the contiguous chain contains 2 or 3 atoms; and ii) a catalyst activator.

Embodiment 84. The polymerization process according to Embodiment 83, wherein the organometallic complex is represented by formula II:

(II)

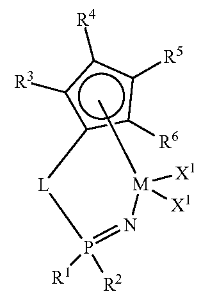

wherein M, $R^1$, $R^2$, L and $X^1$ are as defined for formula I;

wherein $R^3$, $R^4$, $R^5$ and $R^6$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^3$, $R^4$, $R^5$ and $R^6$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 85. The polymerization process according to Embodiment 84, wherein the organometallic complex is represented by formula III:

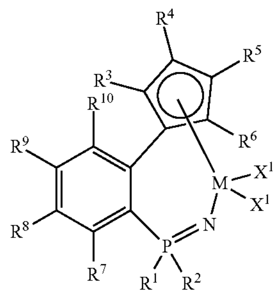

(III)

wherein M, $R^1$, $R^2$, $R^3$, $R^4$, $R^5$, $R^6$ and $X^1$ are as defined for formulas I and II;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group. —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR',a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 86. The polymerization process according to Embodiment 84, wherein the organometallic complex is represented by formula IV:

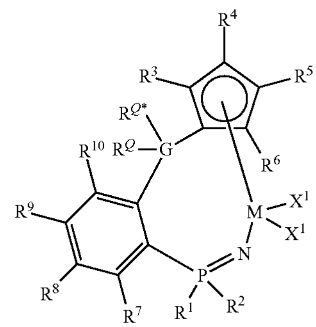

(IV)

wherein M, $R^1$, $R^2$, $R^3$, $R^4$, $R^5$, $R^6$ and $X^1$ are as defined for formulas I and II;

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 87. The polymerization process according to Embodiment 83, wherein the organometallic complex is represented by formula V:

(V)

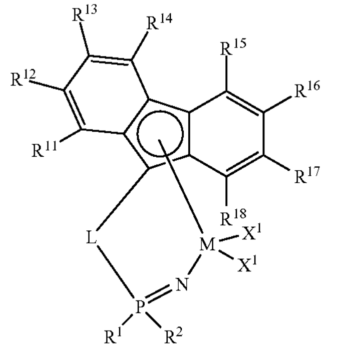

wherein M, $R^1$, $R^2$, L and $X^1$ are as defined for formula I;

wherein $R^{11}$, $R^{12}$, $R^{13}$, $R^{14}$, $R^{15}$, $R^{16}$, $R^{17}$, $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^{11}$, $R^{12}$, $R^{13}$, $R^{14}$, $R^{15}$, $R^{16}$, $R^{17}$, $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 88. The polymerization process according to Embodiment 87, wherein the organometallic complex is represented by formula VI:

(VI)

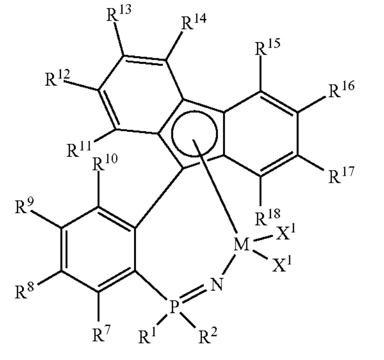

wherein M, $R^1$, $R^2$, $R^{11}$, $R^{12}$, $R^{13}$, $R^{14}$, $R^{15}$, $R^{16}$, $R^{17}$, $R^{18}$ and $X^1$ are as defined for formulas I and V;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 89. The polymerization process according to Embodiment 88, wherein M is Ti.

Embodiment 90. The polymerization process according to Embodiment 88 or 89, wherein $R^7$, $R^8$, $R^9$ and $R^{10}$ are each hydrogen.

Embodiment 91. The polymerization process according to any one of Embodiments 88 to 90, wherein $R^1$ and $R^2$ are each independently an unsubstituted $C_{1-30}$ hydrocarbyl group.

Embodiment 92. The polymerization process according to any one of Embodiments 88 to 91, wherein $R^1$ and $R^2$ are each independently selected from the group consisting of isopropyl, cyclohexyl, and tert-butyl.

Embodiment 93. The polymerization process according to any one of Embodiments 88 to 92, wherein $R^{12}$ and $R^{17}$ are each independently an unsubstituted $C_{1-30}$ hydrocarbyl group, and $R^{11}$, $R^{13}$, $R^{14}$, $R^{15}$, $R^{16}$ and $R^{18}$ are each hydrogen.

Embodiment 94. The polymerization process according to any one of Embodiments 88 to 93, wherein $R^{12}$ and $R^{17}$ are each a tert-butyl group.

Embodiment 95. The polymerization process according to any one of Embodiments 88 to 94, wherein each $X^1$ is independently selected from the group consisting of a $C_{1-6}$ alkyl group, a $C_{7-10}$ arylalkyl group, and a halogen.

Embodiment 96. The polymerization process according to any one of Embodiments 88 to 95, wherein each $X^1$ is independently selected from the group consisting of a methyl group and Cl.

Embodiment 97. The polymerization process according to Embodiment 87, wherein the organometallic complex is represented by formula VII:

(VII)

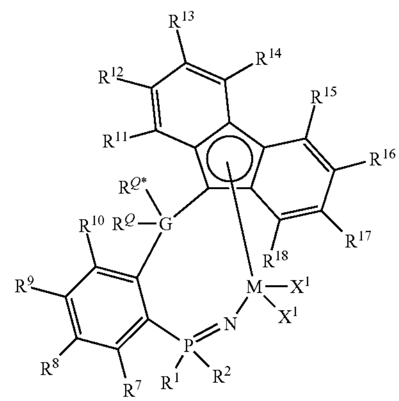

wherein M, $R^1$, $R^2$, $R^{11}$, $R^{12}$, $R^{13}$, $R^{14}$, $R^{15}$, $R^{16}$, $R^{17}$, $R^{18}$ and $X^1$ are as defined for formulas I and V;

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula $—Si(R^a)_3$, and a germanyl group of the formula $—Ge(R^a)_3$;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, $—NR'_2$;

a phosphido group, $—PR'_2$;

a thiolate group, —SR';

a silyl group of the formula $—Si(R^a)_3$; and a germanyl group of the formula $—Ge(R^a)_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula $—NR'_2$, a phosphido group of the formula $—PR'_2$, a thiolate group of the formula —SR', a silyl group of the formula $—Si(R^a)_3$, and a germanyl group of the formula $—Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 98. The polymerization process according to Embodiment 97, wherein M is Ti.

Embodiment 99. The polymerization process according to Embodiment 97 or 98, wherein $R^7$, $R^8$, $R^9$ and $R^{10}$ are each hydrogen.

Embodiment 100. The polymerization process according to any one of Embodiments 97 to 99 wherein $R^1$ and $R^2$ are each independently an unsubstituted $C_{1-30}$ hydrocarbyl group.

Embodiment 101. The polymerization process according to any one of Embodiments 97 to 100, wherein $R^1$ and $R^2$ are each independently selected from the group consisting of isopropyl, cyclohexyl and tert-butyl.

Embodiment 102. The polymerization process according to any one of Embodiments 97 to 101, wherein $R^{12}$ and $R^{17}$ are each independently an unsubstituted $C_{1-30}$ hydrocarbyl group, and $R^{11}$, $R^{13}$, $R^{14}$, $R^{15}$, $R^{16}$ and $R^{18}$ are each hydrogen.

Embodiment 103. The polymerization process according to any one of Embodiments 97 to 102, wherein $R^{12}$ and $R^{17}$ are each a tert-butyl group.

Embodiment 104. The polymerization process according to any one of Embodiments 97 to 103, wherein G is carbon.

Embodiment 105. The polymerization process according to any one of Embodiments 97 to 104, wherein $R^Q$ and $R^{Q*}$ are each independently selected from the group consisting of hydrogen, a $C_{1-20}$ alkyl group and a $C_{6-20}$ aryl group.

Embodiment 106. The polymerization process according to any one of Embodiments 97 to 105, wherein $R^Q$ is hydrogen and $R^{Q*}$ is a $C_{1-8}$ alkyl group.

Embodiment 107. The polymerization process according to any one of Embodiments 97 to 106, wherein each $X^1$ is independently selected from the group consisting of a $C_{1-6}$ alkyl group, a $C_{7-10}$ arylalkyl group, and a halogen.

Embodiment 108. The polymerization process according to any one of Embodiments 97 to 107, wherein each $X^1$ is independently selected from the group consisting of a methyl group and Cl.

Embodiment 109. The polymerization process according to Embodiment 83, wherein the organometallic complex is represented by formula VIII:

(VIII)

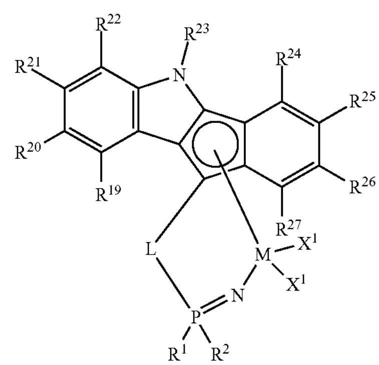

wherein M, $R^1$, $R^2$, L and $X^1$ are as defined for formula I;

wherein $R^{23}$ is selected from the group consisting of hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein $R^{19}$, $R^{20}$, $R^{21}$, $R^{22}$, $R^{24}$, $R^{25}$, $R^{26}$, and $R^{27}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^{19}$, $R^{20}$, $R^{21}$, $R^{22}$, $R^{24}$, $R^{25}$, $R^{26}$, and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 110. The polymerization process according to Embodiment 109, wherein the organometallic complex is represented by formula IX:

(IX)

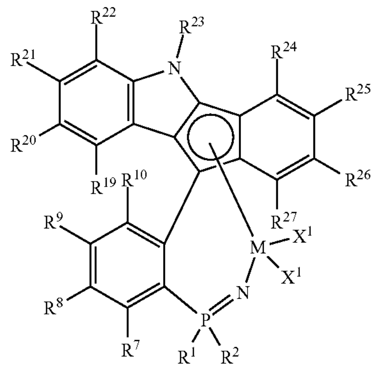

wherein M, $R^1$, $R^2$, $R^{19}$, $R^{20}$, $R^{21}$, $R^{22}$, $R^{23}$, $R^{24}$, $R^{25}$, $R^{26}$, $R^{27}$ and $X^1$ are as defined for formulas I and VIII;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 111. The polymerization process according to Embodiment 110, wherein M is Ti.

Embodiment 112. The polymerization process according to Embodiment 110 or 111, wherein $R^7$, $R^8$, $R^9$ and $R^{10}$ are each hydrogen.

Embodiment 113. The polymerization process according to any one of Embodiments 110 to 112, wherein $R^1$ and $R^2$ are each independently an unsubstituted $C_{1-30}$ hydrocarbyl group.

Embodiment 114. The polymerization process according to any one of Embodiments 110 to 113, wherein $R^1$ and $R^2$ are each independently selected from the group consisting of isopropyl, cyclohexyl and tert-butyl.

Embodiment 115. The polymerization process according to any one of Embodiments 110 to 114, wherein $R^{23}$ is an unsubstituted $C_{1-30}$ hydrocarbyl group.

Embodiment 116. The polymerization process according to any one of Embodiments 110 to 115, wherein $R^{23}$ is a $C_{1-8}$ alkyl group.

Embodiment 117. The polymerization process according to any one of Embodiments 110 to 116, wherein $R^{20}$ is an unsubstituted $C_{1-30}$ hydrocarbyl group.

Embodiment 118. The polymerization process according to any one of Embodiments 110 to 117, wherein $R^{20}$ is an unsubstituted $C_{1-8}$ alkyl group.

Embodiment 119. The polymerization process according to any one of Embodiments 110 to 116, wherein $R^{20}$ is an unsubstituted $C_{1-30}$ hydrocarbyl group, and $R^{19}$, $R^{21}$, $R^{22}$, $R^{24}$, $R^{25}$, $R^{26}$, and $R^{27}$ are each hydrogen.

Embodiment 120. The polymerization process according to Embodiment 119, wherein $R^{20}$ is a $C_{1-8}$ alkyl group.

Embodiment 121. The polymerization process according to any one of Embodiments 110 to 120, wherein each $X^1$ is independently selected from the group consisting of a $C_{1-6}$ alkyl group, a $C_{7-10}$ arylalkyl group, and a halogen.

Embodiment 122. The polymerization process according to any one of Embodiments 110 to 121, wherein each $X^1$ is independently selected from the group consisting of a methyl group and Cl.

Embodiment 123. The polymerization process according to any of Embodiments 83 to 122, wherein the catalyst activator is selected from the group consisting of an alkylaluminoxane co-catalyst, an organoaluminum compound, a boron-based catalyst activator, and mixtures thereof.

Embodiment 124. The polymerization process according to Embodiment 123, wherein the boron-based catalyst activator is selected from the group consisting of [(hydrogenated tallow alkyl)$_2$(Me)NH][B($C_6F_5$)$_4$]; N,N-dimethylanilinium tetrakis(pentafluorophenyl) borate (["$Me_2NHPh$][B($C_6F_5$)$_4$]"); and triphenylmethylium tetrakis (pentafluorophenyl) borate (["$Ph_3C$][B($C_6F_5$)$_4$]").

Embodiment 125. The polymerization process according to any of Embodiments 83 to 124, wherein the one or more than one $C_3$-$C_{12}$ alpha-olefin comprise one or more than one alpha-olefin selected from the group consisting of 1-butene, 1-hexene, and 1-octene.

Embodiment 126. The polymerization process according to any of Embodiments 83 to 124, wherein the process comprises polymerizing ethylene with 1-octene.

Embodiment 127. The polymerization process according to any of Embodiments 83 to 126, wherein the process is a solution phase polymerization process carried out in a solvent.

Embodiment 128. The polymerization process according to Embodiment 127, wherein the solution phase polymerization process is carried out at a temperature of at least 160° C.

Embodiment 129. The polymerization process according to any one of Embodiments 83 to 126, wherein the polymerization process is a continuous solution phase polymerization process carried out in a solvent.

Embodiment 130. The polymerization process according to Embodiment 129, wherein the continuous solution phase polymerization process is carried out in at least one continuously stirred tank reactor.

Embodiment 131. The polymerization process according to Embodiment 129 or 130, wherein the continuous solution phase polymerization process is carried out at a temperature of at least 160° C.

Embodiment 132. A pre-metallation compound represented by formula I-L:

(I-L)

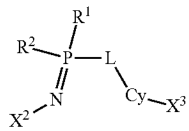

wherein (I-L)

$R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$); wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

Cy is a cyclopentadienyl-type moiety and is covalently bound to L and $X^3$;

$X^2$ is hydrogen, or a silyl group of the formula —Si($R^e$)$_3$;

$X^3$ is hydrogen, or a silyl group of the formula —Si($R^e$)$_3$, or a stannyl group of the formula Sn($R^e$)$_3$;

wherein each $R^e$ is independently selected from the group consisting of hydrogen, a $C_{1-8}$ alkyl group, $C_{1-8}$ alkoxy group, $C_{6-20}$ aryloxy group, and a $C_{6-20}$ aryl group; and L is a bridging group containing a contiguous chain of atoms connecting P with Cy, wherein the contiguous chain contains 2 or 3 atoms.

Embodiment 133. A pre-metallation compound represented by formula I-L-H:

(I-L-H)

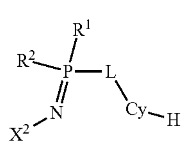

wherein $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$); wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

$X^2$ is hydrogen, or a silyl group of the formula —Si($R^e$)$_3$, wherein each $R^e$ is independently selected from the group consisting of hydrogen, a $C_{1-8}$ alkyl group, $C_{1-8}$ alkoxy group, $C_{6-20}$ aryloxy group and a $C_{6-20}$ aryl group;

Cy is a cyclopentadienyl-type moiety and is covalently bound to L and H; and

L is a bridging group containing a contiguous chain of atoms connecting P with Cy, wherein the contiguous chain contains 2 or 3 atoms.

Embodiment 134. The pre-metallation compound according to Embodiment 133, wherein the pre-metallation compound is represented by formula II-L:

(II-L)

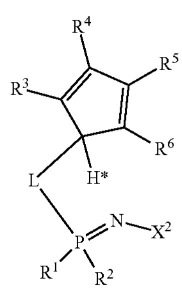

or double bond isomers of formula II-L which are available by migration of the hydrogen, H* within the cyclopentadienyl ring;

wherein $R^1$, $R^2$, L and $X^2$ are as defined for formula I-L-H;

wherein $R^3$, $R^4$, $R^5$ and $R^6$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^3$, $R^4$, $R^5$ and $R^6$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR, a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 135. The pre-metallation compound according to Embodiment 134, wherein the pre-metallation compound is represented by the formula III-L:

(III-L)

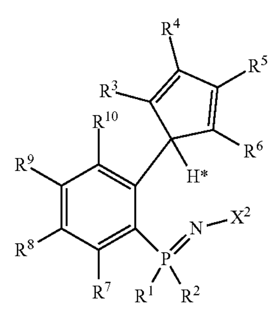

or double bond isomers of formula III-L which are available by migration of the hydrogen, H* within the cyclopentadienyl ring;

wherein $R^1$, $R^2$, $R^3$, $R^4$, $R^5$, $R^6$, and $X^2$ are as defined for formulas I-L-H and II-L;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 136. The pre-metallation compound according to Embodiment 134, wherein the pre-metallation compound is represented by the formula IV-L:

(IV-L)

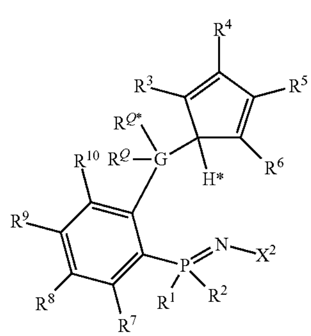

or double bond isomers of formula IV-L which are available by migration of the hydrogen, H* within the cyclopentadienyl ring;

wherein $R^1$, $R^2$, $R^3$, $R^4$, $R^5$, $R^6$, and $X^2$ are as defined for formulas I-L-H and II-L; wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —$NR'_2$, a phosphido group of the formula —$PR'_2$, a thiolate group of the formula —SR', a silyl group of the formula —$Si(R^a)_3$, and a germanyl group of the formula —$Ge(R^a)_3$;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —$NR'_2$;

a phosphido group, —$PR'_2$;

a thiolate group, —SR';

a silyl group of the formula —$Si(R^a)_3$; and a germanyl group of the formula —$Ge(R^a)_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR, a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 137. The pre-metallation compound according to Embodiment 133, wherein the pre-metallation compound is represented by formula V-L:

(V-L)

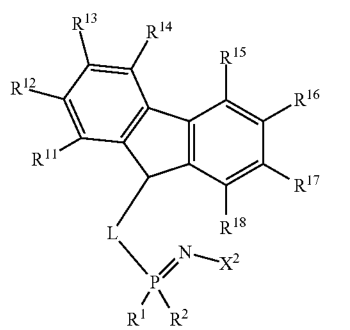

wherein $R^1$, $R^2$, L and $X^2$ are as defined for formula I-L-H;

wherein $R^{11}$, $R^{12}$, $R^{13}$, $R^{14}$, $R^{15}$, $R^{16}$, $R^{17}$, $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^{11}$, $R^{12}$, $R^{13}$, $R^{14}$, $R^{15}$, $R^{16}$, $R^{17}$, $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 138. The pre-metallation compound according to Embodiment 137, wherein the pre-metallation compound is represented by formula VI-L:

(VI-L)

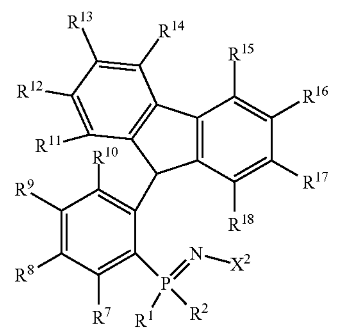

wherein $R^1$, $R^2$, $R^{11}$, $R^{12}$, $R^{13}$, $R^{14}$, $R^{15}$, $R^{16}$, $R^{17}$, $R^{18}$, and $X^2$ are as defined for formulas I-L-H and V-L;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 139. The pre-metallation compound according to Embodiment 138, wherein $R^7$, $R^8$, $R^9$ and $R^{10}$ are each hydrogen.

Embodiment 140. The pre-metallation compound according to Embodiment 138 or 139, wherein $R^1$ and $R^2$ are each independently an unsubstituted $C_{1-30}$ hydrocarbyl group.

Embodiment 141. The pre-metallation compound according to any one of Embodiments 138 to 140, wherein $R^1$ and $R^2$ are each independently selected from the group consisting of isopropyl, cyclohexyl and tert-butyl.

Embodiment 142. The pre-metallation compound according to any one of Embodiments 138 to 141, wherein $R^{12}$ and $R^{17}$ are each independently an unsubstituted $C_{1-30}$ hydrocarbyl group, and $R^{11}$, $R^{13}$, $R^{14}$, $R^{15}$, $R^{16}$, and $R^{18}$ are each hydrogen.

Embodiment 143. The pre-metallation compound according to any one of Embodiments 138 to 142, wherein $R^{12}$ and $R^{17}$ are each a tert-butyl group.

Embodiment 144. The pre-metallation compound according to Embodiment 137, wherein the pre-metallation compound is represented by formula VII-L:

(VII-L)

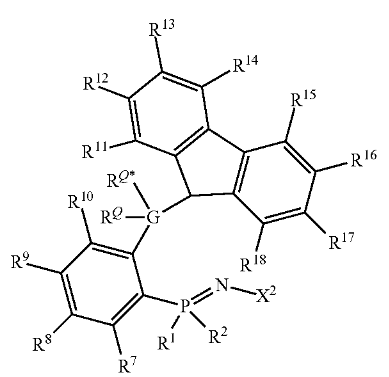

wherein $R^1$, $R^2$, $R^{11}$, $R^{12}$, $R^{13}$, $R^{14}$, $R^{15}$, $R^{16}$, $R^{17}$, $R^{18}$ and $X^2$ are as defined for formulas I-L-H and V-L;

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 145. The pre-metallation compound according to Embodiment 144, wherein $R^7$, $R^8$, $R^9$ and $R^{10}$ are each hydrogen.

Embodiment 146. The pre-metallation compound according to Embodiment 144 or 145, wherein $R^1$ and $R^2$ are each independently an unsubstituted $C_{1-30}$ hydrocarbyl group.

Embodiment 147. The pre-metallation compound according to any one of Embodiments 144 to 146, wherein $R^1$ and $R^2$ are each independently selected from the group consisting of isopropyl, cyclohexyl and tert-butyl.

Embodiment 148. The pre-metallation compound according to any one of Embodiments 144 to 147, wherein $R^{12}$ and $R^{17}$ are each independently an unsubstituted $C_{1-30}$ hydrocarbyl group, and $R^{11}$, $R^{13}$, $R^{14}$, $R^{15}$, $R^{16}$ and $R^{18}$ are each hydrogen.

Embodiment 149. The pre-metallation compound according to any one of Embodiments 144 to 148, wherein $R^{12}$ and $R^{17}$ are each a tert-butyl group.

Embodiment 150. The pre-metallation compound according to any one of Embodiments 144 to 149, wherein G is carbon.

Embodiment 151. The pre-metallation compound according to any one of Embodiments 144 to 150, wherein $R^Q$ and $R^{Q*}$ are each independently selected from the group consisting of hydrogen, a $C_{1-20}$ alkyl group and a $C_{6-20}$ aryl group.

Embodiment 152. The pre-metallation compound according to any one of Embodiments 144 to 151, wherein $R^Q$ is hydrogen and $R^{Q*}$ is a $C_{1-8}$ alkyl group.

Embodiment 153. The pre-metallation compound according to Embodiment 133, wherein the pre-metallation compound is represented by formula VIII-L:

(VIII-L)

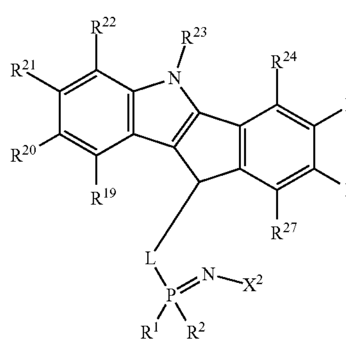

wherein $R^1$, $R^2$, L and $X^2$ are as defined for formula I-L-H;

wherein $R^{23}$ is selected from the group consisting of hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group; and a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein $R^{19}$, $R^{20}$, $R^{21}$, $R^{22}$, $R^{24}$, $R^{25}$, $R^{26}$, and $R^{27}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si$(R^a)_3$; and a germanyl group of the formula —Ge$(R^a)_3$;

wherein two adjacent groups of $R^{19}$, $R^{20}$, $R^{21}$, $R^{22}$, $R^{24}$, $R^{25}$, $R^{26}$, and $R^{27}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si$(R^a)_3$, and a germanyl group of the formula —Ge$(R^a)_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 154. The pre-metallation compound according to Embodiment 153, wherein the pre-metallation compound is represented by formula IX-L:

(IX-L)

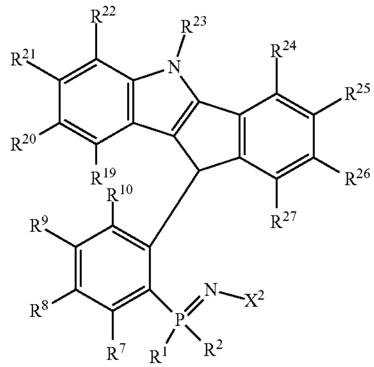

wherein $R^1$, $R^2$, $R^{19}$, $R^{20}$, $R^{21}$, $R^{22}$, $R^{23}$, $R^{24}$, $R^{25}$, $R^{26}$, $R^{27}$ and $X^2$ are as defined for formulas I-L-H and VIII-L;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

Embodiment 155. The pre-metallation compound according to Embodiment 154, wherein $R^7$, $R^8$, $R^9$ and $R^{10}$ are each hydrogen.

Embodiment 156. The pre-metallation compound according to Embodiment 154 or 155, wherein $R^1$ and $R^2$ are each independently an unsubstituted $C_{1-30}$ hydrocarbyl group.

Embodiment 157. The pre-metallation compound according to any one of Embodiments 154 to 156, wherein $R^1$ and $R^2$ are each independently selected from the group consisting of isopropyl, cyclohexyl and tert-butyl.

Embodiment 158. The pre-metallation compound according to any one of Embodiments 154 to 157, wherein $R^{23}$ is an unsubstituted $C_{1-30}$ hydrocarbyl group.

Embodiment 159. The pre-metallation compound according to any one of Embodiments 154 to 158, wherein $R^{23}$ is a $C_{1-8}$ alkyl group.

Embodiment 160. The pre-metallation compound according to any one of Embodiments 154 to 159, wherein $R^{20}$ is an unsubstituted $C_{1-30}$ hydrocarbyl group.

Embodiment 161. The pre-metallation compound according to any one of Embodiments 154 to 160, wherein $R^{20}$ is an unsubstituted $C_{1-8}$ alkyl group.

Embodiment 162. The pre-metallation compound according to any one of Embodiments 154 to 159, wherein $R^{20}$ is an unsubstituted $C_{1-30}$ hydrocarbyl group, and $R^{19}$, $R^{21}$, $R^{22}$, $R^{24}$, $R^{25}$, $R^{26}$, and $R^{27}$ are each hydrogen.

Embodiment 163. The pre-metallation compound according to Embodiment 162 wherein $R^{20}$ is a $C_{1-8}$ alkyl group.

Embodiment 164. The pre-metallation compound according to any of Embodiments 133 to 163, wherein $X^2$ is hydrogen or a trimethylsilyl group, —$SiMe_3$.

Embodiment 165. A process to make an organometallic complex, wherein the process comprises reacting a compound represented by formula I-L-H:

(I-L-H)

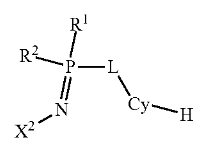

with a group 4 transition metal compound having the formula $MX^*_4$, wherein

M is Ti, Zr, or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$); wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

$X^2$ is a silyl group of the formula —Si($R^e$)$_3$, wherein each $R^e$ is independently selected from the group consisting of hydrogen, a $C_{1-8}$ alkyl group, $C_{1-8}$ alkoxy group, $C_{6-20}$ aryloxy group and a $C_{6-20}$ aryl group;

Cy is a cyclopentadienyl-type moiety and is covalently bound to L and H; and

L is a bridging group containing a contiguous chain of atoms connecting P with Cy, wherein the contiguous chain contains 2 or 3 atoms; and each X* is independently selected from the group consisting of halogen, hydrogen, an amido group of the formula —$NR^{\epsilon}$2, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group; wherein each $R^{\epsilon}$ is independently selected from the group consisting of hydrogen, $C_{1-20}$ alkyl group, and $C_{6-20}$ aryl group.

Embodiment 166. A process to make an organometallic complex, wherein the process comprises reacting a compound represented by formula I-L-2H:

(I-L-2H)

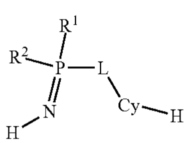

with a base followed by reaction with a group 4 transition metal compound having the formula $MX^*_4$, wherein M is Ti, Zr, or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —NR'$_2$; a silyl group of the formula —Si($R^a$)$_3$; a germanyl group of the formula —Ge($R^a$)$_3$; and a phosphinimine group of the formula —N═P($R^b$)($R^c$)($R^d$); wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

Cy is a cyclopentadienyl-type moiety and is covalently bound to L and H; and

L is a bridging group containing a contiguous chain of atoms connecting P with Cy, wherein the contiguous chain contains 2 or 3 atoms; and each X* is independently selected from the group consisting of halogen, hydrogen, an amido group of the formula —$NR^{\epsilon}$2, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxide group, a $C_{7-20}$ alkylaryloxy group, and a $C_{7-20}$ arylalkyloxy group; wherein each $R^{\epsilon}$ is independently selected from the group consisting of hydrogen, $C_{1-20}$ alkyl group, and $C_{6-20}$ aryl group.

Embodiment 167. A method for making a compound represented by formula I-P-TMS:

(I-P-TMS)

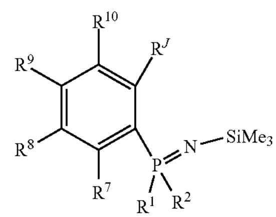

the method comprising combining a phosphine compound represented by formula I-P:

(I-P)

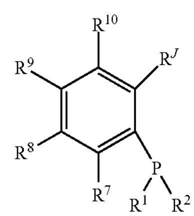

with hexachloroethane, $Cl_3C$—$CCl_3$; and hexamethyldisilazane, $[(CH_3)_3Si]_2NH$;

wherein $R^J$ is selected from the group consisting of a hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$; and a heteroatom containing hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^1$ and $R^2$ are each independently selected from a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group-PR'$_2$;

a thiolate group SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group —NR'$_2$, a phosphido group —PR'$_2$, a thiolate group —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

Embodiment 168. The method according to Embodiment 167, wherein the method comprises:

a first reaction step (i), in which the phosphine compound represented by formula I-P:

(I-P)

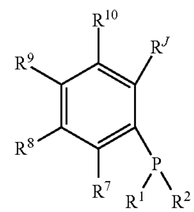

is combined with the hexachloroethane, $Cl_3C—CCl_3$; and a second reaction step (ii), in which the hexamethyldisilazane, $[(CH_3)_3Si]_2NH$ is combined with a reaction product formed in the first reaction step.

Embodiment 169. The method according to Embodiment 167 or 168, wherein the phosphine compound, (I-P) and the hexachloroethane, $Cl_3C—CCl_3$, are combined in a molar ratio of about 1:1.

Embodiment 170. The method according to Embodiment 168, wherein a molar excess of the hexamethyldisilazane, $[(CH_3)_3Si]_2NH$ is combined with the reaction product formed in the first reaction step.

Embodiment 171. The method according to any one of Embodiments 167 to 170, wherein a molar ratio of the hexamethyldisilazane, $[(CH_3)_3Si]_2NH$ to the phosphine compound, (I-P) is greater than 1.0.

Embodiment 172. The method according to any one of Embodiments 167 to 171, wherein the phosphine compound, (I-P); the hexachloroethane, $Cl_3C—CCl_3$; and the hexamethyldisilazane, $[(CH_3)_3Si]_2NH$ are combined in a polar solvent.

Embodiment 173. The method according to Embodiment 172, wherein the polar solvent is selected from the group consisting of dichloromethane, 1,2-dichloroethane, acetonitrile and tetrahydrofuran.

Embodiment 174. The method according to Embodiment 168, wherein the steps (i) and (ii) are carried out in a single reaction vessel.

Embodiment 175. The method according to any one of Embodiments 167 to 174, wherein $R^1$ and $R^2$ are independently selected from the group consisting of a primary alkyl group, a secondary alkyl group, a tertiary alkyl group, and an aryl group.

Embodiment 176. The method according to any one of Embodiments 167 to 175 wherein $R^1$ and $R^Z$ are secondary alkyl groups.

Embodiment 177. The method according to any one of Embodiments 167 to 175, wherein $R^1$ and $R^2$ are tertiary alkyl groups.

Embodiment 178. The method according to any one of Embodiments 167 to 177, wherein $R^7$, $R^8$, $R^9$ and $R^{10}$ are each hydrogen.

Embodiment 179. A method for making a compound represented by formula II-P-TMS:

(II-P-TMS)

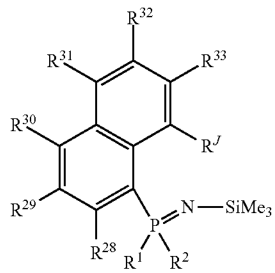

the method comprising combining a phosphine compound represented by formula II-P:

(II-P)

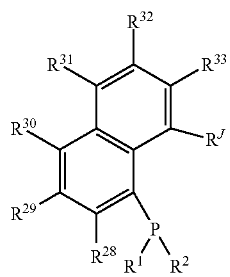

with hexachloroethane, $Cl_3C—CCl_3$; and hexamethyldisilazane, $[(CH_3)_3Si]_2NH$;

wherein $R^J$ is selected from the group consisting of a hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$; and a heteroatom containing hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^1$ and $R^2$ are each independently selected from a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group;

wherein $R^{28}$, $R^{29}$, $R^{30}$, $R^{31}$, $R^{32}$ and $R^{33}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group-PR'$_2$;

a thiolate group SR';

a silyl group of the formula —Si($R^a$)$_3$; and a germanyl group of the formula —Ge($R^a$)$_3$;

wherein two adjacent groups of $R^{eg}$, $R^{29}$, $R^{30}$, $R^{31}$, $R^{32}$ and $R^{33}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group —NR'$_2$, a phosphido group —PR'$_2$, a thiolate group —SR', a silyl group of the formula —Si($R^a$)$_3$, and a germanyl group of the formula —Ge ($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group.

Embodiment 180. The method according to Embodiment 179, wherein the method comprises:

a first reaction step (i), in which the phosphine compound represented by formula TI P:

(II-P)

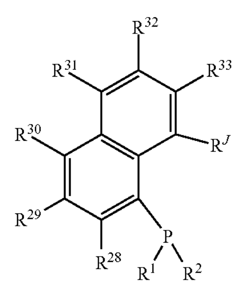

is combined with the hexachloroethane, $Cl_3C—CCl_3$; and a second reaction step (ii), in which the hexamethyldisilazane, $[(CH_3)_3Si]_2NH$ is combined with a reaction product formed in the first reaction step.

Embodiment 181. The method according to Embodiment 179 or 180, wherein the phosphine compound, (II-P) and the hexachloroethane, $Cl_3C—CCl_3$, are combined in a molar ratio of about 1:1.

Embodiment 182. The method according to Embodiment 179, wherein a molar excess of the hexamethyldisilazane, $[(CH_3)_3Si]_2NH$ is combined with the reaction product formed in the first reaction step.

Embodiment 183. The method according to any one of Embodiments 178 to 181, wherein a molar ratio of the hexamethyldisilazane, $[(CH_3)_3Si]_2NH$ to the phosphine compound, (II-P) is greater than 1.0 Embodiment 184. The method according to any one of Embodiments 179 to 183, wherein the phosphine compound, (II-P); the hexachloroethane, $Cl_3C—CCl_3$; and the hexamethyldisilazane, $[(CH_3)_3Si]_2NH$ are combined in a polar solvent.

Embodiment 185. The method according to Embodiment 184, wherein the polar solvent is selected from the group consisting of dichloromethane, 1,2-dichloroethane, acetonitrile and tetrahydrofuran.

Embodiment 186. The method according to Embodiment 180, wherein the steps (i) and (ii) are carried out in a single reaction vessel.

Embodiment 187. The method according to any one of Embodiments 179 to 186, wherein $R^1$ and $R^2$ are independently selected from the group consisting of a primary alkyl group, a secondary alkyl group, a tertiary alkyl group, and an aryl group.

Embodiment 188. The method according to any one of Embodiments 179 to 187, wherein $R^1$ and $R^2$ are secondary alkyl groups.

Embodiment 189. The method according to any one of Embodiments 179 to 187, wherein $R^1$ and $R^2$ are tertiary alkyl groups.

Embodiment 190. The method according to any one of Embodiments 179 to 189, wherein $R^{28}$, $R^{29}$, $R^{30}$, $R^{31}$, $R^{32}$ and $R^{33}$ are each hydrogen.

Embodiment 191 An organometallic complex represented by formula I-M:

(I-M)

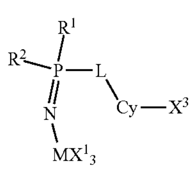

wherein

M is Ti, Zr or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula $—NR'_2$; a silyl group of the formula $—Si(R^a)_3$; a germanyl group of the formula $—Ge(R^a)_3$; and a phosphinimine group of the formula $—N{=}P(R^b)(R^c)(R^d)$; wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

Cy is a cyclopentadienyl-type moiety and is covalently bound to L and $X^3$, each $X^1$ is an activatable ligand;

$X^3$ is hydrogen, or a silyl group of the formula $—Si(R^e)_3$, or a stannyl group of the formula $Sn(R^e)_3$;

wherein each $R^e$ is independently selected from the group consisting of hydrogen, a $C_{1-8}$ alkyl group, $C_{1-8}$ alkoxy group, $C_{6-20}$ aryloxy group, and a $C_{6-20}$ aryl group; and L is a bridging group containing a contiguous chain of atoms connecting P with Cy, wherein the contiguous chain contains 2 or 3 atoms.

Embodiment 192. An olefin polymerization catalyst system comprising:

i) an organometallic complex represented formula I-M:

(I-M)

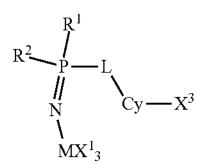

wherein

M is Ti, Zr or Hf, 3 (I-M)

$R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula $—NR'_2$; a silyl group of the formula $—Si(R^a)_3$; a germanyl group of the formula $—Ge(R^a)_3$; and a phosphinimine group of the formula $—N{=}P(R^b)(R^c)(R^d)$; wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

Cy is a cyclopentadienyl-type moiety and is covalently bound to L and $X^3$, each $X^1$ is an activatable ligand;

$X^3$ is hydrogen, or a silyl group of the formula —$Si(R^e)_3$, or a stannyl group of the formula $Sn(R^e)_3$;

wherein each $R^e$ is independently selected from the group consisting of hydrogen, a $C_{1-8}$ alkyl group, $C_{1-8}$ alkoxy group, $C_{6-20}$ aryloxy group, and a $C_{6-20}$ aryl group; and L is a bridging group containing a contiguous chain of atoms connecting P with Cy, wherein the contiguous chain contains 2 or 3 atoms; and ii) a catalyst activator.

Embodiment 193. A polymerization process comprising polymerizing ethylene optionally with one or more than one $C_3$-$C_{12}$ alpha-olefin in the presence of an olefin polymerization catalyst system comprising:

i) an organometallic complex represented formula I-M:

(I-M)

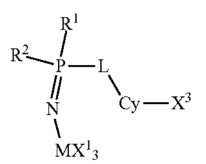

wherein

M is Ti, Zr or Hf;

$R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$; wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

Cy is a cyclopentadienyl-type moiety and is covalently bound to L and $X^3$, each $X^1$ is an activatable ligand;

$X^3$ is hydrogen, or a silyl group of the formula —$Si(R^e)_3$, or a stannyl group of the formula $Sn(R^e)_3$;

wherein each $R^e$ is independently selected from the group consisting of hydrogen, a $C_{1-8}$ alkyl group, $C_{1-8}$ alkoxy group, $C_{6-20}$ aryloxy group, and a $C_{6-20}$ aryl group; and L is a bridging group containing a contiguous chain of atoms connecting P with Cy, wherein the contiguous chain contains 2 or 3 atoms; and ii) a catalyst activator.

INDUSTRIAL APPLICABILITY

Organometallic complexes are provided which can be used within olefin polymerization catalyst systems. The olefin polymerization catalyst systems are effective at polymerizing ethylene with alpha-olefins and may be used in high temperature solution phase polymerization processes.

The invention claimed is:

1. An organometallic complex represented by formula I:

(I)

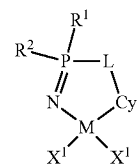

wherein

M is Ti, Zr or Hf, $R^1$ and $R^2$ are each independently selected from the group consisting of hydrogen and $R^X$; or $R^1$ and $R^2$ together with the P atom to which they are attached form a 3-10 membered heterocyclic group which is unsubstituted or further substituted by one or more substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

each $R^X$ is independently selected from the group consisting of a halogen atom; a $C_{1-30}$ hydrocarbyl group, which hydrocarbyl group is unsubstituted or further substituted by one or more than one halogen atom, $C_{1-20}$ alkyl group, $C_{1-20}$ alkoxy group, $C_{7-20}$ alkylaryl group, $C_{7-20}$ arylalkyl group, $C_{6-20}$ aryl group, $C_{6-20}$ aryloxy group, $C_{7-20}$ alkylaryloxy group, and/or $C_{7-20}$ arylalkyloxy group; an amido group of the formula —$NR'_2$; a silyl group of the formula —$Si(R^a)_3$; a germanyl group of the formula —$Ge(R^a)_3$; and a phosphinimine group of the formula —$N{=}P(R^b)(R^c)(R^d)$; wherein each R' is independently selected from the group consisting of hydrogen, $C_{1-20}$ alkyl group, and $C_{6-20}$ aryl group; wherein each $R^a$ is independently selected from the group consisting of hydrogen, $C_{1-8}$ alkyl group, $C_{1-8}$ alkoxy group, $C_{6-20}$ aryloxy group and $C_{6-20}$ aryl group; and $R^b$, $R^c$, $R^d$, are each independently a $C_{1-20}$ alkyl group;

each $X^1$ is an activatable ligand;

Cy is a cyclopentadienyl-type ligand covalently bound to L and coordinated to M via η-bonding; and L is a bridging group containing a contiguous chain of atoms connecting P with Cy, wherein the contiguous chain of atoms consists of 2 or 3 atoms.

2. The organometallic complex according to claim 1, which is represented by formula II:

(II)

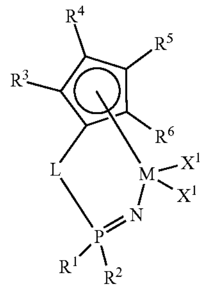

wherein $R^3$, $R^4$, $R^5$ and $R^6$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR;

a silyl group of the formula —Si($R^a$)$_3$; and a germanyl group of the formula —Ge($R^a$)$_3$;

wherein two adjacent groups of $R^3$, $R^4$, $R^5$ and $R^6$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

3. The organometallic complex according to claim 2, which is represented by formula III:

(III)

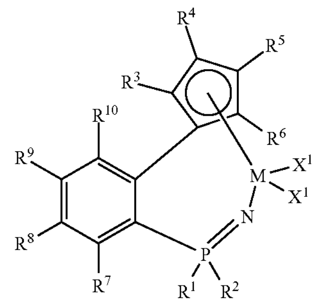

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR;

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR',a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

4. The organometallic complex according to claim 2, which is represented by formula IV:

(IV)

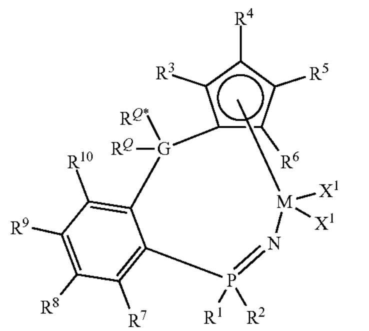

wherein G is C or Si;

wherein $R^Q$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^Q$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

5. The organometallic complex according to claim 1, which is represented by formula V:

(V)

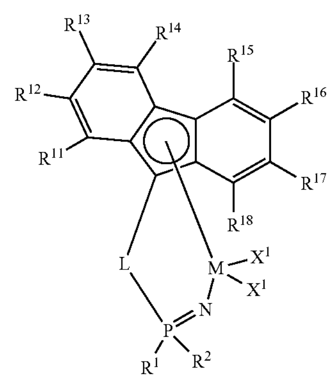

wherein $R^{11}$, $R^{12}$, $R^{13}$, $R^{14}$, $R^{15}$, $R^{16}$, $R^{17}$, $R^{18}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^{11}$, $R^{12}$, $R^{13}$, $R^{14}$, $R^{15}$, $R^{16}$, $R^{17}$, $R^{18}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

6. The organometallic complex according to claim 5, which is represented by formula VI:

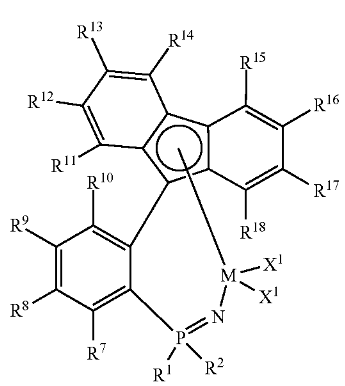

(VI)

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR';

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

7. The organometallic complex according to claim 6, wherein M is Ti.

8. The organometallic complex according to claim 6, wherein $R^7$, $R^8$, $R^9$ and $R^{10}$ are each hydrogen.

9. The organometallic complex according to claim 6, wherein $R^1$ and $R^2$ are each independently an unsubstituted $C_{1-30}$ hydrocarbyl group.

10. The organometallic complex according to claim 9, wherein $R^1$ and $R^2$ are each independently selected from the group consisting of isopropyl, cyclohexyl and tert-butyl.

11. The organometallic complex according to claim 6, wherein $R^{12}$ and $R^{17}$ are each independently an unsubstituted $C_{1-30}$ hydrocarbyl group, and $R^{11}$, $R^{13}$, $R^{14}$, $R^{15}$, $R^{16}$ and $R^{18}$ are each hydrogen.

12. The organometallic complex according to claim 11, wherein $R^{12}$ and $R^{17}$ are each a tert-butyl group.

13. The organometallic complex according to claim 6, wherein each $X^1$ is independently selected from the group consisting of a $C_{1-6}$ alkyl group, a $C_{7-10}$ arylalkyl group, and a halogen.

14. The organometallic complex according to claim 13, wherein each $X^1$ is independently selected from the group consisting of a methyl group and Cl.

15. The organometallic complex according to claim 5, which is represented by formula VII:

(VII)

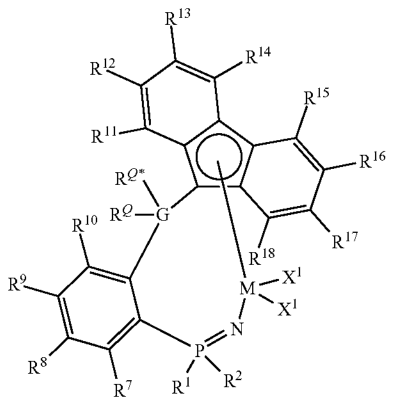

wherein G is C or Si;

wherein $R^{Q}$ and $R^{Q*}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

wherein the groups of $R^{Q}$ and $R^{Q*}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein $R^7$, $R^8$, $R^9$ and $R^{10}$ are each independently selected from the group consisting of halogen;

hydrogen;

a $C_{1-30}$ hydrocarbyl group, which hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

a heteroatom containing $C_{1-30}$ hydrocarbyl group, which heteroatom containing hydrocarbyl group is unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, and a $C_{7-20}$ arylalkyloxy group;

an oxy group, —OR';

an amido group, —NR'$_2$;

a phosphido group, —PR'$_2$;

a thiolate group, —SR;

a silyl group of the formula —Si($R^a$)$_3$; and a germanyl group of the formula —Ge($R^a$)$_3$;

wherein two adjacent groups of $R^7$, $R^8$, $R^9$ and $R^{10}$ may optionally be bonded to form a cyclic hydrocarbyl group or cyclic heteroatom containing hydrocarbyl group, the cyclic hydrocarbyl group or cyclic heteroatom containing hydrocarbyl group being unsubstituted or further substituted by one or more than one substituent selected from the group consisting of a halogen atom, a $C_{1-20}$ alkyl group, a $C_{1-20}$ alkoxy group, a $C_{7-20}$ alkylaryl group, a $C_{7-20}$ arylalkyl group, a $C_{6-20}$ aryl group, a $C_{6-20}$ aryloxy group, a $C_{7-20}$ alkylaryloxy group, a $C_{7-20}$ arylalkyloxy group, an amido group of the formula —NR'$_2$, a phosphido group of the formula —PR'$_2$, a thiolate group of the formula —SR', a silyl group of the formula —Si($R^a$)$_3$, and a germanyl group of the formula —Ge($R^a$)$_3$;

wherein each R' is independently selected from the group consisting of hydrogen, $C_{1-20}$ alkyl group, and $C_{6-20}$ aryl group; and wherein each $R^a$ is independently selected from the group consisting of hydrogen, $C_{1-8}$ alkyl group, $C_{1-8}$ alkoxy group, $C_{6-20}$ aryloxy group, and $C_{6-20}$ aryl group.

16. The organometallic complex according to claim 15, wherein M is Ti.

17. The organometallic complex according to claim 15, wherein $R^7$, $R^8$, $R^9$ and $R^{10}$ are each hydrogen.

18. The organometallic complex according to claim 15, wherein $R^1$ and $R^2$ are each independently an unsubstituted $C_{1-30}$ hydrocarbyl group.

19. The organometallic complex according to claim 18, wherein $R^1$ and $R^2$ are each independently selected from the group consisting of isopropyl, cyclohexyl and tert-butyl.

20. The organometallic complex according to claim 15, wherein $R^{12}$ and $R^{17}$ are each independently an unsubstituted $C_{1-30}$ hydrocarbyl group, and $R^{11}$, $R^{13}$, $R^{14}$, $R^{15}$, $R^{16}$, and $R^{18}$ are each hydrogen.

21. The organometallic complex according to claim 20, wherein $R^{12}$ and $R^{17}$ are each a tert-butyl group.

22. The organometallic complex according to claim 15, wherein G is carbon.

23. The organometallic complex according to claim 22, wherein $R^{Q}$ and $R^{Q*}$ are each independently selected from the group consisting of hydrogen, a $C_{1-20}$ alkyl group and a $C_{6-20}$ aryl group.

24. The organometallic complex according to claim 22, wherein $R^{Q}$ is hydrogen and $R^{Q*}$ is a $C_{1-8}$ alkyl group.

25. The organometallic complex according to claim 15, wherein each $X^1$ is independently selected from the group consisting of a $C_{1-6}$ alkyl group, a $C_{7-10}$ arylalkyl group, and a halogen.

26. The organometallic complex according to claim 25, wherein each $X^1$ is independently selected from the group consisting of a methyl group and Cl.

* * * * *